United States Patent [19]
Kobayashi et al.

[11] Patent Number: 5,844,631
[45] Date of Patent: Dec. 1, 1998

[54] MOTION ESTIMATION METHOD AND APPARATUS FOR CALCULATING A MOTION VECTOR

[75] Inventors: Takayuki Kobayashi; David Wuertele; Yutaka Okada, all of Tokyo, Japan

[73] Assignee: Graphics Communication Laboratories, Tokyo, Japan

[21] Appl. No.: 880,861

[22] Filed: Jun. 23, 1997

Related U.S. Application Data

[62] Division of Ser. No. 622,786, Mar. 27, 1996, Pat. No. 5,715,016.

[30] Foreign Application Priority Data

Apr. 5, 1995 [JP] Japan ............................. 7-80000
Jun. 14, 1995 [JP] Japan ............................. 7-147049

[51] Int. Cl.⁶ .................... H04N 5/14; H04N 9/64; H04N 7/12; H04N 11/02
[52] U.S. Cl. .......................... 348/699; 348/416
[58] Field of Search .......................... 348/384, 390, 348/400–402, 407, 409–413, 415, 416, 420, 699; 382/232, 236, 238; H04N 5/14, 9/64, 7/12, 11/02

[56] References Cited

U.S. PATENT DOCUMENTS 5,585,862 12/1996 Wuertele et al. ............ 348/699
5,619,286 4/1997 Kobayashi et al. ............ 348/416

*Primary Examiner*—Richard Lee
*Assistant Examiner*—Nhon T. Diep
*Attorney, Agent, or Firm*—Lane, Aitken & McCann

[57] ABSTRACT

Herein described are a motion estimation method and a motion estimation apparatus for calculating a motion vector to estimate a current picture based on a reference picture. The current picture is partially formed by a current block represented by pel values. The reference picture is partially formed by a search window represented by pel values and having a plurality of candidate blocks. There are provided processor elements and side register units arranged in the form of a matrix array. The pel values of the search window are fed to the processor elements and the side register units. The pel values of the current block are fed to the processor elements. Between the processor elements and the side register units, are shifted pel values of the search window. The processor elements are designed to calculate distortion values each indicative of a difference between the current block and each of the candidate blocks on the basis of the received pel values of the search window and the received pel values of the current block. The method and apparatus are characterized in that, at one of the adjoining two columns of the matrix array, the pel values of the search window are shifted only in an upward direction, while, at the other of the adjoining two columns of the matrix array, the pel values of the search window are shifted only in a downward direction.

19 Claims, 103 Drawing Sheets

MATRIX ARRAY FOR
FIRST SEARCH WINDOW

MATRIX ARRAY FOR
SECOND SEARCH WINDOW

FIG.94
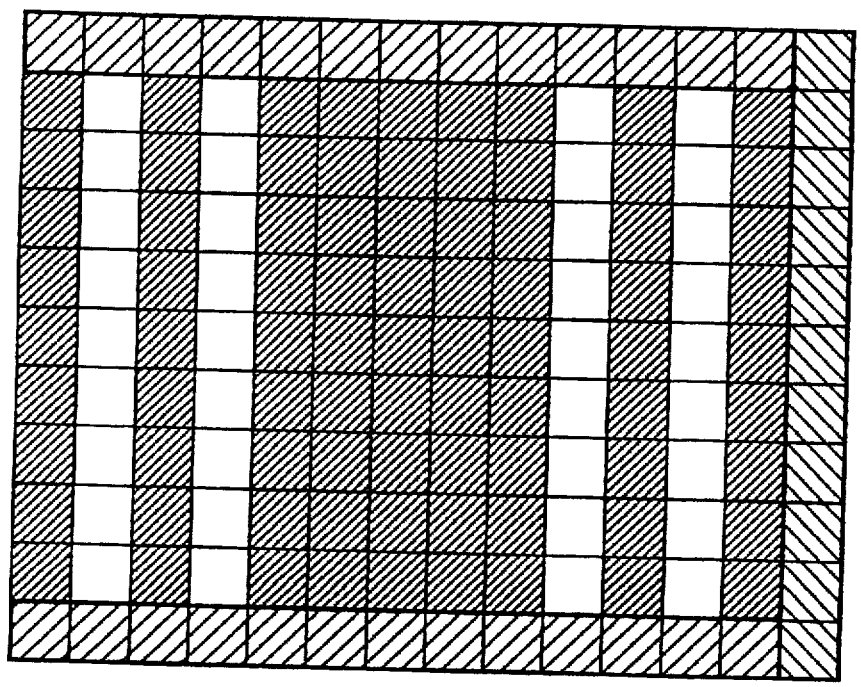
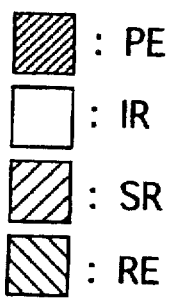: PE
☐ : IR
◪ : SR
◩ : RE

☒ : PE
☐ : IR
▨ : SR
▨ : RE

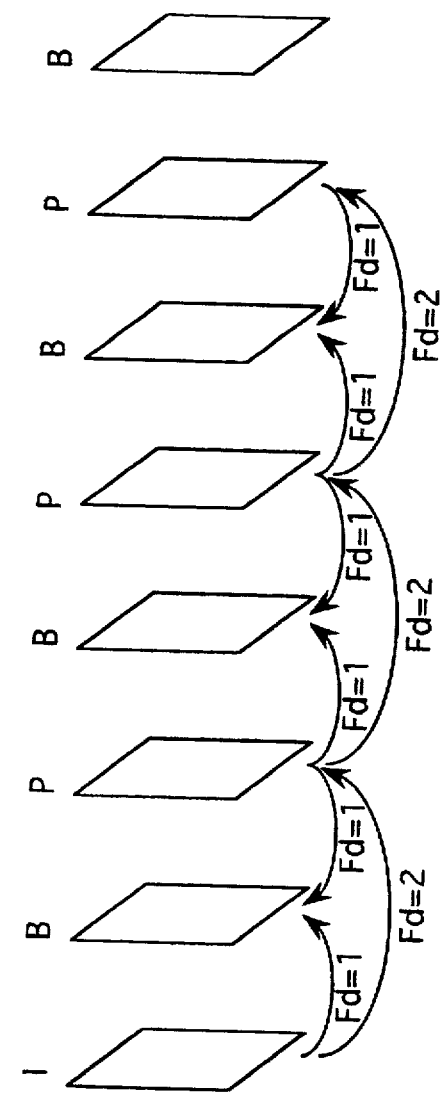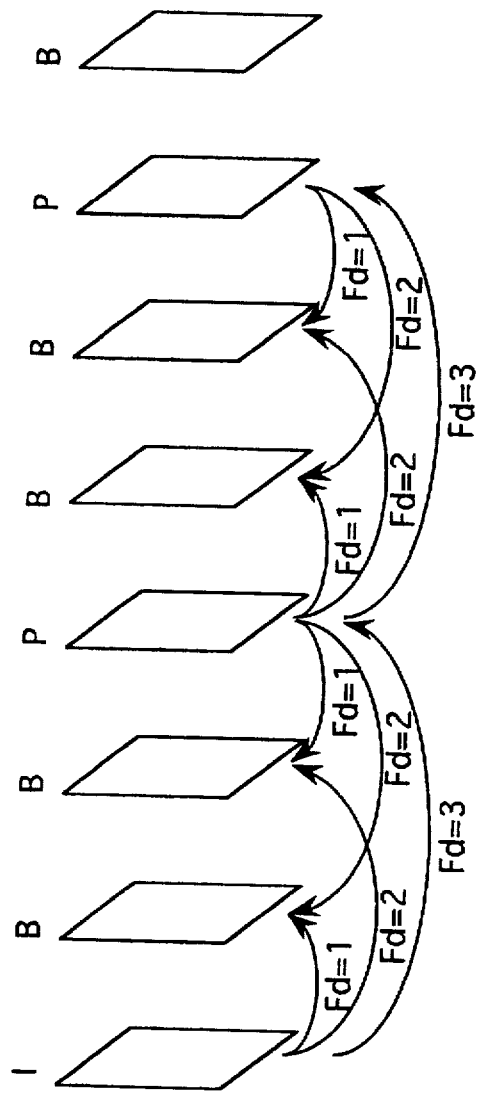
FIG. 97 PRIOR ART
(a) M=2
(b) M=3

FIG.100
PRIOR ART
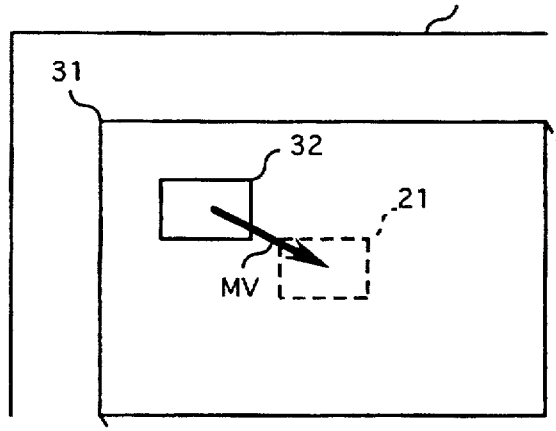
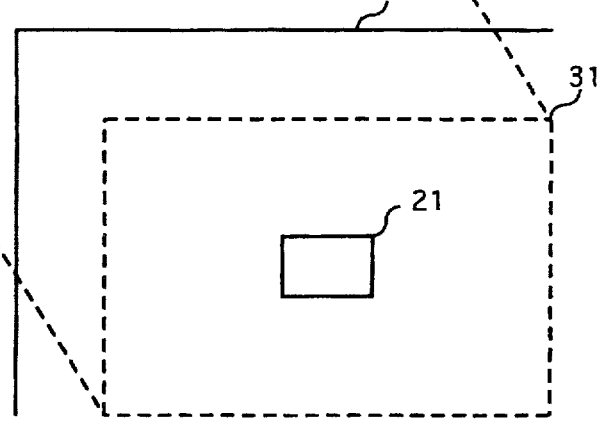

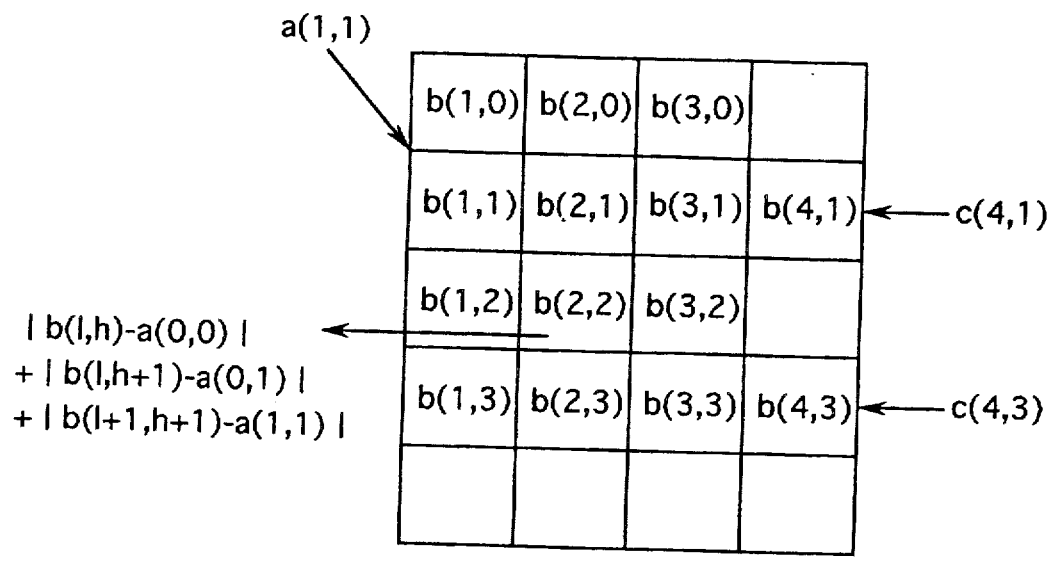
FIG.103 (c) PRIOR ART
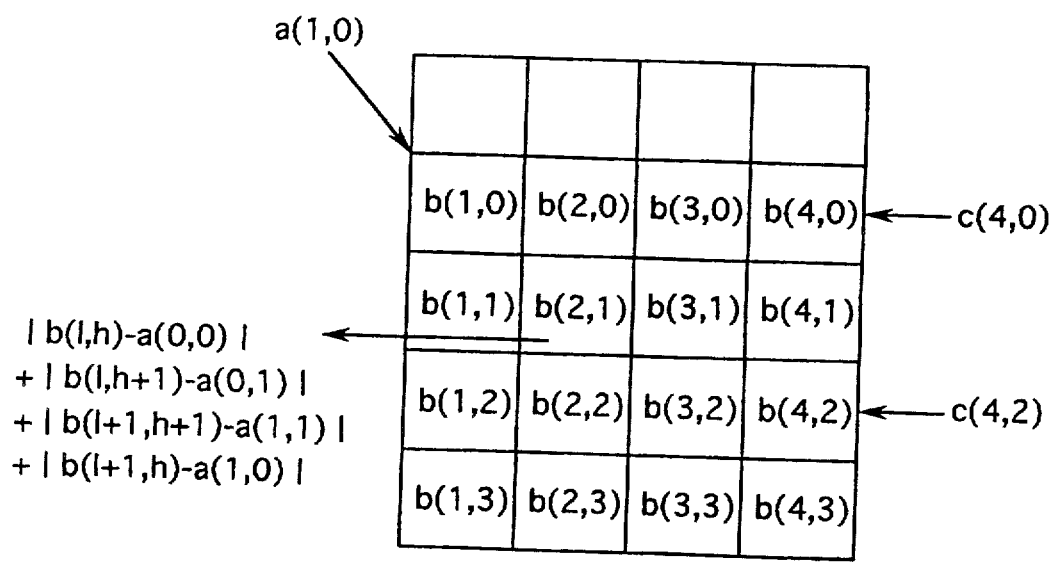
FIG.103 (d) PRIOR ART

MOTION ESTIMATION METHOD AND APPARATUS FOR CALCULATING A MOTION VECTOR

This is a division of application Ser. No. 087,786 filed Mar. 27, 1996, now U.S. Pat. No. 5,715,016.

BACKGROUND OF THE INVENTION

1. Field of the Invention

The present invention relates to a motion estimation method and an apparatus for calculating a motion vector.

2. Description of the Prior Art

In the recent years, information transmitting media such as news paper, TV and radio have been flooded with information relative to "multimedia" to which ardent attentions are paid by not only those skilled in the art but ordinary people in the world. Although variously interpreted, the term "multimedia" as used herein is considered to be information presented in the combination of text, graphics, video, sound and the like. Since such information is generally handled by a computer, data representative of the video and sound as well as the text and graphics are required to be digitized. When the data representative of video sequences such as moving pictures are digitized, the amount of digitized data is extremely large in comparison with that of the data indicative of sound, text or graphics. For this reason, the data of moving pictures to be handled by the computer are required to be compressed when the data are stored in a storage device or transmitted over a communication line.

Up until now, there have been proposed a wide variety of data compression processes for compressing the data of moving pictures. The data compression process is applied to a basic inter-frame predicting coding method, a motion compensation inter-frame predicting coding method, a bi-directional predicting coding method, a dual-prime predicting coding method, and other predicting coding methods. The following description will be made about the basic inter-frame predicting coding method, the motion compensation inter-frame predicting coding method, and the bidirectional predicting coding method with reference to FIGS. 97 to 103.

FIGS. 97(a) and 97(b) respectively show two types of moving pictures different in predicting coding process to each other and each constructed by a series of pictures. Here, the term "picture" is intended to mean a frame or a field each forming part of the moving picture. The frame comprises a first field of odd scanning lines forming part of the frame and a second field of even scanning lines forming part of the frame. The symbols "I", "P" and "B" shown in FIGS. 97(a) and 97(b) represent "Intra-picture" (hereinlater referred to as "I-picture" for simplicity), "Predictivepicture" (also hereinlater referred to as "P-picture" for simplicity) and "Bidirectionally predictive-picture" (similarly, hereinlater referred to as "B-picture"), respectively. The I-picture is encoded from its original picture. The P-picture is encoded either from the I-picture or the P-picture in the same order as that of the original picture. The B-picture is encoded after the I-picture and P-picture are processed, and is then placed between the I-picture and P-picture. The symbol "M" represents a cycle which is updated every time an I-picture or a P-picture appears, and the symbol "Fd" represents a distance between the reference picture and the picture to be encoded.

First, the basic inter-frame predicting coding method will be described with reference to FIG. 98. This method comprises a step of calculating a difference between pel values of each picture element (hereinlater referred to merely as "pel") of a current picture 12 and pel value of each pel of a reference picture 11 corresponding in position to each pel of the current picture 12, the current picture 12 and the reference picture 11 partially forming a moving picture. The method further comprises steps of comparing the difference with a predetermined threshold value, and dividing the pel value of the reference picture 11 into two data groups consisting of a significant pel value group having differences each larger than the threshold value and an insignificant pel value group having differences each equal to or less than the threshold value. The significant pel value are considered to be useful data that are not allowed to be omitted when the current picture 12 is estimated on the basis of the reference picture 11. On the contrary, the insignificant pel value are considered to be unnecessary data that are allowed to be omitted when the current picture 12 is estimated on the basis of the reference picture 11. The reference picture 11 may be either of future or past pictures with respect to the current picture 12.

If a person image 10 in the reference picture 11 has been moved right in the current picture 12 as shown in FIG. 98, there are produced two significant pel values regions indicated by the reference numerals of 13 and 14, respectively and an insignificant pel value region indicated by a blank surrounding the significant pel value regions 13 and 14. By adding, to pel value of a pel of the reference picture 11 within the significant pel value regions 13 and 14, a difference between pel value of a pel of current picture 12 and the pel value of the pel of the reference picture 11 corresponding in position to each other, pel value of the pel of the current block picture 12 can be estimated. Pel value of each pel of the current picture 12 within the insignificant pel value region are represented by pel value of a pel of the reference picture 11 corresponding in position to the pel of the current picture 12.

In the case that the basic inter-frame predicting coding method is utilized, the difference data between two pels rapidly decrease as the significant pel value is decreased. This means that compression efficiency can be enhanced. The number of the significant pel is decreased by setting the threshold value large and as a consequence the compression efficiency can be further enhanced. If, however, the threshold value becomes extremely large, motion of the image looks to be jerky, or moving portion of the image looks to be at a standstill in part, thereby resulting in an drawback of the fact that image quality becomes poor.

In view of the property of the basic inter-frame predicting coding method, the compression efficiency is enhanced under the condition that variation between the current picture and the reference picture is small because of the fact that the difference data are decreased in proportion to the size of standstill image region of the current picture with respect to the reference picture. The following motion compensation inter-frame predicting coding method, however, realizes higher compression efficiency in comparison with the basic inter-frame predicting coding method.

Likewise, on the assumption that the person image 10 in the reference picture 11 is moved right in the current picture 12, the motion compensation inter-frame predicting coding method is explained hereinafter with reference to FIG. 99. The motion compensation inter-frame predicting coding method comprises a step of calculating a motion vector "MV" indicating the movement distance and movement direction of the person image 10 between the reference picture 11 and the current picture 12. The motion compensation inter-frame predicting coding method further comprises a step of estimating the person image 10 in the current picture 12 with the aid of the motion vector MV and pel value defining the person image 10 in the reference picture 11. In this case, there is produced only one significant pel value region 13 as shown in FIG. 99. Accordingly, the motion compensation inter-frame predicting coding method is superior to the basic inter-frame predicting coding method in the fact that the number of the significant pels can be sharply decreased and accordingly that the compression efficiency can be extremely enhanced.

The motion compensation inter-frame predicting coding method will be described hereinafter in detail with reference to FIGS. 100 to 102. According to ITU-T (International telecommunication Union-Telecommunication Standardization Sector) H.261, the motion compensation inter-frame predicting coding method comprises steps of dividing a current picture 20 shown in FIG. 100 into a plurality of blocks including a block (hereinlater referred to as a "current block") 21, specifying a search window 31 including blocks (referred to hereinlater as "candidate blocks") in a reference picture 30, and calculating distortion values each indicative of a difference between the current block 21 and each of the candidate blocks. The distortion value is calculated by converting, into positive numbers, local distortion values each indicative of a difference between pel value of each pel of the current block 21 and pel value of each pel of the candidate block corresponding in position to each pel of the current block 21, and summing up the converted local distortion values.

The motion compensation inter-frame predicting coding method further comprises steps of specifying a candidate block 32 which provides a minimum distortion value, i.e., the smallest in the distortion values calculated in the above mentioned manner, and calculating a motion vector representative of a distance between and a direction defined by the current block 21 and the candidate block 32. The motion vector MV thus calculated and the distortion value between the candidate block 32 included in the reference picture 30 and the current block 21 are encoded by an encoder (not shown).

FIGS. 101(a) and 101(b) represent relations among the current block 21, search window 31 and candidate blocks 32. If the current block 21 and the search window 31 contain N columns of M pels and H columns of L pels as shown in FIGS. 101(b) and 101(a), respectively, the search window 31 includes (H−N+1)×(L−M+1) candidate blocks 32 each similar to the current blocks 21. In the case that pel value of a pel at the top left-hand corner of current block 21 in FIG. 101(b) is indicated by a(0,0), pel value of each of the candidate blocks 32 corresponding in position to the pel value a(0,0) of the current block 21 are included in an area defined by oblique lines in FIG. 101(a).

FIGS. 102(a) and 102(b) represent a positional relation between pel values of each pel of the current block 21 and pel value of each pel of the candidate block 32 corresponding in position to each pel of the current block 21. The pel value b(l+m,h+n) in FIG. 102(a) indicates pel value of each of the candidate blocks corresponding in position to the pel value a(m,n) of the current block 21 shown in FIG. 102 (b). Pel value b(l,h) in the search window 31 shown in FIG. 102(a) is representative of a block position arranged at the upper left-hand corner of the candidate block 32 and accordingly corresponds in position to the pel value a(0,0) of the current block 21.

Under the state that the current block 21, the search window 31 and the candidate block 32 are shown in FIGS. 101(a), 101(b), 102(a) and 102(b), a distortion value D(l,h) between the current block 21 and the candidate block 32 is indicated as follows:

$$D(l,h) = \sum_{m=0}^{M-1} \sum_{n=0}^{N-1} \|b(l+m, h+n) \cdot a(m,n)\| = \sum_{m=0}^{M-1} \sum_{n=0}^{N-1} \|d(m,n)\| \quad (1)$$

Note that "∥ ∥" is indicative of a norm, and "d(m,n)" represents a local distortion value indicative of a difference between pel values of two pels corresponding in position to each other. The norm arithmetic is absolute-value arithmetic, square arithmetic or the like. The local distortion value is defined by the following equation. d(m,n)=b(l+m,h+n)−a(m,n) ... (2) The above-mentioned process of comparing a block of the current picture with each of blocks of the reference picture in motion compensation inter-frame predicting coding method is called a block matching method. The above-mentioned process is particularly called a full search block matching method if the current block is compared with all the candidate blocks included in the search window.

Such the full search block matching method has been known by Japanese Patent Laid-open Publication No. 2-213291. In this method, the search window itself is moved upward, downward, and leftward with respect to the search block to scan the whole pel values in the search window, thereby saving calculation time required for calculating the local distortion values of the difference between the pel values of two pels corresponding in position to each other in the search window. During a cycle 1 shown in FIG. 103(a), after each of the processor elements receives pel value in the search window, |b(l,h)−a(0,0)| is calculated (where l=0, 1, 2, and h=0, 1, 2) at each of the processor elements. During the next cycle 2, the whole pel values in the search window is moved upward to calculate |b(1,h+1)−a(1,0)| as shown in FIG. 103(b). During the next cycle 3 shown in FIG. 103(c), the whole pel values in the search window is moved leftward to calculate |b(1+1,h+1)−a(1,1)| at each of the processor elements. During the next cycle 4, the whole pel values in the search window is moved downward to calculate |b(l+1,h)−a(0,1)| as shown in FIG. 103(d).

The block matching method described above is, however, required to be carried out through two different cycles consisting of a first cycle for transmitting the whole pel values in the search window upward and a second cycle for transmitting the whole pel values in the search window downward, and thus requires upward and downward busses each of which needs to be connected at each of the processor elements, therefore making it more complex and difficult to design various circuits to calculate the distortion values. Moreover, the size of the search window cannot be changed when the moving distance of a moving picture is extremely large, or when the time-lag is excessively long between the play-back pictures of the reference picture and the current picture whose motion vector is calculated, by the reason that the size of the search window is determined by the number of processor elements.

SUMMARY OF THE INVENTION

It is a primary object of the present invention to provide a motion estimation method and apparatus in which search window data can be transmitted between processor elements in an efficient way during distortion calculations.

It is another object of the present invention to provide a motion estimation method and apparatus in which a few processor elements can carry out distortion calculations for a search window.

It is a further object of the present invention to provide a motion estimation method and apparatus in which a circuit can carry out both coarse vector search and fine vector search.

It is a still further object of the present invention to provide a motion estimation method and apparatus which comprises processor elements operated selectively to carry out distortion calculations for a first search window and to carry out distortion calculations for a second search window.

In accordance with an aspect of the present invention, there is provided a motion estimation method of calculating a motion vector to estimate a current picture partially forming a moving picture on the basis of a reference picture partially forming the moving picture. The current picture is partially formed by a current block containing N×M pel values which are arranged in the form of a matrix with N rows by M columns. The reference picture is partially formed by a search window containing H×L pel values which are arranged in the form of a matrix with H rows by L columns. The search window has a plurality of candidate blocks each equal in size to the current block, and the motion vector is indicative of a displacement between the current block and one of the candidate blocks most similar to the current block. Here, the N and M are integers, respectively, and the H and L are integers greater than the N and M, respectively.

The motion estimation method comprises the step (i) of preparing (H−N+1)×(L−M+1) processor elements for receiving and holding the pel values of the search window and for receiving the pel values of the current block to calculate distortion values each indicative of a difference between the current block and each of the candidate blocks, (L−M+1) side register units for receiving and holding the pel values of the search window, and an input register unit for receiving and holding the pel values of the search window. The processor elements are arranged in the form of a matrix array with (H−N+1) rows by (L−M+1) columns. Each of the side register units is electrically connected to each of the processor elements of the 1st row of the matrix array and electrically connected to each of the processor elements of the (H−N+1)th row of the matrix array. The side register unit electrically connected to the processor element of the ∥th column of the matrix array is assumed to be a side register unit of the ∥th column. Here, the ∥ is an integer defined by 1≦∥≦(L−M+1). The input register unit is electrically connected to the side register unit of the (L−M+1)th column and the processor elements of the (L−M+1)th column.

The motion estimation method further comprises the steps (ii), (iii) and (iv) of inputting the pel values of the search window into the input register unit, transmitting H pel values of the search window from the input register unit to the processor elements and side register unit of the (L−M+1)th column, and of repeating the transmitting step (iii) at regular intervals until all of the pel values of the search window are received by the processor elements and the side register unit of the (L−M+1)th column.

The motion estimation method further comprises the step (v) of parallel shifting the pel values from the processor elements of the ∥th column to the processor elements of the (∥−1)th column and from the side register unit of the ∥th column to the side register unit of the (∥−1)th column in simultaneous relationship to the repeated transmitting steps (iii).

The motion estimation method further comprises the step (vi) of parallel shifting, (N−1) times in each of the intervals, the pel values from the side register units of the odd columns to the processor elements occupying intersections of the odd columns and the 1st row, from the processor elements occupying intersections of the odd columns and the hth row to the processor elements occupying intersections of the odd columns and the (h+1)th row, and from the processor elements occupying intersections of the odd columns and the (H−N+1)th row to the side register units of the odd columns. Here the h is an integer defined by 1≦h<(H−N+1).

The motion estimation method further comprises the step (vii) of parallel shifting, (N−1) times in each of the intervals, the pel values from the side register units of the even columns to the processor elements occupying intersections of the even columns and the (H−N+1)th row, from the processor elements occupying intersections of the even columns and the (h+1)th row to the processor elements occupying intersections of the even columns and the hth row, and from the processor elements occupying intersections of the even columns and the 1st row to the side register units of the even columns.

The motion estimation method further comprises the steps (viii), (ix) and (x) of inputting the pel values of the current block into the processor elements of the odd columns in first predetermined order simultaneously when the pel values of each of the candidate blocks are received by each of the processor elements, and of inputting the pel values of the current block into the processor elements of the even columns in second predetermined order different from the first predetermined order simultaneously when the pel values of the candidate blocks are received by each of the processor elements, and instructing each of the processor elements to calculate each of the distortion values on the basis of the received pel values of each of the candidate blocks and the received pel values of the current block.

In accordance with another aspect of the present invention, there is provided a motion estimation apparatus for calculating a motion vector to estimate a current picture partially forming a moving picture on the basis of a reference picture partially forming the moving picture. The current picture is partially formed by a current block containing N×M pel values which are arranged in the form of a matrix with N rows by M columns. The reference picture is partially formed by a search window containing H×L pel values which are arranged in the form of a matrix with H rows by L columns. The search window has a plurality of candidate blocks each equal in size to the current block. The motion vector is indicative of a displacement between the current block and one of the candidate blocks most similar to the current block. Here, the N and M are integers, respectively, and the H and L are integers greater than the N and M, respectively.

The motion estimation apparatus comprises (H−N+1)×(L−M+1) processor elements for receiving and holding the pel values of the search window and for receiving the pel values of the current block to calculate distortion values each indicative of a difference between the current block and each of the candidate blocks. The processor elements are arranged in the form of a matrix array with (H−N+1) rows by (L−M+1) columns. The motion estimation apparatus further comprises (L−M+1) side register units for receiving and holding the pel values of the search window. Each of the side register units is electrically connected to each of the processor elements of the 1st row of the matrix array and electrically connected to each of the processor elements of the (H−N+1)th row of the matrix array. The side register unit electrically connected to the processor element of the ∥th column of the matrix array is assumed to be a side register unit of the ∥th column. Here the ∥ is an integer defined by 1≦∥≦(L−M+1). The motion estimation apparatus further comprises an input register unit for receiving and holding the pel values of the search window. The input register unit is electrically connected to the side register unit of the (L−M+1)th column and the processor elements of the (L−M+1)th column.

The motion estimation apparatus further comprises search window supplying means for supplying the pel values of the search window to the input register unit, current block supplying means for supplying the pel values of the current block to the processor elements, and transmission control means for repeatedly transmitting H pel values of the search window from the input register unit to the processor elements and side register unit of the (L−M+1)th column until all of the pel values of the search window are received by the processor elements and side register unit of the (L−M+1)th column.

The motion estimation apparatus further comprises first shift control means for parallel shifting the pel values from the processor elements of the ∥th column to the processor elements of the (∥−1)th column and from the side register unit of the ∥th column to the side register unit of the (∥−1)th column in simultaneous relationship to each of the repetitions by the transmission control means, second shift control means for parallel shifting, (N−1) times in each of the intervals, the pel values from the side register units of the odd columns to the processor elements occupying intersections of the odd columns and the 1st row, from the processor elements occupying intersections of the odd columns and the hth row to the processor elements occupying intersections of the odd columns and the (h+1)th row, and from the processor elements occupying intersections of the odd columns and the (H−N+1)th row to the side register units of the odd columns. Here the h is an integer defined by $1 \leq h < (H-N+1)$, and third shift control means for parallel shifting, (N−1) times in each of the intervals, the pel values from the side register units of the even columns to the processor elements occupying intersections of the even columns and the (H−N+1)th row, from the processor elements occupying intersections of the even columns and the (h+1)th row to the processor elements occupying intersections of the even columns and the hth row, and from the processor elements occupying intersections of the even columns and the 1st row to the side register units of the even columns.

The motion estimation apparatus further comprises odd column input control means for instructing the current block supplying means to input the pel values of the current block into the processor elements of the odd columns in first predetermined order simultaneously when the pel values of each of the candidate blocks are received by each of the processor elements, even column input control means for instructing the current block supplying means to input the pel values of the current block into the processor elements of the even columns in second predetermined order different from the first predetermined order simultaneously when the pel values of the candidate blocks are received by each of the processor elements, and calculation control means for instructing the processor elements to calculate each of the distortion values on the basis of the received pel values of each of the candidate blocks and the received pel values of the current block.

In accordance with a further aspect of the present invention, there is provided a motion estimation method of calculating a motion vector to estimate a current picture partially forming a moving picture on the basis of a reference picture partially forming the moving picture. The current picture is partially formed by a current block containing N×M pel values which are arranged in the form of a matrix with N rows by M columns. The reference picture is partially formed by a search window containing H×L pel values which are arranged in the form of a matrix with H rows by L columns. The search window has a plurality of candidate blocks each equal in size to the current block. The motion vector is indicative of a displacement between the current block and one of the candidate blocks most similar to the current block. Here, the N and M are integers, respectively, and the H and L are integers greater than the N and M, respectively. The motion estimation method comprises the step (i) of preparing a plurality of processor elements for receiving and holding the pel values of the search window and for receiving the pel values of the current block to calculate distortion values each indicative of a difference between the current block and each of the candidate blocks, a plurality of intermediate registers for receiving and holding the pel values of the search window, and (L−M+1) side register units for receiving and holding the pel values of the search window and an input register unit for receiving and holding the pel values of the search window. The sum of the number of the processor elements and the number of the intermediate registers is (H−N+1)×(L−M+1). The processor elements and the intermediate registers respectively form (H−N+1)×(L−M+1) matrix elements arranged in the form of a matrix array with (H−N+1) rows by (L−M+1) columns. The (L−M+1) side register units are related to at least one of each of the (L−M+1) matrix elements of the 1st row and each of the (L−M+1) matrix elements of the (H−N+1)th row. The side register unit related to the matrix element of the ∥th column of the matrix array is assumed to be a side register unit of the ∥th column. Here, the ∥ is an integer defined by $1 \leq \| \leq (L-M+1)$. The input register unit is electrically connected to the side register unit of the (L−M+1)th column and the matrix elements of the (L−M+1)th column.

The motion estimation method comprises the steps (ii), (iii) and (iv) of inputting the pel values of the search window into the input register unit, of transmitting H pel values of the search window from the input register unit to the matrix elements and side register unit of the (L−M+1)th column of the matrix array, and of repeating the transmitting step (iii) at regular intervals until all of the pel values of the search window are received by the matrix elements and the side register unit of the (L−M+1)th column of the matrix array.

The motion estimation method comprises the step (v) of parallel shifting the pel values from the matrix elements of the ∥th column to the matrix elements of the (∥−1)th column of the matrix array and from the side register unit of the ∥th column to the side register unit of the (∥−1)th column in simultaneous relationship to each of the repeated transmitting steps (iii).

The motion estimation method comprises the step (vi) of parallel shifting, (N−1) times in each of the intervals, the pel values from the side register units of the odd columns of the matrix array to the matrix elements occupying intersections of the odd columns and the 1st row of the matrix array, from the matrix elements occupying intersections of the odd columns and the hth row of the matrix array to the matrix elements occupying intersections of the odd columns and the (h+1)th row of the matrix array, and from the matrix elements occupying intersections of the odd columns and the (H−N+1)th row of the matrix array to the side register units of the odd columns. Here, the h is an integer defined by $1 \leq h < (H-N+1)$. The odd columns of the matrix array are assumed that the columns of the matrix array including at least one processor element and all of the rows of the matrix array are counted as columns and rows of the matrix array.

The motion estimation method comprises the step (vii) of parallel shifting, (N−1) times in each of the intervals, the pel values from the side register units of the even columns of the matrix array to the matrix elements occupying intersections of the even columns and the (H−N+1)th row of the matrix array, from the matrix elements occupying intersections of the even columns and the (h+1)th row of the matrix array to the matrix elements of the even columns and the hth row of the matrix array, and from the matrix elements occupying intersections of the even columns and the 1st row of the matrix array to the side register units of the even columns. The even columns of the matrix array are assumed that the columns of the matrix array including at least one processor element and all of the rows of the matrix array are counted as columns and rows of the matrix array.

The motion estimation method comprises the steps (viii), (ix) and (x) of inputting the pel values of the current block into the processor elements of the odd columns of the matrix array in first predetermined order simultaneously when the pel values of each of the candidate blocks are received by each of the processor elements, of inputting the pel values of the current block into the processor elements of the even columns of the matrix array in second predetermined order different from the first predetermined order simultaneously when the pel values of the candidate blocks are received by each of the processor elements, and of instructing each of the processor elements to calculate each of the distortion values on the basis of the received pel values of each of the candidate blocks and the received pel values of the current block.

In accordance with also an aspect of the present invention, there is provided a motion estimation apparatus for calculating a motion vector to estimate a current picture partially forming a moving picture on the basis of a reference picture partially forming the moving picture. The current picture is partially formed by a current block containing N×M pel values which are arranged in the form of a matrix with N rows by M columns. The reference picture is partially formed by a search window containing H×L pel values which are arranged in the form of a matrix with H rows by L columns. The search window has a plurality of candidate blocks each equal in size to the current block. The motion vector is indicative of a displacement between the current block and one of the candidate blocks most similar to the current block. Here, the N and M are integers, respectively, and the H and L are integers greater than the N and M, respectively.

The motion estimation apparatus comprises a plurality of processor elements for receiving and holding the pel values of the search window and for receiving the pel values of the current block to calculate distortion values each indicative of a difference between the current block and each of the candidate blocks and a plurality of intermediate registers for receiving and holding the pel values of the search window. The sum of the number of the processor elements and the number of the intermediate registers is (H−N+1)×(L−M+1). The processor elements and the intermediate registers respectively form (H−N+1)×(L−M+1) matrix elements arranged in the form of a matrix array with (H−N+1) rows by (L−M+1) columns.

The motion estimation apparatus further comprises (L−M+1) side register units for receiving and holding the pel values of the search window. The (L−M+1) side register units are related to at least one of each of the (L−M+1) matrix elements of the 1st row and each of the (L−M+1) matrix elements of the (H−N+1)th row. The side register unit related to the matrix element of the ∥th column of the matrix array is assumed to be a side register unit of the ∥th column. Here, the ∥ is an integer defined by $1 \leq \| \leq (L-M+1)$.

The motion estimation apparatus further comprises an input register unit for receiving and holding the pel values of the search window. The input register unit is electrically connected to the side register unit of the (L−M+1)th column and the matrix elements of the (L−M+1)th column.

The motion estimation apparatus further comprises search window supplying means for supplying the pel values of the search window into the input register unit, current block supplying means for supplying the pel values of the current block into the processor elements, and transmission control means for repeatedly transmitting H pel values of the search window from the input register unit to the processor elements and side register unit of the (L−M+1)th column until all of the pel values of the search window are received by the matrix elements and the side register unit of the (L−M+1)th column.

The motion estimation apparatus further comprises first shift control means for parallel shifting the pel values from the matrix elements of the ∥th column to the matrix elements of the (∥−1)th column of the matrix array and from the side register unit of the ∥th column to the side register unit of the (∥−1)th column in simultaneous relationship to each of the repetitions by the transmission control means.

The motion estimation apparatus further comprises second shift control means for parallel shifting, (N−1) times in each of the intervals, the pel values from the side register units of the odd columns to the matrix elements occupying intersections of the odd columns and the 1st row of the matrix array, from the matrix elements occupying intersections of the odd columns and the hth row of the matrix array to the matrix elements occupying intersections of the odd columns and the (h+1)th row of the matrix array, and from the matrix elements occupying intersections of the odd columns and the (H−N+1)th row of the matrix array to the side register units of the odd columns. Here, the h is an integer defined by $1 \leq h < (H-N+1)$. The second shift control means is operated on assumption that the columns of the matrix array including at least one processor element and all of the rows of the matrix array are counted as columns and rows of the matrix array.

The motion estimation apparatus further comprises third shift control means for parallel shifting, (N−1) times in each of the intervals, the pel values from the side register units of the even columns to the matrix elements occupying intersections of the even columns and the (H−N+1)th row of the matrix array, from the matrix elements occupying intersections of the even columns and the (h+1)th row of the matrix array to the matrix elements occupying intersections of the even columns and the hth row of the matrix array, and from the matrix elements occupying intersections of the even columns and the 1st row of the matrix array to the side register units of the even columns. The third shift control means is operated on assumption that the columns of the matrix array including at least one processor element and all of the rows of the matrix array are counted as columns and rows of the matrix array.

The motion estimation apparatus further comprises odd column input control means for instructing the current block supplying means to input the pel values of the current block into the processor elements of the odd columns of the matrix array in first predetermined order simultaneously when the pel values of each of the candidate blocks are received by each of the processor elements, and even column input control means for instructing the current block supplying means to input the pel values of the current block into the processor elements of the even columns of the matrix array in second predetermined order different from the first predetermined order simultaneously when the pel values of the candidate blocks are received by each of the processor elements, and calculation control means for instructing the processor elements to calculate each of the distortion values on the basis of the received pel values of each of the candidate blocks and the received pel values of the current block.

In accordance with also an aspect of the present invention, there is provided a motion estimation method of calculating a motion vector to estimate a current picture partially forming a moving picture on the basis of a reference picture partially forming the moving picture. The current picture includes a current block defined by a plurality of pel values. The reference picture includes a plurality of search windows each defined by a plurality of pel values. Each of the search window has a plurality of candidate blocks each equal in size to the current block. The motion vector is indicative of a displacement between the current block and one of the candidate blocks most similar to the current block.

The motion estimation method comprises the step (i) of preparing a register group formed by a plurality of first and second registers for receiving and holding the pel values of one of the search windows, and an arithmetic group formed by a plurality of arithmetic devices equal in number to the first registers. Each of the arithmetic devices receives the pel values of one of the search windows from the first registers and receives the pel values of the current block to calculate each of distortion values indicative of a difference between the current block and each of the candidate blocks.

The motion estimation method further comprises the steps (ii) through (vii) of selecting one from among the search windows, of supplying the register group with the pel values of the search window selected in the selecting step (ii), of supplying the arithmetic group with the pel values of the current block, of selecting part of the first and second registers on the basis of the search window selected in the selecting step (ii), of instructing the selected first and second registers to shift the pel values of the search window therebetween, of instructing the arithmetic devices to calculate the distortion values, respectively, on the basis of the received pel values of the candidate blocks of the selected search window received from the selected first registers and the received pel values of the current block, and of detecting the minimum distortion value from among the calculated distortion values to specify the candidate block of the selected search window most similar to the current block.

In accordance with also an aspect of the present invention, there is provided a motion estimation apparatus for calculating a motion vector to estimate a current picture partially forming a moving picture on the basis of a reference picture partially forming the moving picture. The current picture includes a current block defined by a plurality of pel values. The reference picture includes a plurality of search windows each defined by a plurality of pel values. Each of the search window has a plurality of candidate blocks each equal in size to the current block. The motion vector is indicative of a displacement between the current block and one of the candidate blocks most similar to the current block.

The motion estimation apparatus comprises search window supplying means for supplying the pel values of the search windows, current block supplying means for supplying the pel values of the current block, a register group formed by a plurality of first and second registers for receiving and holding the pel values of one of the search windows, and an arithmetic group formed by a plurality of arithmetic devices equal in number to the first registers, each of the arithmetic devices receiving the pel values of one of the search window from the first registers and receiving the pel values of the current block to calculate each of distortion values indicative of a difference between the current block and each of the candidate blocks.

The motion estimation apparatus further comprises search window selecting means for selecting one from among the search windows, first instructing means for instructing the search window supplying means to supply the register group with the pel values of the search window selected by the selecting means, second instructing means for instructing the current block supplying means to supply the arithmetic group with the pel values of the current block, selecting means for selecting part of the first and second registers on the basis of the search window selected by the search window selecting means, third instructing means for instructing the selected first and second registers to shift the pel values of the search window therebetween, fourth instructing means for instructing the arithmetic devices to calculate the distortion values, respectively, on the basis of the received pel values of the candidate blocks of the selected search window received from the selected first registers and the received pel values of the current block, and detecting means for detecting the minimum distortion value from among the calculated distortion values to specify the candidate block of the selected search window most similar to the current block.

In accordance with also an aspect of the present invention, there is provided a motion estimation apparatus for calculating a motion vector to estimate a current picture partially forming a moving picture on the basis of a reference picture partially forming the moving picture. The current picture is partially formed by a current block containing N×M pel values which are arranged in the form of a matrix with N rows by M columns. The reference picture is partially formed by first and second search windows containing H1×L1 pel values and H2×L2 pel values, respectively, which are arranged in the form of a matrix with H1 rows by L1 columns and H2 rows by L2 columns, respectively. The first and second search windows each has a plurality of candidate blocks each equal in size to the current block. Here, the N and M are integers, respectively, and the H1 and L1 are integers greater than the N and M, respectively, the H2 and L2 are integers greater than the N and M, respectively, and smaller than the H1 and L1. The motion estimation apparatus assumes two different operation modes consisting of a first operation mode in which the apparatus calculates a motion vector indicative of a displacement between the current block and one of the candidate blocks of the first search window most similar to the current block, and a second operation mode in which the apparatus calculates a motion vector indicative of a displacement between the current block and one of the candidate blocks of the second search window most similar to the current block.

The motion estimation apparatus comprises a plurality of processor elements for receiving and holding the pel values of the search window and for receiving the pel values of the current block to calculate distortion values each indicative of a difference between the current block and each of the candidate blocks. The number of the processor elements is equal to the number of the candidate blocks included in the second search window.

The motion estimation apparatus further comprises a plurality of intermediate registers for receiving and holding the pel values of the search window. The sum of the number of the processor elements and the number of the intermediate registers is (H1−N+1)×(L1−M+1). The processor elements and the intermediate registers respectively form (H1−

N+1)×(L1−M+1) matrix elements arranged in the form of a matrix array with (H1−N+1) rows by (L1−M+1) columns.

The motion estimation apparatus further comprises (L1−M+1) side register units for receiving and holding the pel values of the search window. The (L1−M+1) side register units are related to at least one of each of the (L1−M+1) matrix elements of the 1st row and each of the (L1−M+1) matrix elements of the (H1−N+1)th row. The side register unit related to the matrix element of the ∥th column of the matrix array is assumed to be a side register unit of the ∥th column. Here, the ∥ is an integer defined by 1≦∥≦(L1−M+1).

The motion estimation apparatus further comprises mode selecting means for selecting one of the first and second operation modes. All of the columns and rows of the matrix array are counted as columns and rows of a matrix array for the first search window when the first operation mode is selected. Part of the columns and the rows of the matrix array includes at least one processor element are counted as columns and rows of a matrix array for the second search window when the second operation mode is selected.

The motion estimation apparatus further comprises an input register unit for receiving and holding the pel values of the selected search window. The input register unit is electrically connected to the side register unit of the (L1−M+1)th column of the first or matrix array and the matrix elements of the (L1−M+1)th column of the matrix array.

The motion estimation apparatus further comprises search window supplying means for supplying the pel values of the first search window to the input register unit when the first operation mode is selected, and for supplying the pel values of the second search window to the input register unit when the second operation mode is selected, current block supplying means for supplying the pel values of the current block into the processor elements, and transmission control means for repeatedly transmitting H1 or H2 pel values of the first or second search window from the input register unit to the matrix elements and side register unit of the (L1−M+1)th column until all of the pel values of the first or second search window are received by the matrix elements and the side register unit of the (L1−M+1)th column.

The motion estimation apparatus further comprises first shift control means for parallel shifting the pel values from the matrix elements of the ∥th column of the matrix array to the matrix elements of the (∥−1)th column of the matrix array and from the side register unit of the ∥th column of the matrix array to the side register unit of the (∥−1)th column in simultaneous relationship to each of the repetitions by the transmission control means. The first shift control means is operated on assumption that all of the rows and columns of the matrix array are counted as columns of the matrix array when the first operation mode is selected, and that the rows and columns of the matrix array each including at least one processor element are counted as columns of the matrix array when the second operation mode is selected.

The motion estimation apparatus further comprises second shift control means for parallel shifting, (N−1) times in each of the intervals, the pel values from the side register units of the odd columns to the matrix elements occupying intersections of the odd columns and the 1st row of the matrix array, from the matrix elements occupying intersections of the odd columns and the hth row of the matrix array to the matrix elements occupying intersections of the odd columns and the (h+1)th row of the matrix array, and from the matrix elements occupying intersections of the odd columns and the (H1−N+1)th row of the matrix array to the side register units of the odd columns. Here, the h is an integer defined by 1≦h<(H1−N+1). The second shift control means is operated on assumption that the columns of the matrix array including at least one processor element and all of the rows of the matrix array are counted as columns and rows of the matrix array when the first operation mode is selected, and that the rows and columns of the matrix array each including as least one processor element are counted as rows and columns of the matrix array when the second operation mode is selected.

The motion estimation apparatus further comprises third shift control means for parallel shifting, (N−1) times in each of the intervals, the pel values from the side register units of the even columns to the matrix elements occupying intersections of the even columns and the (H1−N+1)th row of the matrix array, from the matrix elements occupying intersections of the even columns and the (h+1)th row of the matrix array to the matrix elements occupying intersections of the even columns and the hth row of the matrix array, and from the matrix elements occupying intersections of the even columns and the 1st row of the matrix array to the side register units of the even columns. The third shift control means is operated on assumption that the columns of the matrix array including at least one processor element and all of the rows of the matrix array are counted as columns and rows of the matrix array when the first operation mode is selected, and that the rows and columns of the matrix array each including as least one processor element are counted as rows and columns of the matrix array when the second operation mode is selected.

The motion estimation apparatus further comprises odd column input control means for instructing the current block supplying means to input the pel values of the current block into the processor elements of the odd columns of the matrix array in first predetermined order simultaneously when the pel values of each of the candidate blocks are received by each of the processor elements, and even column input control means for instructing the current block supplying means to input the pel values of the current block into the processor elements of the even columns of the matrix array in second predetermined order different from the first predetermined order simultaneously when the pel values of the candidate blocks are received by each of the processor elements, and calculation control means for instructing each of the processor elements to calculate each of the distortion values on the basis of the received pel values of each of the candidate blocks of the first search window and the received pel values of the current block when the first operation mode is selected by the mode selecting means, and for instructing each of the processor elements to calculate each of the distortion values on the basis of the received pel values of each of the candidate blocks of the second search window and the received pel values of the current block when the second operation mode is selected by the mode selecting means.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 1 is a block diagram showing a first embodiment of a motion estimation apparatus according to the present invention as comprising a distortion calculating unit 1000a;

FIG. 36 is a block diagram showing a second embodiment of a motion estimation apparatus according to the present invention as comprising a distortion calculating unit 2000a;

FIG. 70 is a block diagram showing the third embodiment of the motion estimation apparatus according to the present invention as comprising a distortion calculating unit 3000a;

17

Figure 70:
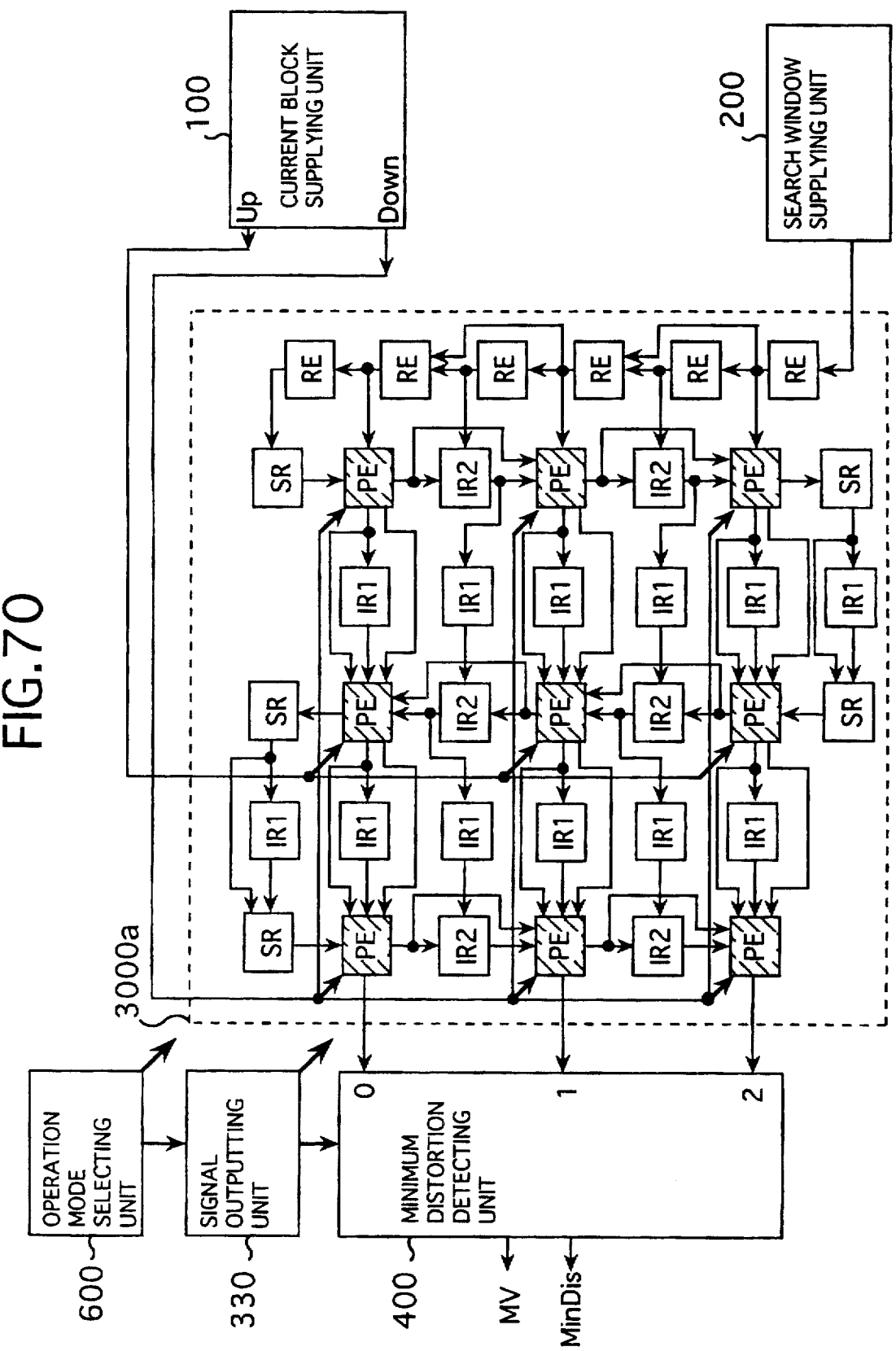
Figure 71:
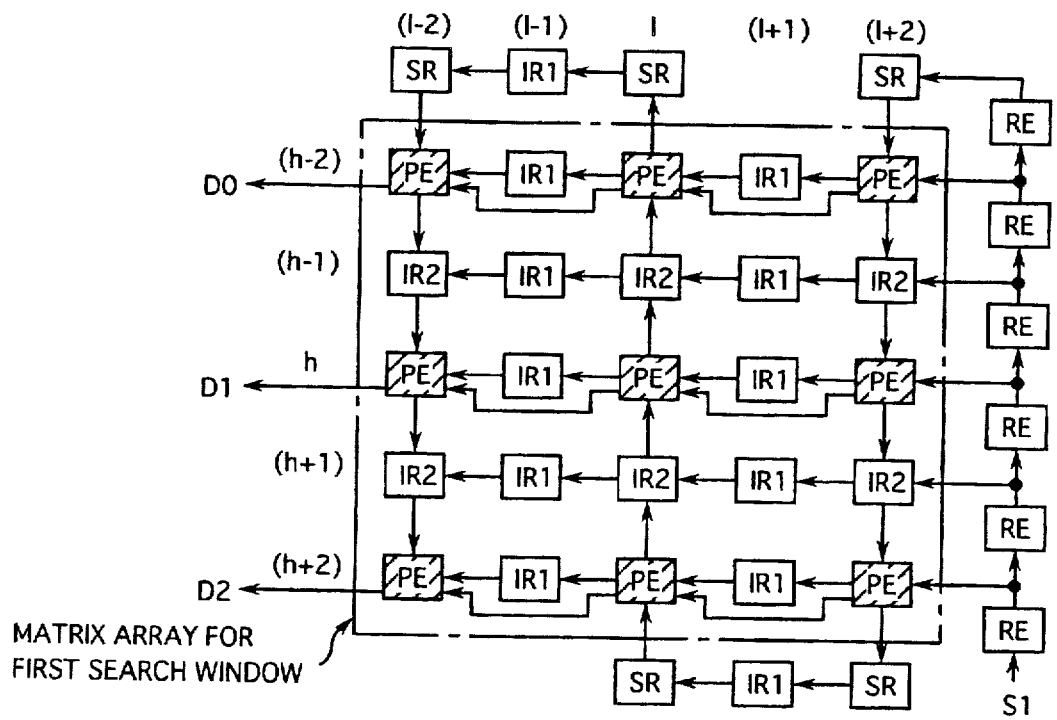
FIGS. 71(a) and 71(b) are diagrams showing matrix arrays for first search window and second search window.
Figure 71:
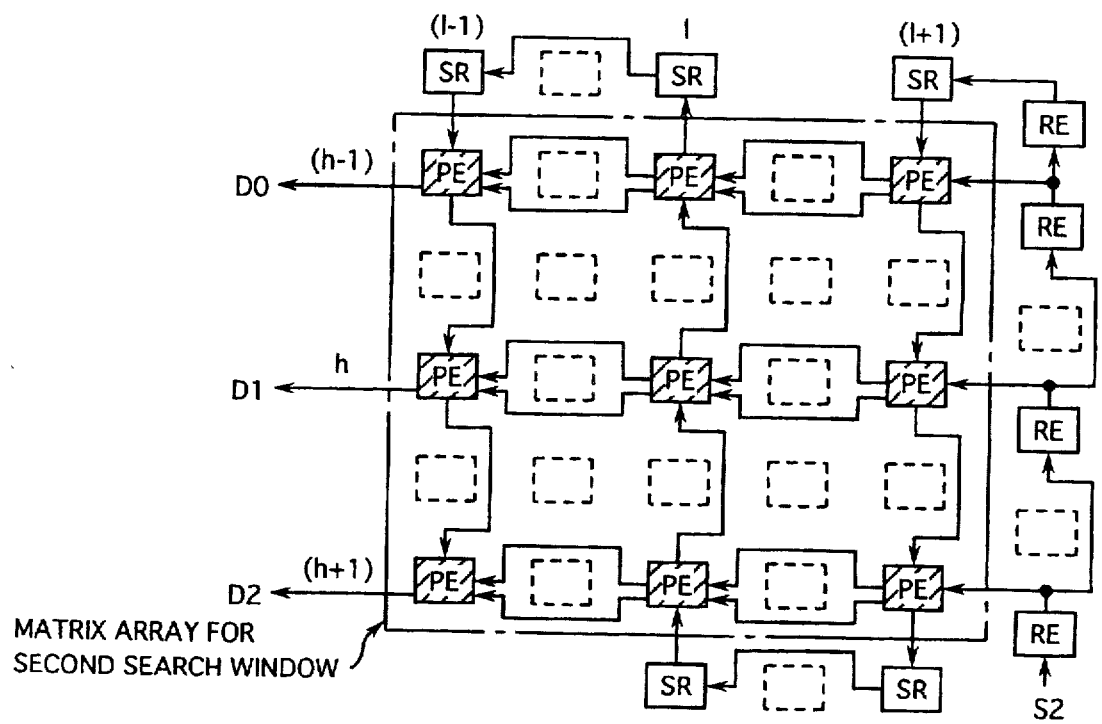
Figure 72:
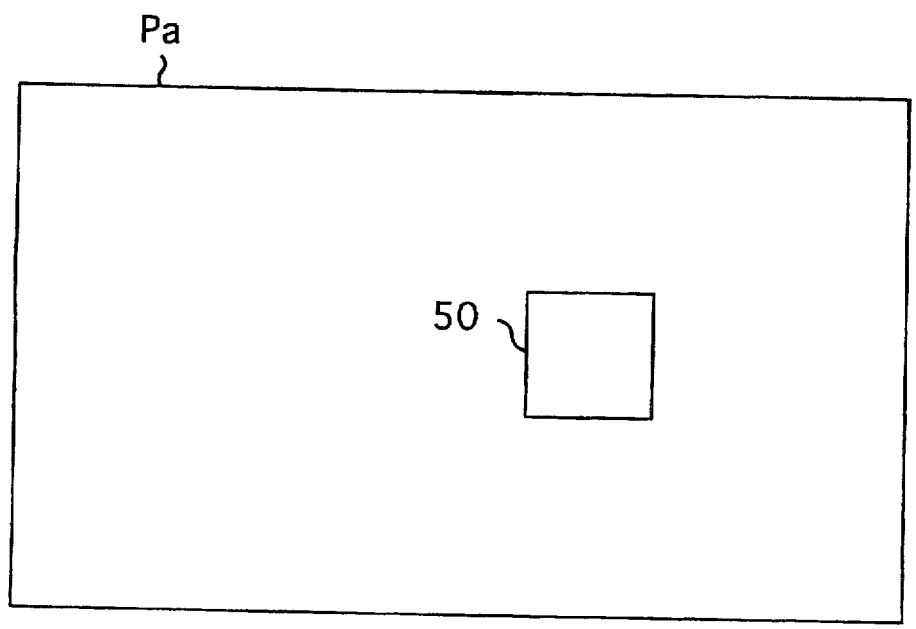
FIG. 72(a) is a diagram showing a current picture including a current block.
FIG. 72(b) is a diagram showing a reference picture including a first search window and a second search window.
Figure 72:
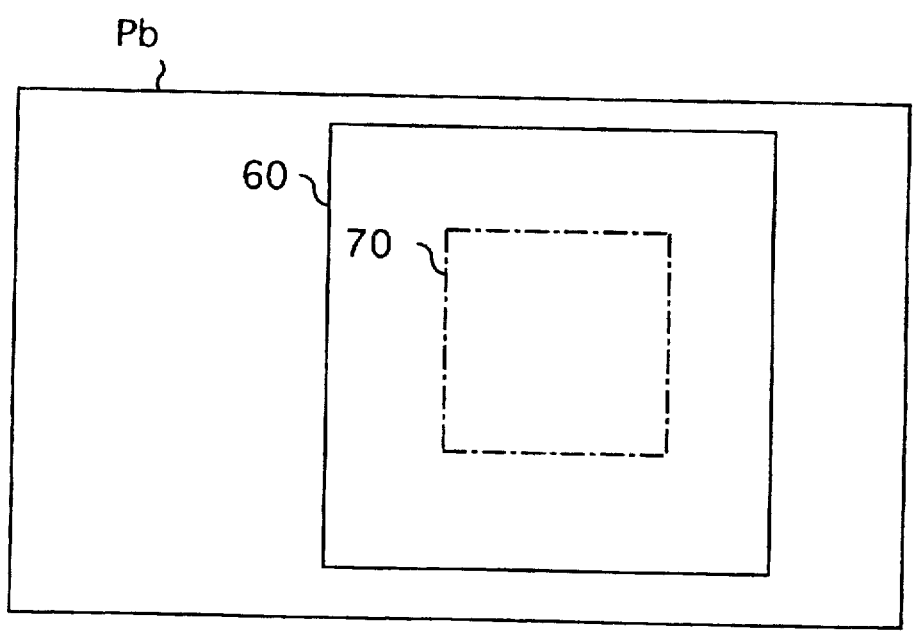
Figure 77A:
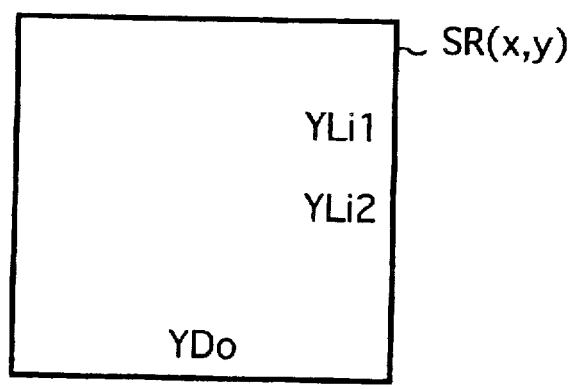
Figure 77B:
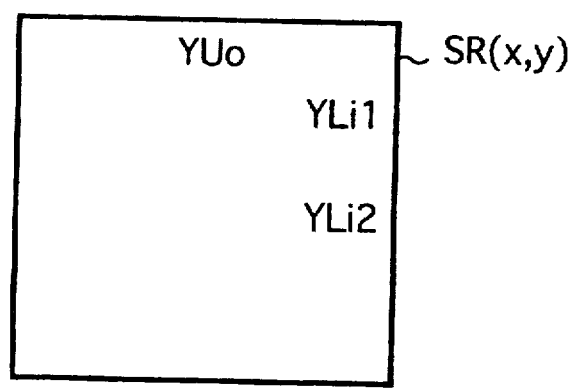
Figure 78:
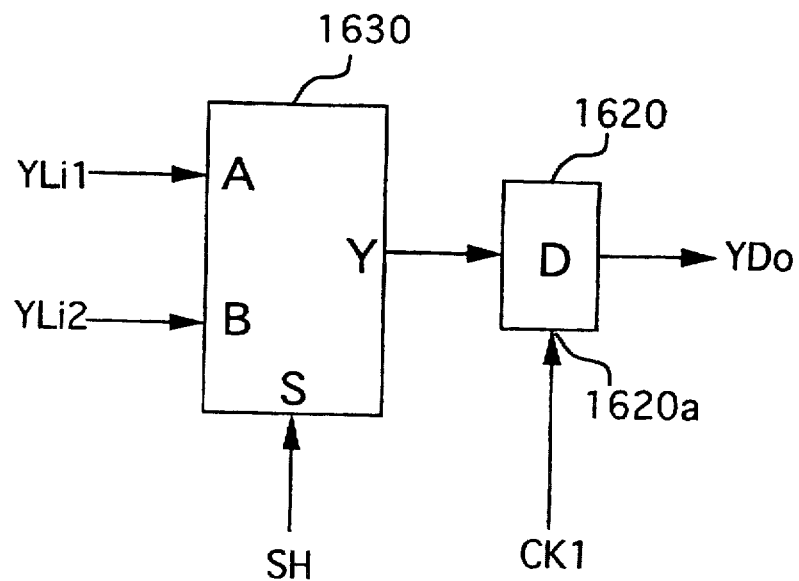
Figure 78:
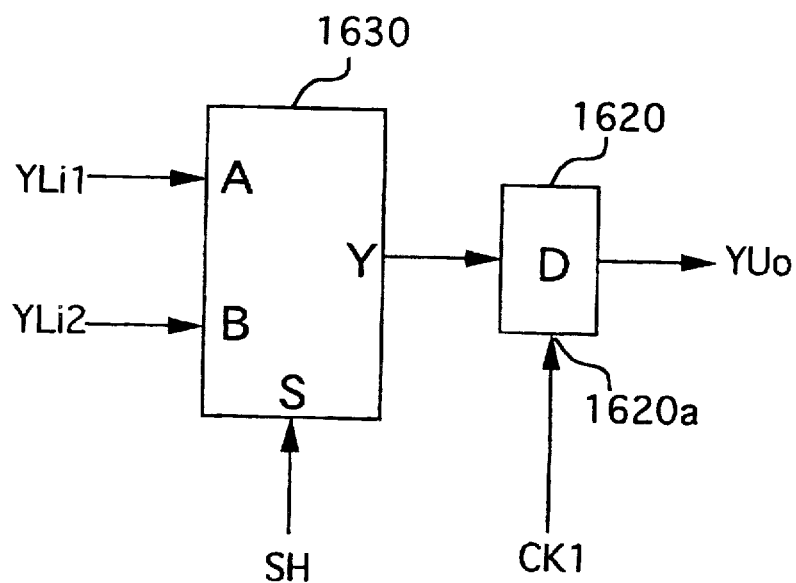
Figure 79:
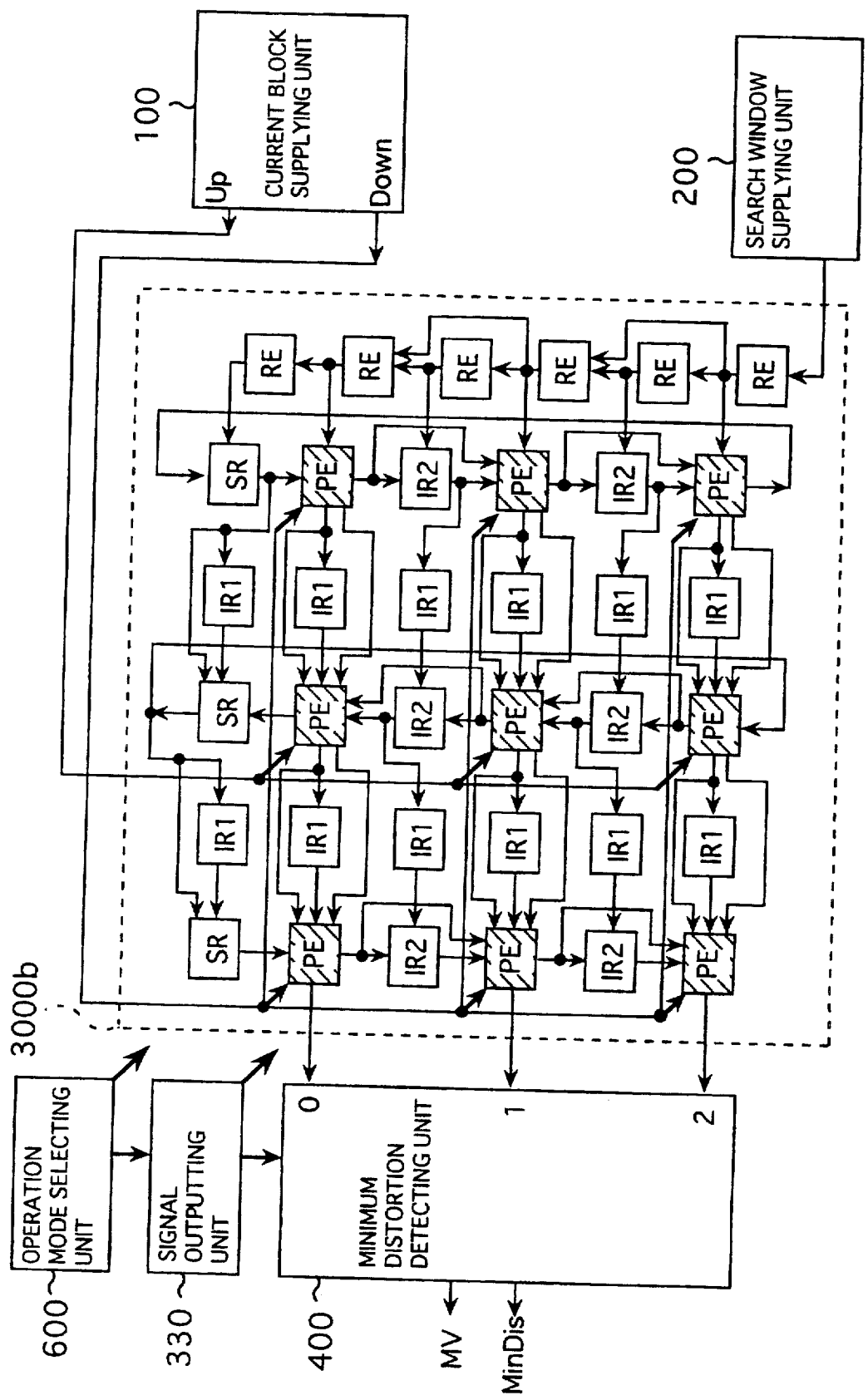
Figure 80:
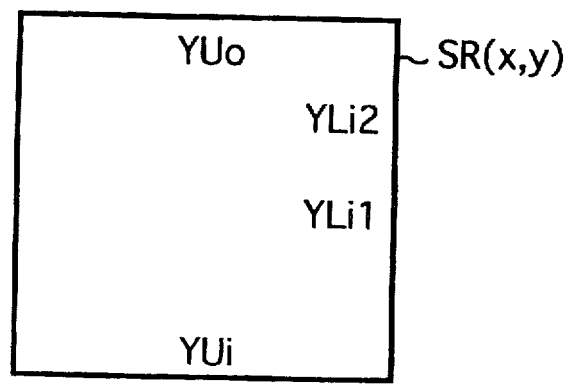
Figure 80:
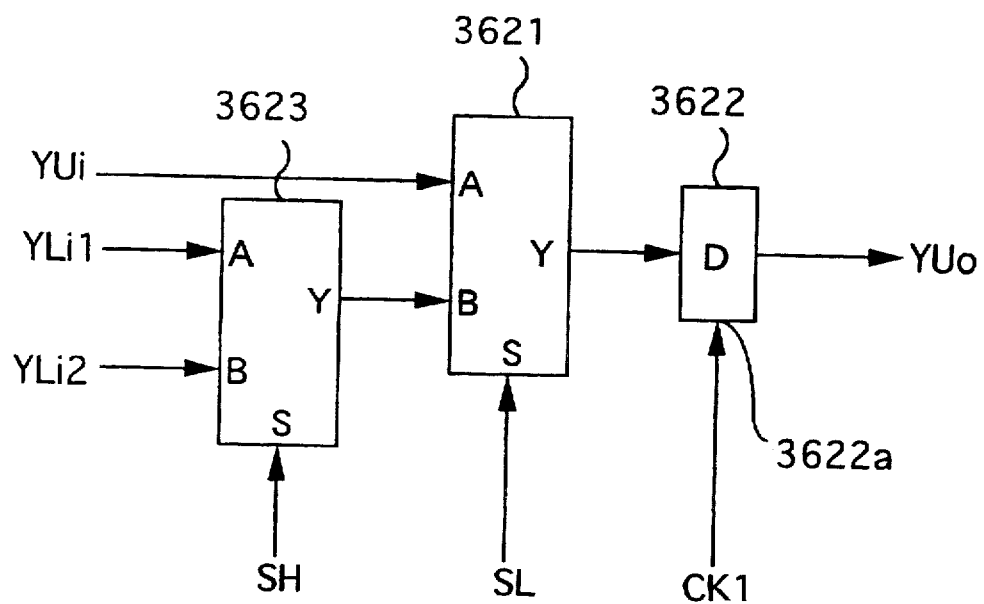
Figure 81:
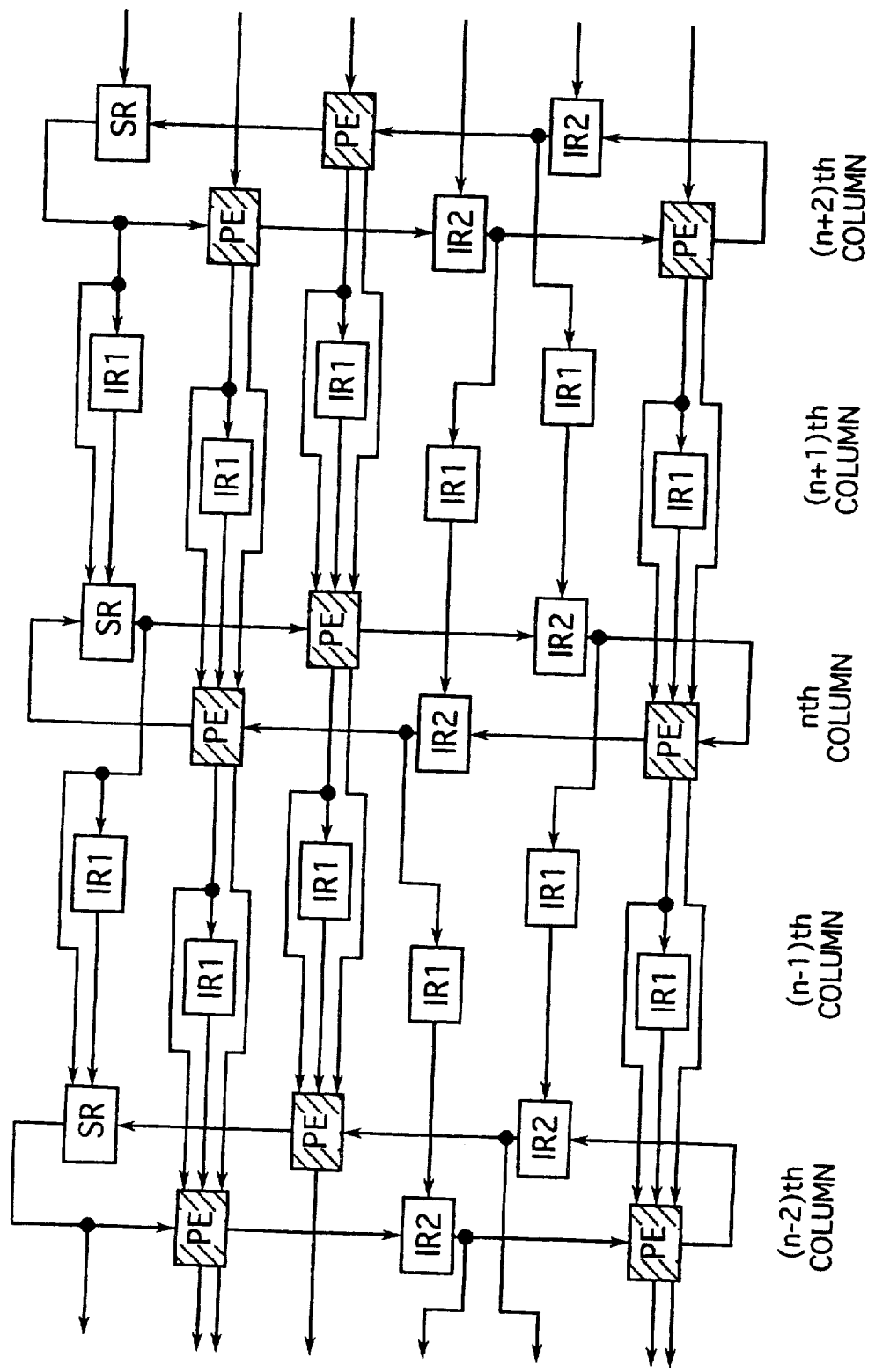
Figure 95:
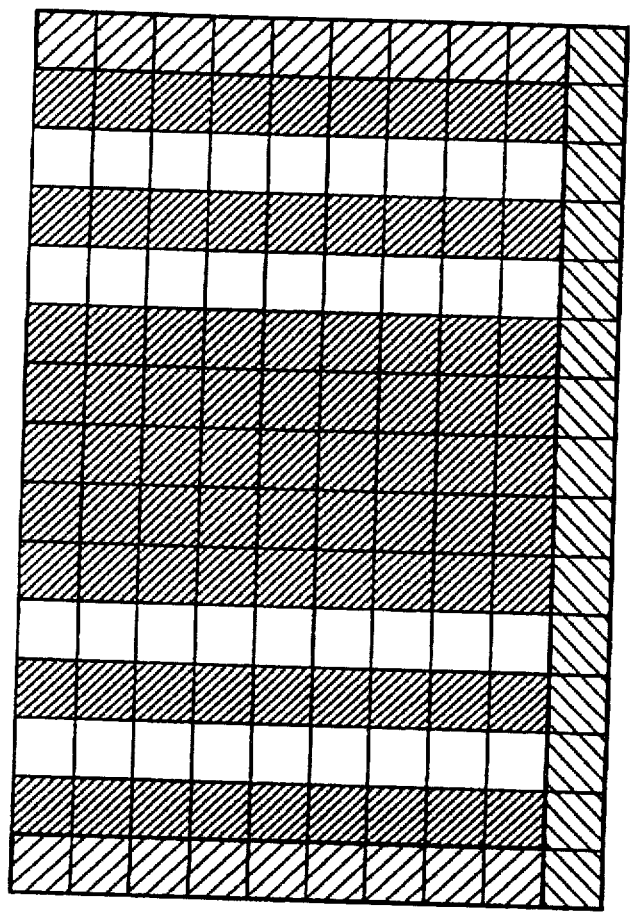
Figure 98:
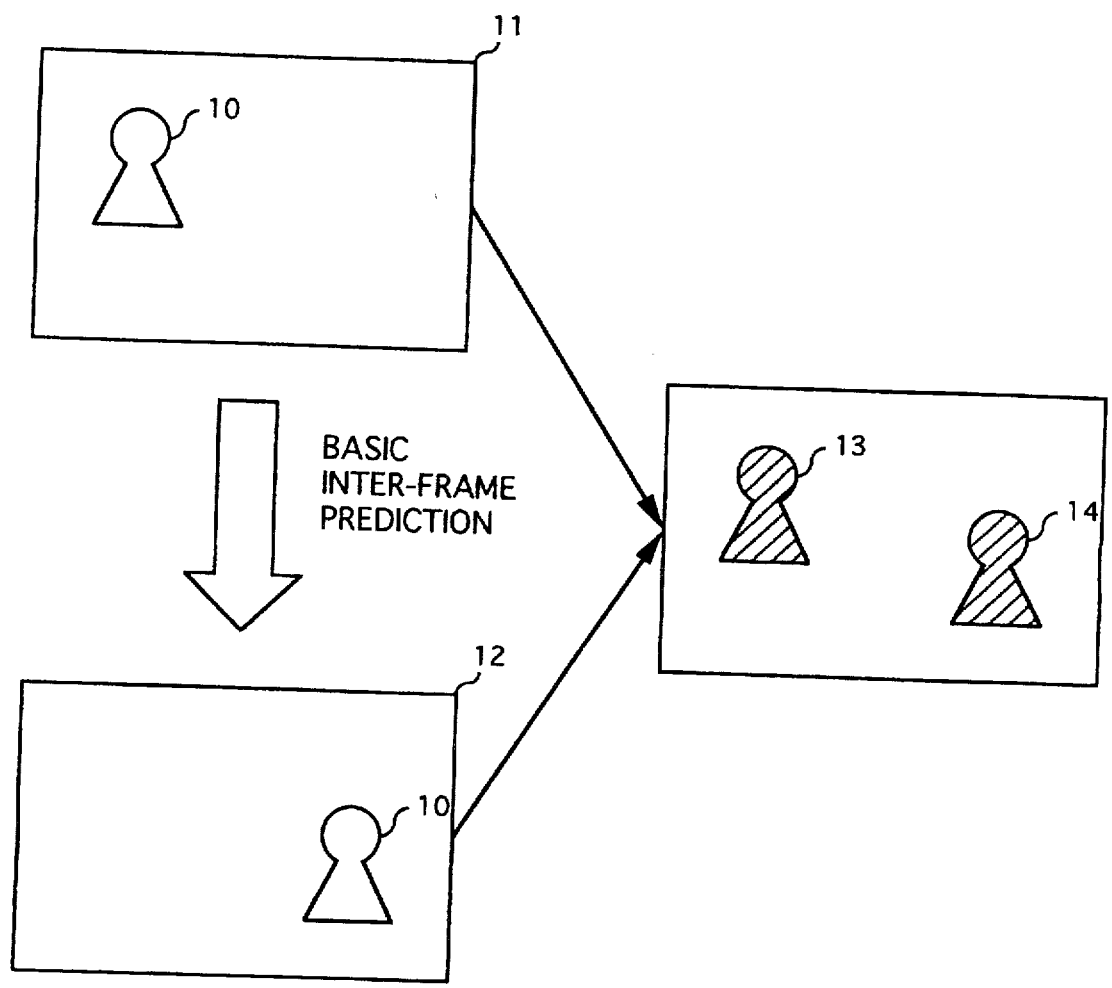
Figure 99:
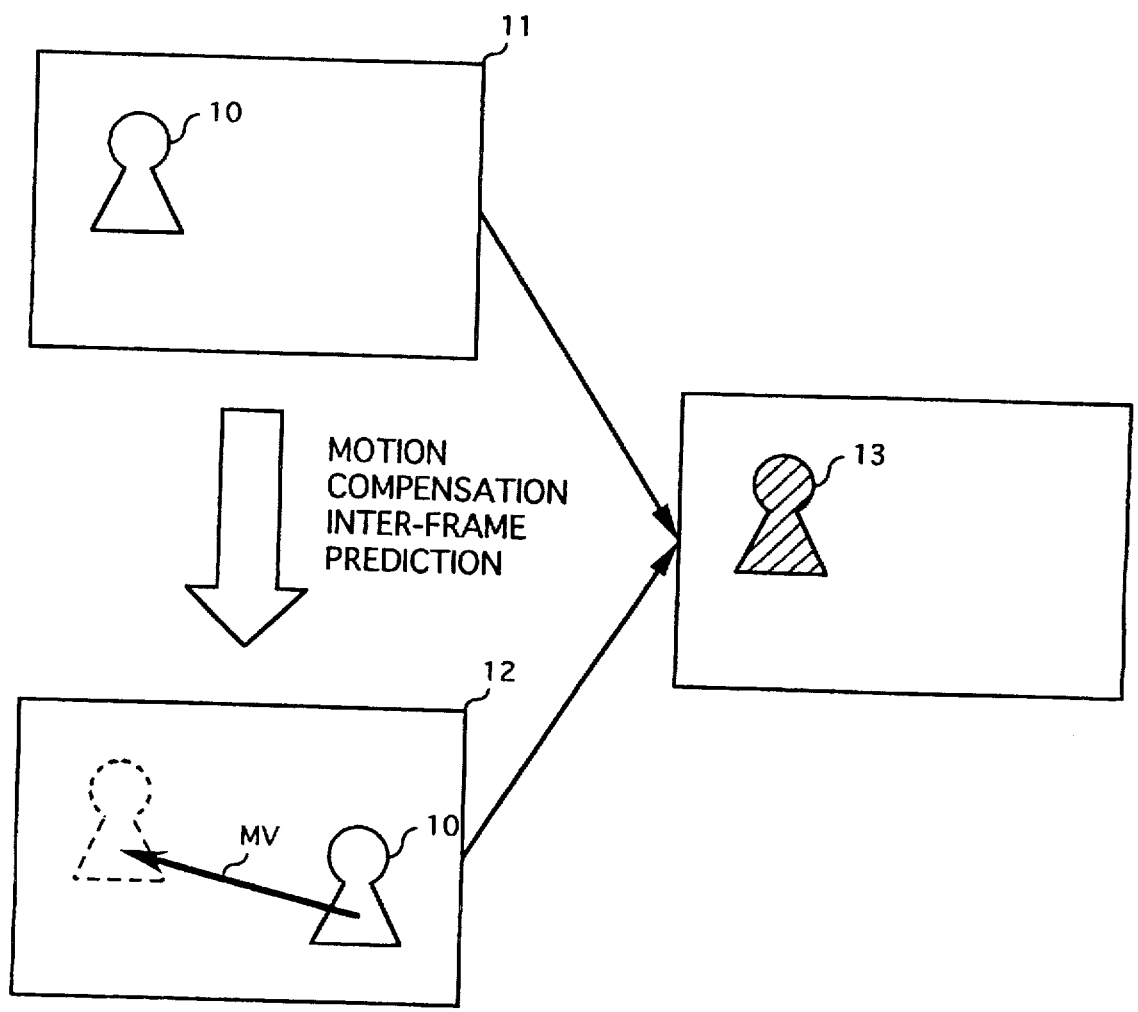
Figure 101A:
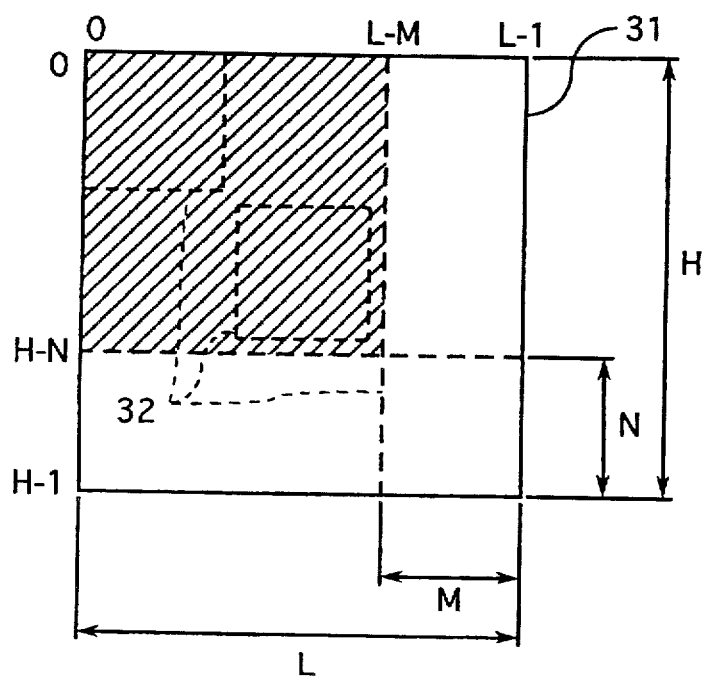
Figure 101B:
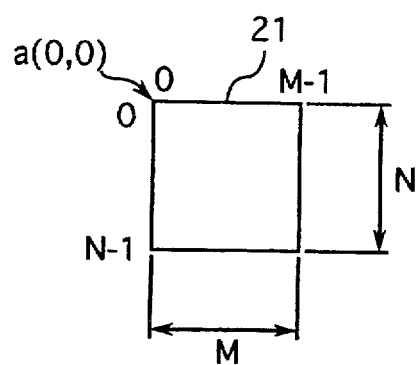
Figure 102A:
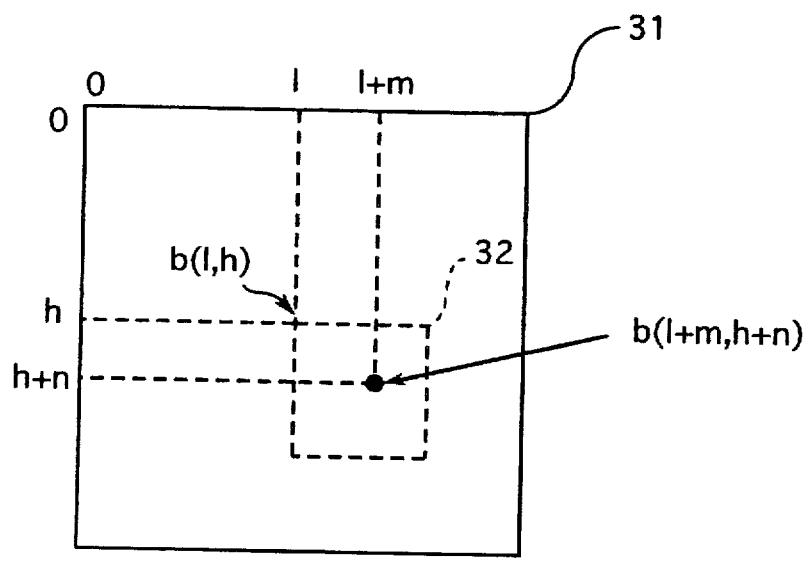
Figure 102B:
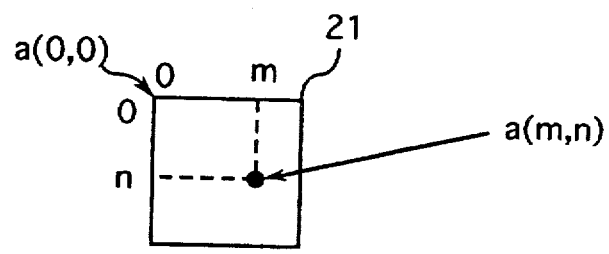
Figure 103:
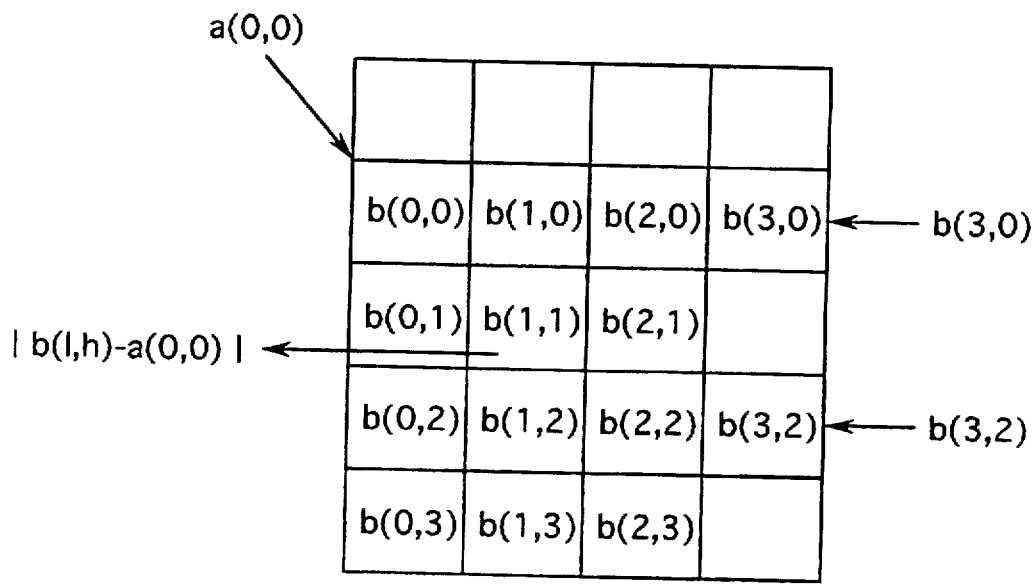
Figure 103:
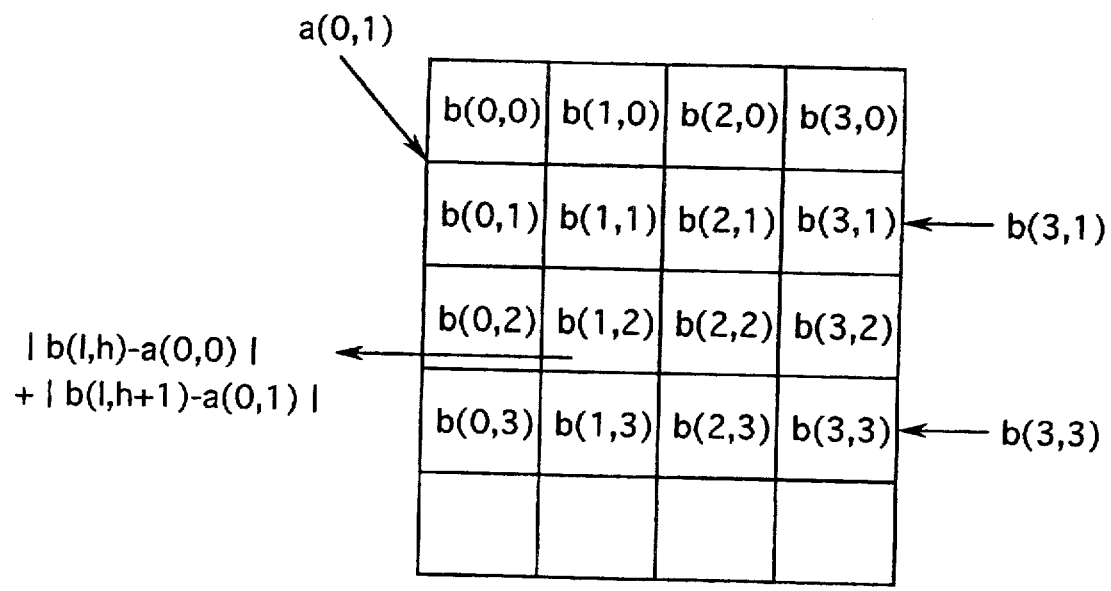

FIG. 77 is a plan view showing each of side registers shown in FIG. 70;

FIG. 78 is a block diagram showing each of the side registers shown in FIG. 77;

FIG. 79 is a block diagram showing the third embodiment of the motion estimation apparatus according to the present invention as comprising a distortion calculating unit 3000b;

FIG. 80(a) is a plan view showing a side register shown in FIG. 79;

FIG. 80(b) is a block diagram showing the side register shown in FIG. 80(a);

FIG. 81 is a diagram showing the matrix elements of the distortion calculating unit electrically connected in a ring-style;

FIGS. 82 through 88 are diagrams showing flow of the pel values of search window during initialization operation of the motion estimation apparatus shown in FIG. 79;

FIGS. 89 through 93 are diagrams showing flow of the pel values of search window in periods (g) to (k), respectively;

FIGS. 94 and 95 are diagrams showing matrix arrays of the distortion calculating unit comprising a plurality of the processor elements, a plurality of the intermediate registers, a plurality of the side registers and a plurality of the input registers;

FIGS. 96(a) and 96(b) are diagrams showing two type of the reference pictures comprising the first search window and the second search window;

FIG. 97 is a diagram for explaining a conventional moving picture comprising a plurality of pictures;

FIG. 98 is a diagram for explaining a conventional basic inter-frame predicting coding method;

FIG. 99 is a diagram for explaining a conventional motion compensation inter-frame predicting coding method;

FIG. 100 is a diagram for explaining a motion vector calculated through the conventional motion compensation inter-frame predicting coding method;

FIGS. 101(a) and 101(b) are diagrams for explaining a search window and a current block;

FIGS. 102(a) and 102(b) are diagrams for explaining relations between a pel of a current block and a pel of each of candidate blocks corresponding in position to each other; and FIGS. 103(a) through 103(d) are diagrams for explaining flow of the pel values of search window during cycles 1 to 4, respectively, and local distortion values calculated in each of cycles 1 to 4 by the central processor element.

DESCRIPTION OF THE PREFERRED EMBODIMENTS

Description will be made hereinafter about the present invention with reference to the drawings.

FIGS. 1 through 27 show a first preferred embodiment of the motion estimation apparatus according to the present invention.

Figure 1:
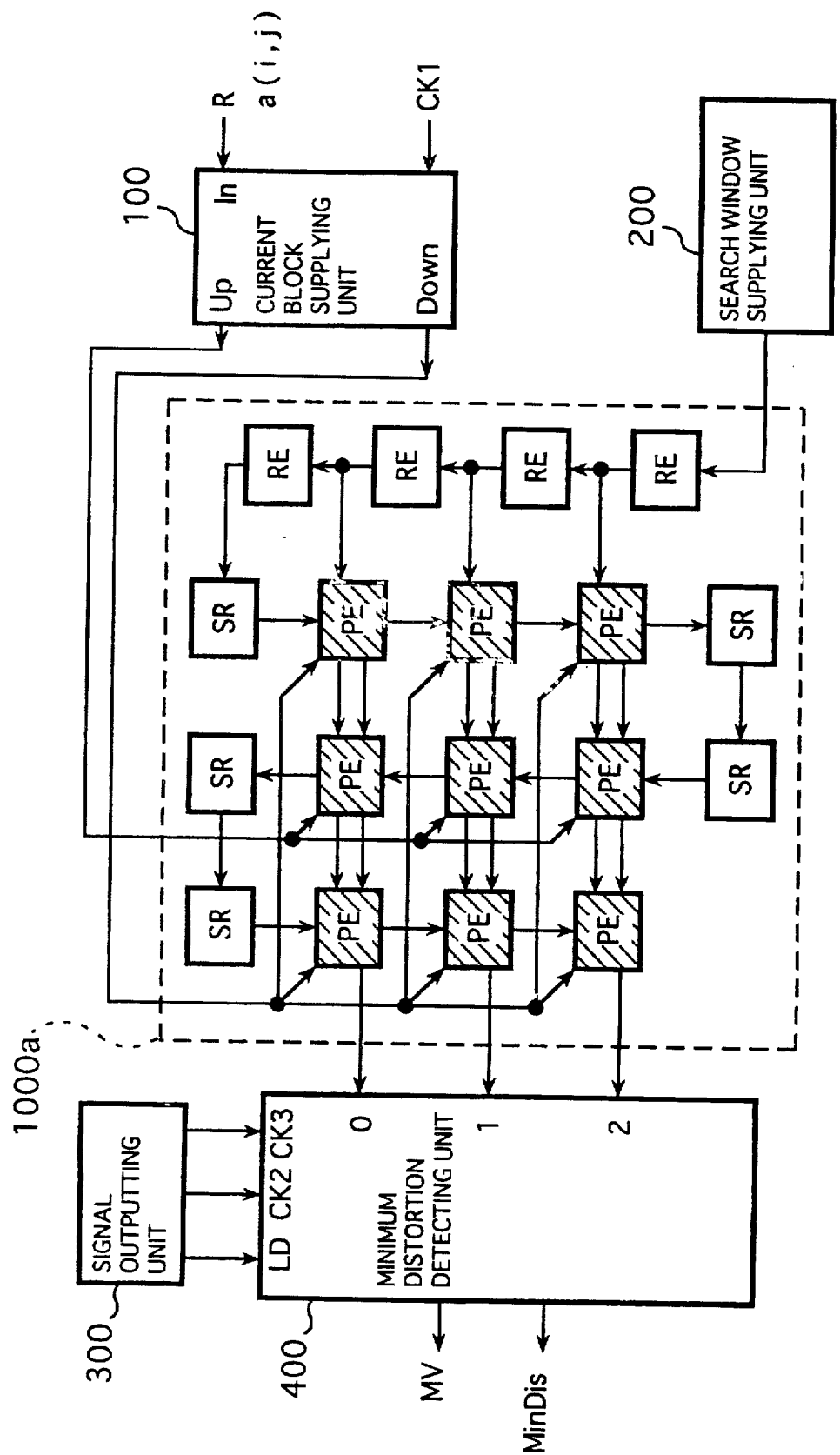

As shown in FIG. 1, the motion estimation apparatus comprises a current block supplying unit 100, a search window supplying unit 200, a distortion calculating unit 1000a, a minimum distortion detecting unit 400, and a signal outputting unit 300.

As shown in FIGS. 2(a) and 2(b), a reference symbol Pa represents a current picture partially forming a moving picture and a reference symbol Pb represents a reference picture partially forming the moving picture. The reference picture Pb is encoded prior to the current picture Pa.

18

The motion estimation apparatus shown in FIG. 1 is designed to calculate a motion vector to estimate the current picture Pa on the basis of the reference picture Pb.

As shown in FIG. 2(a), the current picture Pa is partially formed by a current block 50 containing four pel values which are arranged in the form of a matrix with 2 rows by 2 columns. As shown in FIG. 2(b), the reference picture Pb is partially formed by a search window 70 containing sixteen pel values which are arranged in the form of a matrix with 4 rows by 4 columns. As shown in FIG. 3, the search window 70 has a plurality of candidate blocks 70a each equal in size to the current block 50. The motion vector is indicative of a displacement between the current block 50 and one of the candidate blocks 70a most similar to the current block 50.

The current block supplying unit 100 is designed to provide the distortion calculating unit 1000a with pel values of the current block 50. The current block 50 is assumed to comprise the pel values a(0,0), a(0,1), a(1,0) and a(1,1) as shown in FIG. 3.

The search window supplying unit 200 is designed to supply pel values of each of the candidate blocks 70a of the search window 70 to the distortion calculating unit 1000a. The search window 70, as shown in FIG. 3, is a specified area in the reference picture Pb which may contain a plurality of candidate blocks 70a similar to the current block 50.

The search window 70 must be larger than that of the current block 50, and is assumed to comprise the pel values, c(0,0), c(0,1), c(0,2), c(0,3), c(1,0), c(1,1), c(1,2), c(1,3), c(2,0), c(2,1), c(2,2), c(2,3), c(3,0), c(3,1), c(3,2) and c(3,3) as shown in FIG. 3.

The distortion calculating unit 1000a is designed to calculate distortion values between the current block 50 of the current picture Pa and the respective candidate blocks 70a of the search window 70 of the reference picture Pb. The distortion calculating unit 1000a is operated to calculate the distortion values through the steps of calculating a difference between each pel value of the current block 50 and each pel value of each of the candidate block 70a of the search window 70 with each pair of pels corresponding in position to each other, taking an absolute value of the difference to obtain a local distortion value at each pair of pels, summing up the local distortion values to obtain a distortion value for each of the candidate blocks 70a, and repeating this calculation process for every candidate blocks 70a.

The minimum distortion detecting unit 400 is designed to determine a minimum distortion value among the distortion values calculated by the distortion calculating unit 1000a, and to calculate a motion vector based on the position of the candidate block 70a of the search window 70 which is determined to have the minimum distortion.

The signal outputting unit 300 is designed to output signals to control operations of the current block supplying unit 100, the search window supplying unit 200, the distortion calculating unit 1000a and the minimum distortion detecting unit 400.

FIG. 3 shows a relation between the current block 50 of the current picture Pa and the respective candidate blocks 70a of the search window 70 of the reference picture Pb. Since a full search block matching method is adapted in the embodiment shown in FIG. 3, all the candidate blocks 70a included in the search window 70 are scanned to calculate the distortion values.

Figure 4:
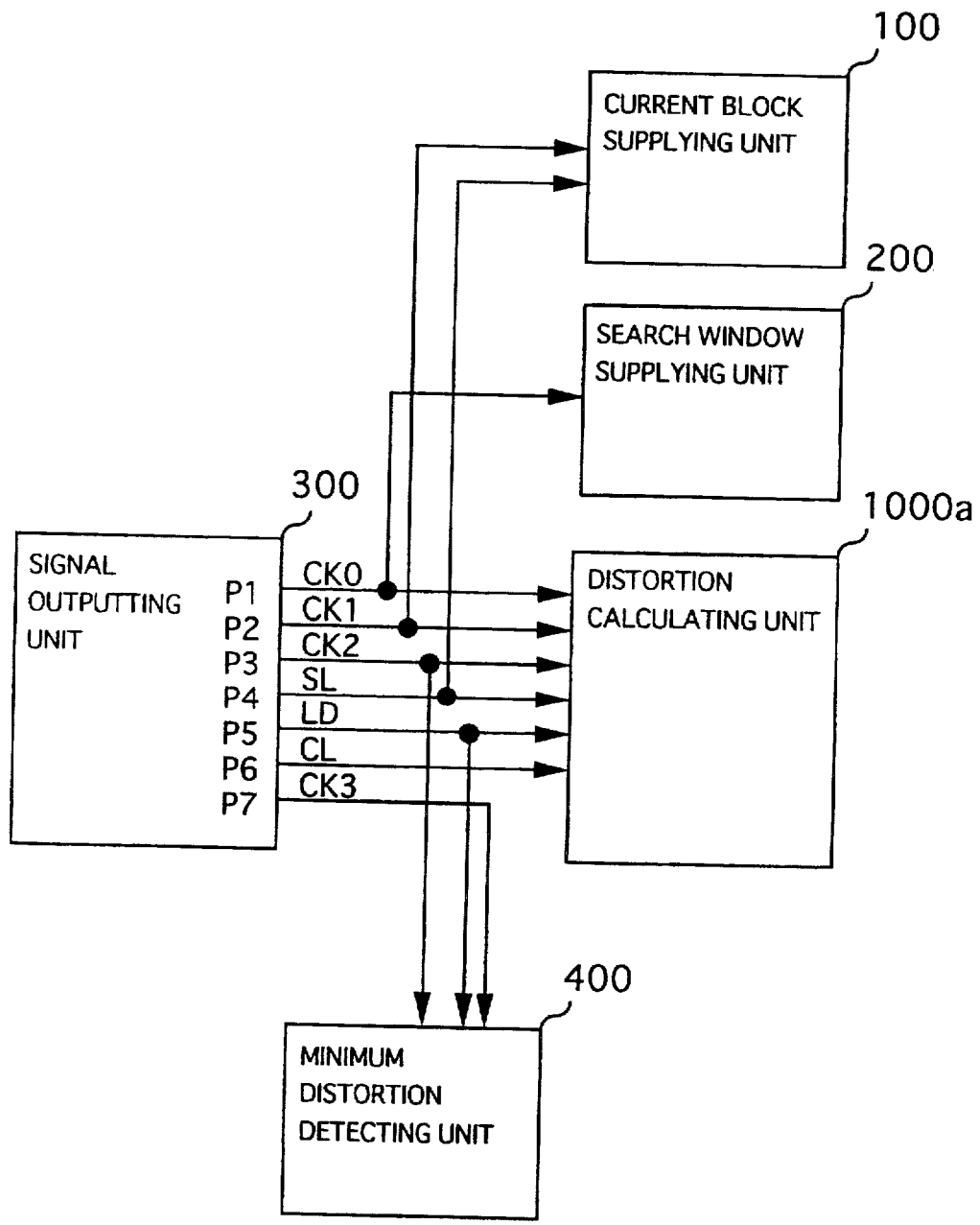
FIG. 4 is a block diagram showing a signal outputting unit and showing signals supplied from the signal outputting unit to the current block supplying unit, the search window supplying unit, the distortion calculating unit and minimum distortion detecting unit.

As shown in FIG. 4, the signal outputting unit 300 has first through seventh signal output terminals, denoted by P1 through P7 respectively. Each signal outputted from each of the signal output terminals P1 through P7 is adapted to control operations of the current block supplying unit 100, the search window supplying unit 200, the distortion calculating unit 1000a, and the minimum distortion detecting unit 400, and is outputted to each of the units listed herein.

Figure 5:
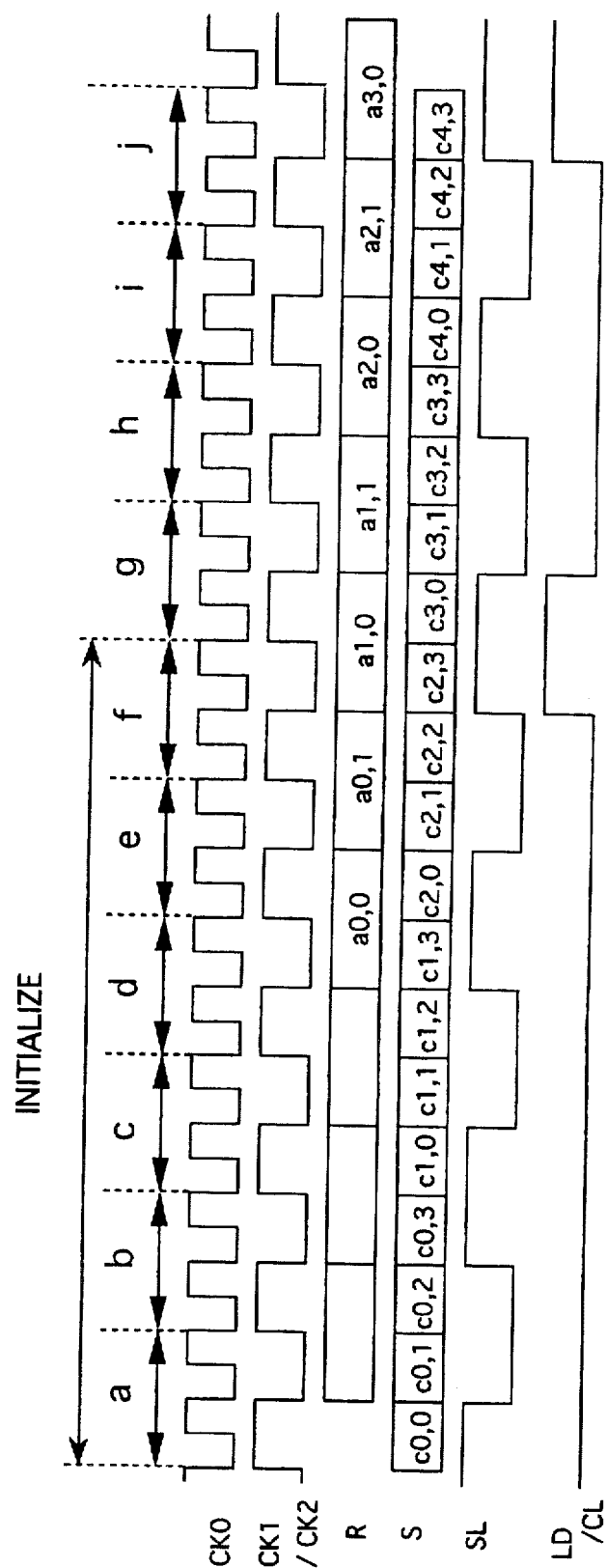
FIG. 5 is a timing chart showing the signals generated by the signal outputting unit shown in FIG. 4 and pel value supplied to the current block supplying unit and the search window supplying unit shown in FIG. 1.
Figure 6:
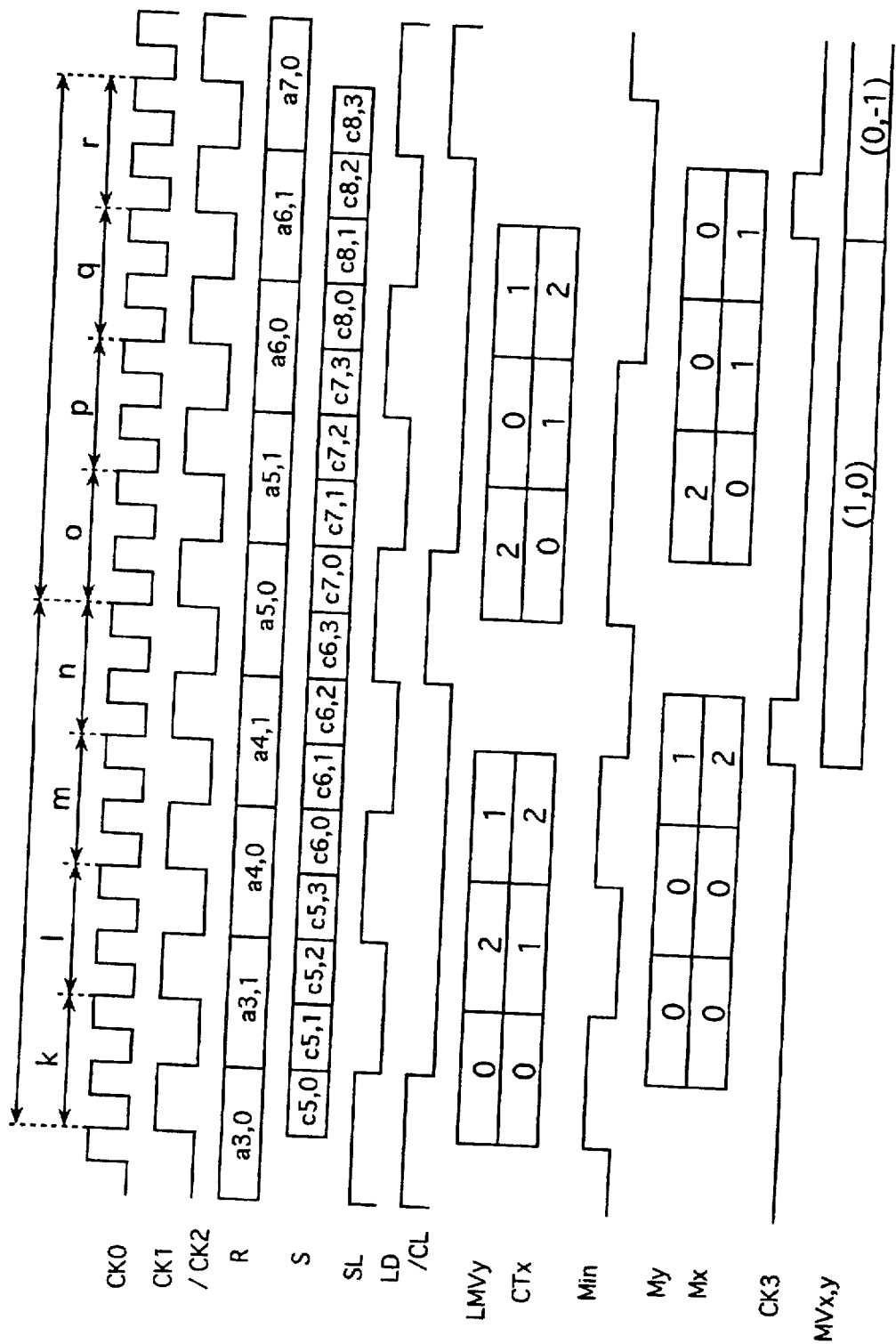
FIG. 6 is a timing chart showing signals inputted into and outputted from the minimum distortion detecting unit shown in FIG. 13.

The wave form of the signal respectively outputted from the signal output terminals P1 through P7 of the signal outputting unit 300 is shown in FIGS. 5 and 6. The first signal output terminal P1 is adapted to transmit a clock pulse signal CK0. The second signal output terminal P2 is adapted to transmit a pulse signal CK1 of the pulse width twice as long as that of the clock pulse signal CK0. The pulse signal CK1 is initiated at the simultaneous timing of the first pulse of the clock pulse signal CK0, thereafter outputted at a rate of one pulse of the pulse signal CK1 per two pulses of the clock pulse signal CK0. The third signal output terminal P3 is adapted to transmit a pulse signal CK2 which has an equivalent wave form and pulse cycle to those of the pulse signal CK1. The pulse signal CK2 is initiated at the simultaneous timing of the first pulse of the clock pulse signal CK0.

The fourth signal output terminal P4 is adapted to transmit a pulse signal SL of the pulse width four times as long as that of the clock pulse signal CK0. The pulse signal SL is initiated at the simultaneous timing of the second pulse of the clock pulse signal CK0, thereafter outputted at a rate of one pulse of the pulse signal SL per four pulses of the clock pulse signal CK0. The fifth signal output terminal P5 is adapted to transmit a pulse signal LD of the pulse width four times as long as that of the clock pulse signal CK0. The pulse signal LD is initiated at the simultaneous timing of the twelfth pulse of the clock pulse signal CK0, thereafter outputted at a rate of one pulse of the pulse signal LD per eight pulses of CK0. The sixth signal output terminal P6 is adapted to transmit a pulse signal CL which has an equivalent wave form and pulse cycle to those of the pulse signal LD. The pulse signal CL is outputted at the simultaneous timing of the twelfth pulse of the clock pulse signal CK0.

The seventh signal output terminal P7 is adapted to transmit a pulse signal CK3 of the pulse width twice as long as that of the clock pulse signal CK0. The pulse signal CK3 is initiated at the simultaneous timing of the 27th pulse of the clock pulse signal CK0, thereafter outputted at a rate of one pulse of the pulse signal CK3 per eight pulses of the clock pulse signal CK0.

FIG. 1 shows a construction of the motion estimation apparatus which comprises each means including the distortion calculating unit 1000a whose structure is described above.

Figure 7:
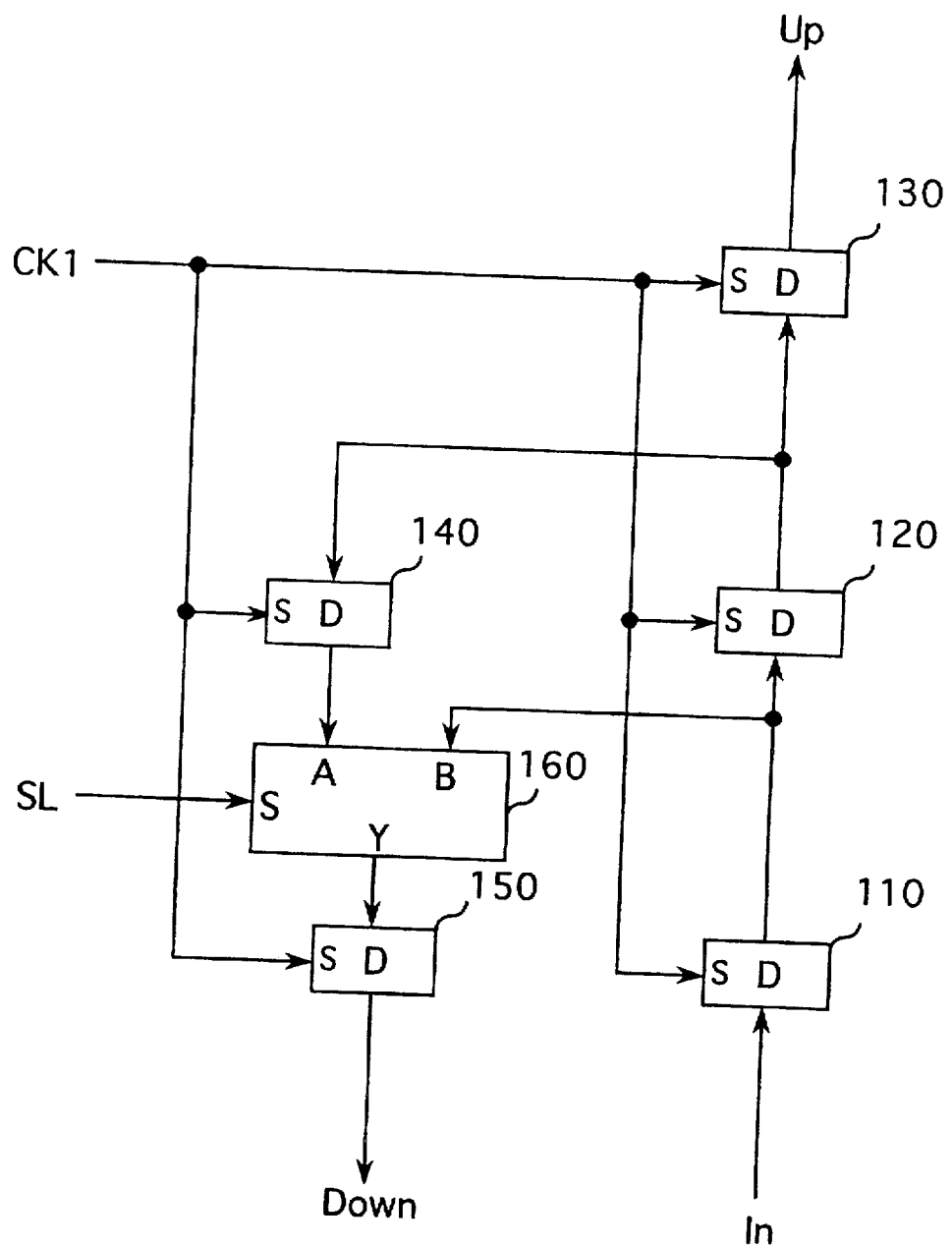
FIG. 7 is a block diagram showing the current block supplying unit.

The current block supplying unit 100 shown in FIG. 1 consists of flip-flops 110, 120, 130, 140 and 150, and a selector 160 as shown in FIG. 7.

Each of the flip-flops 110, 120, 130, 140 and 150 comprises a D flip-flop having a data input terminal, a signal input terminal S and a data output terminal, and is operated to latch the current data on the data input terminal up to the data output terminal at the simultaneous timing of the pulse received through the signal input terminal.

The selector 160 has a first data input terminal A, a second data input terminal B, a signal input terminal S, and a data output terminal Y, and is operated to select either one of the data on the first data input terminal A or the second data input terminal B depending on the signal condition received at the signal input terminal S. The data on the first data input terminal A is outputted through the data output terminal Y when the signal representative of "0" is received through the input signal terminal S, and the data on the second data input terminal B is outputted through the data output terminal Y when the signal representative of "1" is received through the input signal terminal S.

Each of the signal input terminals of all the flip-flops 110, 120, 130, 140 and 150 of the current block supplying unit 100 is electrically connected to the second signal output terminal P2 of the signal outputting unit 300. The data input terminal of the flip-flop 100 is electrically connected to the data supplying means (not shown) which supplies data to the current block, and the data input terminal of the flip-flop 120 is electrically connected to the data output terminal of the flip-flop 110. The data input terminal of the flip-flop 130 is electrically connected to the data output terminal of flip-flop 120, and the data input terminal of the flip-flop 140 is electrically connected to the data output terminal of the flip-flop 120. The data input terminal of the flip-flop 150 is electrically connected to the data output terminal Y of the selector 160. The signal input terminal S of the selector 160 is electrically connected to the fourth signal output terminal P4 of the signal outputting unit 300, the first data input terminal A of the selector 160 is electrically connected to the data output terminal of the flip-flop 140, and the second data input terminal B of the selector 160 is electrically connected to the data output terminal of the flip-flop 110.

More specifically, as shown in FIGS. 5 and 6, the pel values of the current block, a(0,0), a(0,1), a(1,0), a(1,1), a(2,0), a(2,1), . . . are received through the data input terminal of the flip-flop 110 at the simultaneous timing of the 5th, 6th, 7th, 8th, 9th, 10th . . . pulse of the pulse signal CK1 respectively in the order listed herein. The pel values, a(0,0), a(0,1), a(1,0), a(1,1), a(2,0), a(2,1), . . . are outputted through the data output terminal of the flip-flop 130 at the simultaneous timing of the 7th, 8th, 9th, 10th, 11th, 12th . . . pulse neous timing of the 7th, 8th, 9th, 10th, 11th, 12th . . . pulse of the pulse signal CK1 respectively in the order listed herein. The pel values, a(0,1), a(0,0), a(1,1), a(1,0), a(2,1), a(2,0), . . . are outputted through the data output terminal of the flip-flop 150 at the simultaneous timing of the 7th, 8th, 9th, 10th, 11th, 12th . . . pulse of the pulse signal CK1 respectively in the order listed herein.

Figure 8:
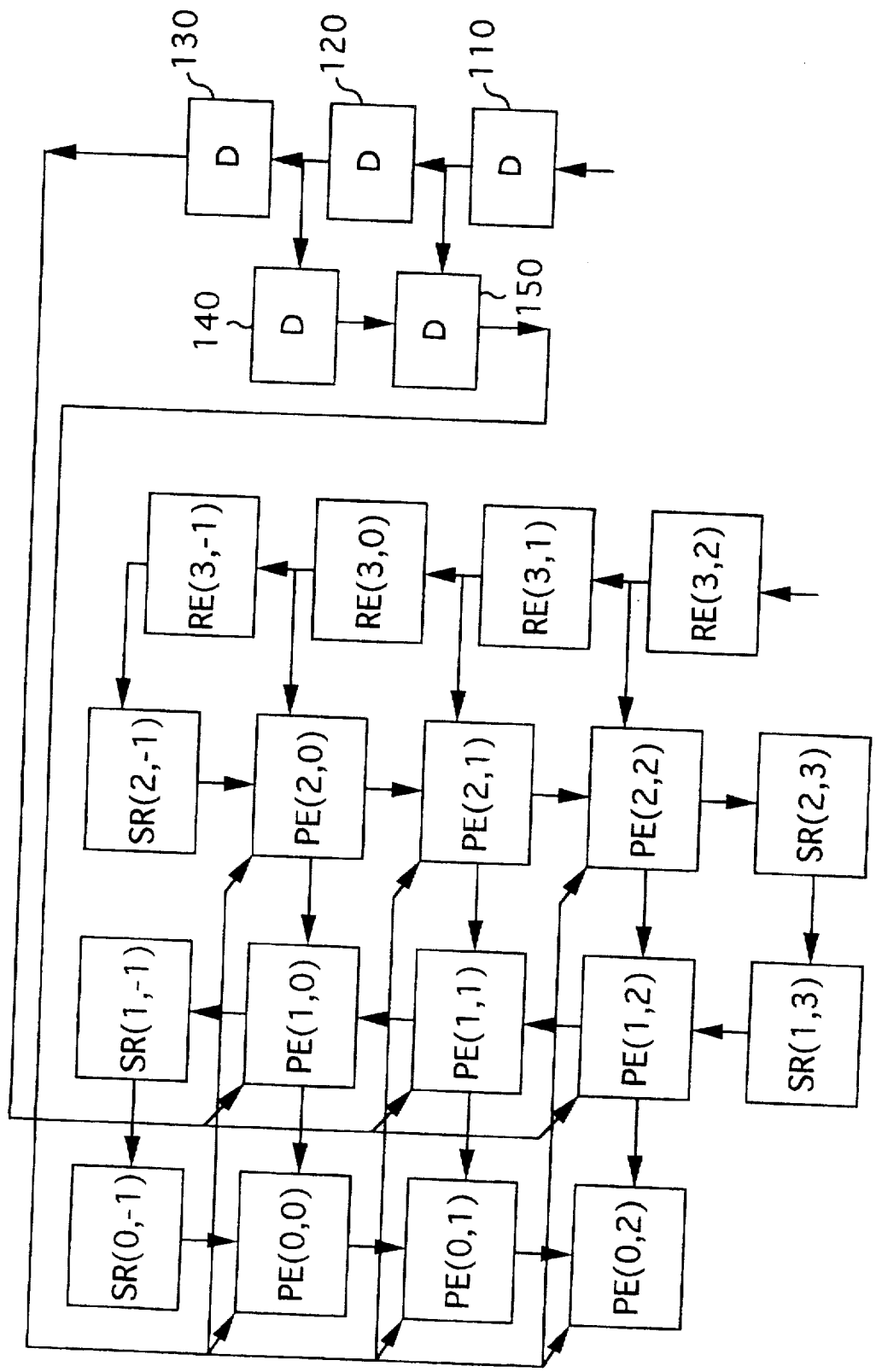
FIG. 8 is a block diagram concretely showing a current block supplying unit and a distortion calculating unit.

The search window supplying unit 200 is designed to supply pel values of the search window, c(0,0), c(0,1), c(0,2), c(0,3), c(1,0), c(1,1), c(1,2), c(1,3), c(2,0), c(2,1), c(2,2), c(2,3), c(3,0), c(3,1), c(3,2), c(3,3), c(4,0), c(4,1), c(4,2), c(4,3), . . . to the input terminal of the input register RE(3,2) of the distortion calculating unit 1000a shown in FIG. 8 at the simultaneous timing of every pulse of the clock pulse signal CK0 in the order listed herein.

The distortion calculating unit 1000a comprises nine processor elements PE(0,0), PE(0,1), PE(0,2), PE(1,0), PE(1,1), PE(1,2), PE(2,0), PE(2,1) and PE(2,2), five side registers SR(0,-1), SR(1,-1), SR(2,-1), SR(1,3) and SR(2,3), and four input registers RE(3,-1), RE(3,0), RE(3,1) and RE(3,2). Each of the processor elements PE(0,0), PE(0,1), PE(0,2), PE(1,0), PE(1,1), PE(1,2), PE(2,0), PE(2,1) and PE(2,2) is merely referred to as the symbol PE(x,y), each of the first side registers SR(0,-1), SR(1,-1), SR(2,-1), SR(1,3) and SR(2,3) is merely referred to as the symbol SR(x,y), and each of the second input register RE(3,-1), RE(3,0), RE(3,1) and RE(3,2) is merely referred to as the symbol RE(x,y) hereinlater for easily understanding of and simplifying explanation of the processor elements, the side registers and the input registers. Here x=0,1,2,3 and y=-1,0,1,2,3.

Figure 9:
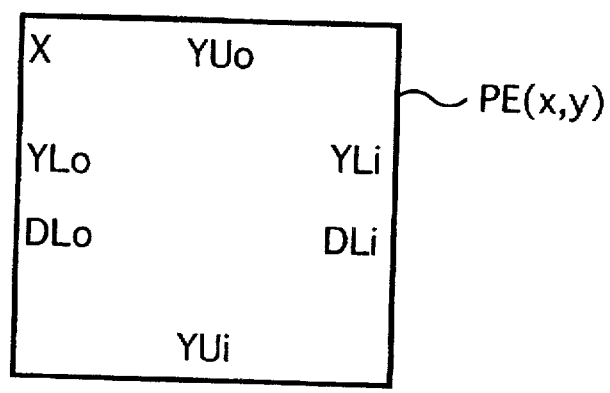
FIGS. 9(a) and 9(b) are plan views showing each of processor elements shown in FIG. 8.
Figure 9:
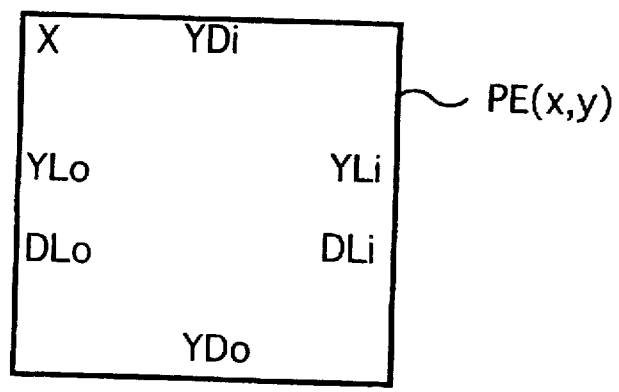

The input and output terminals of the processor elements of the first and third column are shown in FIG. 9(b), and the input and output terminals of the processor elements of the second column are shown in FIG. 9(a). As shown in FIG. 9, each of the processor elements PE(x,y) of the first and third columns has input terminals X, YDi, YLi and DLi, output terminals YDo, DLo and YLo, and input terminals (not shown) each of which is connected to each of the signal output terminals of the signal outputting unit 300. Each of the processor elements PE(x,y) of the second column has input terminals X, YLi, DLi and YUi, output terminals YUo, DLo and YLo and input terminals (not shown) each of which is connected to each of the signal output terminals of the signal outputting unit 300.

Figure 10:
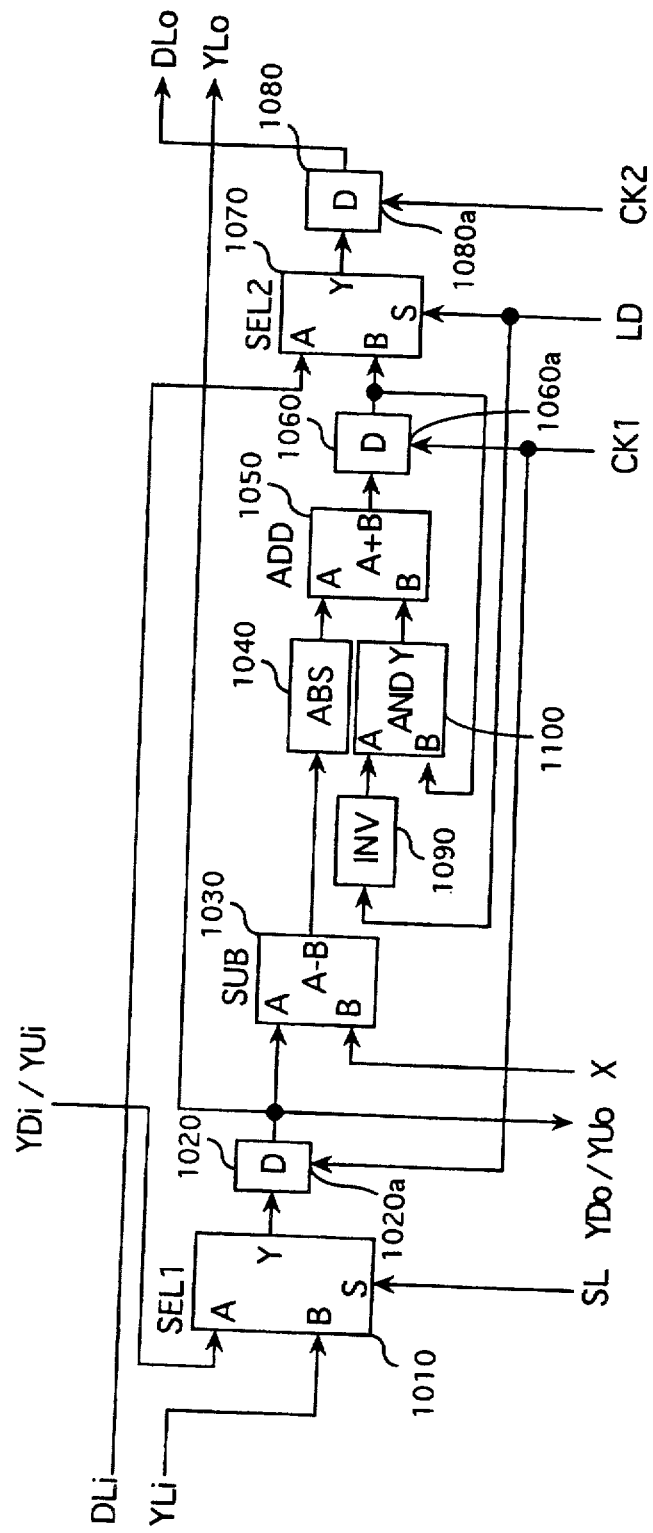
FIG. 10 is a block diagram showing the processor element shown in FIG. 9.
Figure 11:
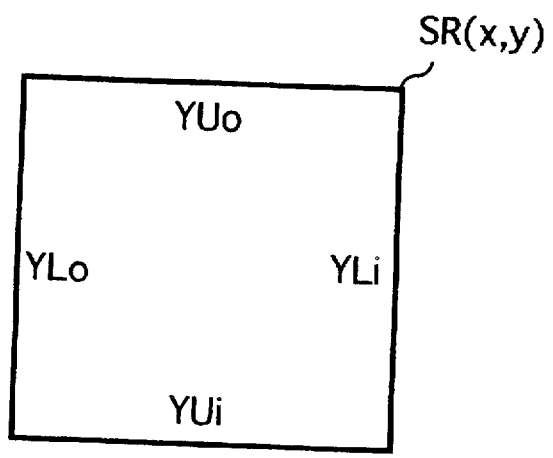
FIGS. 11(a) and 11(b) are plan views showing each of side registers shown in FIG. 8.
Figure 11:
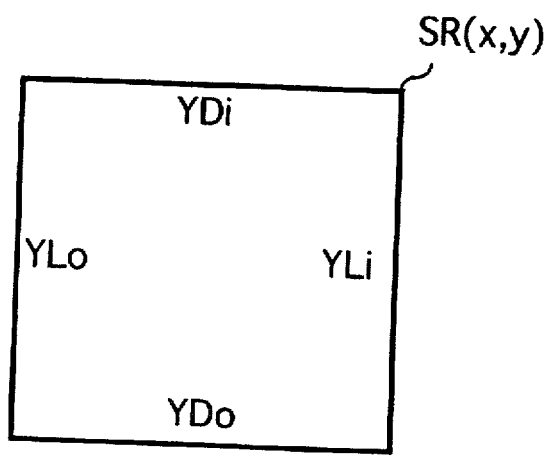

FIG. 10 shows a specific construction of each of the processor elements.

As shown in FIG. 10, the processor elements PE(x,y) comprises a selector 1010, a flip-flop 1020, a subtracter 1030, a positive value transducer 1040, an inverter 1090, a logical product element 1100, an adder 1050, a flip-flop 1060, a selector 1070 and a third flip-flop 1080.

The selector 1010 has a first data input terminal A, a second data input terminal B, a signal input terminal S, and a data output terminal Y, and is designed to output the data on the signal input terminal A through the data output terminal Y when the signal representative of "0" is received through the signal input terminal S, and to output the data on the signal input terminal B through the data output terminal Y when the signal representative of "1" is received through the signal input terminal S.

The flip-flop 1020 comprises a D flip-flop having a data input terminal, a signal input terminal 1020a and a data output terminal, and is designed to latch the current data in the data input terminal up to the data output terminal at the simultaneous timing of the pulse cycle of the pulse signal received through the signal input terminal 1020a.

The subtracter 1030 has a first data terminal A, a second data input terminal B, and a data output terminal, and is designed to subtract a value on the second data input terminal B from a value on the first data input terminal A, and to output the resulting value through the data output terminal.

The positive value transducer 1040 has a data input terminal and a data output terminal, and is designed to convert a value on the data input terminal into a positive value by means of either one of the absolute or square arithmetic calculation, and to output a resulting value through the data output terminal.

The inverter 1090 has a signal input terminal and a signal output terminal, and is designed to output a signal indicative of "1" through the signal output terminal when the signal indicative of "0" is received through the signal input terminal, and to output a signal indicative of "1" through the signal output terminal when the signal indicative of "0" is received through the signal input terminal.

The logical product element 1100 has a signal input terminal A, a data input terminal B, and a data output terminal Y. The logical product element 1100 is designed to output data representative of "1" through the data output terminal Y only when both of the signal representative of "1" and the data representative of "1" are respectively received through the signal input terminal A and the data input terminal B, and to output data representative of "0" through the data output terminal Y when the signal representative of "0" or the data representative of "0" is received through either one or both of the signal input terminals A and the data input terminal B. In other words, the logical product element 1100 is operated to output data representative of "0" through the data output terminal Y whenever the signal representative of "0" is received through the signal input terminal A, and to output the same data as that received through the second input terminal B through the data output terminal Y when the signal representative of "1" is received through the signal input terminal A, The adder 1050 has a first data input terminal A, a second data input terminal B, and a data output terminal, and is designed to add a value on the first data input terminal A and a value on the second data input terminal B, and to output the resulting value through the data output terminal.

The flip-flop 1060 comprises a D flip-flop having a data input terminal, a signal input terminal 1060a, and a data output terminal, and is designed to latch the current data in the data input terminal up to the data output terminal at the simultaneous timing of the pulse cycle of the pulse signal received through the signal input terminal 1060a.

The selector 1070 has a first data input terminal A, a second data input terminal B, a signal input terminal S, and a data output terminal Y, and is designed to output data on the first input terminal A through the data output terminal Y when the signal representative of "0" is received through the signal input terminal S, and to output data on the second input terminal B through the data output terminal Y when the signal representative of "1" is received through the signal input terminal S.

The flip-flop 1080 has a data input terminal, a signal input terminal 1080a, and a data output terminal, and is designed to latch the current data in the data input terminal up to the data output terminal at the simultaneous timing of the pulse cycle of the pulse signal received through the signal input terminal 1080a.

The first data input terminal A of the selector 1010 of each of the processor elements PE(x,y) of the odd columns is electrically connected to either one of the data output terminal of the flip-flop 1020 of another processor element PE(x,y−1) or the data output terminal of the side register SR(x,y−1) through the input terminal YDi, while the first data input terminal A of the selector 1010 of each of the processor elements PE(x,y) of the even column is electrically connected to either one of the data output terminal of the flip-flop 1020 of another processor element PE(x,y+1) or the data output terminal of the side register SR(x,y+1) through the input terminal YUi, and the second data input terminal B of the selector 1010 is electrically connected to either one of the data output terminal of the flip-flop 1020 of another processor element PE(x+1,y) or the data output terminal of the input register RE(x+1,y) through the input terminal YLi.

Moreover, the signal input terminal S of the selector 1010 of each of the processor elements PE(x,y) is electrically connected to the fourth signal output terminal P4 of the signal outputting unit 300.

The data input terminal of the flip-flop 1020 of each of the processor elements PE(x,y) is electrically connected to the data output terminal Y of the selector 1010 of the same processor element PE(x,y), and the signal input terminal 1020a of the flip-flop 1020 is electrically connected to the second signal output terminal P2 of the signal outputting unit 300.

The first data input terminal A of the subtracter 1030 of each of the processor elements PE(x,y) is electrically connected to the data output terminal of the flip-flop 1020 of the present processor element PE(x,y). The second data input terminal B of the subtracter 1030 of the processor elements of the first and third columns is electrically connected to the data output terminal of the flip-flop 150 of the current block supplying unit 100 through the input terminal X, while the second data input terminal B of the subtracter 1030 of the processor elements of the second column is electrically connected to the data output terminal of the flip-flop 130 of the current block supplying unit 100 through the input terminal X.

The data input terminal of the positive value transducer 1040 of each of the processor elements PE(x,y) is electrically connected to the data output terminal of the subtracter 1030 of the same processor element PE(x,y).

The signal input terminal of the inverter 1090 of each of the processor elements PE(x,y) is electrically connected to the fifth signal output terminal P5 of the signal outputting unit 300.

The signal input terminal A of the logical product element 1100 of each of the processor elements PE(x,y) is electrically connected to the data output terminal of the inverter 1090 of the present processor element PE(x,y), and the data input terminal B of the logical product element 1100 is electrically connected to the data output terminal of the flip-flop 1060 of the present processor element PE(x,y).

The first data input terminal A of the adder 1050 of each of the processor elements PE(x,y) is electrically connected the data output terminal of the positive value transducer 1040 of the present processor element PE(x,y), and the second data input terminal B of the adder 1050 is electrically connected to the data output terminal Y of the logical product element 1100 of the present processor element PE(x,y).

The data input terminal of the flip-flop 1060 of each of the processor elements PE(x,y) is electrically connected to the data output terminal of the adder 1050 of the present processor element PE(x,y), and the signal input terminal 1060a of the flip-flop 1060 is electrically connected to the second signal output terminal P2 of the signal outputting unit 300.

The first data input terminal A of the selector 1070 of each of the processor elements PE(x,y) is electrically connected to the data output terminal of the flip-flop 1080 of another processor element PE(x+2,y) through the input terminal DLi, and the second data input terminal B of the selector 1070 is electrically connected to the data output terminal of the flip-flop 1060 of the same processor element PE(x,y), and the signal input terminal S of the selector 1070 is electrically connected to the fifth signal output terminal P5 of the signal outputting unit 300.

The data input terminal of the third flip-flop 1080 of each of the processor elements PE(x,y) is electrically connected to the data output terminal Y of the second selector 1070 of the present processor element PE(x,y), and the signal input terminal 1080a of the third flip-flop 1080 is electrically connected to the third signal output terminal P3 of the signal outputting unit 300.

Each of the input registers RE(x,y) of the distortion calculating unit 1000a comprises a D flip-flop having a data input terminal, a signal input terminal and a data output terminal, and is designed to latch the current data in the data input terminal up to the data output terminal at the simultaneous timing of the pulse cycle of the pulse signal received through the signal input terminal.

The data input terminal of the input register RE(3,2) of the distortion calculating unit 1000a is electrically connected to the data output terminal of the search window supplying unit 200, the data input terminal of each of the input registers RE(x,y) in the rest is electrically connected to the data output terminal of another input register RE(x,y+1), and the signal input terminal is electrically connected to the first signal output terminal P1 of the signal outputting unit 300.

Each of the side registers SR(x,y) of the distortion calculating unit 1000a comprises a D flip-flop having a data input terminal, signal input terminal and data output terminal, and is designed to latch current data in the data input terminal up to the data output terminal at the simultaneous timing of the pulse cycle of the pulse signal received through the signal input terminal.

The data input terminal of the side register SR(0,−1) of the distortion calculating unit 1000a is electrically connected to the data output terminal of the side register SR(1,−1), the data input terminal of the side register SR(1,−1) is electrically connected to the data output terminal of the flip-flop 1020 of the processor element PE(1,0), the data input terminal of the side register SR(1,3) is electrically connected to the data output terminal of the side register SR(2,3), the data input terminal of the side register SR(2,3) is electrically connected to the data output terminal of the flip-flop 1020 of the processor element PE(2,2), the data input terminal of the side register SR(2,−1) is electrically connected to the data output terminal of the input register RE(3,−1), and the signal input terminal is electrically connected to the second signal output terminal P2 of the signal outputting unit 300.

The current block of the present embodiment is a block of the size consisting of 2×2 pels, therefore there exists only one side register in the side register unit. However, when the current block is a block of the size having three or more columns of pels, the innermost side register unit (next to the processor elements) excluding the outermost side register unit (at the top or the bottom) has input terminals YLi and YUi, output terminals YUo and YLo, and input terminals (not shown) each of which is connected to each signal output terminal of the signal outputting unit 300 in the case of the side registers SR of the even column as shown in FIG. 11(b), and has an input terminal YDi and an output terminal YDo instead of YUi and YUo respectively in the case of the side registers SR of the odd columns as shown in FIG. 11(a).

Figure 12:
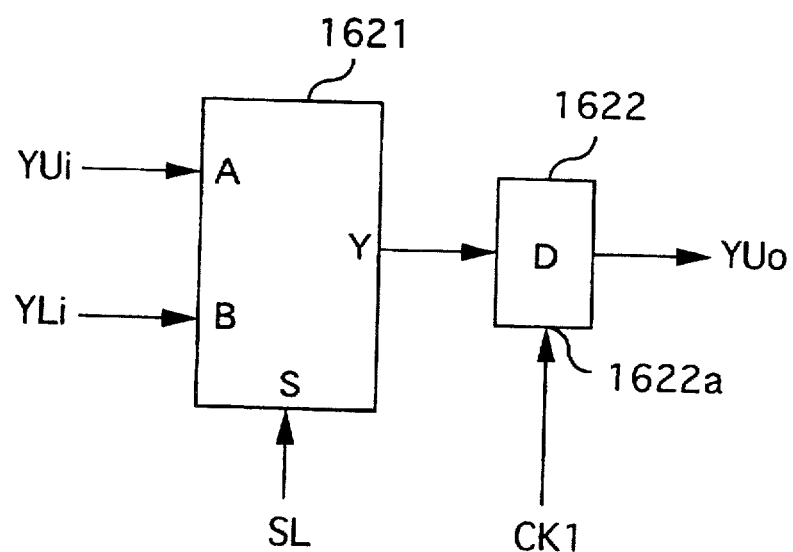
FIGS. 12(a) and 12(b) are block diagrams showing each of the side registers shown in FIG. 11.
Figure 12:
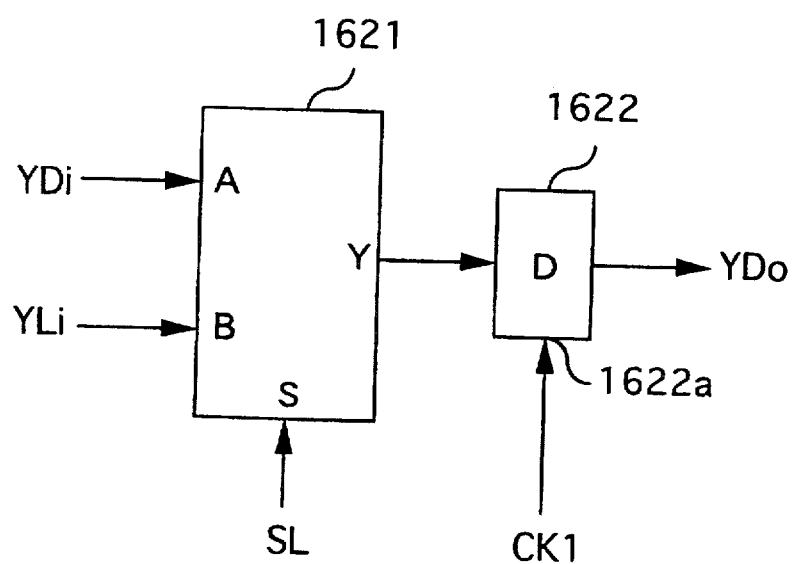

FIG. 12 shows a specific construction of the side register SR. As shown in FIG. 12, the side register SR comprises a selector 1621 and a flip-flop 1622, and is designed to select either one of the two values received through the selector 1621 depending on the signal condition received through the selector 1621, and to output the selected value to the flip-flop 1622. The flip-flop 1622 then transmits the value at the simultaneous timing of the pulse cycle of the pulse signal CK1.

Figure 13:
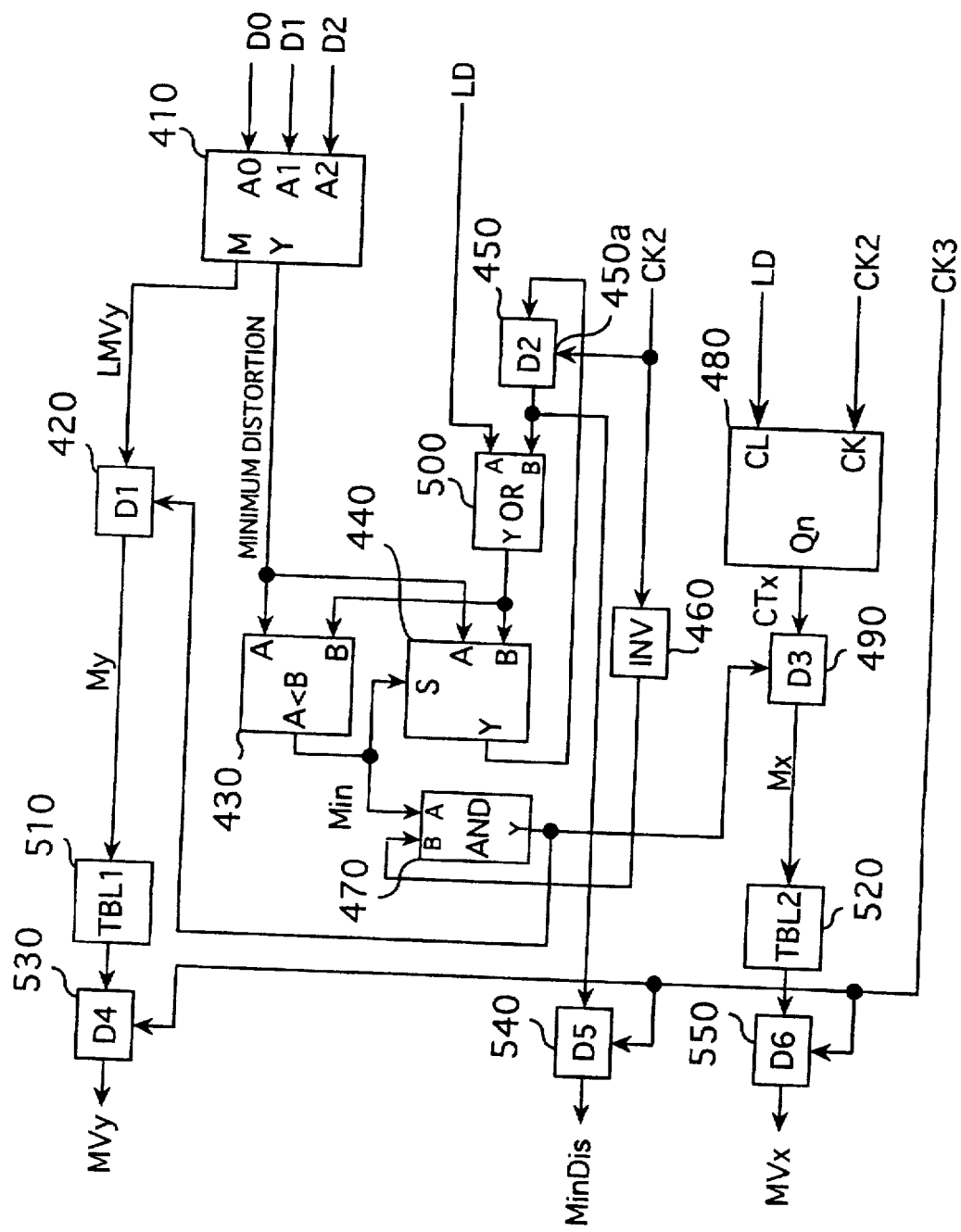
FIG. 13 is a block diagram showing the minimum distortion detecting unit.

FIG. 13 shows a specific construction of the minimum distortion detecting unit 400. As shown in FIG. 13, the minimum distortion detecting unit 400 comprises a comparator 410, a flip-flop 420, a comparator 430, a selector 440, a flip-flop 450, a logical sum element 500, an inverter 460, a logical product element 470, a counter 480, a flip-flop 490, a conversion table 510, a conversion table 520, a flip-flop 530, a flip-flop 540, and a flip-flop 550.

The comparator 410 has data input terminals A0, A1 and A2, and data output terminals M and Y. The first comparator 410 is designed to select a value representative of a minimum value among the values received through the data input terminals A0, A1 and A2, and to output the minimum value through the output terminal Y, and to output the value representative of any of "0", "1", or "2" at the same time through the output terminal M depending upon which input terminal holds the minimum value. The value representative of "0" is outputted when the input terminal A0 holds the minimum value, the value "1" is outputted when the input terminal A1 holds the minimum value, and the value "2" is outputted when the input terminal A2 holds the minimum value through the output terminal M.

The comparator 430 has a first data input terminal A, a second data input terminal B, and a signal output terminal. The comparator 430 is designed to output a signal representative of "0" through the signal output terminal when the value on the data input terminal A is equal to or larger than the value on the data input terminal B, and to output a signal representative of "1" through the signal output terminal when the value on the data input terminal A is smaller than the value on the data input terminal B.

The selector 440 has a first data input terminal A, a second data input terminal B, and a signal input terminal S and a data output terminal Y. The selector 440 is designed to output present data on the second data input terminal B through the data output terminal Y when the signal representative of "0" is received through the signal input terminal S, and to output present data on the input terminal A through the data output terminal Y when the signal representative of "1" is received through the signal input terminal S.

The flip-flop 450 comprises a D flip-flop having a data input terminal, a signal input terminal 450a and a data output terminal, and is designed to latch current data in the data input terminal up to the data output terminal at the simultaneous timing of the pulse cycle of the pulse signal received through the signal input terminal 450a.

The logical sum element 500 has a signal input terminal A, a data input terminal B, and a data output terminal Y. The logical sum element 500 is designed to output a value representative of "1" through the data output terminal Y when the signal representative of "1" is received through either of the signal input terminal A or the data input terminal B, and to output a signal representative of "0" through the data output terminal Y when the signal representative of "0" is received both through the signal input terminal A and the data input terminal B. In other words, the logical sum element 500 is operated to output a signal representative of "1" through the data output terminal Y whenever the signal representative of "1" is received through the signal input terminal A, and to output a present value in the data input terminal B through the data output terminal Y when the signal representative of "0" is received through the signal input terminal A.

The inverter 460 has a signal input terminal and a signal output terminal, and is designed to output a signal representative of "1" through the signal output terminal when the signal representative of "0" is received through the signal input terminal, and to output a signal representative of "0" through the signal output terminal when the signal representative of "1" is received through the signal output terminal.

The logical product element 470 has a first signal input terminal A, a second signal input terminal B, and a signal output terminal Y. The logical product element 470 is designed to output a signal representative of "1" through the signal output terminal Y only when the signal representative of "1" is received both through the first and second signal input terminals A and B, and to output a signal representative of "0" through the signal output terminal Y when the signal representative of "0" is received either through the first signal input terminal A or the second signal input terminal B.

The flip-flop 420 comprises a D flip-flop having a data input terminal, a signal input terminal, and a data output terminal, and is designed to latch current data in the data input terminal up to the data output terminal at the simultaneous timing of the pulse cycle of the pulse signal received through the signal input terminal.

The counter 480 has signal input terminals CK and CL and a count output terminal Qn. The counter 480 is designed to reset a value in the count output terminal Qn to "0" at the simultaneous timing of the pulse cycle of the pulse signal received through the signal input terminal CL, and to increment the signal in the count output terminal Qn at the simultaneous timing of the pulse cycle of the pulse signal received through the signal input terminal CK, and to output the incremented signal through the count output terminal Qn at the simultaneous timing of the pulse signal received through the signal input terminal CK.

The flip-flop 490 comprises a D flip-flop having a count input terminal, a signal input terminal and a data output terminal, and is designed to latch current data in the count input terminal up to the data output terminal at the simultaneous timing of the pulse cycle of the pulse signal received through the signal input terminal.

The conversion table 510 has a data input terminal and a data output terminal, and is designed to convert data on the data input terminal into the data representative of a motion vector, and to output the converted result through the data output terminal.

The conversion table 520 has a data input terminal and a data output terminal, and is designed to convert data on the data input terminal into the data representative of a motion vector, and to output the converted result through the data output terminal.

The flip-flop 530 comprises a D flip-flop having a data input terminal, a signal input terminal and a data output terminal, and is designed to latch current data in the data input terminal up to the data output terminal at the simultaneous timing of the pulse cycle of the pulse signal received through the signal input terminal.

The flip-flop 540 comprises a D flip-flop having a data input terminal, a signal input terminal and a data output terminal, and is designed to latch current data in the data input terminal up to the data output terminal at the simultaneous timing of the pulse cycle of the pulse signal received through the signal input terminal.

The flip-flop 550 comprises a D flip-flop having a data input terminal, a signal input terminal and a data output terminal, and is designed to latch current data in the data input terminal up to the data output terminal at the simultaneous timing of the pulse signal received through the signal input terminal.

The data input terminal A0 of the comparator 410 is electrically connected to the data output terminal of the flip-flop 1080 of the processor element PE(0,0) through the output terminal DLo of the processor element PE(0,0), and the data input terminal A1 is electrically connected to the data output terminal of the flip-flop 1080 of the processor element PE(0,1) through the output terminal DLo of the processor element PE(0,1), and the data input terminal A2 is electrically connected to the data output terminal of the flip-flop 1080 of the processor element PE(0,2) through the output terminal DLo of the processor element PE(0,2).

The first data input terminal A of the comparator 430 is electrically connected to the data output terminal Y of the comparator 410, while the second input terminal B is electrically connected to the data output terminal Y of the logical sum element 500. The first data input terminal A of the selector 440 is electrically connected to the data output terminal Y of the comparator 410, while the second data input terminal B is electrically connected to the data output terminal Y of the logical sum element 500.

The data input terminal of the flip-flop 450 is electrically connected to the data output terminal Y of the selector 440, while the signal input terminal 450a is electrically connected to the third signal output terminal P3 of the signal outputting unit 300.

The signal input terminal A of the logical sum element 500 is electrically connected to the fifth signal output terminal P5 of the signal outputting unit 300, while the data input terminal B is electrically connected to the data output terminal of the flip-flop 450.

The signal input terminal of the inverter 460 is electrically connected to the third signal output terminal P3 of the signal outputting unit 300. The first signal input terminal A of the logical product element 470 is electrically connected to the signal output terminal of the comparator 430, while the second signal input terminal B is electrically connected to the data output terminal of the inverter 460.

The signal input terminal CK of the counter 480 is electrically connected to the third signal output terminal P3 of the signal outputting unit 300, while the signal input terminal CL is electrically connected to the fifth signal output terminal P5 of the signal outputting unit 300.

The data input terminal of the flip-flop 490 is electrically connected to the count output terminal Qn of the counter 480, while the signal input terminal is electrically connected to the data output terminal Y of the logical product element 470.

The data input terminal of the conversion table 510 is electrically connected to the data output terminal of the flip-flop 420, and the data input terminal of the conversion table 520 is electrically connected to the data output terminal of the flip-flop 490.

The data input terminal of the flip-flop 530 is electrically connected to the data output terminal of the conversion table 510, while the signal input terminal is electrically connected to the seventh signal output terminal P7 of the signal outputting unit 300.

The data input terminal of the flip-flop 540 is electrically connected to the data output terminal of the flip-flop 450, while the signal input terminal is electrically connected to the seventh signal output terminal P7 of the signal outputting unit 300.

The data input terminal of the flip-flop 550 is electrically connected to the data output terminal of the conversion table 520, while the signal input terminal is electrically connected to the seventh signal output terminal P7 of the signal outputting unit 300.

The operation of the first embodiment will be described hereinlater.

The pel values are supplied from the current block supplying unit 100 and the search window supplying unit 200 to the distortion calculating unit 1000a as being described hereinlater.

As will be understood from the timing chart in FIGS. 5 and 6 in which the pulse signals SL and CK1 are shown, the pulse signal SL changes before each pulse of the pulse signal CK1. The selector 1010 of the processor element PE(x,y) is operated to select the second data input terminal B before the first pulse of the pulse signal CK1 is outputted, and to select the first data input terminal A before the second pulse of CK1 is outputted, and this selecting process is repeated in every succeeding pulse cycle of the pulse signal CK1. The selector 160 of the current block supplying unit 100 is operated to select the second data input terminal B before the first pulse of the pulse signal CK1 is outputted, and to select the first data input terminal A before the second pulse of the pulse signal CK1 is outputted, and this selecting process is repeated in every succeeding pulse cycle of the pulse signal CK1.

At each of the input registers RE(x,y), as shown in FIG. 1, each data in the data input terminal is latched at the simultaneous timing of every pulse of the clock pulse signal CK0 to be transmitted to another register or processor element, while at the flip-flop 1020 of each of the processor elements PE(x,y), as shown in FIG. 10, each data in the data input terminal selected by the selector 1010 is latched at the simultaneous timing of every pulse of the pulse signal CK1 to be transmitted to another processor element or register through the output terminals YLo, YDo and YUo.

At the flip-flop 150 of the current block supplying unit 100, as shown in FIG. 7, each data in the data input terminal selected by the selector 160 is latched at the simultaneous timing of every pulse of the clock signal CK1 to be transmitted to each of the processor elements of the distortion calculating unit 1000a through the output terminals.

The pel value transmission to each of the input registers RE(x,y), which will be described hereinlater, is assumed to occur at the time the data is latched at the flip-flop of each of the input registers RE(x,y). Moreover, the pel value transmission to each of the side registers SR(x,y) is assumed to occur at the time the data is latched at the flip-flop 1622 of each of the side registers SR(x,y).

The input registers RE is operated to receive data from the adjacent lower input register RE or the search window supplying unit 200 shown in FIG. 1 at the simultaneous timing of the pulse cycle of the pulse signal CK0, and this process is repeated every pulse cycle of the pulse signal CK0. While each of the processor elements and side registers is operated to receive data either from the adjacent right processor element or register shown in FIG. 1 at the simultaneous timing of the first pulse of the pulse signal CK1, and at the second pulse of the pulse signal CK1, each of the processor elements of the first and third columns and side registers is operated to receive data either from the adjacent upper processor element or side register shown in FIG. 1, while each of the processor elements of the second column and the side registers is operated to receive data either from the adjacent lower processor element or side register shown in FIG. 1, and this process is repeated every succeeding pulse cycle of the pulse signal CK1.

Figure 14:
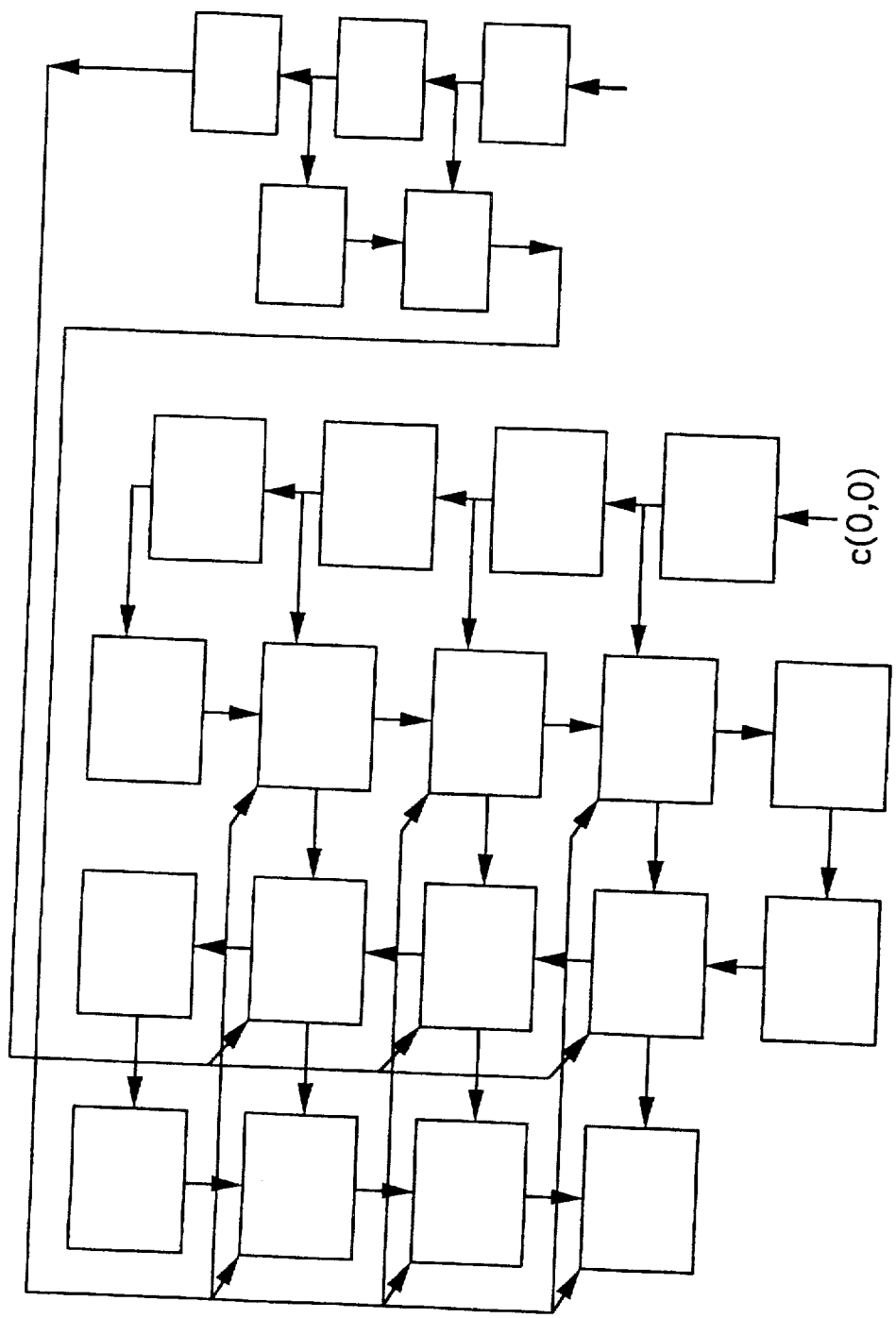
FIGS. 14 through 21 are diagrams showing flow of the pel values of search window during initialization operation of the motion estimation apparatus shown in FIG. 1.

The flow of pel values will be described more specifically hereinlater. At the simultaneous timing of the first pulse of the pulse signal CK0 as shown in FIG. 14, the pel value c(0,0) is supplied from the search window supplying unit 200 to the input register RE(3,2).

Figure 15:
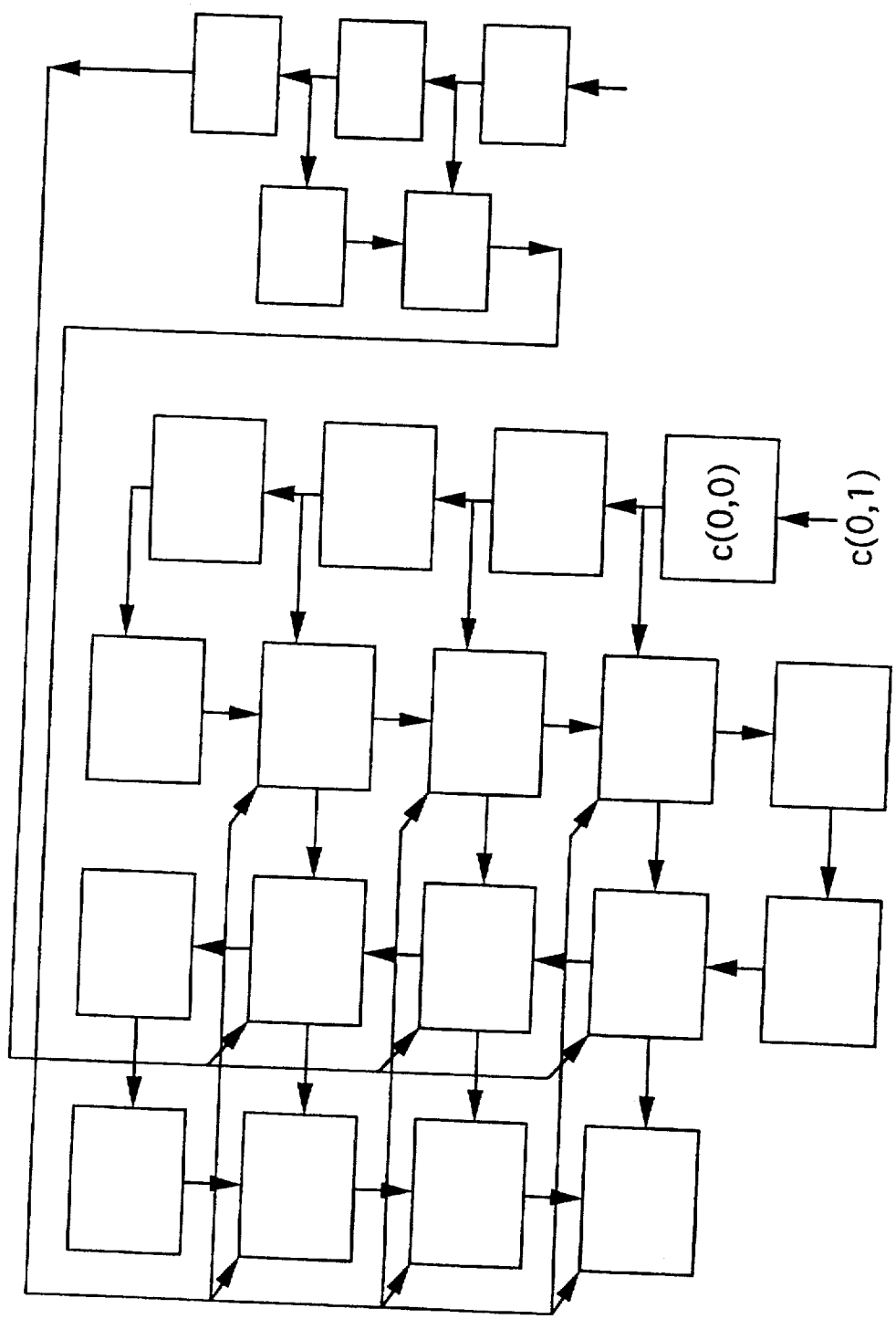

At the simultaneous timing of the second pulse of the pulse signal CK0 as shown in FIG. 15, the pel value c(0,0) is transmitted from the input register RE(3,2) to the input register RE(3,1), while the pel value c(0,1) is supplied from the search window supplying unit 200 to the input register RE(3,2).

Figure 16:
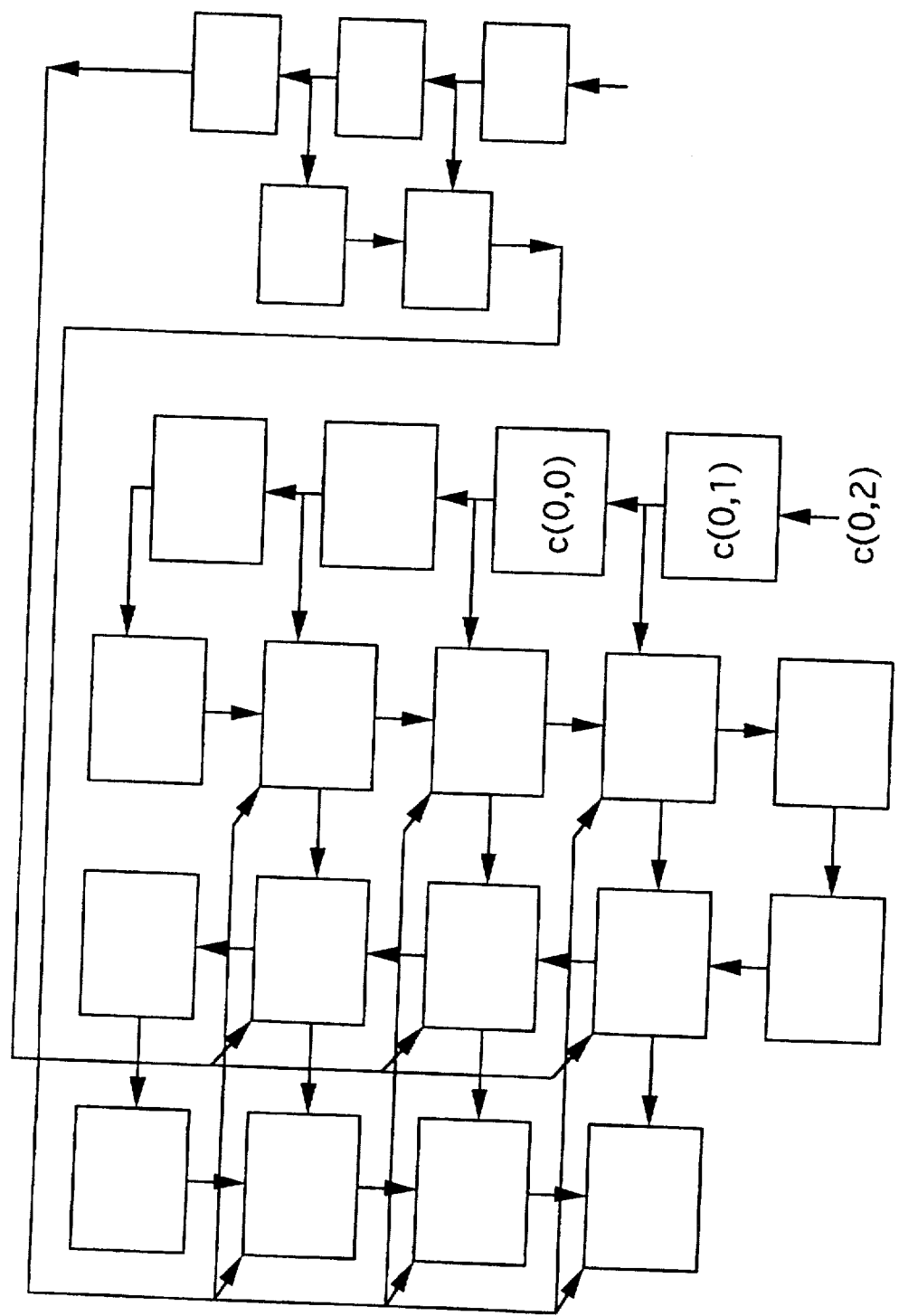

At the simultaneous timing of the third pulse of the pulse signal CK0 as shown in FIG. 16, the pel values c(0,0) and c(0,1) are transmitted from the input registers RE(3,1) and RE(3,2) to the input registers RE(3,0) and RE(3,1) respectively, while the pel value c(0,2) is supplied from the search window supplying unit 200 to the input register RE(3,2).

Figure 17:
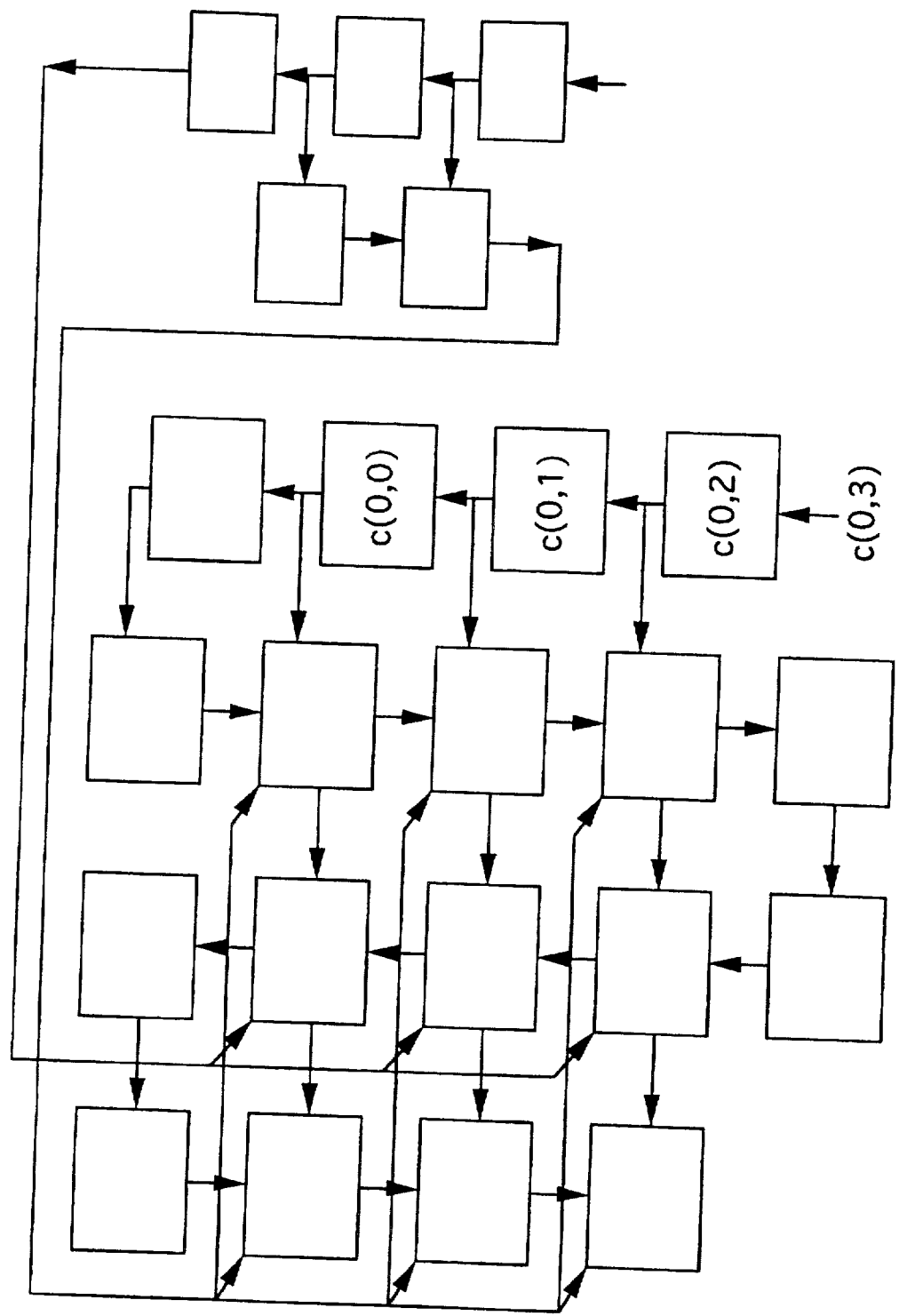

At the simultaneous timing of the fourth pulse of the pulse signal CK0 as shown in FIG. 17, the pel values c(0,0), c(0,1) and c(0,2) are transmitted from the input registers RE(3,0), RE(3,1) and RE(3,2) to the input register RE(3,-1), RE(3,0) and RE(3,2) respectively, while the pel value c(0,3) is supplied from the search window supplying unit 200 to the input register RE(3,2).

Figure 18:
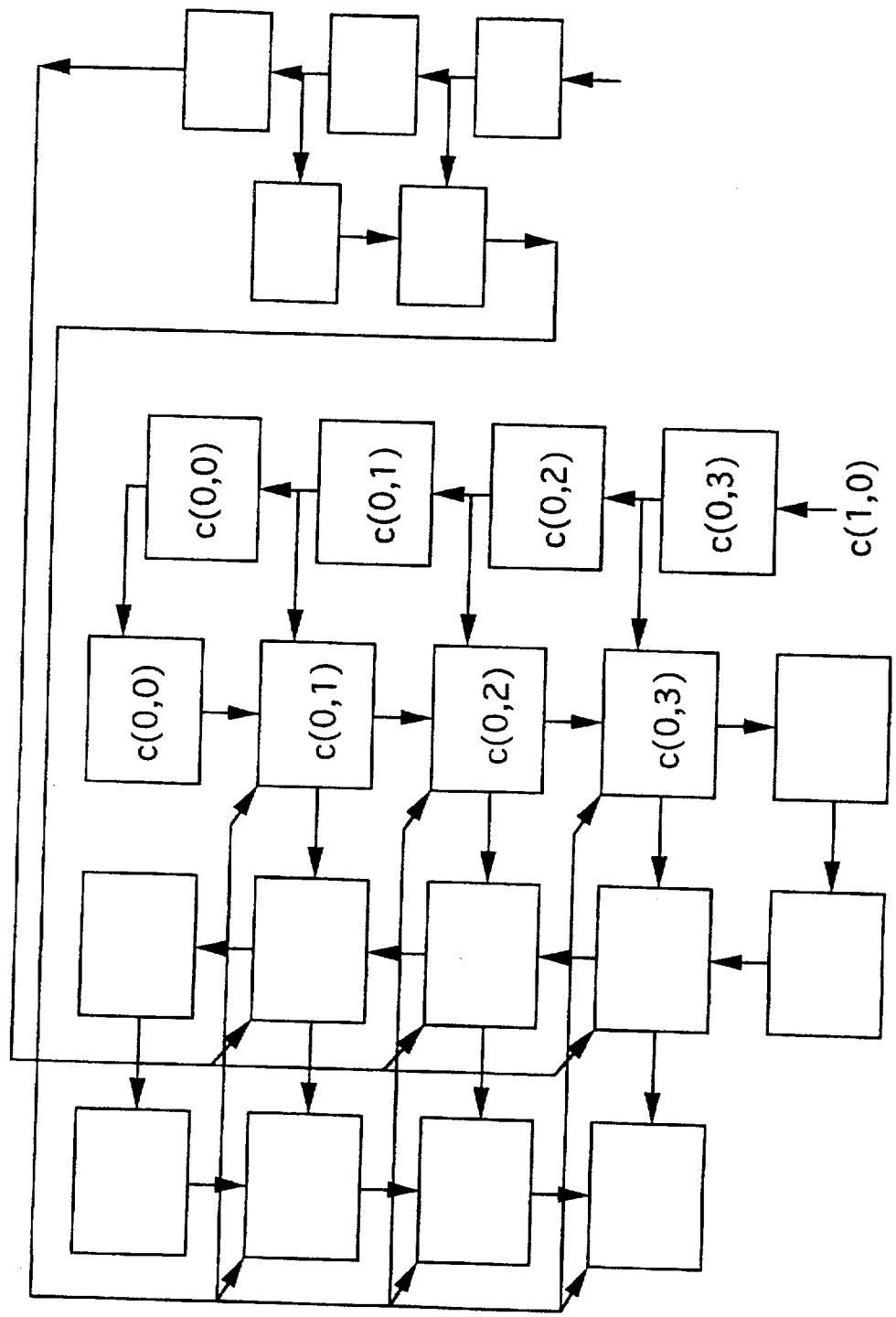

At the simultaneous timing of the third pulse of the pulse signal CK1 as shown in FIG. 18, the pel values c(0,0), c(0,1), c(0,2) and c(0,3) are transmitted from the input registers RE(3,-1), RE(3,0), RE(3,1) and RE(3,2) to the side register SR(2,-1), the processor elements PE(2,0), PE(2,1) and PE(2,2) respectively.

Before the fourth pulse of the pulse signal CK1 is outputted, the pel values c(0,2), c(0,3), c(1,0) and c(1,1) are transmitted to the input registers RE(3,-1), RE(3,0), RE(3,1) and RE(3,2) respectively.

Figure 19:
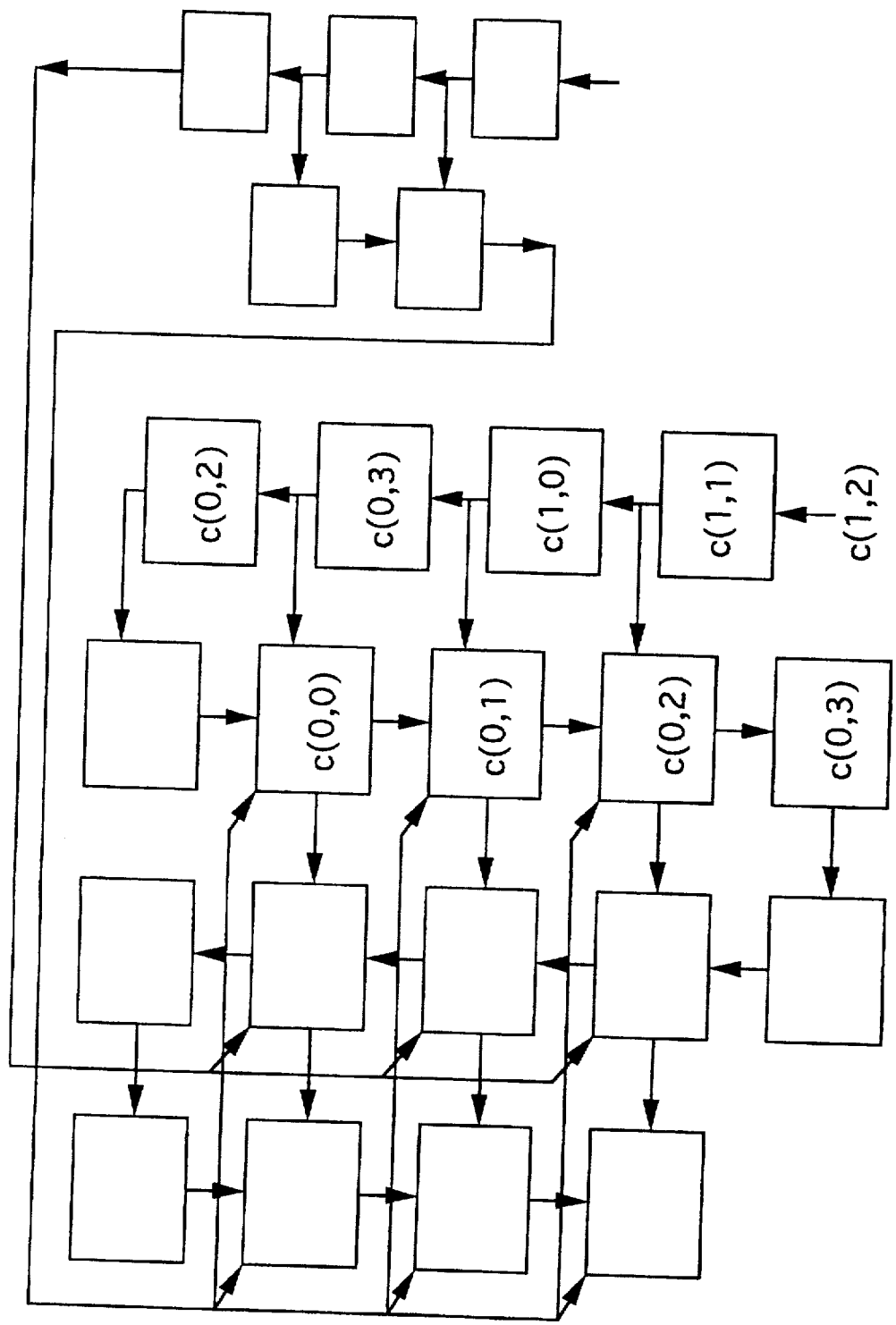

At the simultaneous timing of the fourth pulse of the pulse signal CK1 as shown in FIG. 19, the pel values c(0,0), c(0,1), c(0,2) and c(0,3) are transmitted from the side register SR(2,-1), the processor elements PE(2,0), PE(2,1) and PE(2,2) to the processor elements PE(2,0), PE(2,1), PE(2,2), and the side register SR(2,3) respectively.

Before the fifth pulse of the pulse signal CK1 is outputted, the pel values c(1,0), c(1,1), c(1,2) and c(1,3) are transmitted to the input registers RE(3,-1), RE(3,0), RE(3,1) and RE(3,2) respectively.

Figure 20:
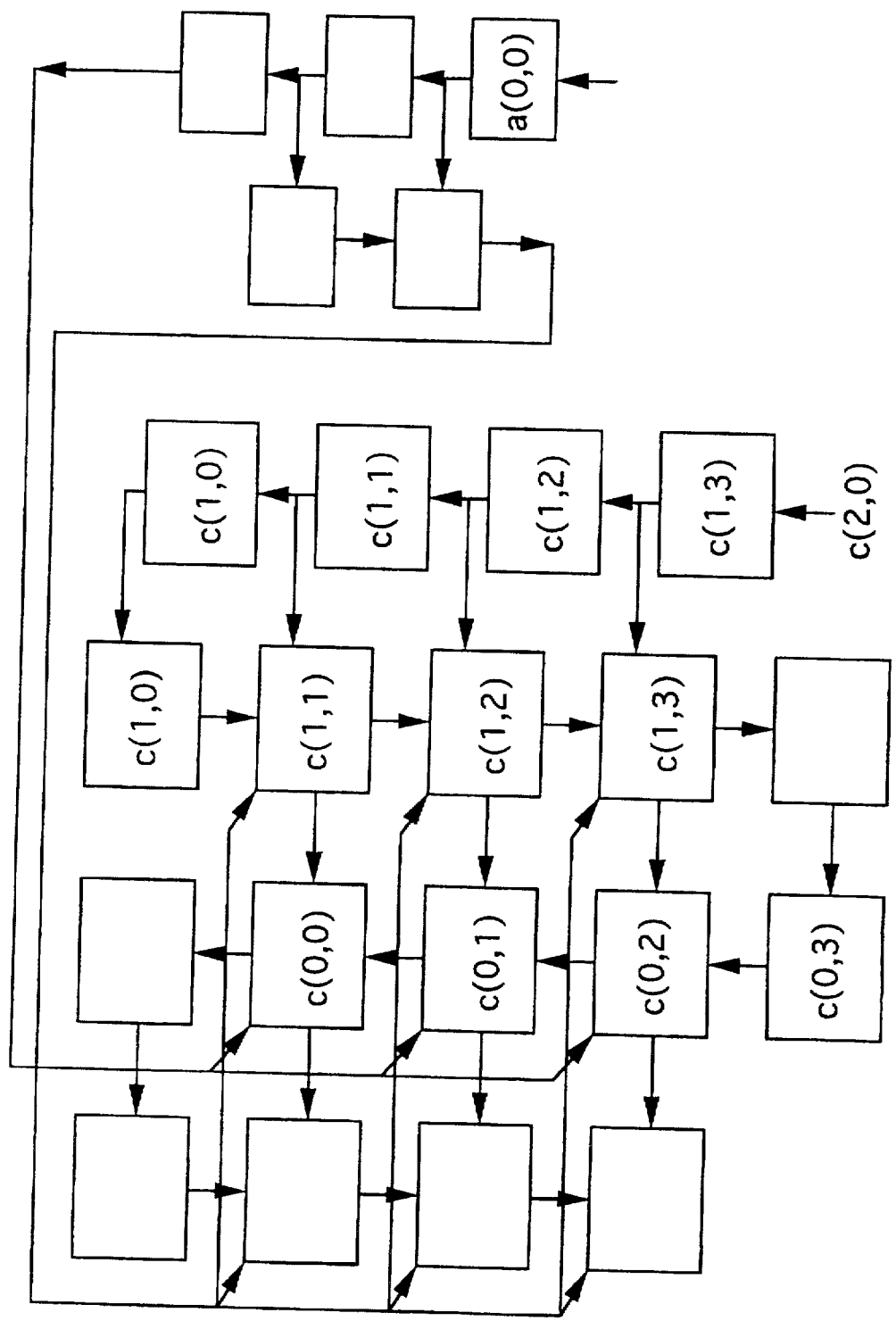

At the simultaneous timing of the fifth pulse of the pulse signal CK1 as shown in FIG. 20, the pel values c(0,0), c(0,1), c(0,2), c(0,3), c(1,0), c(1,1), c(1,2) and C(1,3) are transmitted from the processor elements PE(2,0), PE(2,1), PE(2,2), the side register SR(2,3), the input registers RE(3,-1), RE(3,0), RE(3,1) and RE(3,2) to the processor elements PE(1,0), PE(1,1), PE(1,2), the side register SR(1,3), SR(2,-1), the processor elements PE(2,0), PE(2,1) and PE(2,2) respectively.

At the same time, the pel value a(0,0) is supplied from the data inputting means (not shown) to the flip-flop 110 of the current block supplying unit 100.

Before the sixth pulse of the pulse signal CK1 is outputted, the pel values c(1,2), c(1,3), c(2,0) and c(2,1) are transmitted to the input registers RE(3,-1), RE(3,0), RE(3,1) and RE(3,2) respectively.

Figure 21:
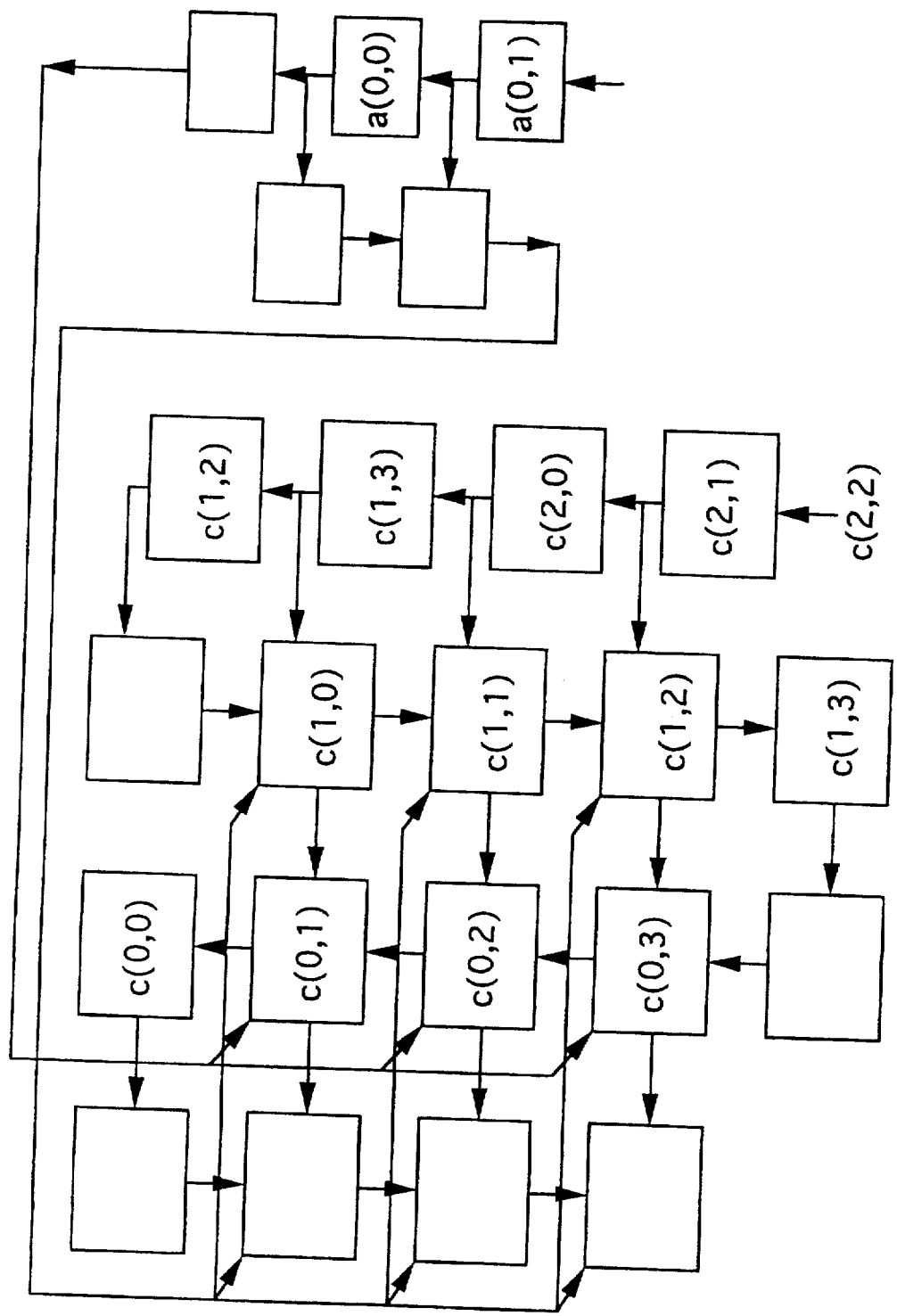

At the simultaneous timing of the sixth pulse of the pulse signal CK1 as shown in FIG. 21, the pel values c(0,0), c(0,1), c(0,2), c(0,3), c(1,0), c(1,1), c(1,2) and c(1,3) are transmitted from the processor elements PE(1,0), PE(1,1), PE(1,2), the side registers SR(1,3), SR(2,-1), the processor elements PE(2,0), PE(2,1) and PE(2,2) to the side register SR(1,-1), the processor elements PE(1,0), PE(1,1), PE(1,2), PE(2,0), PE(2,1), PE(2,2), and the side register SR(2,3) respectively.

At the same time, the pel value a(0,0) is transmitted from the flip-flop 110 of the current block supplying unit 100 to the flip-flop 120 of the current block supplying unit 100, while the pel value a(0,1) is supplied from the data inputting means to the flip-flop 110 of the current block supplying unit 100.

Before the seventh pulse of the pulse signal CK1 is outputted, the pel values c(2,0), c(2,1), c(2,2) and c(2,3) are transmitted to the input registers RE(3,-1), RE(3,0), RE(3,1) and RE(3,2) respectively.

Figure 22:
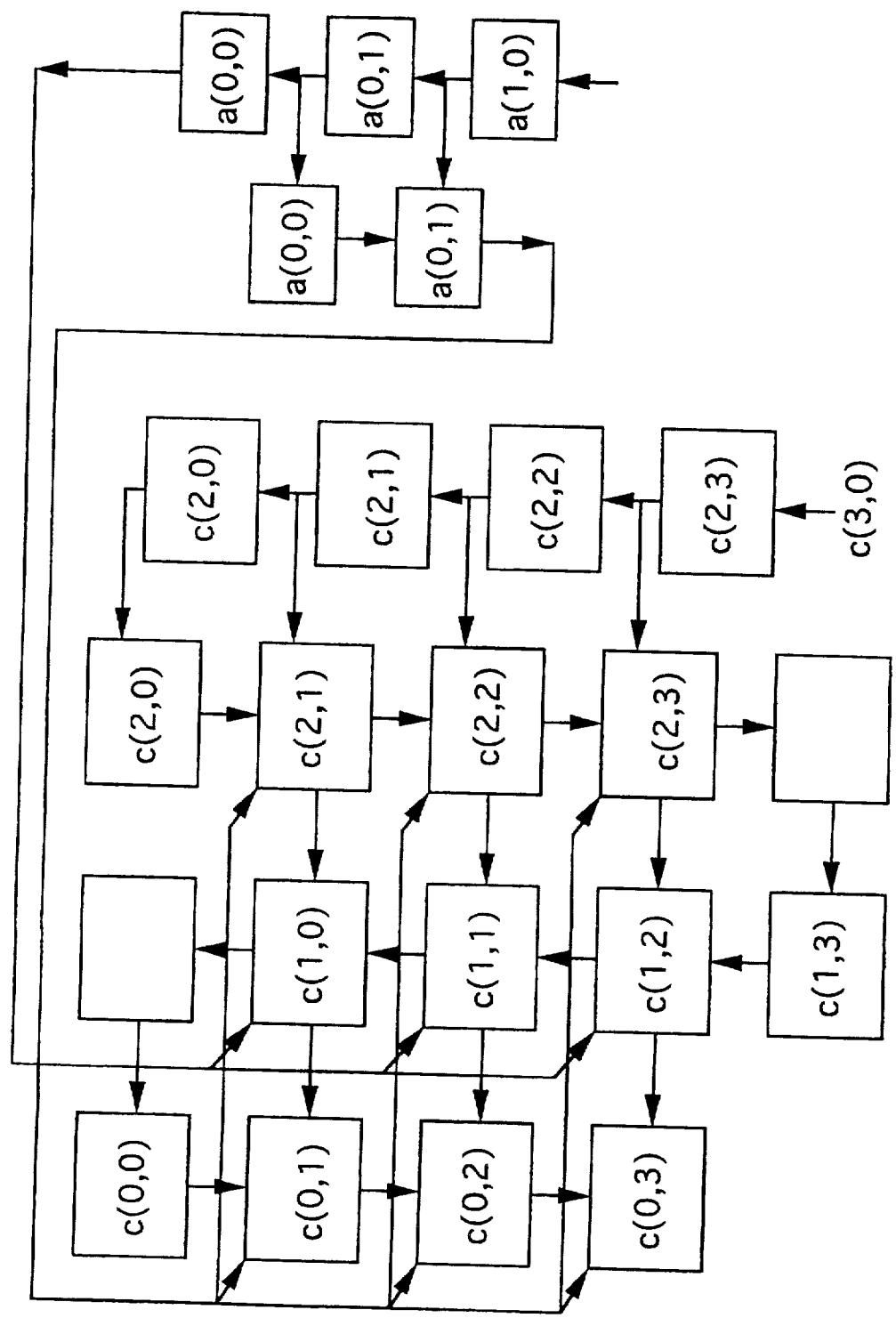
FIGS. 22 through 27 are diagrams showing flow of the pel values of search window in periods (k) to (p), respectively.

At the simultaneous timing of the seventh pulse of the pulse signal CK1 as shown in FIG. 22, the pel values c(0,0), c(0,1), c(0,2), c(0,3), c(1,0), c(1,1), c(1,2), c(1,3), c(2,0), c(2,1), c(2,2) and c(2,3) are transmitted from the side register SR(1,-1), the processor elements PE(1,0), PE(1,1), PE(1,2), PE(2,0), PE(2,1), PE(2,2), the side register SR(2,3), the input registers RE(3,-1), RE(3,0), RE(3,1) and RE(3,2) to the side registers SR(0,-1), the processor elements PE(0,0), PE(0,1), PE(0,2), PE(1,0), PE(1,1), PE(1,2), the side registers SR(1,3), SR(2,-1), the processor elements PE(2,0), PE(2,1) and PE(2,2) respectively.

At the same time, the pel values a(0,0) and a(0,1) are transmitted from the flip-flops 120 and 110 of the current block supplying unit 100 to both flip-flops 130 and 140, both flip-flops 120 and 150 of the current block supplying unit 100, respectively, while the pel value a(1,0) is supplied from the data inputting means to the flip-flop 110 of the current block supplying unit 100.

Before the eighth pulse of the pulse signal CK1 is outputted, the pel values c(2,2), c(2,3), c(3,0) and c(3,1) are transmitted to the input registers RE(3,-1), RE(3,0), RE(3,1) and RE(3,2) respectively.

Figure 23:
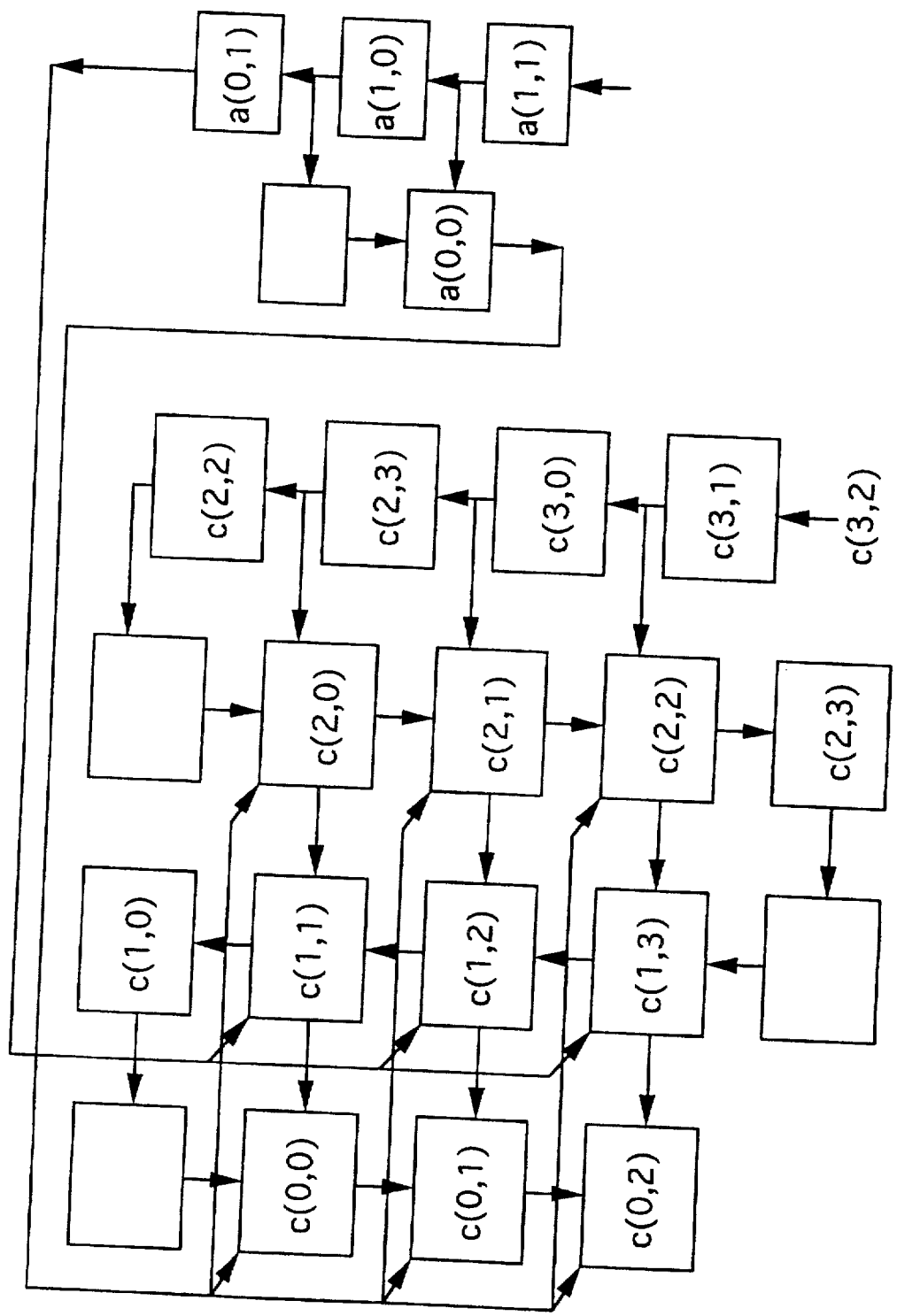

At the simultaneous timing of the eighth pulse of the pulse signal CK1 as shown in the FIG. 23, the pel values c(0,0), c(0,1), c(0,2), c(1,0), c(1,1), c(1,2), c(1,3), c(2,0), c(2,1), c(2,2) and c(2,3) are transmitted from the side register SR(0,-1), the processor elements PE(0,0), PE(0,1), PE(1,0), PE(1,1), PE(1,2), the side registers SR(1,3), SR(2,-1), the processor elements PE(2,0), PE(2,1) and PE(2,2) to the processor elements PE(0,0), PE(0,1), PE(0,2), the side register SR(1,-1), the processor elements PE(1,0), PE(1,1), PE(1,2), PE(2,0), PE(2,1), PE(2,2), and the side register SR(2,3) respectively.

At the same time, the pel values a(0,0), a(0,1) and a(1,0) are transmitted from the flip-flops 140, 120 and 110 of the current block supplying unit 100 to the flip-flops 150, 130 and 120 of the current block supplying unit 100, respectively, while the pel value a(1,1) is supplied from the data inputting means to the flip-flop 110 of the current block supplying unit 100.

Before the ninth pulse of the pulse signal CK1 is outputted the pel values c(3,0), c(3,1), c(3,2) and c(3,3) are transmitted to the input registers RE(3,-1), RE(3,0), RE(3,1) and RE(3,2) respectively.

Figure 24:
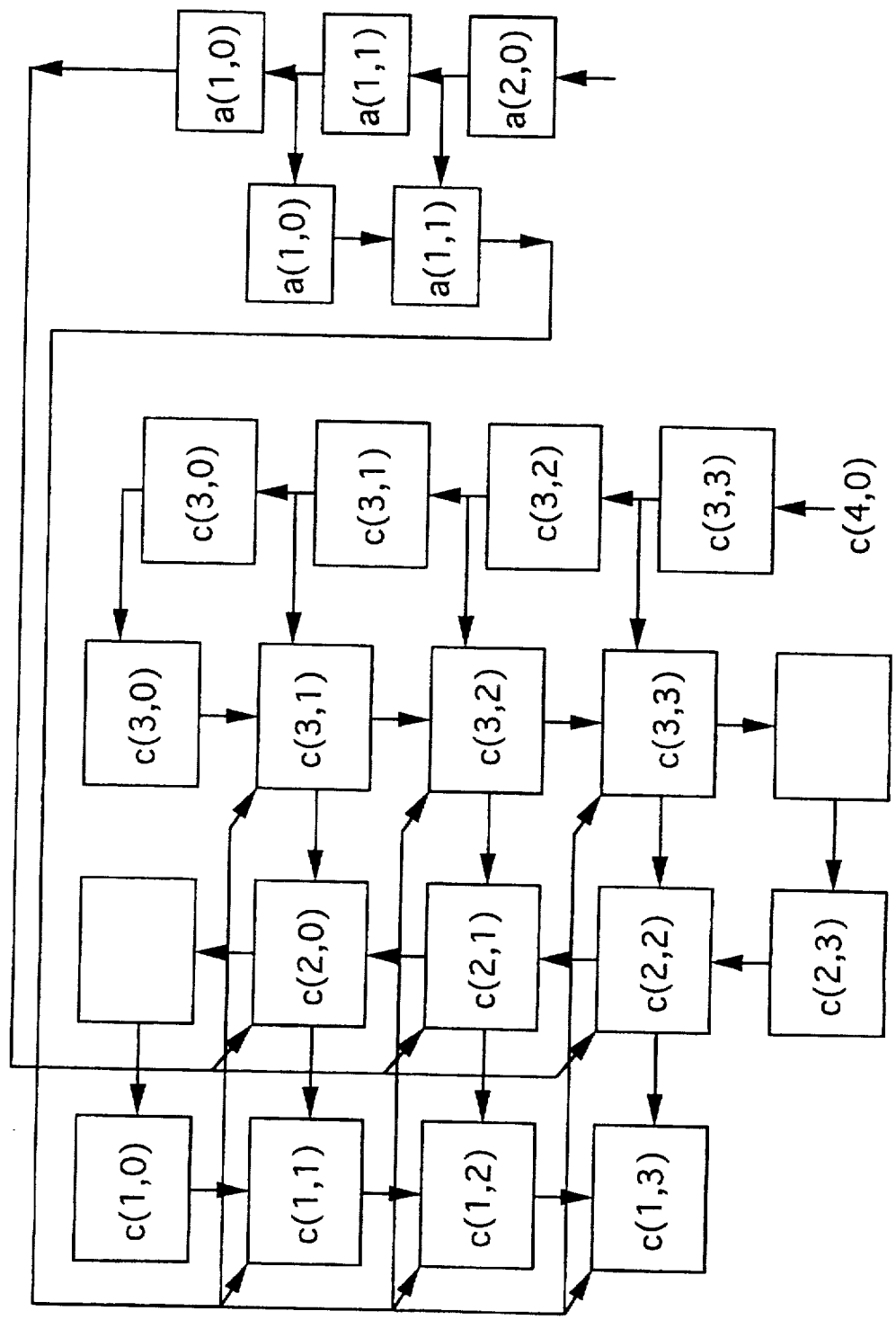

At the simultaneous timing of the ninth pulse of the pulse signal CK1 as shown in the FIG. 24, the pel values c(1,0), c(1,1), c(1,2), c(1,3), c(2,0), c(2,1), c(2,2), c(2,3), c(3,0), c(3,1), c(3,2) and c(3,3) are transmitted from the side register SR(1,-1), the processor elements PE(1,0), PE(1,1), PE(1,2), PE(2,0), PE(2,1), PE(2,2), the side register SR(2,3), the input registers RE(3,-1), RE(3,0), RE(3,1) and RE(3,2) to the side registers SR(0,-1), the processor elements PE(0,0), PE(0,1), PE(0,2), PE(1,0), PE(1,1), PE(1,2), the side registers SR(1,3), SR(2,-1), the processor elements PE(2,0), PE(2,1) and PE(2,2) respectively.

At the same time, the pel values a(1,0) and a(1,1) are transmitted from the flip-flops 120 and 110 of the current block supplying unit 100 to both flip-flops 130 and 140, both flip-flops 120 and 150 of the current block supplying unit 100, respectively, while the pel value a(2,0) is supplied from the data inputting means to the flip-flop 110 of the current block supplying unit 100.

Before the tenth pulse of the pulse signal CK1 is outputted, the pel values c(3,2), c(3,3), c(4,0) and c(4,1) are transmitted to the input registers RE(3,-1), RE(3,0), RE(3,1) and RE(3,2) respectively.

Figure 25:
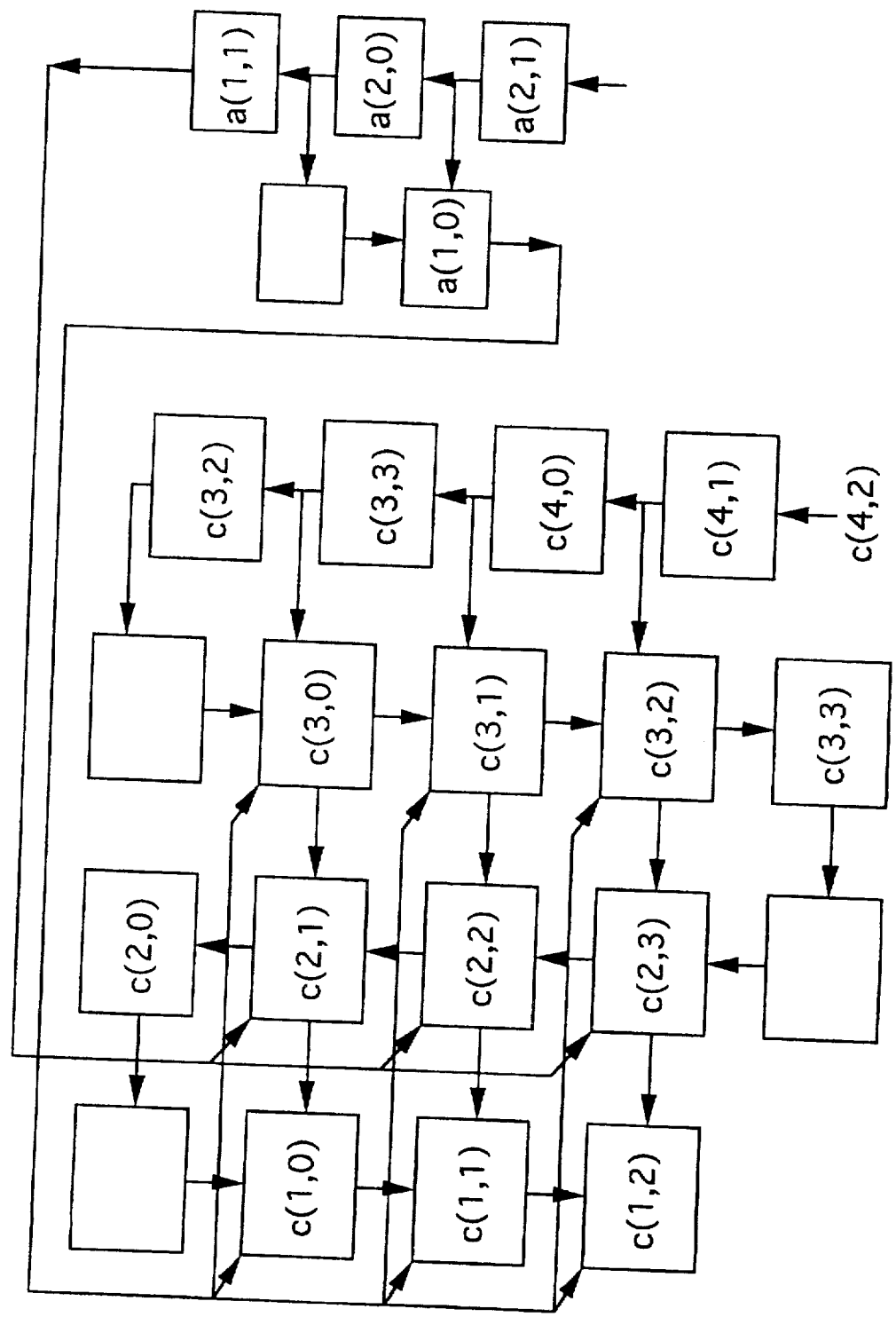

At the simultaneous timing of the tenth pulse of the pulse signal CK1 as shown in the FIG. 25, the pel values c(1,0), c(1,1), c(1,2), c(2,0), c(2,1), c(2,2), c(2,3), c(3,0), c(3,1), c(3,2) and c(3,3) are transmitted from the side register SR(0,-1), the processor elements PE(0,0), PE(0,1), PE(1,0), PE(1,1), PE(1,2), the side registers SR(1,3), SR(2,-1), the processor elements PE(2,0), PE(2,1) and PE(2,2) to the processor elements PE(0,0), PE(0,1), PE(0,2), the side register SR(1,-1), the processor elements PE(1,0), PE(1,1), PE(1,2), PE(2,0), PE(2,1), PE(2,2), and the side register SR(2,3) respectively.

At the same time, the pel values a(1,0), a(1,1) and a(2,0) are transmitted from the flip-flops 140, 120 and 110 of the current block supplying unit 100 to the flip-flops 150, 130 and 120 of the current block supplying unit 100, respectively, while the pel value a(2,1) is supplied from the data inputting means to the flip-flop 110 of the current block supplying unit 100.

During the periods (g), (h), (i) and (j), as shown in FIG. 5, each of which begins with a rising edge of seventh, eighth, ninth, and tenth pulse of the pulse signal CK1 respectively, and ends with a rising edge of eighth, ninth, tenth and eleventh pulse of the pulse signal CK1 respectively, the calculations described below are performed at each of the processor elements PE(x,y).

During the period (g) as shown in FIG. 22, each of the pel values, c(0,1), c(0,2), c(0,3), c(1,0), c(1,1), c(1,2), c(2,1), c(2,2) and c(2,3) is transmitted, as in the listed order herein, to the first data input terminal A of the subtracter 1030 of the corresponding processor elements PE(0,0), PE(0,1), PE(0,2), PE(1,0), PE(1,1), PE(1,2), PE(2,0), PE(2,1) and PE(2,2) respectively through the selector 1010 and the flip-flop 1020 of each of the processor elements. In other words, each of the processor elements PE(x,y) of the odd columns is operated to receive the pel values c(x,y+1), while each of the processor elements PE(x,y) of the even column is operated to receive the pel values c(x,y).

At the same time, each of the processor elements of the odd columns and of the even column is operated to receive the pel values a(0,1) and a(0,0) of the current block respectively through the second data input terminal B of the subtracter 1030 of each of the processor elements PE(x,y).

At each of the processor elements PE(x,y) of the odd columns and of the even column, the following subtraction is performed on the pel values by the subtracter 1030 respectively.

c(x,y+1)−a(0,1) at PE(x,y) of the odd columns c(x,y)−a(0,0) at PE(x,y) of the even column The values calculated by the subtracter 1030 are then converted into positive values by the positive value transducer 1040 as follows.

|c(x,y+1)−a(0,1)| at PE(x,y) of the odd columns

|c(x,y)−a(0,0)| at PE(x,y) of the even column

The positive values thus converted by the positive value transducer 1040 are then transmitted to the first data input terminal A of the adder 1050. While at the inverter 1090 of each of the processor elements, the signal LD is received through the signal input terminal. The signal LD representative of "1" is outputted during the period (f) prior to the period (g), and thus the signal representative "0" is transmitted from the signal output terminal of the inverter 1090. The signal outputted from the inverter 1090 is then transmitted to the signal input terminal A of the logical product element 1100, therefore the data representative of "0" is transmitted from the data output terminal Y regardless of the value received through the data input terminal B of the logical product element 1100. The data representative of "0" is then transmitted to the data input terminal B of the adder 1050 where the data received through the first data input terminal A, and the data representative of "0" received through the second input terminal B are added, and the resulting value is transmitted to the flip-flop 1060 as follows.

|c(x,y+1)−a(0,1)| at PE(x,y) of the odd columns

|c(x,y)−a(0,0)| at PE(x,y) of the even column

During the period (h), the subtracter 1030 of each of the processor elements PE(x,y) of the odd columns is operated to receive the pel value c(x,y) through the first data input terminal A transmitted either from the data output terminal of the flip-flop 1020 of the adjacent upper processor element PE(x,y−1) shown in FIG. 1 or from the data output terminal of the side register SR(x,y−1), while receiving the pel value a(0,0) of the current block through the second data input terminal B. The subtracter 1030 of each of the processor elements PE(x,y) of the even column is operated to receive the pel value c(x,y+1) of the current block through the first data input terminal A transmitted either from the data output terminal of the flip-flop 1020 of the adjacent lower processor element PE(x,y+1) or from the data output terminal of the side register SR(x,y+1), while receiving the pel value a(0,1) through the second data input terminal B.

At each of the processor elements PE(x,y) of the odd columns and of the even column, the following subtraction is performed on the pel values by the subtracter 1030 respectively.

c(x,y)−a(0,0) at PE(x,y) of the odd columns c(x,y+1)−a(0,1) at PE(x,y) of the even column The resulting values are converted into positive values by the positive value transducer 1040 as follows.

|c(x,y)−a(0,0)| at PE(x,y) of the odd columns

|c(x,y+1)−a(0,1)| at PE(x,y) of the even column

The positive values thus converted by the positive value transducer 1040 are then transmitted to the first data input terminal A of the adder 1050. The second data input terminal B of the adder 1050 is operated to receive the value calculated during the period (g) transmitted from the flip-flop 1060 through the logical product element 1100. At the adder 1050, the following calculation is performed.

|c(x,y+1)−a(0,1)|
+|c(x,y)−a(0,0)| at PE(x,y) of the odd columns

|c(x,y)−a(0,0)|
+|c(x,y+1)−a(0,1)| at PE(x,y) of the even column

The resulting pel values are then transmitted to the flip-flop 1060.

During the period (i), the subtracter 1030 of each of the processor elements PE(x,y) of the odd columns is operated to receive the pel value c(x+1,y) through the first data input terminal A transmitted either from the data output terminal of the flip-flop 1020 of the adjacent right processor element PE(x+1,y) shown in FIG. 1 or from the data output terminal of the input register RE(x+1,y), while receiving the pel value a(1,1) of the current block through the second data input terminal B. The subtracter 1030 of each of the processor elements PE(x,y) of the even column is operated to receive the pel value c(x+1,y) of the current block through the first data input terminal A transmitted from the data output terminal of the flip-flop 1020 of the adjacent right processor element PE(x,y), while receiving the pel value a(1,0) through the second data input terminal B.

At each of the processor elements PE(x,y) of the odd columns and of the even column, the following subtraction is performed on the pel values by the subtracter 1030 respectively.

c(x+1,y+1)−a(1,1) at PE(x,y) of the odd columns c(x+1,y)−a(1,0) at PE(x,y) of the even column The resulting values are converted into positive values by the positive value transducer 1040 as follows.

$|c(x+1,y+1)-a(1,1)|$ at PE(x,y) of the odd columns $|c(x+1,y)-a(1,0)|$ at PE(x,y) of the even column The positive values thus converted by the positive value transducer 1040 are then transmitted to the first data input terminal A of the adder 1050. The second data input terminal B of the adder 1050 is operated to receive the value calculated during the period (h) transmitted from the flip-flop 1060 through the logical product element 1100. At the adder 1050 the following calculation is performed.

$|c(x,y+1)-a(0,1)|$ $+|c(x,y)-a(0,0)|$ $+|c(x+1,y+1)-a(1,1)|$ at PE(x,y) of the odd columns $|c(x,y)-a(0,0)|$ $+|c(x,y+1)-a(0,1)|$ $+|c(x+1,y)-a(1,0)|$ at PE(x,y) of the even column The resulting values are then transmitted to the flip-flop 1060.

During the period (j), the subtracter 1030 of each of the processor elements PE(x,y) of the odd columns is operated to receive the pel value $c(x+1,y)$ through the first data input terminal A transmitted either from the data output terminal of the flip-flop 1020 of the adjacent upper processor element PE(x,y-1) shown in FIG. 1 or from the data output terminal of the side register SR(x,y-1), while receiving the pel value $a(1,0)$ of the current block through the second data input terminal B. The subtracter 1030 of each of the processor elements PE(x,y) of the even column is operated to receive the pel value $c(x+1,y+1)$ of the current block through the first data input terminal A transmitted either from the data output terminal of the flip-flop 1020 of the adjacent lower processor element PE(x,y+1) or from the data output terminal of the side register SR(x,y+1), while receiving the pel value $a(1,1)$ through the second data iput terminal B.

At each of the processor elements PE(x,y) of the odd columns and of the even column, the following subtraction is performed on the pel values by the subtracter 1030 respectively.

$c(x+1,y)-a(1,0)$ at PE(x,y) of the odd columns $c(x+1,y+1)-a(1,1)$ at PE(x,y) of the even column The resulting values are converted into positive values by the positive value transducer 1040 as follows.

$|c(x+1,y)-a(1,0)|$ at PE(x,y) of the odd columns $|c(x+1,y+1)-a(1,1)|$ at PE(x,y) of the even column The positive values thus converted by the positive value transducer 1040 are then transmitted to the first data input terminal A of the adder 1050. The second data input terminal B of the adder 1050 is operated to receive the value calculated during the period (i) transmitted from the flip-flop 1060 through the logical product element 1100. At the adder 1050 the following calculation is performed.

$|c(x,y+1)-a(0,1)|$ $+c(x,y)-a(0,0)|$ $+|c(x+1,y+1)-a(1,1)|$ $+|c(x+1,y)-a(1,0)|$ ... (Q1) at PE(x,y) of the odd columns $|c(x,y)-a(0,0)|$ $+|c(x,y+1)-a(0,1)|$ $+|c(x+1,y)-a(1,0)|$ $+|c(x+1,y+1)-a(1,1)|$ ... (Q2) at PE(x,y) of the even column At the simultaneous timing of the pulse signal LD which is outputted during the period (j), the data output terminal Y of the second selector is latched to the data output terminal of the flip-flop 1060, and at the simultaneous timing of the eleventh pulse of the pulse signal CK1, i.e., at the timing of the pulse cycle of the pulse signal CK2, the resulting value obtained from the adder 1050 in the process described above is outputted from each of the processor elements PE(x,y) through the output terminal DLo. For instance, the following value is outputted from the processor element PE(1,1) through the output terminal DLo.

$|c(1,1)-a(0,0)|$ $+|c(1,2)-a(0,1)|$ $+|c(2,1)-a(1,0)|$ $+|c(2,2)-a(1,1)|$

Figure 2:
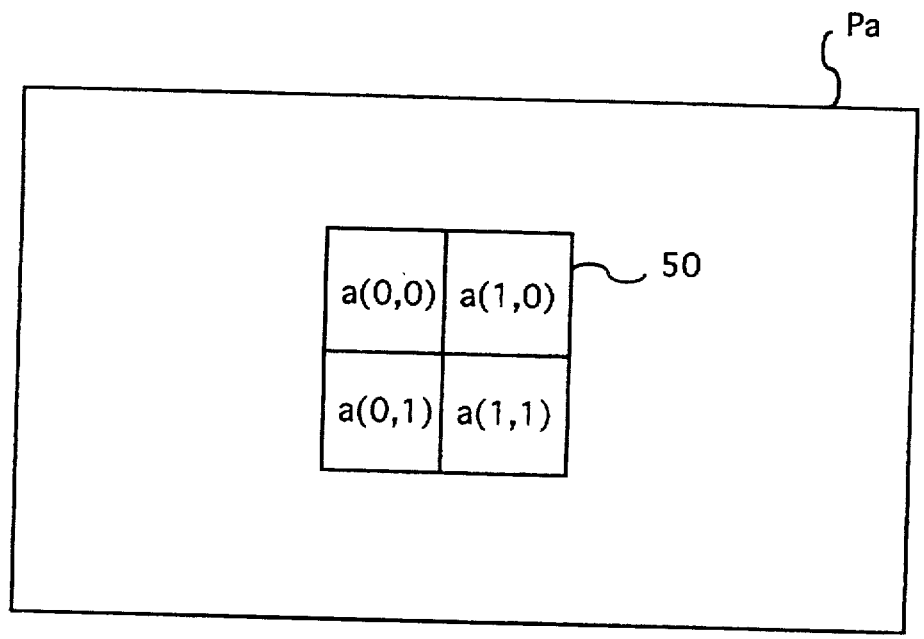
FIG. 2(a) is a diagram showing a current picture including a current block.
FIG. 2(b) is a diagram showing a reference picture including a search window.
Figure 2:
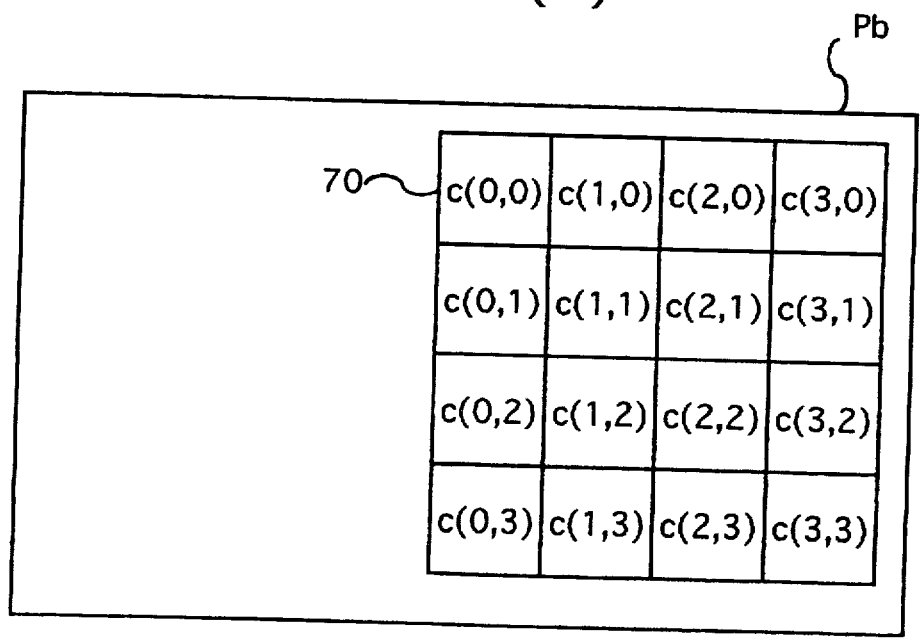
Figure 3:
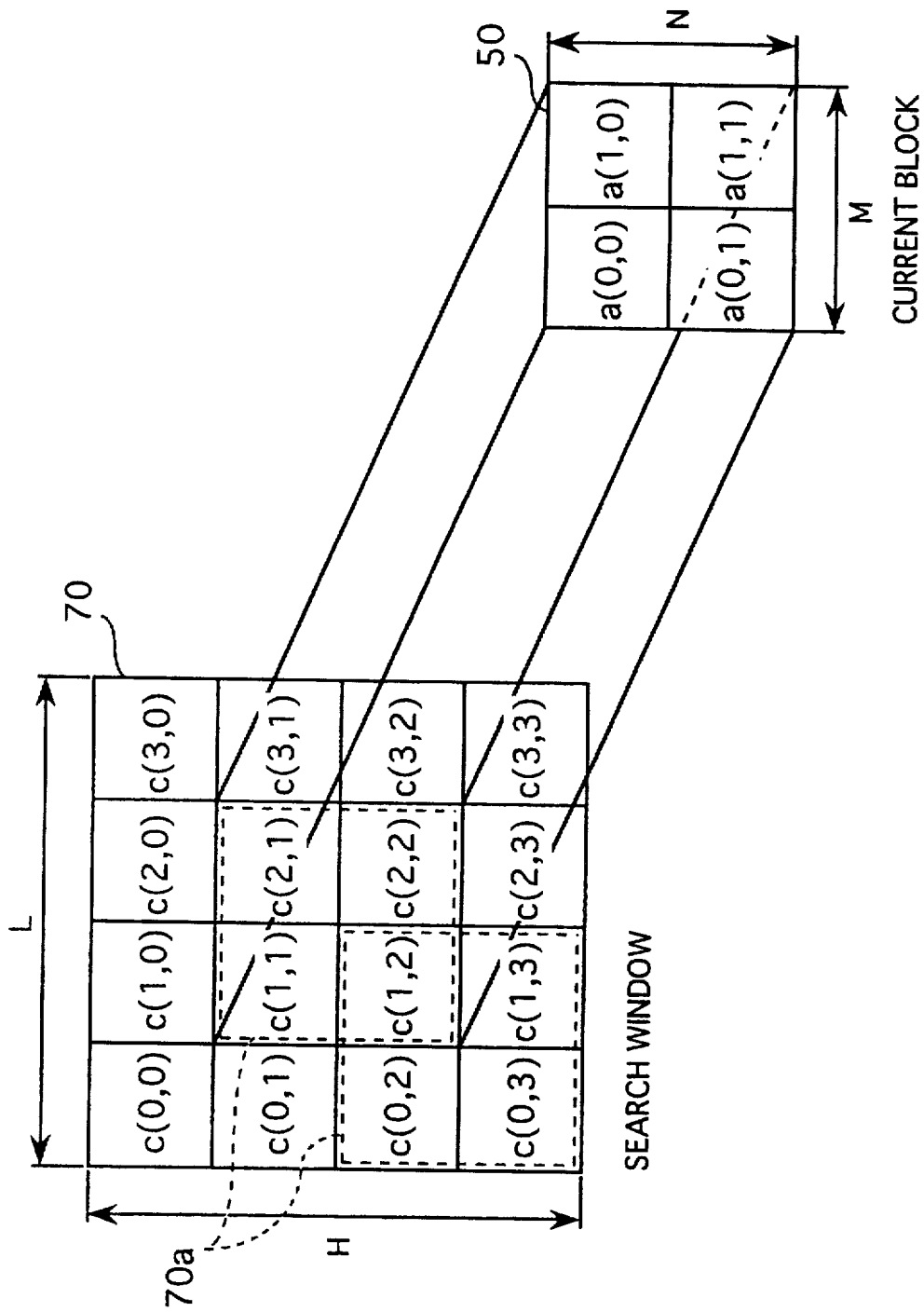
FIG. 3 is a diagram showing a relation between the current block of the current picture and each of the candidate blocks of the search window of the reference picture shown in FIGS. 2(a) and 2(b), respectively.

The expression (Q2) listed above represents a distortion value between the candidate block 70a of the reference picture Pb and the current block 50 of the current picture Pa shown in FIGS. 2 and 3.

As will be understood from the above equation (Q1) for the processor elements PE(x,y) of the odd columns and the equation (Q2) for the processor elements PE(x,y) of the even column, the difference between the equations (Q1) and (Q2) is order of the terms, and thus both equations are equivalent to each other. Therefore, the value outputted from each of the processor elements of the odd columns and of the even column, regardless of its column position, represents a distortion value.

Consequently, the distortion value between each of the candidate blocks 70a of the search window 70 and the current block 50 shown in FIGS. 2 and 3 is thus calculated at each of the processor elements PE(x,y). Specifically in the present embodiment, nine distortion values are calculated for each of the nine candidate blocks 70a with respect to the current block 50.

At the simultaneous timing of the eleventh pulse of the pulse signal CK2, the distortion value thus calculated at each of the processor elements PE(0,0), PE(0,1) and PE(0,2) is transmitted from each of the processor elements through the output terminal DLo to the comparator 410 of the minimum distortion detecting unit 400 through each of the data input terminals A0, A1 and A2 respectively. Since the first data input terminal A is selected by the selector 1070 of each of the processor elements PE(x,y), the distortion value calculated at each of the processor elements PE(1,0), PE(1,1), PE(1,2), PE(2,0), PE(2,1) and PE(2,2) is transmitted to the adjacent left processor element PE(x-1,y) respectively at the simultaneous timing of the eleventh pulse of the pulse signal CK2.

At the simultaneous timing of the twelfth pulse of the pulse signal CK2, the distortion value calculated at each of the processor elements PE(1,0), PE(1,1) and PE(1,2) is transmitted from each of the processor elements PE(0,0), PE(0,1) and PE(0,2) to the comparator 410 of the minimum distortion detecting unit 400 through each of the data input terminals A0, A1 and A2 respectively. Moreover, the distortion value calculated at each of the processor elements PE(2,0), PE(2,1) and PE(2,2) is transmitted from each of the processor elements PE(1,0), PE(1,1) and PE(1,2) to each of the processor elements PE(0,0), PE(0,1) and PE(0,2) respectively.

At the simultaneous timing of the thirteen pulse of the pulse signal CK2, the distortion value calculated at each of the processor elements PE(2,0), PE(2,1) and PE(2,2) is transmitted from each of the processor elements PE(0,0), PE(0,1) and PE(0,2) to the comparator 410 of the minimum distortion detecting unit 400 through each of the data input terminals A0, A1 and A2 respectively.

The minimum distortion detecting unit 400 is operated to receive the distortion value calculated by each of the processor elements of the distortion calculating unit 1000a through each of the data input terminals A0, A1 and A2. In the description below, the signal represents either one of the values "0" or "1", and the distortion value calculated by each of the processor elements is denoted by "D(x,y)".

During the period (j), the logical sum element 500 receives the signal representative of "1" through the data input terminal A, therefore the value representative of "1" is outputted through the data output terminal Y regardless of the value received through the data input terminal B. While at the counter 480, the count value to be outputted through the count output terminal Qn is reset to "0" by the signal received through the signal input terminal CL which is outputted at the simultaneous timing of the pulse signal LD.

At the simultaneous timing of the eleventh pulse of the pulse signal CK2, the distortion values D(0,0), D(0,1) and D(0,2) are transmitted to the comparator through the data input terminals A0, A1 and A2 respectively. The comparator 410 is then operated to compare the distortion values received through the input terminals A0, A1 and A2 with one another to find a minimum distortion value which is to be outputted through the data output terminal Y. The comparator 410 is further operated to output the value denoted by LMVy, any one of the values 0, 1 or 2 indicating which data input terminal holds a minimum distortion value, through the data output terminal M. In the present embodiment, the minimum distortion value is found to be the distortion value D(0,0), and the value LMVy is found to be "0" as shown in FIG. 6.

The flip-flop 450 is operated to output the retaining value through the data output terminal at the simultaneous timing of the pulse cycle of the pulse signal CK2, while the logical sum element 500 is operated to output a maximum value, the value with all bits set to "1", through the data output terminal Y regardless of the value in the data input terminal B because the signal received through the input terminal A is set to "1" during the period (j).

At the comparator 430, the distortion value D(0,0) received through the first data input terminal A and the above maximum value received through the second data input terminal B are compared to each other, and the value representative of "1" is outputted through the signal output terminal since the distortion value D(0,0) is smaller than the other. At the selector 440, since the signal representative of "1" is received through the signal input terminal S, the distortion value D(0,0) in the data input terminal A is selected and transmitted to the flip-flop 450 through the data output terminal Y. At the counter 480, the value CTx which is reset to "0" during the period (j) is outputted through the count output terminal Qn at the simultaneous timing of the pulse cycle of the pulse signal CK2.

Subsequently, at the simultaneous timing of a falling edge of the pulse signal CK2, the signal representative of "1" is transmitted from the inverter 460 through the signal output terminal to the logical product element 470 through the signal input terminal B. Receiving the signal representative of "1" both through the signal input terminals A and B, the logical element 470 is operated to output the signal representative of "1" through the signal output terminal Y.

The flip-flop 420 is operated to output the value My, the value received as the value LMVy representative of "0", through the data output terminal at the simultaneous timing of the signal representative of "1" which is outputted from the logical product element 470 through the signal output terminal Y. The conversion table 510 is operated to convert the value My received through the data input terminal, the value representative of "0", into a value representative of a motion vector, and to output the value representative of "−1" through the data output terminal.

The flip-flop 490 is operated to output the value Mx, the value received as the value CTx representative of "0", through the data output terminal at the simultaneous timing of the signal representative of "1" which is outputted from the logical product element 470 through the signal output terminal Y. The conversion table 520 is operated to output the value Mx representative of "0" received through the data input terminal, into a value representative of a motion vector, and to output the value representative of "−1" through the data output terminal.

At the simultaneous timing of the twelfth pulse of the pulse signal CK2, the distortion values D(1,0), D(1,1) and D(1,2) are transmitted to the comparator 410 through the data input terminals A0, A1 and A2 respectively. The comparator 410 is then operated to compare the distortion values received through the input terminals A0, A1 and with one another to find a minimum distortion value. The distortion value D(1,2) determined to represent a minimum distortion value is outputted through the data output terminal Y, and the value representative of "2" indicating the data input terminal A2 holds the minimum distortion value is outputted through the data output terminal M of the comparator 410.

The flip-flop 450 is operated to output the distortion value D(0,0) through the data output terminal at the simultaneous timing of the pulse cycle of the pulse signal CK2, while the logical sum element 500 is operated to output the present value, i.e., the distortion value D(0,0) received through the second data input terminal B, through the data output terminal Y since the signal representative of "0" is received through the first signal input terminal A.

At the comparator 430, the distortion value D(1,2) received through the first data input terminal A and the distortion value D(0,0) received through the second data input terminal B are compared to each other, and the signal representative of "0" is outputted through the signal output terminal since the distortion value D(0,0) is smaller than the other. At the selector 440, since the signal representative of "0" is received through the signal input terminal S, the distortion value D(0,0) received through the data input terminal B is selected and transmitted to the flip-flop 450 through the data output terminal Y.

The counter 480 is operated to output the value CTx representative of "1" through the count output terminal Qn at the simultaneous timing of the pulse cycle of the pulse signal CK2.

Subsequently, at the simultaneous timing of a falling edge of the pulse signal CK2, the signal representative of "1" is transmitted from the inverter 460 through the signal output terminal to the logical product element 470 through the signal input terminal B. Receiving the signal representative of "1" through the signal input terminals B, the logical product element 470 is operated to output the signal representative of "0" through the signal output terminal Y because the signal representative of "0" is received through the signal input terminal A.

Both of the flip-flops 420 and 490 retain the values My and Mx respectively since the signal representative of "0" is received through each of the signal input terminals.

At the simultaneous timing of the thirteenth pulse of the pulse signal CK2, the distortion values D(2,0), D(2,1) and D(2,2) are transmitted to the comparator 410 through the data input terminals A0, A1 and A2 respectively. The comparator 410 is then operated to compare the distortion values received through the input terminals A0, A1 and A2 with one another to find a minimum distortion value. The distortion value D(2,1) determined to represent a minimum distortion value is then outputted through the data output terminal Y, and the value representative of "1" indicating the data input terminal A1 holds the minimum distortion value is outputted through the data output terminal M of the comparator 410.

The flip-flop 450 is operated to output the distortion value D(0,0) through the data output terminal, while the logical sum element 500 is operated to output the present value D(0,0) received through the second data input terminal B through the data output terminal Y since the signal representative of "0" is received through the first signal input terminal A.

At the comparator 430, the distortion value D(2,1) received through the first data input terminal A and the distortion value D(0,0) received through the second data input terminal B are compared to each other, and the signal representative of "1" is outputted through the signal output terminal since the distortion value D(2,1) received through the data input terminal A is smaller than the other. At the selector 440, since the signal representative of "1" is received through the signal input terminal S, the distortion value D(2,1) received through the data input terminal A is selected and transmitted to the flip-flop 450 through the data output terminal Y.

The counter 480 is operated to output the value CTx representative of "2" through the count output terminal Qn at the simultaneous timing of the pulse cycle of the pulse signal CK2.

Subsequently, at the simultaneous timing of a falling edge of the pulse signal CK2, the signal representative of "1" is transmitted from the inverter 460 through the signal output terminal to the logical product element 470 through the signal input terminal B. Receiving the signal representative of "1" both through the signal input terminals A and B, the logical element 470 is operated to output the signal representative of "1" through the signal output terminal Y.

The flip-flop 420 is operated to output the value My, the received value LMVy representative of "1", through the data output terminal at the simultaneous timing of the signal representative of "1" which is outputted from the logical product element 470 through the signal output terminal Y. The conversion table 510 is operated to convert the value My, the value representative of "1", into a value representative of a motion vector, and to output the value representative of "0" through the data output terminal.

The flip-flop 490 is operated to output the value Mx, the received value CTx representative of "2", through the data output terminal at the simultaneous timing of the signal representative of "1" which is outputted from the logical product element 470 through the signal output terminal Y. The conversion table 520 is operated to output the value Mx, the value representative of "0" received through the data input terminal, into a value representative of a motion vector, and to output the value representative of "1" through the data output terminal.

Subsequently, at the simultaneous timing of the pulse cycle of the pulse signal CK3, at the flip-flop 530, the value which is received through the data input terminal after being converted into a motion vector, the value representative of "0", is outputted through the data output terminal to be used for MVy, the value to represent a vertical coordinate of the motion vector. The flip-flop 540 is operated to output the minimum distortion value, the distortion value D(2,1) which is received through the data input terminal from the flip-flop 450, through the data output terminal at the simultaneous iming of the thirteen pulse of the pulse signal CK2. At the lip-flop 550, the value which is received through the data input terminal after being converted into a motion vector, the value representative of "1", is outputted through the data output terminal to be used for MVx, the value to represent a horizontal coordinate of the motion vector.

The motion vector MV(1,0) and the minimum distortion value D(2,1) are thus calculated with respect to the current block consisting of the pels a(0,0), a(0,1), a(1,0) and a(1,1).

Consequently, the minimum distortion value MinDis between the candidate block 70a and the current block 50 and the motion vector MVx, MVy corresponding to the minimum distortion value MinDis are thus calculated by the minimum distortion detecting unit 400.

At the distortion calculating unit 1000a, before the eleventh pulse of the pulse signal CK1 is outputted, the pel value c(4,0), c(4,1) and c(4,2) are transmitted from the input registers RE(3,0), RE(3,1) and RE(3,2) to the input registers RE(3,−1), RE(3,0) and RE(3,1), respectively, while the pel value c(4,3) is supplied from the search window supplying unit 200 to the input register RE(3,2).

At the simultaneous timing of the eleventh pulse of the pulse signal CK1, the pel values c(2,0), c(2,1), c(2,2), c(2,3), c(3,0), c(3,1), c(3,2), c(3,3), c(4,0), c(4,1), c(4,2) and c(4,3) are transmitted from the side register SR(1,−1), the processor elements PE(1,0), PE(1,1), PE(1,2), PE(2,0), PE(2,1), PE(2,2), the side register SR(2,3), the input registers RE(3,−1), RE(3,0), RE(3,1) and RE(3,2) to the side register SR(0,−1), the processor elements PE(0,0), PE(0,1), PE(0,2), PE(1,0), PE(1,1), PE(1,2), the side registers SR(1,3), SR(2,−1), the processor elements PE(2,0), PE(2,1) and PE(2,2) respectively.

At the same time, the pel values a(2,0) and a(2,1) are transmitted from the flip-flops 120 and 110 of the current block supplying unit 100 to both of the flip-flops 130 and 140, both of the flip-flops 120 and 150, respectively, while the pel value a(3,0) is supplied from the data inputting means to the flip-flop 110 of the current block supplying unit 100.

In the similar manner as described above, each of the pel values of the current block a(2,0), a(2,1), a(3,0) and a(3,1), and each of the corresponding pel values in the search window 70 are successively transmitted at the simultaneous timing of the pulse cycle of the pulse signals CK0 and CK1.

During the periods (k), (l), (m) and (n) each of which begins with a rising edge of the eleventh, twelfth, thirteenth, and fourteenth pulse of the pulse signal CK1 respectively, and ends with a rising edge of the twelfth, thirteenth, fourteenth and fifteenth pulse of the pulse signal CK1 respectively, the calculations described below are performed at each of the processor elements PE(x,y).

Figure 26:
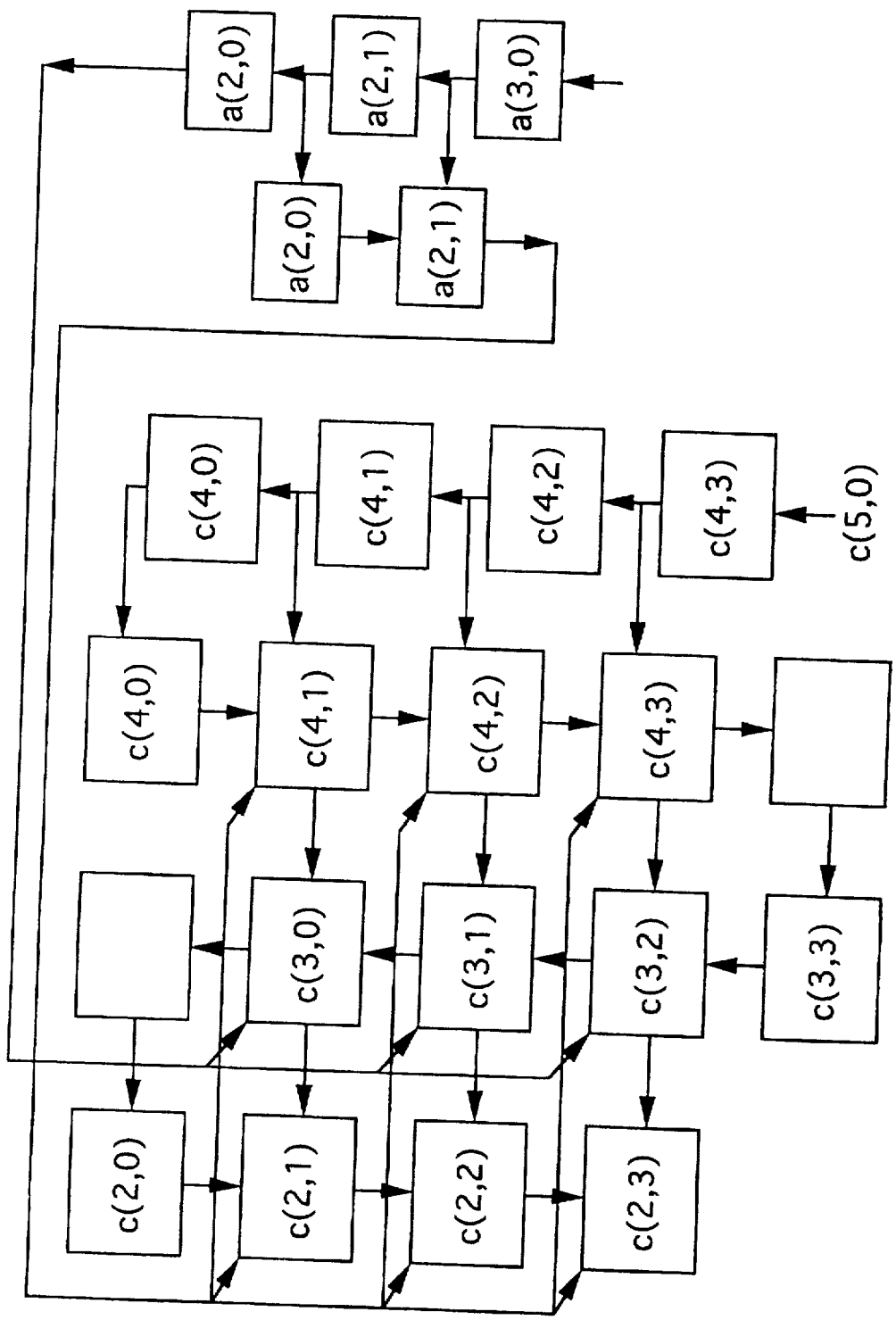
Figure 27:
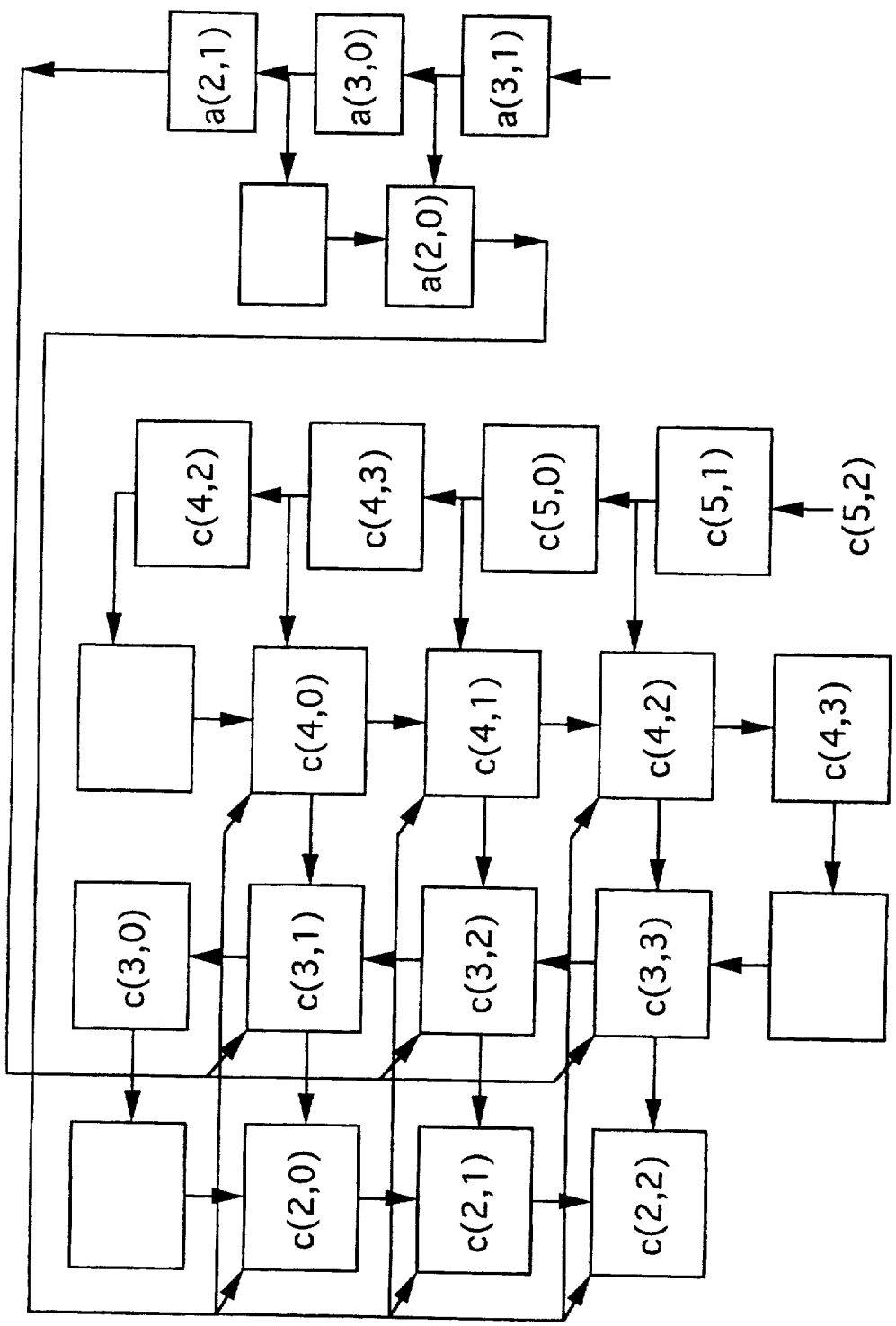

During the period (k) as shown in FIG. 26, each of the pel values, c(2,1), c(2,2), c(2,3), c(3,0), c(3,1), c(3,2), c(4,1), c(4,2) and c(4,3) is transmitted, as in the listed order herein, to the first data input terminal A of the subtracter 1030 of each of the corresponding processor elements PE(0,0), PE(0, 1), PE(0,2), PE(1,0), PE(1,1), PE(1,2), PE(2,0), PE(2,1) and PE(2,2) respectively through the selector 1010 and the flip-flop 1020. In other words, each of the processor elements PE(x,y) of the odd columns is operated to receive the pel value c(x+2,y+1), while each of the processor elements PE(x,y) of the even column is operated to receive the pel value c(x+2,y).

At the same time, each of the processor elements of the odd columns is operated to receive the pel value a(2,1) of the current block through the second data input terminal B of the subtracter 1030 of each of the processor elements PE(x,y), while each of the processor elements of the even column is operated to receive the pel value a(2,0) of the current block through the second data input terminal B of the subtracter 1030 of each of the processor elements PE(x,y).

The following subtraction is performed on the pel values by the subtracter 1030 at each of the processor elements PE(x,y) of the odd columns and of the even column respectively.

c(x+2,y+1)−a(2,1) at PE(x,y) of the odd columns
c(x+2,y)−a(2,0) at PE(x,y) of the even column The values calculated by the subtracter 1030 are then converted into positive values by the positive value transducer 1040 as follows.

|c(x+2,y+1)−a(2,1)| at PE(x,y) of the odd columns
|c(x+2,y)−a(2,0)| at PE(x,y) of the even column The positive values thus converted by the positive value transducer 1040 are then transmitted to the adder 1050 through the first data input terminal A.

At the simultaneous timning of a rising edge of the pulse signal LD during the period (j), the inverter 1090 is operated to receive the signal representative of "1" through the data input terminal, and to output the value representative of "0" through the data output terminal. Receiving the value representative of "0" transmitted from the inverter 1090 through the first signal input terminal A, the logical product element 1100 is operated to output the value representative of "0" through the data output terminal Y regardless of the value received through the data input terminal B.

Since the signal representative of "1" is outputted by the pulse signal LD at the simultaneous timing of the eleventh pulse of the pulse signal CK1, the adder 1050 is operated to receive the value representative of "0" through the second data input terminal B. Therefore, the values received through the first data input terminal A and the value representative of "0" received through the second data input terminal B are added by the adder 1050, and the resulting value is transmitted to the flip-flop 1060 as follows.

|c(x+2,y+1)−a(2,1)| at PE(x,y) of the odd columns
|c(x+2,y)−a(2,0)| at PE(x,y) of the even column During the period (l), the calculation similar to that performed during the period (k) is repeated, and the resulting values are converted into positive values by the positive value transducer 1040 as follows.

|c(x+2,y)−a(2,0)| at PE(x,y) of the odd columns
|c(x+2,y+1)−a(2,1)| at PE(x,y) of the even column The positive values thus converted by the positive value transducer 1040 are then transmitted to the adder 1050 through the first data input terminal A. The second data input terminal B of the adder 1050 is operated to receive the above value calculated during the period (k) transmitted from the flip-flop 1060 through the logical product element 1100. At the adder 1050 the above two values received through the first and second data input terminals A and B are added as follows.

|c(x+2,y+1)−a(2,1)|
+|c(x+2,y)−a(2,0)| at PE(x,y) of the odd columns
|c(x+2,y)−a(2,0)|
+|c(x+2,y+1)−a(2,1)| at PE(x,y) of the even column The resulting pel values are then transmitted to the flip-flop 1060.

During the period (m), the calculation similar to those performed during the periods (k) and (l) is repeated, and the resulting values are converted into positive values by the positive value transducer 1040 as follows.

|c(x+3,y+1)−a(3,1)| at PE(x,y) of the odd columns
|c(x+3,y)−a(3,0)| at PE(x,y) of the even column The positive values thus converted by the positive value transducer 1040 are then transmitted to the adder 1050 through the first data input terminal A. The second data input terminal B of the adder 1050 is operated to receive the value calculated during the period (l) transmitted from the flip-flop 1060 through the logical product element 1100. At the adder 1050 the above two values received through the first and second data input terminals A and B are added as follows.

|c(x+2,y+1)−a(2,1)|
+|c(x+2,y)−a(2,0)|
+|c(x+3,y+1)−a(3,1)| at PE(x,y) of the odd columns
|c(x+2,y)−a(2,0)|
+|c(x+2,y+1)−a(2,1)|
+|c(x+3,y)−a(3,0)| at PE(x,y) of the even column The resulting values are then transmitted to the flip-flop 1060.

During the period (n), the calculation similar to those performed during the periods (k), (l) and (m) is repeated, and the resulting values are converted into positive values by the positive value transducer 1040 as follows.

|c(x+3,y)−a(3,0)| at PE(x,y) of the odd columns
|c(x+3,y+1)−a(3,1)| at PE(x,y) of the even column The positive values thus converted by the positive value transducer 1040 are then transmitted to the adder 1050 through the first data input terminal A. The second data input terminal B of the adder 1050 receives the value calculated during the period (m) transmitted from the flip-flop 1060. At the adder 1050, the above two values received through the first and second data input terminals A and B are added as follows.

|c(x+2,y+1)−a(2,1)|
+|c(x+2,y)−a(2,0)|
+|c(x+3,y+1)−a(3,1)|
+|c(x+3,y)−a(3,0)| . . . (Q3) at PE(x,y) of the odd columns
|c(x+2,y)−a(2,0)|
+|c(x+2,y+1)−a(2,1)|
+|c(x+3,y)−a(3,0)|
+|c(x+3,y+1)−a(3,1)| . . . (Q4) at PE(x,y) of the even column At the simultaneous timing of the pulse signal LD which is outputted during the period (n), the data output terminal Y of the selector 1070 is latched to the data output terminal of the flip-flop 1060, and at the simultaneous timing of the fifteenth pulse of the pulse signal CK2, the resulting value obtained at the adder 1050 in the process described above is outputted at each of the processor elements PE(x,y) through the output terminal DLo. For instance, the following value is outputted through the output terminal DLo of the processor element PE(0,0).

|c(2,1)−a(2,1)|
+|c(2,0)−a(2,0)|
+|c(3,1)−a(3,1)|
+|c(3,0)−a(3,0)|

Figure 28:
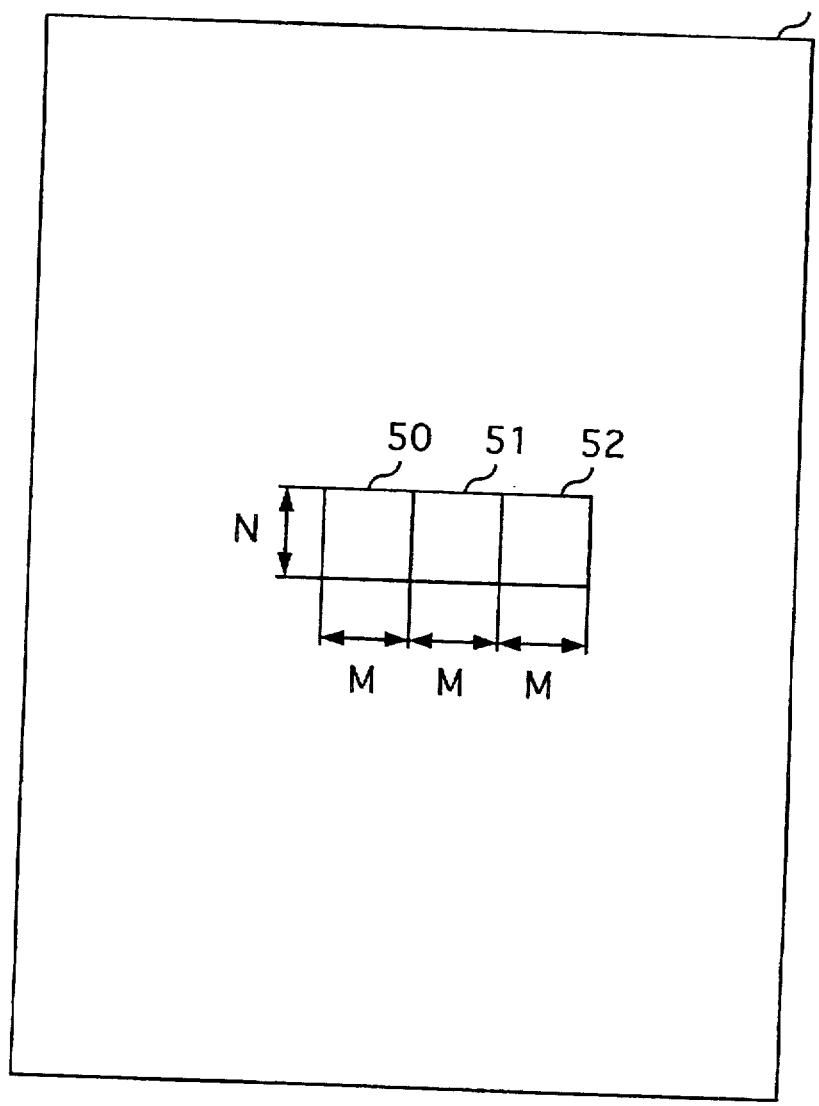
FIG. 28 is a diagram showing the current picture including a plurality of current blocks each deviated by M pels from the adjoining current block in a horizontal direction.
Figure 29:
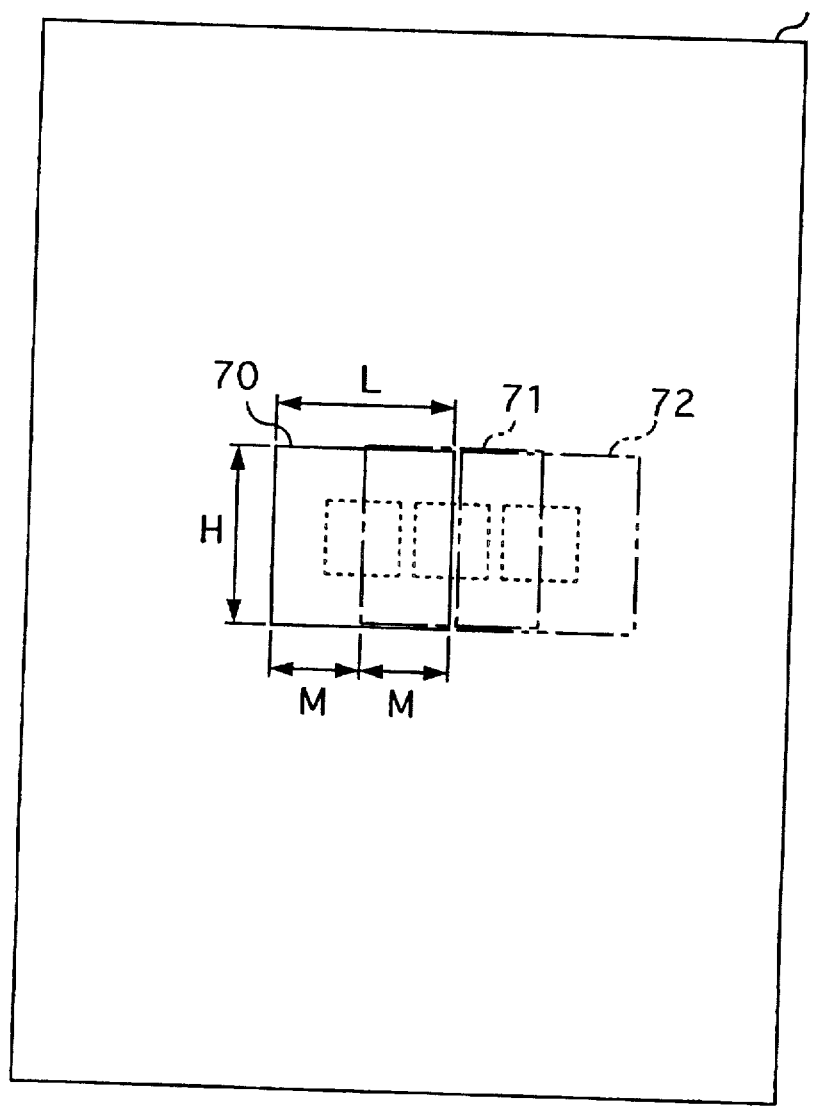
FIG. 29 is a diagram showing the reference picture including a plurality of search windows each deviated by M pels from the adjoining search window in a horizontal direction.

As will be understood from the equations (Q3) and (Q4) listed above, the difference between the equations (Q3) and (Q4) is order of the terms, and thus both equations are equivalent to each other. Consequently, the distortion value between each of the nine candidate blocks of the search window 71 and the current block 51 shown in FIGS. 28 and 29 is thus calculated at each of the processor elements PE(x,y). The search window 71 is deviated by two pels in horizontal direction away from the search window 70, and the current block 51 is adjacent to the current block 50 in horizontal direction as shown in FIGS. 2, 3, 28 and 29.

At the simultaneous timing of the fifteenth pulse of the pulse signal CK2, each distortion value thus calculated at each of the processor elements PE(0,0), PE(0,1) and PE(0,2) is transmitted from each of the processor elements through the output terminal DLo to the comparator 410 of the minimum distortion detecting unit 400 through the data input terminals A0, A1 and A2 respectively.

At the simultaneous timing of the sixteenth pulse of the pulse signal CK2, the distortion value thus calculated at each of the processor elements PE(1,0), PE(1,1) and PE(1,2) is transmitted from each of the processor elements PE(0,0), PE(0,1) and PE(0,2) to the comparator 410 of the minimum distortion detecting unit 400 through the data input terminals A0, A1 and A2 respectively. Moreover, at the simultaneous timing of the seventeenth pulse of the pulse signal CK2, the distortion value thus calculated at each of the processor elements PE(2,0), PE(2,1) and PE(2,2) is transmitted from each of the processor elements PE(0,0), PE(0,1) and PE(0,2) to the comparator 410 of the minimum distortion detecting unit 400 through the data input terminals A0, A1 and A2 respectively.

The minimum distortion detecting unit 400 is operated with a comparator 410 to receive the distortion value calculated by each of the processor elements of the distortion calculating unit 1000a through the data input terminals A0, A1 and A2. The minimum distortion value MinDis between the candidate block of the search window 71 and the current block 51 and the motion vector denoted by MVx, MVy are then calculated at the minimum distortion detecting unit 400. The search window 71 is deviated by two pels in horizontal direction away from the search window 70, and the current block 51 is adjacent to the current block 50 in horizontal direction.

There exist duplicated pel values in the search windows, 70, 71, 72, . . . , each of which corresponds to the current block 50, 51, 52, . . . , however, the motion vector and the minimum distortion value with respect to each of the current blocks are successively calculated in the calculation process described above without having duplicated pel values being transmitted.

Each of the distortion calculating units 1000a and 1000b may be designed to transmit the distortion values from the first row of the processor elements to the minimum distortion detecting unit 400 and to transmit the distortion values each being calculated by each of the processor elements of the second and third rows from each of the processor elements of the second and third rows to each of the processor elements of the first and second rows respectively, when each of the processor elements finish calculating the distortion values. The distortion calculating units 1000a and 1000b are further designed to repeatedly transmit the distortion vales until all of the distortion values transmit from the processor elements of the distortion calculating units 1000a and 1000b to the minimum distortion detecting unit 400. This result in the fact that the motion vector and the minimum distortion value with respect to each of the current blocks are successively calculated in the calculation process described above without having duplicated pel values being transmitted.

FIGS. 28 and 29 are diagrams showing the current block and the search window which are deviated in horizontal direction. The current block shown in FIG. 28 consists of the pels N rows by M columns being deviated by M pels in horizontal direction, and the search window shown in FIG. 29 consists of the pels H rows by L columns being deviated by M pels in horizontal direction.

This means that the first embodiment of the motion estimation apparatus can continuously calculate the distortion values and the motion vectors on the basis of a plurality of the current blocks and the specific search window. The first embodiment has a further advantage over prior-art apparatus in greatly reducing the frequency of inputting the pel values of the search window from L×H to M×H. The larger the size of the search window is, the greater the frequency of inputting the pel values of the search window reduce. The size of the search window is large, thereby causing the present embodiment of the motion estimation apparatus to be more effectively utilized.

Each of the processor elements has either the pel values of the current block 50 or the pel values of the another current block 51, thereby causing each of the processor elements to be unnecessary to have a memory for storing the distortion values previously calculated.

In FIGS. 30 through 35 show other embodiments of the motion estimation apparatus according to the present invention in which different construction of the side registers are shown.

Figure 30:
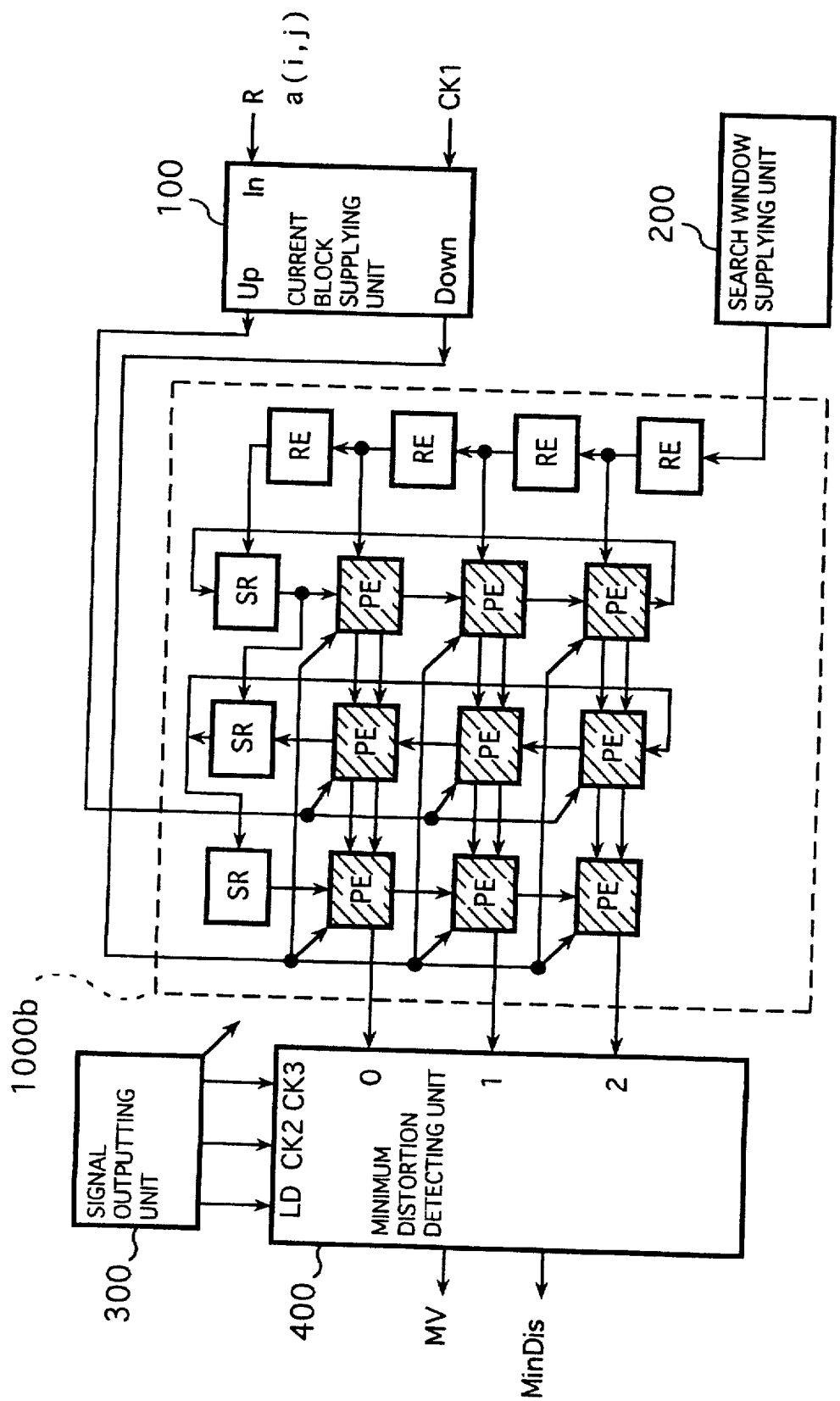
FIG. 30 is a block diagram showing the first embodiment of the motion estimation apparatus according to the present invention as comprising a distortion calculating unit 1000b.
Figure 31:
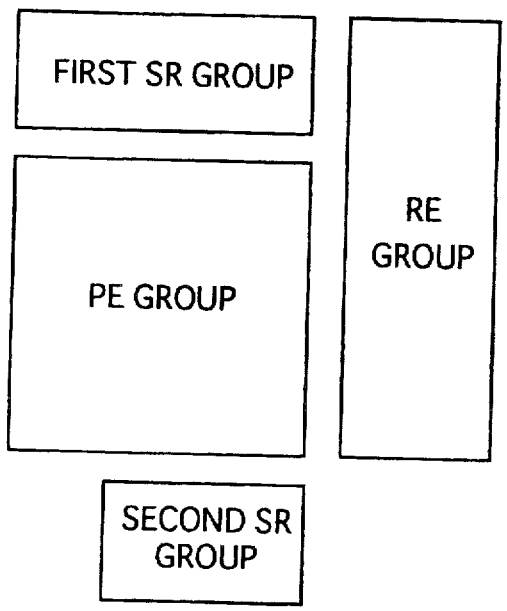
FIG. 31(a) is a block diagram showing the distortion calculating unit 1000a comprising side register groups, input register group and processor element group.
FIG. 31(b) is a block diagram showing the distortion calculating unit 1000b comprising a side register group, input register group and processor element group.
Figure 31:
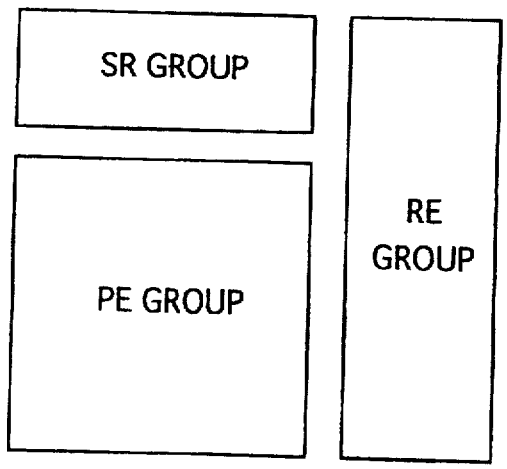

FIG. 30 shows one of the embodiments in which the side register units, which are separately disposed at the top and bottom of the same column in the embodiment shown in FIG. 1, are incorporated into one register unit with data transmission being controlled by a selector. More specifically, the side registers SR(1,-1) and SR(1,3) of the second column in the embodiment in FIG. 1 are replaced by the side register SR(1,-1) whose construction is shown in FIGS. 32(a) and 33(a), and the side registers SR(2,-1) and SR(2,3) of the third column in the embodiment in FIG. 1 are replaced by the side register SR(2,-1) whose construction is shown in FIGS. 32(b) and 33(b).

In the embodiment shown in FIG. 30, a distortion calculating unit 1000b comprises an input register group, a side register group and a processor element group as shown in FIG. 31(b). FIG. 31(a) shows group construction of the distortion calculating unit 1000a of the first embodiment in FIG. 1 in which a side register group consists of first and second side register groups. Each column of each of the first side register group and the second side register group includes one side register SR. This result in the fact that the first embodiment has an advantage over prior-art apparatus in easily forming the distortion calculating unit 1000a from the first and second side register groups.

Figure 32:
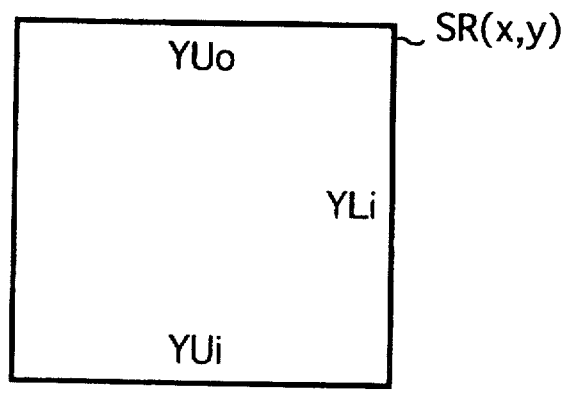
FIGS. 32(a) and 32(b) are plan views showing each of the side registers shown in FIG. 30.
Figure 32:
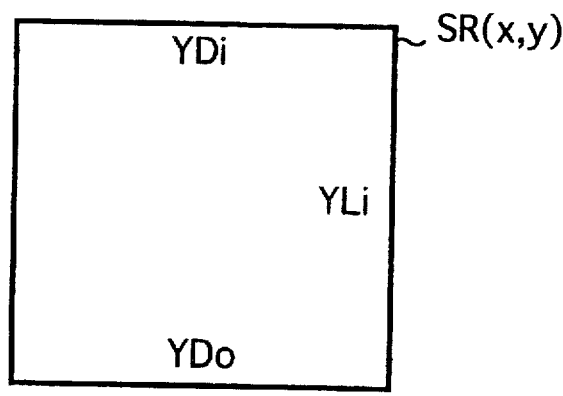
Figure 33:
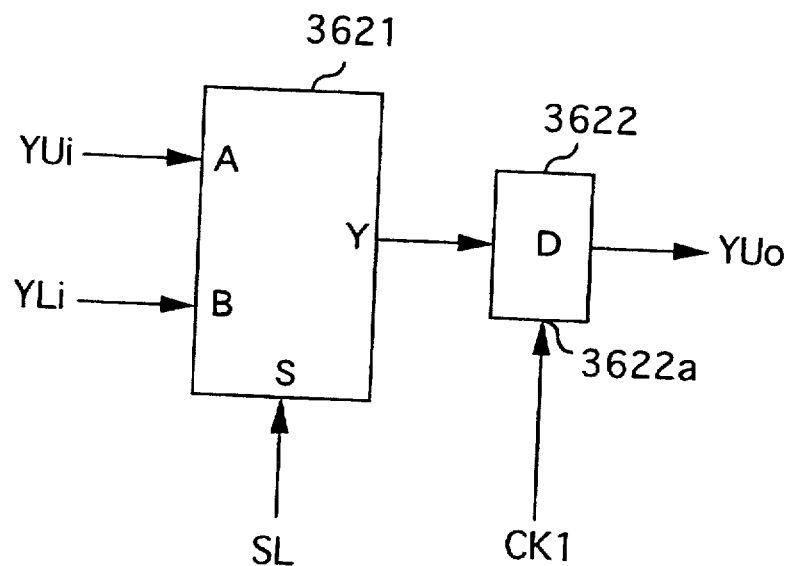
FIGS. 33(a) and 33(b) are block diagrams showing each of the side registers shown in FIG. 32.
Figure 33B:
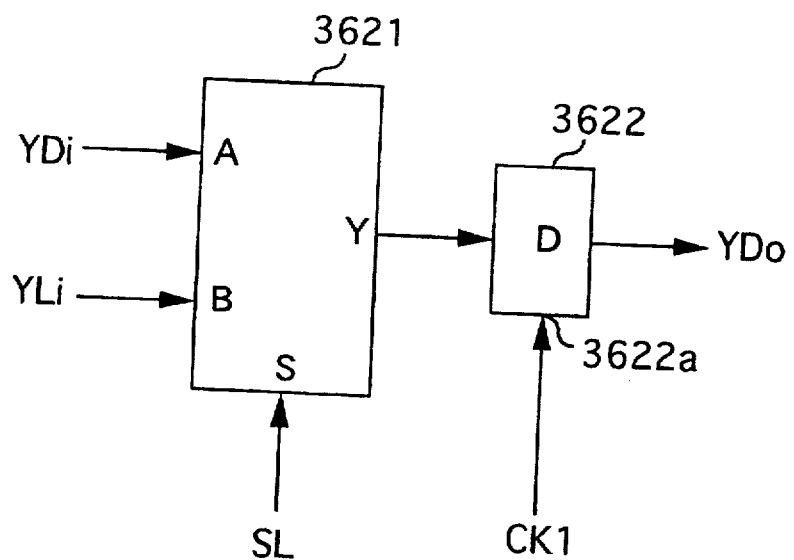

FIG. 32 shows an input and output terminal disposition of the side register SR(x,y), and FIG. 33 shows specific circuit construction of the side register SR(x,y).

FIGS. 32(a) and 33(a) show construction of the side register SR(x,y) of the second column which has input terminals YLi, YUi, and an output terminal YUo, and comprises a selector 3621 and a flip-flop 3622.

FIGS. 32(b) and 33(b) show construction of the side register SR(x,y) of the third column which has an input terminals YDi, YLi, and an output terminal YDo, and comprises a selector 3621 and a flip-flop 3622.

The selector 3621 of the side register SR(x,y) has a first data input terminal A, a second data input terminal B, a signal input terminal S and a data output terminal Y, and is designed to output the data on the first data input terminal A through the data output terminal Y when the signal representative of "0" is received through the signal input terminal S, and to output the data on the second data input terminal B through the data output terminal Y when the signal representative of "1" is received through the signal input terminal S.

The flip-flop 3622 of the side register SR(x,y) comprises a D flip-flop having a data input terminal, a signal input terminal 3622a and data output terminal, and is designed to latch current data in the data input terminal up to the data output terminal.

The first data input terminal A of the selector 3621 of the side register SR(1,−1) is electrically connected to the output terminal of the flip-flop 1020 through the input terminal YUi, while the second data input terminal B of the selector 3621 is electrically connected to the data output terminal of the flip-flop 3622 of another side register SR(2,−1) through the input terminal YLi.

The first data input terminal A of the selector 3621 of the side register SR(2,−1) is electrically connected to the output terminal of the flip-flop 1020 of the processor elements PE(2,2) through YDi, while the second data input terminal B of the selector 3621 is electrically connected to the data output terminal of the input register RE(3,−1).

The signal input terminal S of the selector 3621 of the side register SR(x,y) is electrically connected to the fourth signal output terminal P4 of the signal outputting unit 300.

The data input terminal of the flip-flop 3622 of the side register SR(x,y) is electrically connected to the data output terminal Y of the selector 3621 of the present side register SR(x,y), and the signal input terminal 3622a of the flip-flop 3622 is electrically connected to the second signal output terminal P2 of the signal outputting unit 300.

The operation of the side registers SR(1,−1) and SR(2,−1) will be described hereinlater. At the simultaneous timing of the third pulse of the pulse signal CK1, the pel value c(0,0) is transmitted from the input register RE(3,−1) to the side register SR(2,−1).

At the simultaneous timing of the fourth pulse of the pulse signal CK1, the pel values c(0,0) and c(0,3) are transmitted from the side register SR(2,−1) and the processor elements PE(2,2) to the processor element PE(2,0) and the side registers SR(2,−1) respectively.

At the simultaneous timing of the fifth pulse of the pulse signal CK1, the pel values c(0,3) and c(1,0) are transmitted from the side register SR(2,−1) and the input register RE(3,−1) to the side registers SR(1,−1) and SR(2,−1) respectively.

At the simultaneous timing of the sixth pulse of the pulse signal CK1, the pel values c(0,0), c(0,3), c(1,0) and c(1,3) are transmitted from the processor element PE(1,0), the side registers SR(1,−1), SR(2,−1), and the processor element PE(2,2) to the side register SR(1,−1), the processor elements PE(1,2), PE(2,0), and the side register SR(2,−1) respectively.

At the simultaneous timing of the seventh pulse of the pulse signal CK1, the pel values c(0,0), c(1,3) and c(2,0) are transmitted from the side registers SR(1,−1), SR(2,−1), and the input register RE(3,−1) to the side registers SR(0,−1), SR(1,−1) and SR(2,−1) respectively.

The distortion value is calculated at each of the processor elements by repeating the process describe above.

Figure 34:
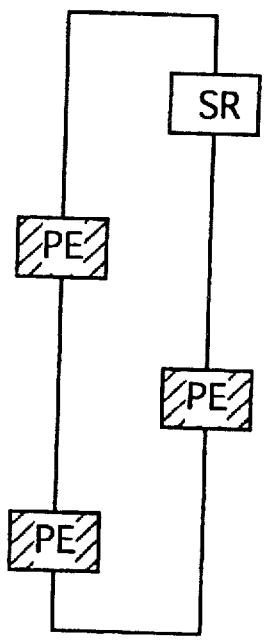
FIG. 34 is a diagram showing one of columns of a matrix elements of the distortion calculating unit electrically connected in a ring-style.

Constructing a circuit in such a manner that a column holding the side registers SR(1,−1) and SR(2,−1) is placed in a ring-style as shown in FIG. 34 makes it possible to shorten transmission busses, and to lessen the differences among the length of transmission busses. This means that the distortion calculating unit 1000b can be uniform in the operation time for transferring the pel values between each of the elements.

Figure 35:
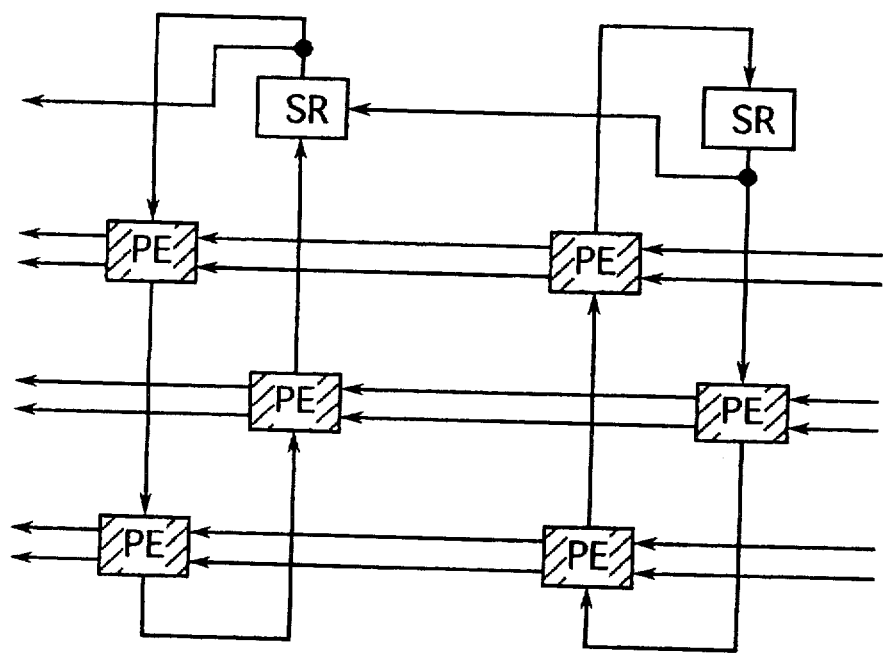
FIG. 35 is a diagram showing the matrix elements of the distortion calculating unit electrically connected in a ring-style.

FIG. 35 is a diagram showing a ring-style disposition described above in which connections among the columns are illustrated.

From the foregoing description along with FIGS. 1 through 35, it will be appreciated that the first embodiment of motion estimation method and apparatus according to the present invention brings numerous advantage described below.

The motion estimation apparatus shown in FIGS. 1 comprises a distortion calculating unit 1000a or an additional motion estimation apparatus shown in FIG. 30 comprises a distortion calculating unit 1000b. Each of the distortion calculating units 1000a and 1000b comprises a plurality of processor elements PE and is designed to parallel shifting the pel values of the search window 70 between each of the processor elements and another processor element vertically adjoining the processor element toward only one predetermined side. This means that each of the processor elements is electrically connected to the vertically adjoining processor element by only one bus for transferring the pel values between each of the processor elements and the vertically adjoining processor element. This result in the fact that the first embodiment has an advantage over prior-art apparatus in reducing the number of the buses for transferring the pel values of the search window 70 between each of the processor elements.

As shown in FIG. 1 and described hereinbefore, the motion estimation apparatus further comprises a minimum distortion detecting unit 400. After the distortion calculating unit 1000a or 1000b finishes calculating the distortion values, all of the distortion values calculated by the processor elements are transmitted from the processor elements to the minimum distortion detecting unit 400. This result in the fact that the distortion calculating unit 1000a or 1000b is unnecessary to store the distortion values.

As shown in FIGS. 22 through 27 and described hereinbefore, the current block supplying unit 100 carries out, in ascending order of column number, operations by each of which the pel vales of each column of the current block 50 are supplied one by one in ascending order of row number to the processor elements of the even columns, and carries out, in ascending order of column number, operations by each of which the pel values of the current block 50 are supplied one by one in descending order of row number to the processor elements of the odd columns. This result in the fact that the first embodiment has an advantage over prior-art apparatus in instructing each of the processor elements to calculate each of the distortion values on the basis of the pel values of the current block 50 and the pel values of each of the candidate blocks 70a of the search window 70.

As shown in FIG. 7 and described hereinbefore, the current block supplying unit 100 comprises flip-flops 110, 120, 130, 140 and 150 and a selector 160. The current block supplying unit 100 is designed to supply the processor elements of the even columns with the pel values of the current block 50 one by one in ascending order of row number while to supply the processor elements of the odd columns with the pel values of the current block 50 one by one in descending order of row number. This result in the fact that the first embodiment has an advantage over prior-art apparatus in easily forming the circuit of the current block supplying unit 100 from the flip-flops 110, 120, 130, 140 and 150 and the selector 160 for supplying the processor elements of the odd columns with the pel values of the current block 50 one by one in ascending order of row number and supplying the processor elements of the even columns with the pel values of the current block 50 one by one in descending order of row number.

As shown in FIGS. 1 through 35 and described hereinbefore, the distortion calculating unit 1000a or 1000b comprises an input register group including H input registers RE. And the flip-flops of the input registers are parallel connected to the processor elements of the (L−M+1)th column and the side registers of the (L−M+1)th column for transmitting the pel values of each column of the search window 70 to the processor elements of the (L−M+1)th column and the side registers of the (L−M+1)th column, respectively. This result in the fact that the first embodiment has an advantage over prior-art apparatus in making it possible to supply the processor elements PE of the distortion calculating unit 1000a or 1000b with the pel values of each of the candidate blocks 70a of the search window 70 for instructing each of the processor elements to calculate the distortion values, only resulting from inputting the pel values of each column of the search window 70 in ascending order of row number into the input register group of the distortion calculating unit 1000a or 1000b from the search window supplying unit 200.

As shown in FIGS. 1 through 35 and described hereinbefore, each of the input registers of the distortion calculating unit 1000a or 1000b comprises a flip-flop. The flip-flops of the input registers RE are electrically connected in series with each other. The pel values of the search window 70 received by the flip-flops of the input register group are parallel transmitted to the processor elements of the (L−M+1)th column and the side register unit of the (L−M+1)th column.

The input register group of the distortion calculating unit 1000a or 1000b comprises more input registers RE than that of the present embodiment, thereby making it possible to receive the more pel values of the search window 70 than that of the present embodiment. This means that the processor elements PE can calculate the distortion values on the basis of each of the candidate blocks 70a and the current block 50 each being the larger size than that of the present embodiment.

FIGS. 36 through 66 show a second preferred embodiment of the motion estimation apparatus according to the present invention. The motion estimation apparatus herein shown comprises constitutional units and elements same as and different from those of the first preferred embodiment of the motion estimation apparatus which have been described in detail in the above. Only the constitutional units and elements of the second preferred embodiment different from those of the first preferred embodiment will be described hereinafter in detail while the constitutional units and elements of the second preferred embodiment same as those of the first preferred embodiment will not be described hereinafter but respectively bears reference numerals same as those of the constitutional units and elements of the first preferred embodiment.

Figure 36:
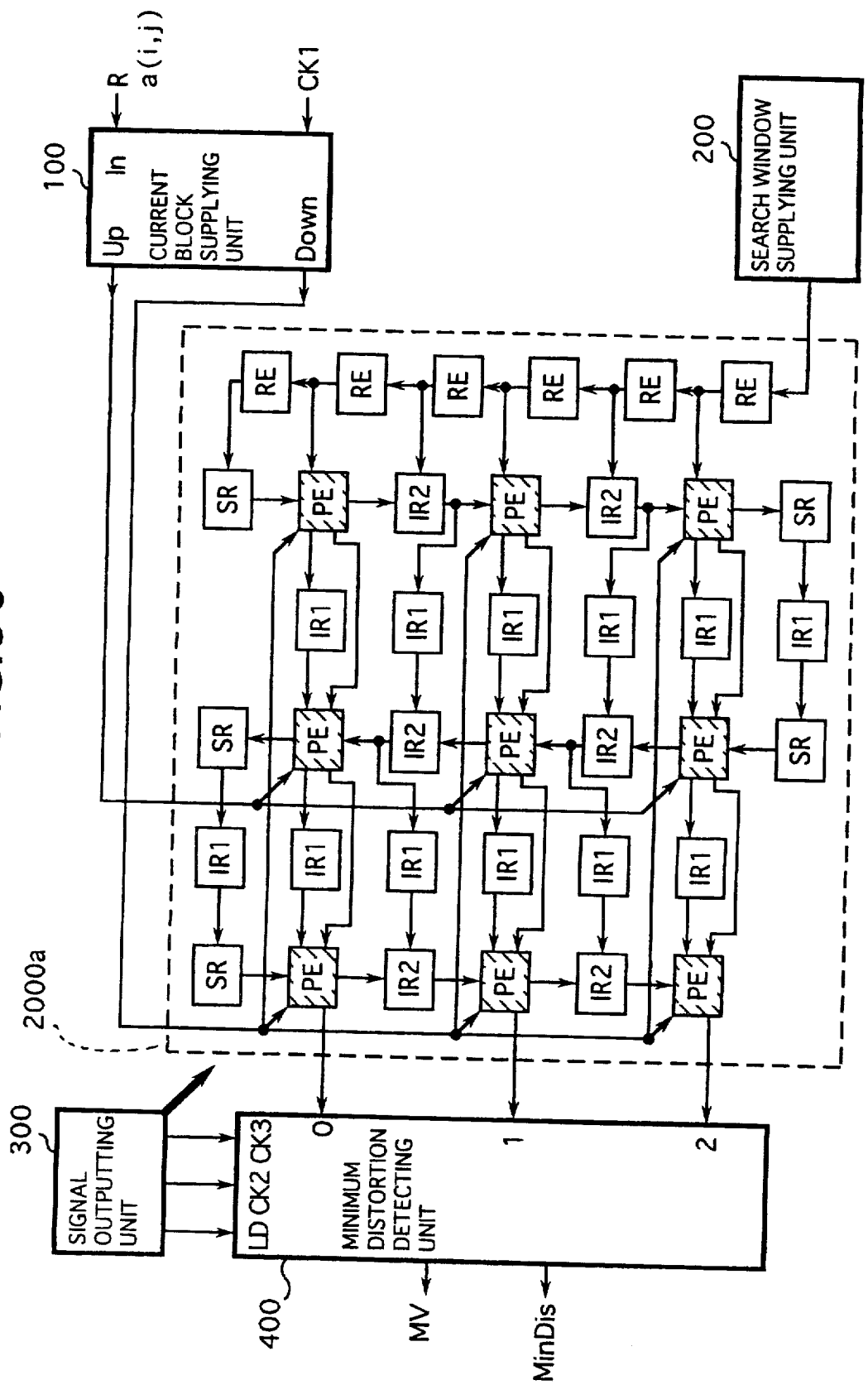

The motion estimation apparatus shown in FIG. 36 comprises a distortion calculating unit 2000a which comprises nine processor elements, PE(0,0), PE(0,2), PE(0,4), PE(2,0), PE(2,2), PE(2,4), PE(4,0), PE(4,2) and PE(4,4), five side registers, SR(0,−1), SR(2,−1), SR(4,−1), SR(2,5) and SR(4,5), six input registers, RE(5,−1), RE(5,0), RE(5,1), RE(5,2), RE(5,3) and RE(5,4), twelve first intermediate registers, IR1(1,−1), IR1(1,0), IR1(1,1), IR1(1,2), IR1(1,3), IR1(1,4), IR1(3,0), IR1(3,1), IR1(3,2), IR1(3,3), IR1(3,4) and IR1(3, 5), six second intermediate registers, IR2(0,1), IR2(0,3), IR2(2,1), IR2(2,3), IR2(4,1) and IR2(4,3). Each of the processor elements PE listed above is denoted by the symbol PE(x,y), each of the side registers SR is denoted by the symbol SR(x,y), each of the input registers RE is denoted by the symbol RE(x,y), each of the first intermediate registers IR1 is denoted by the symbol IR1(x,y), and each of the second intermediate registers IR2 is denoted by the symbol IR2(x,y). Here, x=0,1,2,3,4,5 and y=−1,0,1,2,3,4,.

Each of the processor elements PE(x,y), each of the side registers SR(x,y), and each of the input registers RE(x,y) of the second embodiment are respectively identical to those of the first embodiment and are shown in FIG. 1.

As shown in FIG. 36, the processor elements PE(x,y), the first intermediate registers IR1(x,y) and the second intermediate registers IR2(x,y) are arranged in the form of a matrix array with 5 rows by 5 columns. In the description of the present embodiment, the odd columns of the matrix array refer to the first and fifth columns of the matrix array, while the even column of the matrix array refers to the third column of the matrix array.

Figure 37:
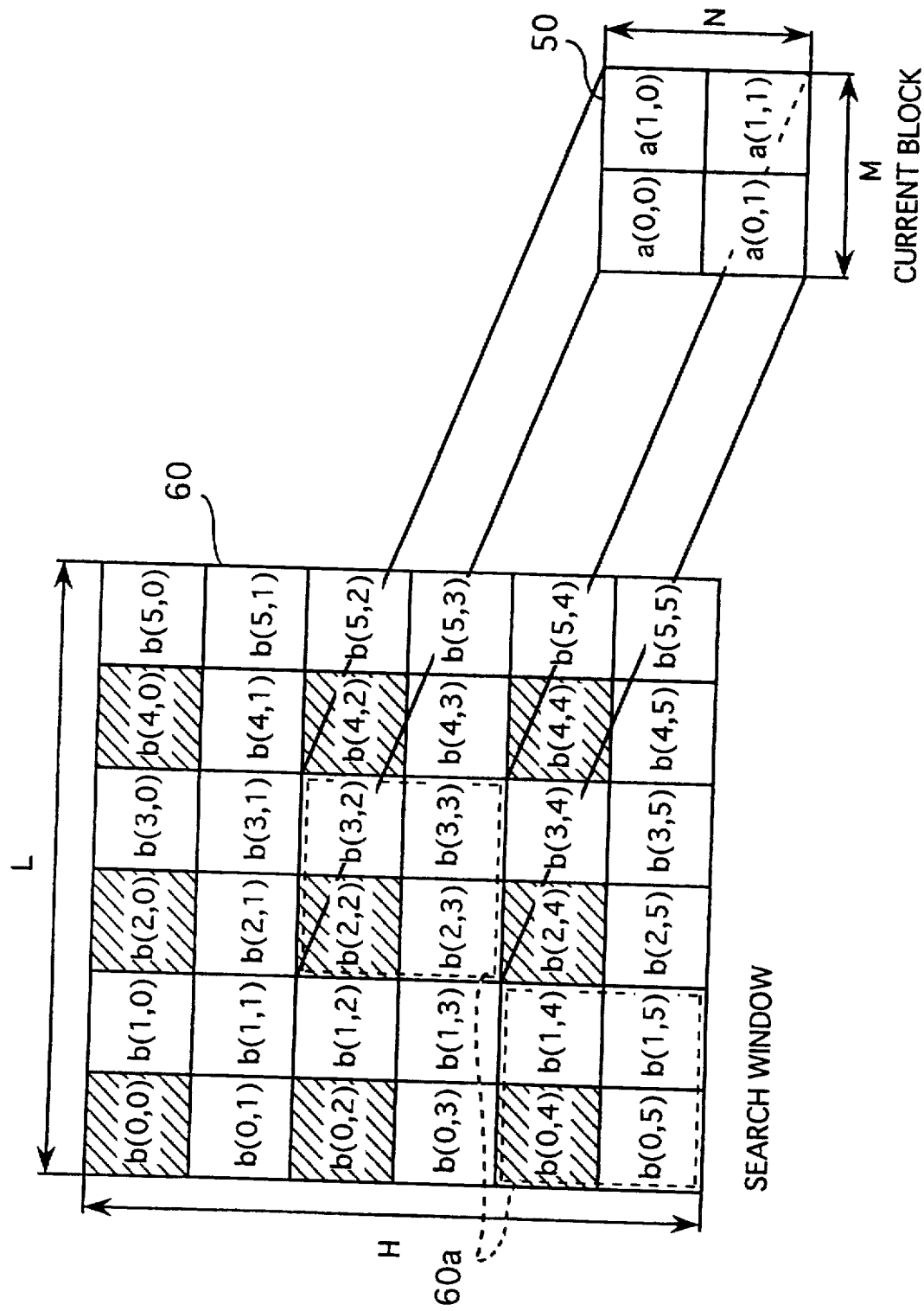
FIG. 37 is a diagram showing a relation between the current block of the current picture and each of the candidate blocks of the search window of the reference picture shown in FIGS. 2(a) and 2(b), respectively.
Figure 38:
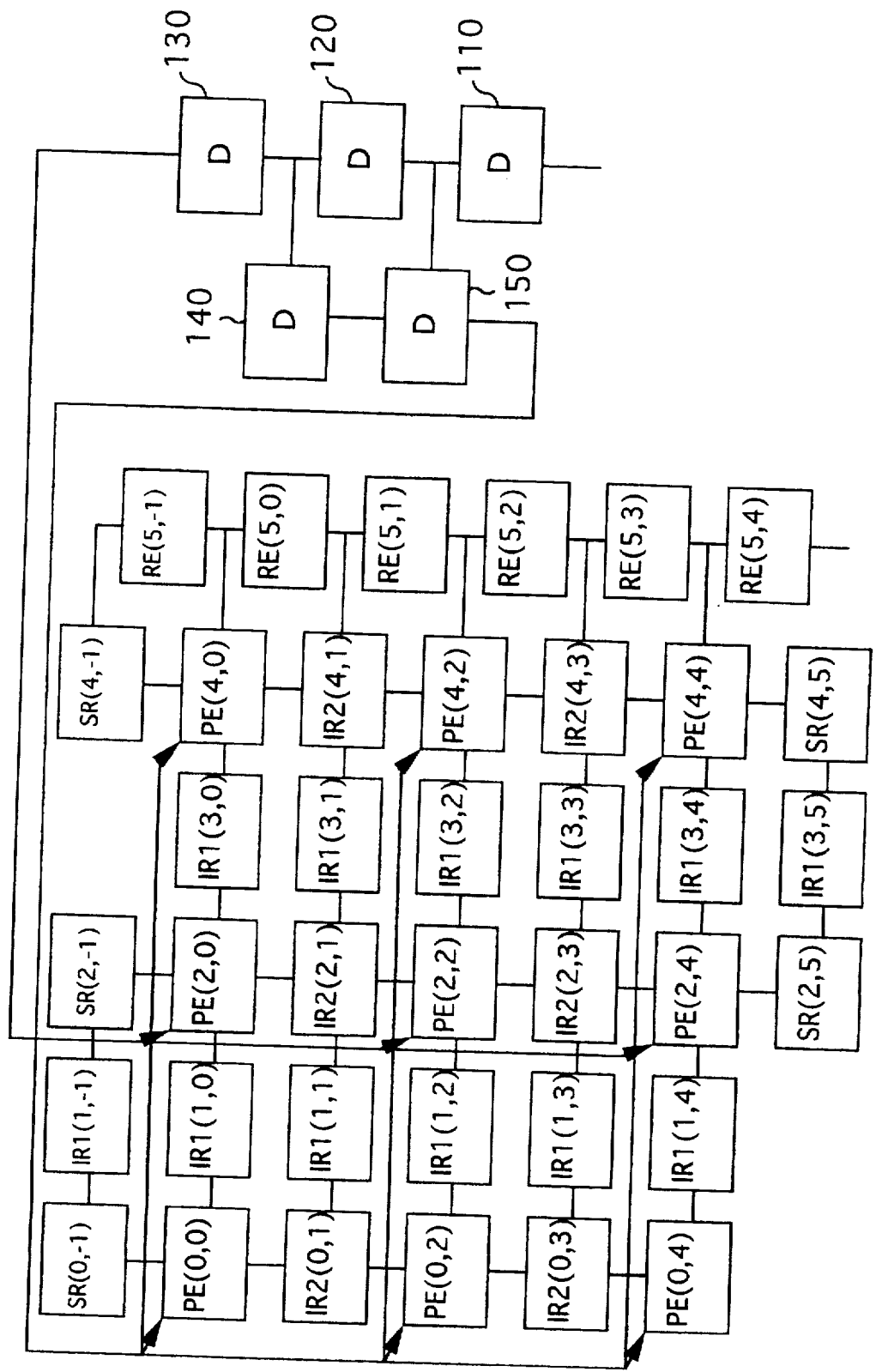
FIG. 38 is a block diagram concretely showing a current block supplying unit and a distortion calculating unit.
Figure 39:
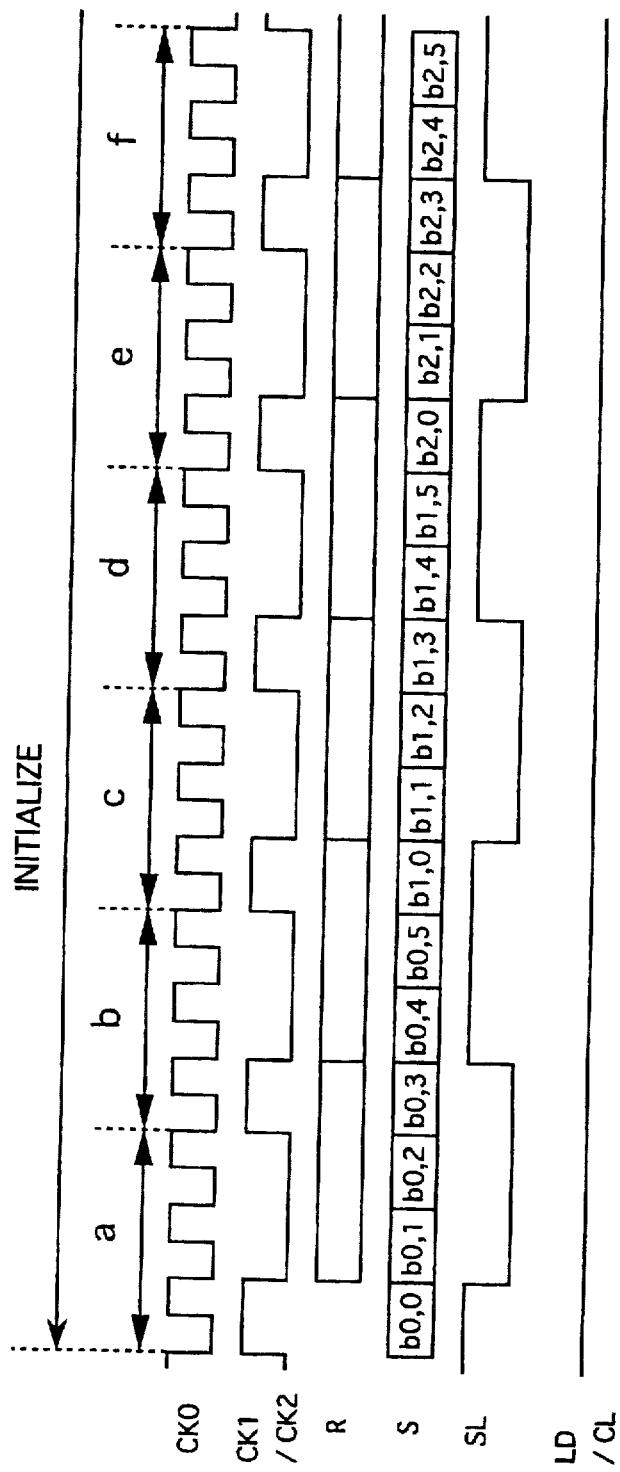
FIGS. 39 and 40 are timing charts showing the signals generated by the signal outputting unit shown in FIG. 36 and pel values supplied to the current block supplying unit and the search window supplying unit shown in FIG. 36.
Figure 40:
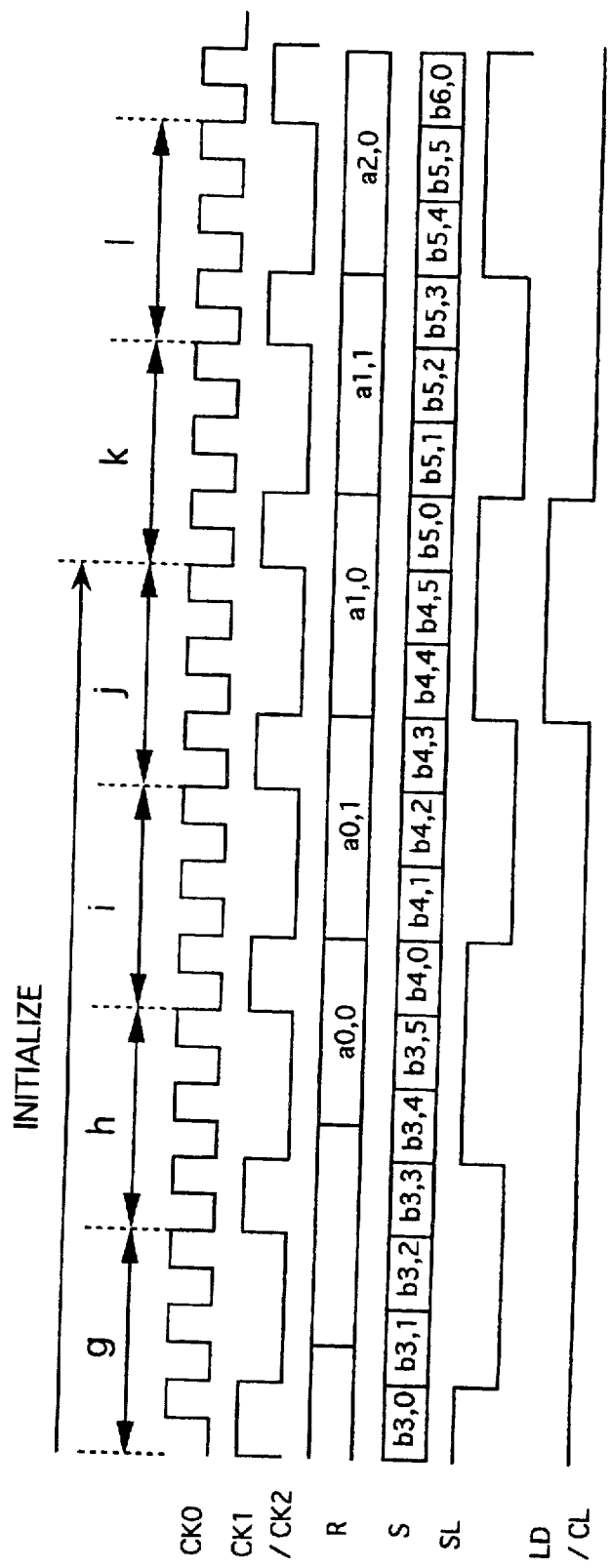
Figure 41:
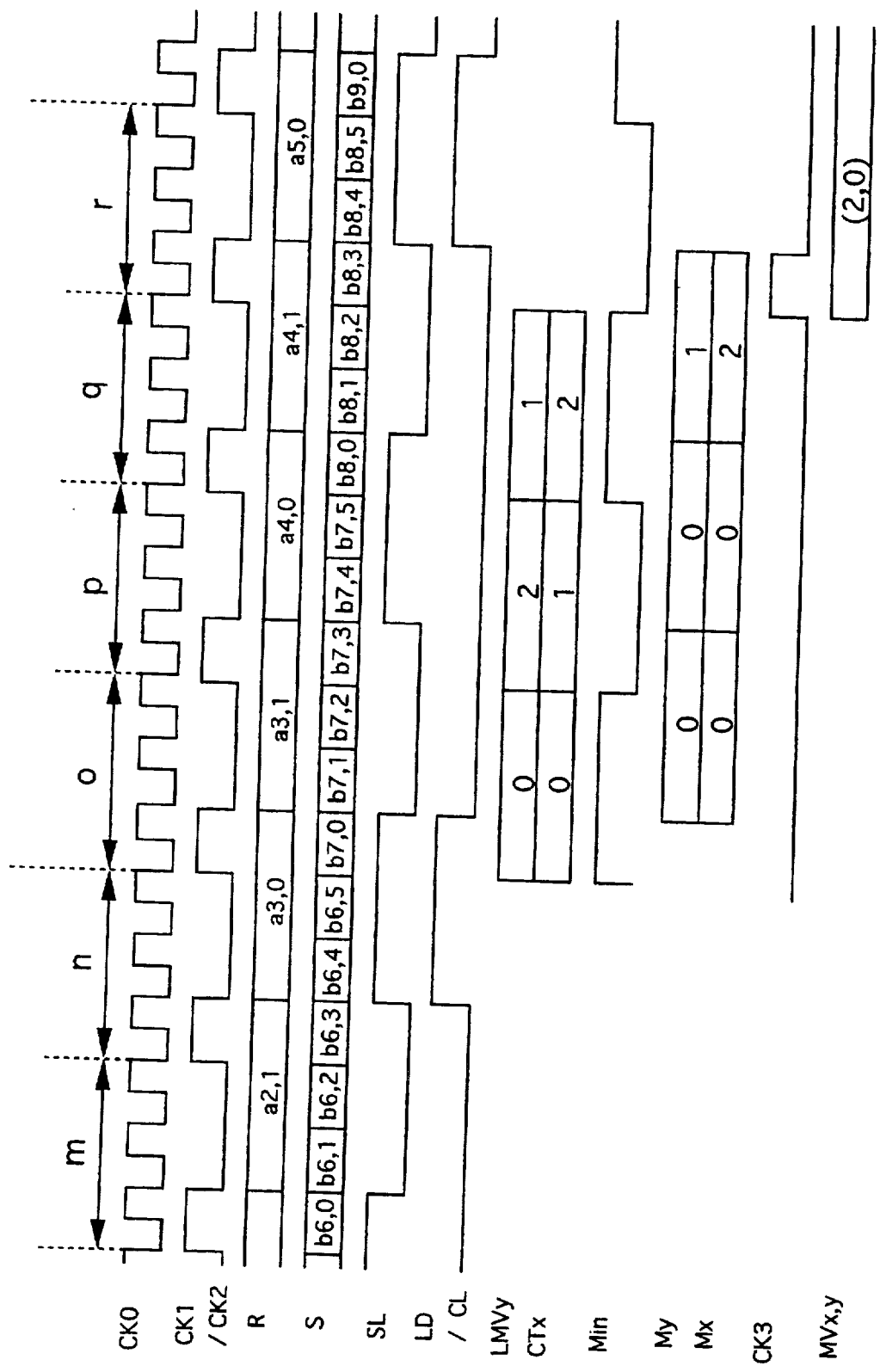
FIGS. 41 and 42 are timing charts showing signals inputted into and outputted from the minimum distortion detecting unit shown in FIG. 30.
Figure 42:
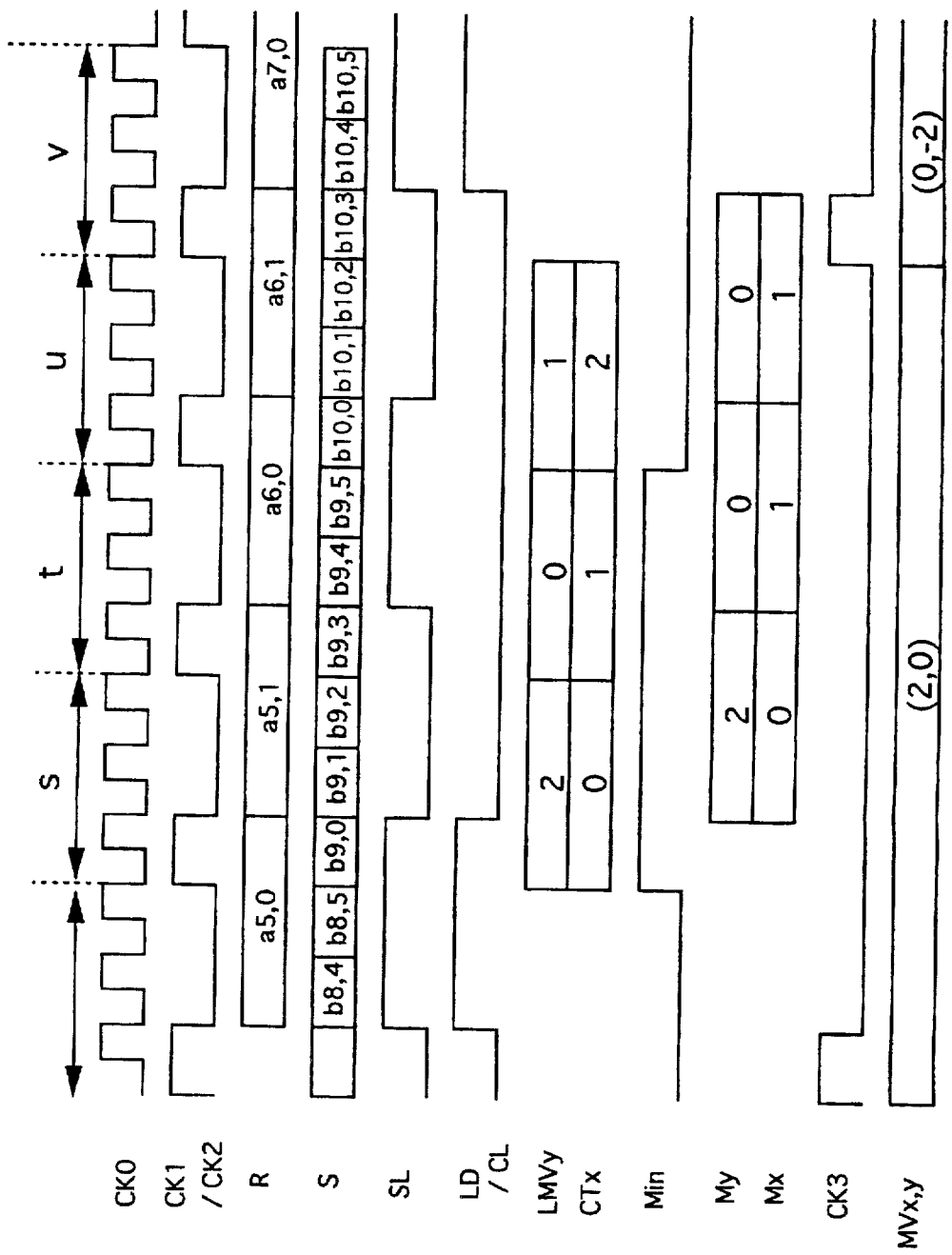

FIG. 37 is a diagram showing a relation between the current block 50, the search window 60 and the respective candidate blocks 60a of the search window 60, and the respective candidate blocks 60a of the search window 60. The candidate block is a block included in the search window, and the upper left pel positioned at the first column of the first row of the respective candidate blocks is shown as a shaded pel in the search window in FIG. 37.

The distortion calculating unit 2000a shown in FIG. 36 is designed to calculate distortion values between the current block 50 and the respective candidate blocks 60a shown in FIG. 37.

Referring to FIG. 36, the first data input terminal A of the selector 1070 of each of the processor elements PE(x,y) is electrically connected to the data output terminal of the flip-flop 1080 of another processor element PE(x+2,y) through the input terminal DLi.

The signal outputting unit 300 shown in FIG. 36 has the same signal output terminals as those of the signal outputting unit 300 shown in FIG. 4, however, each of the signals outputted from the signal output terminal of the signal outputting unit 300 shown in FIG. 36 has different wave form from that of the signals outputted from the signal outputting unit 300 shown in FIG. 4.

The wave form of the signals respectively transmitted from the signal output terminals P1 through P7 of the signal outputting unit 300 is shown in FIGS. 39 through 42. The first signal output terminal P1 is adapted to transmit a clock pulse signal CK0. The second signal output terminal P2 is adapted to transmit a pulse signal CK1 of the pulse width twice as long as that of the clock pulse signal CK1. The pulse signal CK1 is initiated at the simultaneous timing of the first pulse of the clock pulse signal CK1, thereafter outputted at a rate of one pulse of the pulse signal CK1 per three pulses of the clock pulse signal CK0. The third signal output terminal P3 is adapted to transmit a pulse signal CK2 which has an equivalent wave form and pulse cycle to those of the pulse signal CK1 . The pulse signal CK2 is initiated at the simultaneous timing of the first pulse of the clock pulse signal CKo.

The fourth signal output terminal P4 is adapted o t ranslit a pulse signal SL of the pulse width six times as long as that of the clock pulse signal CK0. The pulse signal SL is initiated at the simultaneous timing of the second pulse of the clock pulse signal CK1, thereafter outputted at a rate of one pulse of the pulse signal SL per six pulses of the clock pulse signal CKo. The fifth signal output terminal P5 is adapted to transmit pulse signal LD of the pulse width six times as long as that of the clock pulse signal CK0. The pulse signal LD is initiated at the simultaneous timing of the 29th pulse of the clock pulse signal CK0, thereafter outputted at a rate of one pulse of the pulse signal LD per twelve pulses of the clock pulse signal CK0. The sixth signal output terminal P6 is adapted to transmit a pulse signal CL which has an equivalent wave form and pulse cycle to those of the pulse signal LD. The pulse signal CL is outputted at the simultaneous timing of the 29th pulse of the clock pulse signal CK1.

The seventh signal output terminal P7 is adapted to transmit a pulse signal CK3 of the pulse width twice as long as that of the clock pulse signal CK0. The pulse signal CK3 is initiated at the simultaneous timing of the 52nd pulse of the clock pulse signal CK0, thereafter outputted at a rate of one pulse of the pulse signal CK3 per twelve pulses of the clock pulse signal CK0.

Figure 43:
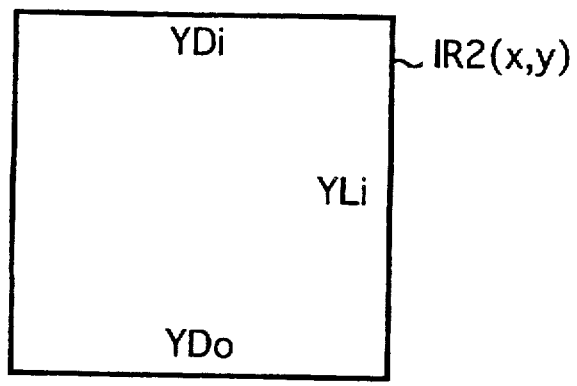
FIGS. 43(a) and 43(b) are plan views showing each of second intermediate registers shown in FIG. 36.
Figure 43:
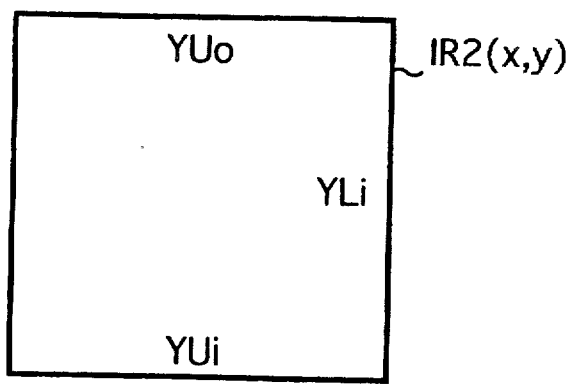
Figure 44:
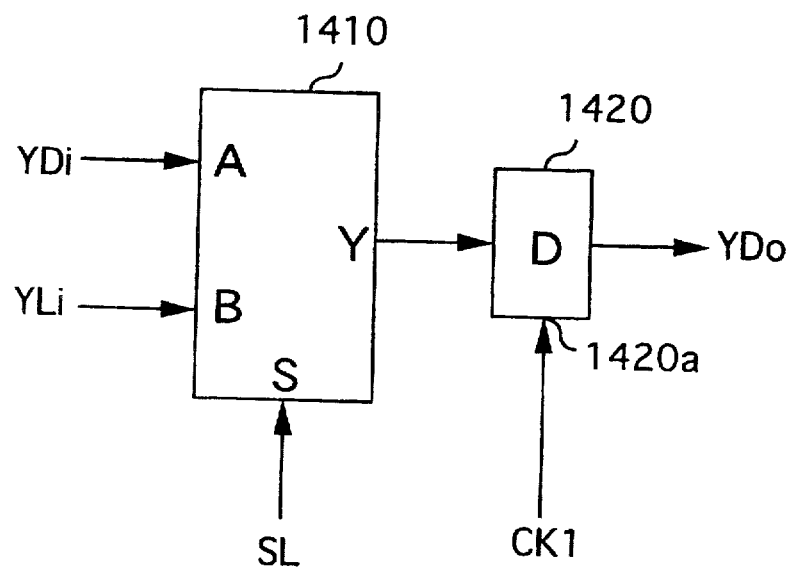
FIGS. 44(a) and 44(b) are block diagrams showing each of the second intermediate registers shown in FIG. 43.
Figure 44:
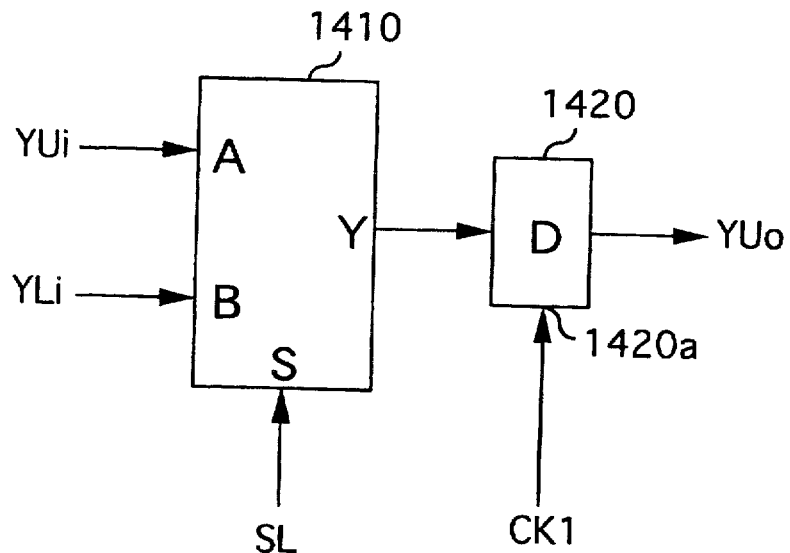

FIGS. 43 and 44 are block diagrams showing each of the second intermediate registers IR2(x,y) shown in FIG. 36.

FIG. 43 is block diagrams showing input and output terminal disposition of each of the second intermediate registers IR2(x,y).

As shown in FIG. 43(a), each of the second intermediate registers IR2(x,y) of the odd columns has input terminals YDi and YLi, and an output terminal YDo. As shown in FIG. 43(b), each of the second intermediate registers IR2(x,y) of the even column has input terminals YUi and YLi, and output terminal YUo. Each of the second intermediate registers IR2(x,y) has input terminals (not shown) each of which is electrically connected to each of the signal output terminals of the signal outputting unit 300.

Referring to FIG. 36, the input terminal YDi of the second intermediate registers IR2(x,y) of the odd columns is electrically connected to the data output terminal of the flip-flop 1020 of the processor elements PE(x,y-1). The input terminal YLi of the second intermediate registers IR2(x,y) of the first column is electrically connected to the output terminal YLo of the first intermediate registers IR1(x+1,y). The input terminal YLi of the second intermediate registers IR2(x,y) of the fifth column is electrically connected to the output terminal of the input registers RE(x+1,y). The output terminal YDo of each of the second intermediate registers IR2 (x,y) is electrically connected to the first input terminal A of the selector 1010 of the processor elements PE (x,y+1).

The input terminal YUi of the second intermediate registers IR2(x,y) of the even column is electrically connected to the data output terminal of the flip-flop 1020 of the processor elements PE(x,y+1). The input terminal YLi of each of the second intermediate registers IR2(x,y) is electrically connected to the output terminal YLo of the first intermediate registers IR1(x+1,y). The output terminal YUo of each of the second intermediate registers IR2(x,y) is electrically connected to the first input terminal A of the selector 1010 of the processor elements PE (x,y-1).

FIG. 44 shows a specific construction of each of the second intermediate registers IR2(x,y) of both odd and even columns. As shown in FIG. 44, each of the second intermediate registers IR2(x,y) comprises a selector 1410 and a flip-flop 1420.

The selector 1410 has a first data input terminal A, a second data input terminal B, a signal input terminal S and a data output terminal Y, and is operated to select either one of the data received through the first data input terminal A or the second data input terminal B depending on the signal condition received through the signal input terminal S. The data received through the first data input terminal A is outputted through the data output terminal Y when the signal representative of "0" is received through the input signal terminal S, and the data received through the second data input terminal B is outputted through the data output terminal Y when the signal representative of "1" is received through the input signal terminal S.

The flip-flop 1420 comprises a D flip-flop having a data input terminal, a signal input terminal 1420a and a data output terminal, and is operated to latch current data in the data input terminal up to the data output terminal at the simultaneous timing of the pulse cycle received through the signal input terminal 1420a.

Figure 45:
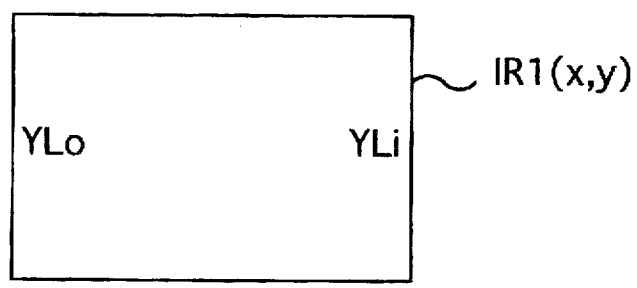
FIG. 45 is a plan view showing each of first intermediate registers shown in FIG. 36.
Figure 46:
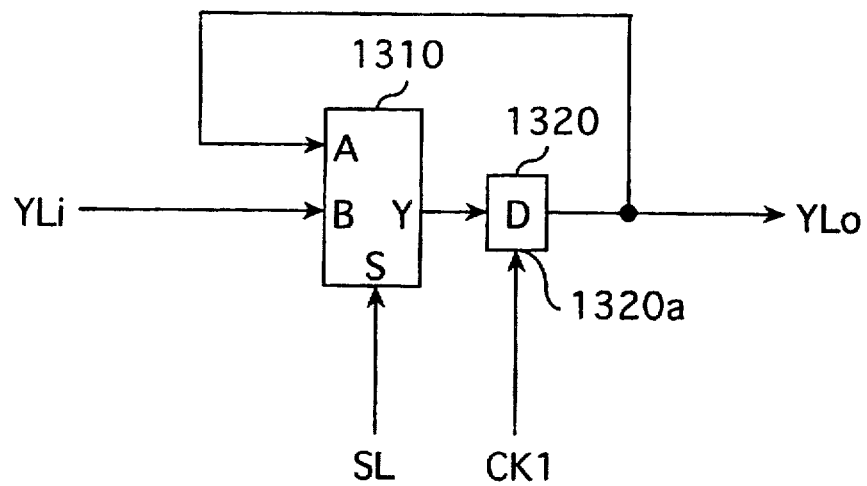
FIG. 46 is a block diagram showing each of the first intermediate registers shown in FIG. 45.

FIGS. 45 and 46 are block diagrams showing each of the first intermediate registers IR1(x,y) shown in FIG. 36.

FIG. 45 is block diagrams showing input and output terminal disposition of each of the first intermediate registers IR1(x,y).

As shown in FIG. 45, each of the first intermediate registers IR1(x,y) has an input terminal YLi, and an output terminal YLo, and input terminals (not shown) each of which is connected to each of the signal output terminals of the signal outputting unit 300.

The input terminal YLi of each of the first intermediate registers IR1(x,y) is electrically connected to any one of the data output terminal of the flip-flop 1020 of the processor elements PE(x+1,y), the output terminals YDo and YUo of the second intermediate registers IR2(x+1,y), or the output terminal of the side registers SR(x+1,y. The output terminal YLo of each of the first intermediate registers IR1(x,y) is electrically connected to any one of the first input terminal A of the selector 1010 of the processor elements PE (x-1,y), the input terminal YLi of the second intermediate registers IR2(x-1,y), or the input terminal of the side registers SR(x-1,y).

FIG. 46 shows specific construction of each of the first intermediate registers IR1(x,y). As shown in FIG. 46, each of the first intermediate registers IR1(x,y) comprises a selector 1310 and a flip-flop 1320.

The selector 1310 has a first data input terminal A, a second data input terminal B, a signal input terminal S, and a data output terminal Y, and is operated to select either one of the data received through the first data input terminal A or the second data input terminal B depending on the signal condition received at the signal input terminal S. The data received through the first data input terminal A is outputted through the data output terminal Y when the signal representative of "0" is received through the input signal terminal S, and the data received through the second data input terminal B is outputted through the data output terminal Y when the signal representative of "1" is received through the input signal terminal S.

The flip-flops 1320 comprises a D flip-flop having a data input terminal, a signal input terminal 1320a, and a data output terminal, and is operated to latch current data in the data input terminal up to the data output terminal at the simultaneous timing of the pulse received through the signal input terminal 1320a.

Figure 47:
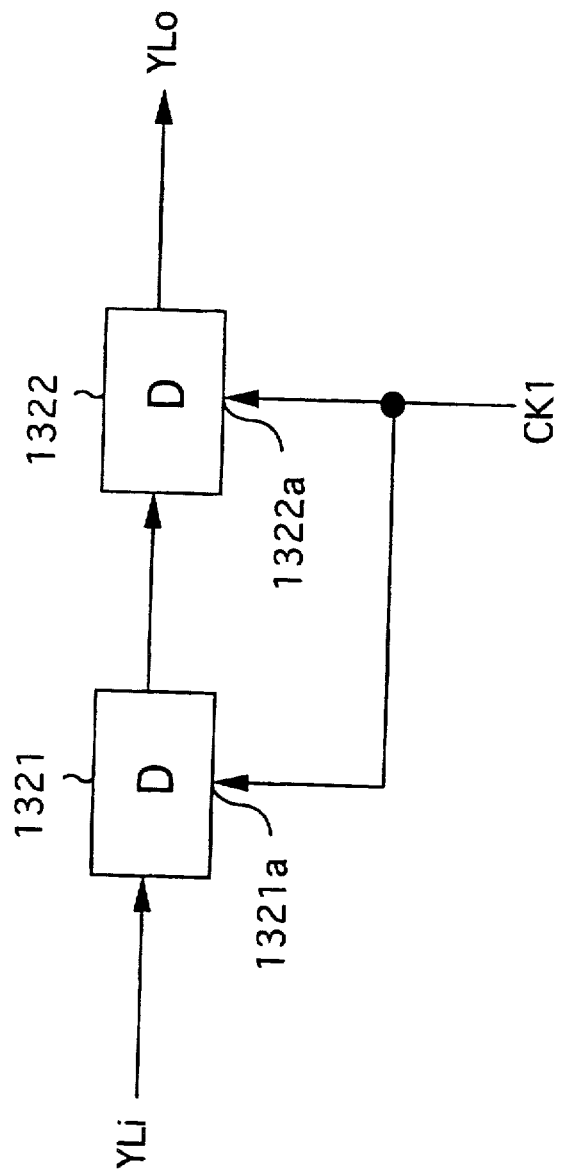
FIG. 47 is a block diagram showing another embodiment of each of the first intermediate registers.

Each of the first intermediate registers IR1(x,y) mentioned above may be constructed with elements as shown in FIG. 47.

As shown in FIG. 47, each of the first intermediate registers IR1(x,y) comprises flip-flops 1321 and 1322.

The flip-flops 1321 comprises a D flip-flop having a data input terminal, a signal input terminal 1321a, and a data output terminal, and is operated to latch current data in the data input terminal up to the data output terminal at the simultaneous timing of the pulse cycle received through the signal input terminal 1321a.

The flip-flops 1322 comprises a D flip-flop having a data input terminal, a signal input terminal 1322a, and a data output terminal, and is operated to latch current data in the data input terminal up to the data output terminal at the simultaneous timing of the pulse cycle received through the signal input terminal 1322a.

Referring to FIG. 44, the first data input terminal A of the selector 1410 of the second intermediate registers IR2(x,y) of the odd columns is electrically connected to the data output terminal of the flip-flop 1020 of the processor elements PE(x,y-1) through the input terminal YDi. The first data input terminal A of the selector 1410 of each of the second intermediate registers IR2(x,y) of the even column is electrically connected to the data output terminal of the flip-flop 1020 of the processor elements PE(x,y+1) through the input terminal YUi. The second data input terminal B of the selector 1410 of each of the second intermediate registers IR2(x,y) of the fifth column is electrically connected to the data output terminal of the input registers RE(x+1,y through the input terminal YLi. The second data input terminal B of the selector 1410 of each of the second intermediate registers IR2(x,y) of the first and third columns is electrically connected to the data output terminal of the flip-flop 1320 of the first intermediate registers IR1(x+1,y) through the input terminal YLi.

The signal input terminal of the selector 1410 of the second intermediate registers IR2(x,y) is electrically connected to the fourth signal output terminal P4 of the signal outputting unit 300.

The data input terminal of the flip-flop 1420 of the second intermediate registers IR2(x,y) is electrically connected to the data output terminal Y of the selector 1410 of the present second intermediate registers IR2(x,y). The signal input terminal 1420a of the flip-flop 1420 of the second intermediate registers IR2(x,y) is electrically connected to the second signal output terminal P2 of the signal outputting unit 300.

Referring to FIG. 46, the first data input terminal A of the selector 1310 of each of the first intermediate registers IR1(x,y) is electrically connected to the data output terminal of the flip-flop 1320 of the present first intermediate registers IR1(x,y). The second data input terminal B of the selector 1310 of each of the first intermediate registers IR1(x,y) is electrically connected to either of the data output terminal of the flip-flop 1020 of the processor elements PE(x+1,y) or the data output terminal of the side registers SR(x+1,y) through the input terminal YLi.

The signal input terminal of the selector 1310 of each of the first intermediate registers IR1(x,y) is electrically connected to the fourth signal output terminal P4 of the signal outputting unit 300.

The data input terminal of the flip-flop 1320 of the first intermediate registers IR1(x,y) is electrically connected to the data output terminal of the selector 1310 of the present first intermediate registers IR1(x,y). The signal input terminal 1320a of the flip-flop 1320 of the first intermediate registers IR1(x,y) is electrically connected to the second signal output terminal P2 of the signal outputting unit 300.

The operation will be described hereinlater.

The pel values are supplied from the current block supplying unit 100 and the search window supplying unit 200 to the distortion calculating unit 2000a as being described hereinlater.

Similarly to the first embodiment, the pel value transmission to each of the input registers RE(x,y), which will be described hereinlater, is assumed to occur at the time the data is latched at the flip-flop of each of the input registers RE(x,y). Moreover, the pel value transmission to each of the side registers SR(x,y) is assumed to occur at the time the data is latched at the flip-flop 1620 of each of the side registers SR(x,y).

Further, the pel value transmission to each of the second intermediate registers IR2(x,y) is assumed to occur at the time the data is latched at the flip-flop 1420 of each of the second intermediate registers IR2(x,y), and the pel value transmission to each of the first intermediate registers IR1(x,y) is assumed to occur at the time the data is latched at the flip-flop 1320 of each of the first intermediate registers IR1(x,y), and the pel value transmission to each of the processor elements PE(x,y) is assumed to occur at the time the data is latched at the flip-flop 1020 of each of the processor elements PE(x,y).

The input register RE is operated to receive data from the adjacent lower input register RE and the search window supplying unit 200 shown in FIG. 36 at the simultaneous timing of the pulse cycle of the pulse signal CK0, and this process is repeated every pulse cycle of the pulse signal CK0. While each of the processor elements and registers is operated to receive data either from the adjacent right processor element or register shown in FIG. 36 at the simultaneous timing of the first pulse of the pulse signal CK1, and at the second pulse of the pulse signal CK1, each of the processor elements and registers of the first and fifth columns is operated to receive data either from the adjacent upper processor element or register shown in FIG. 36, while each of the processor elements and the registers of the third column is operated to receive data either from the adjacent lower processor element or register shown in FIG. 36, and this process is repeated every succeeding pulse cycle of the pulse signal CK1.

Figure 48:
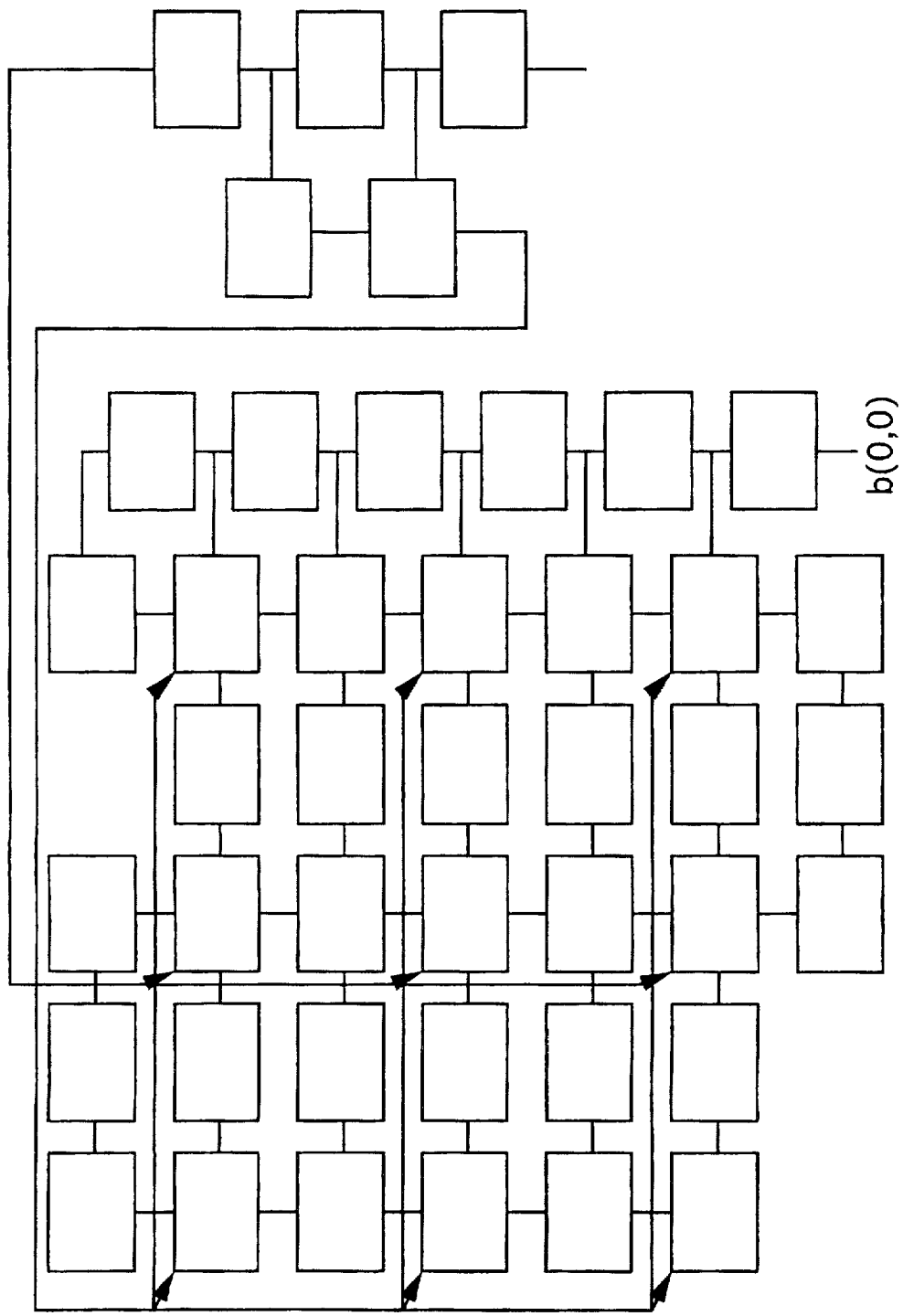
FIGS. 48 through 61 are diagrams showing flow of the pel values of search window during initialization operation of the motion estimation apparatus shown in FIG. 36.

The flow of pel values will be described more specifically hereinlater. At the simultaneous timing of the first pulse of the pulse signal CK0 as shown in FIG. 48, the pel value b(0,0) is supplied from the search window supplying unit 200 to the input register RE(5,4).

Figure 49:
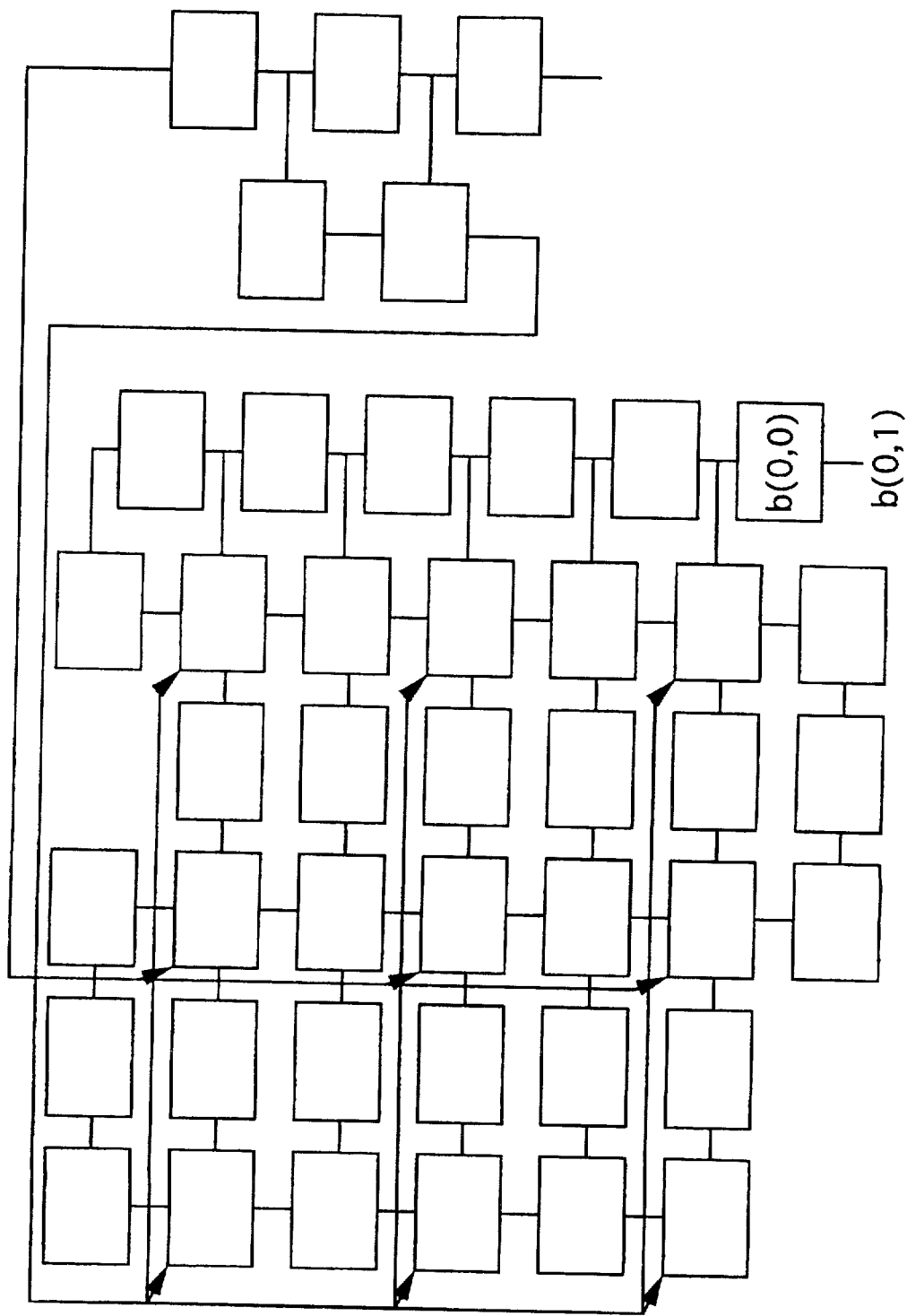

At the simultaneous timing of the second pulse of the pulse signal CK0 as shown in FIG. 49, the pel value b(0,0) is transmitted from the input register RE(5,4) to the input register RE(5,3), while the pel value b(0,1) is supplied from the search window supplying unit 200 to the input register RE(5,4).

Figure 50:
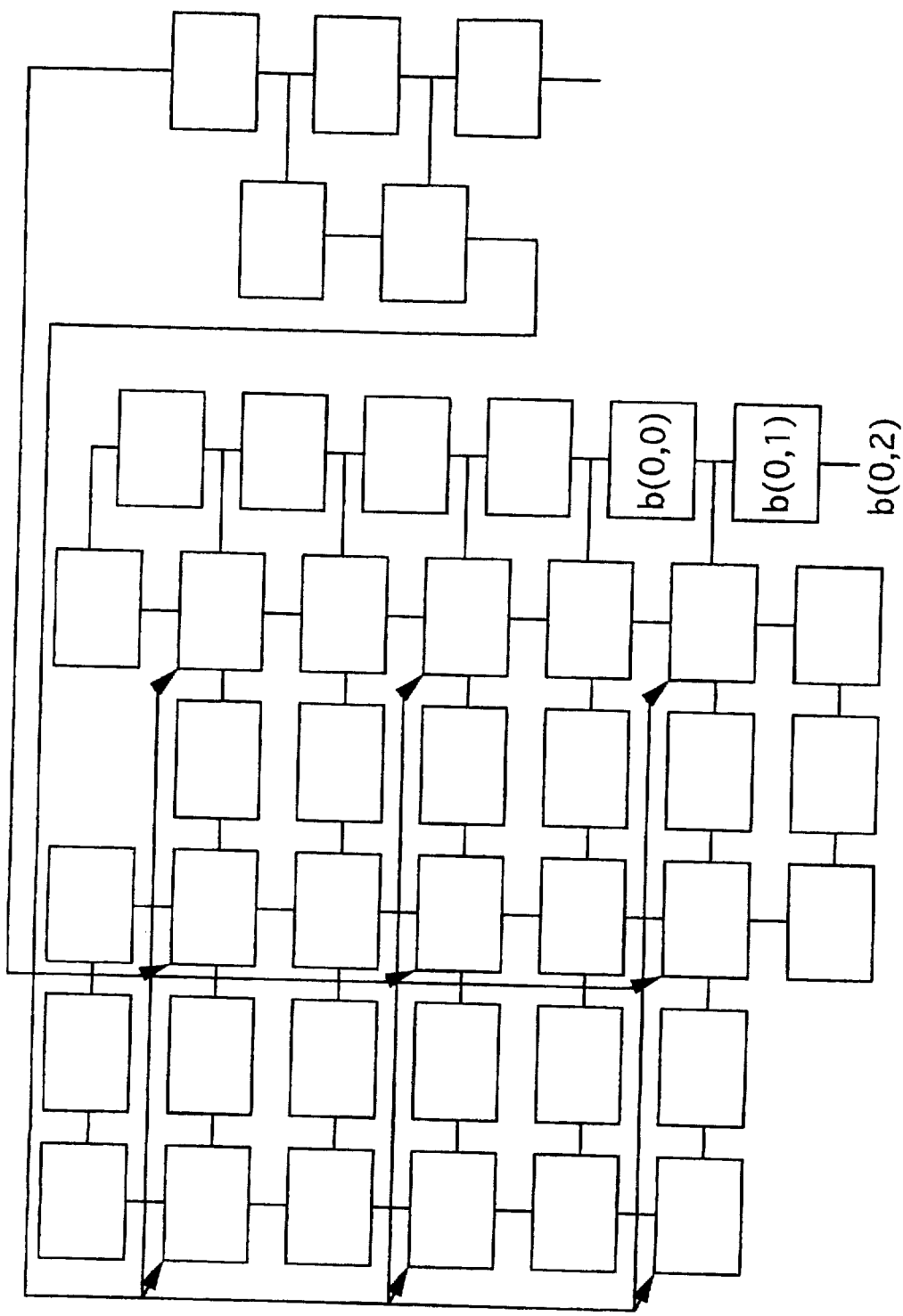

At the simultaneous timing of the third pulse of the pulse signal CK0 as shown in FIG. 50, the pel values b(0,0) and b(0,1) are transmitted from the input registers RE(5,3) and RE(5,4) to the input registers RE(5,2) and RE(5,3), respectively, while the pel value b(0,2) is supplied from the search window supplying unit 200 to the input register RE(5,4).

Figure 51:
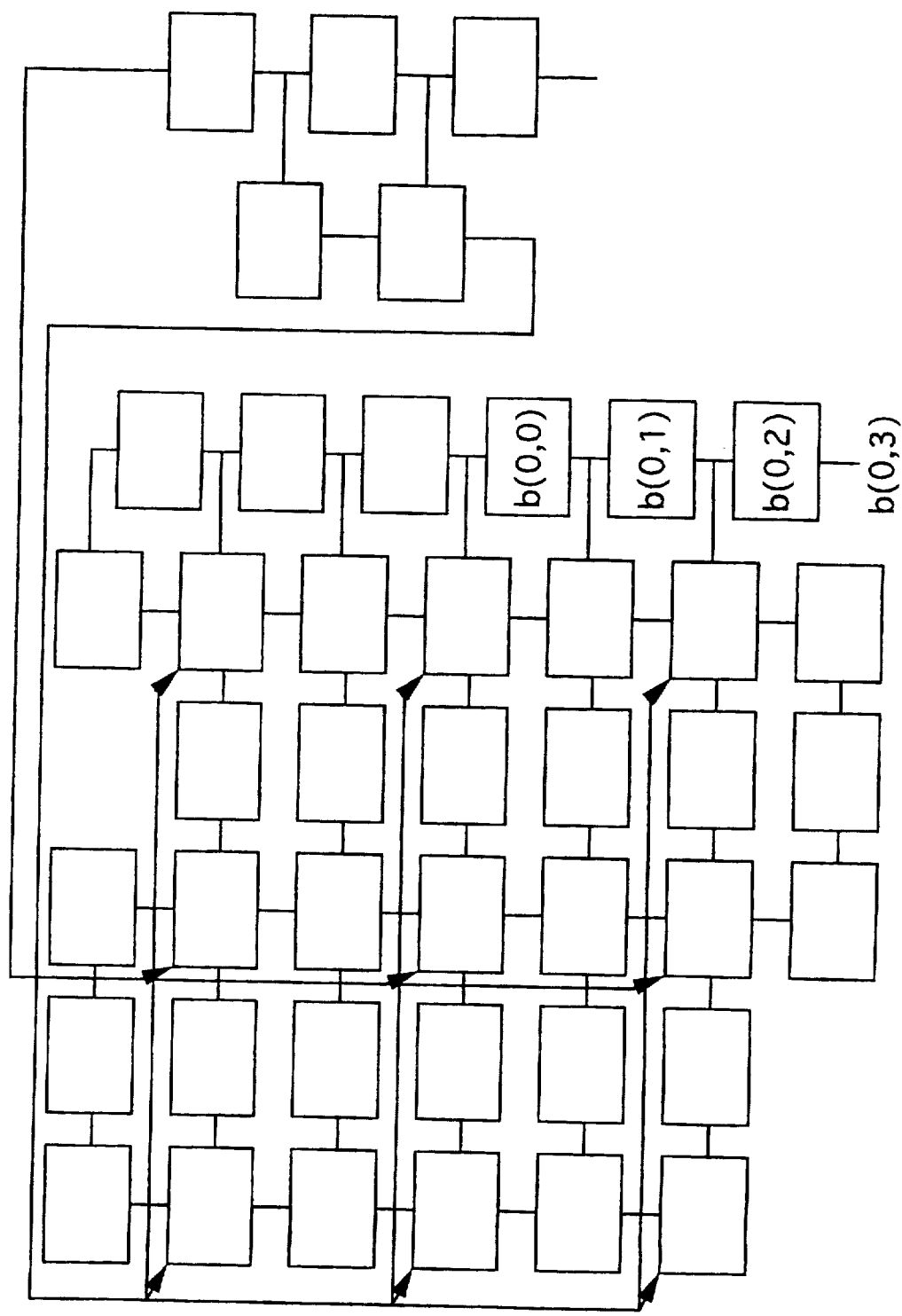

At the simultaneous timing of the fourth pulse of the pulse signal CK0 as shown in FIG. 51, the pel values b(0,0), b(0,1) and b(0,2) are transmitted from the input registers RE(5,2), RE(5,3) and RE(5,4) to the input registers RE(5,1), RE(5,2) and RE(5,3), respectively, while the pel value b(0,3) is supplied from the search window supplying unit 200 to the input register RE(5,4).

Figure 52:
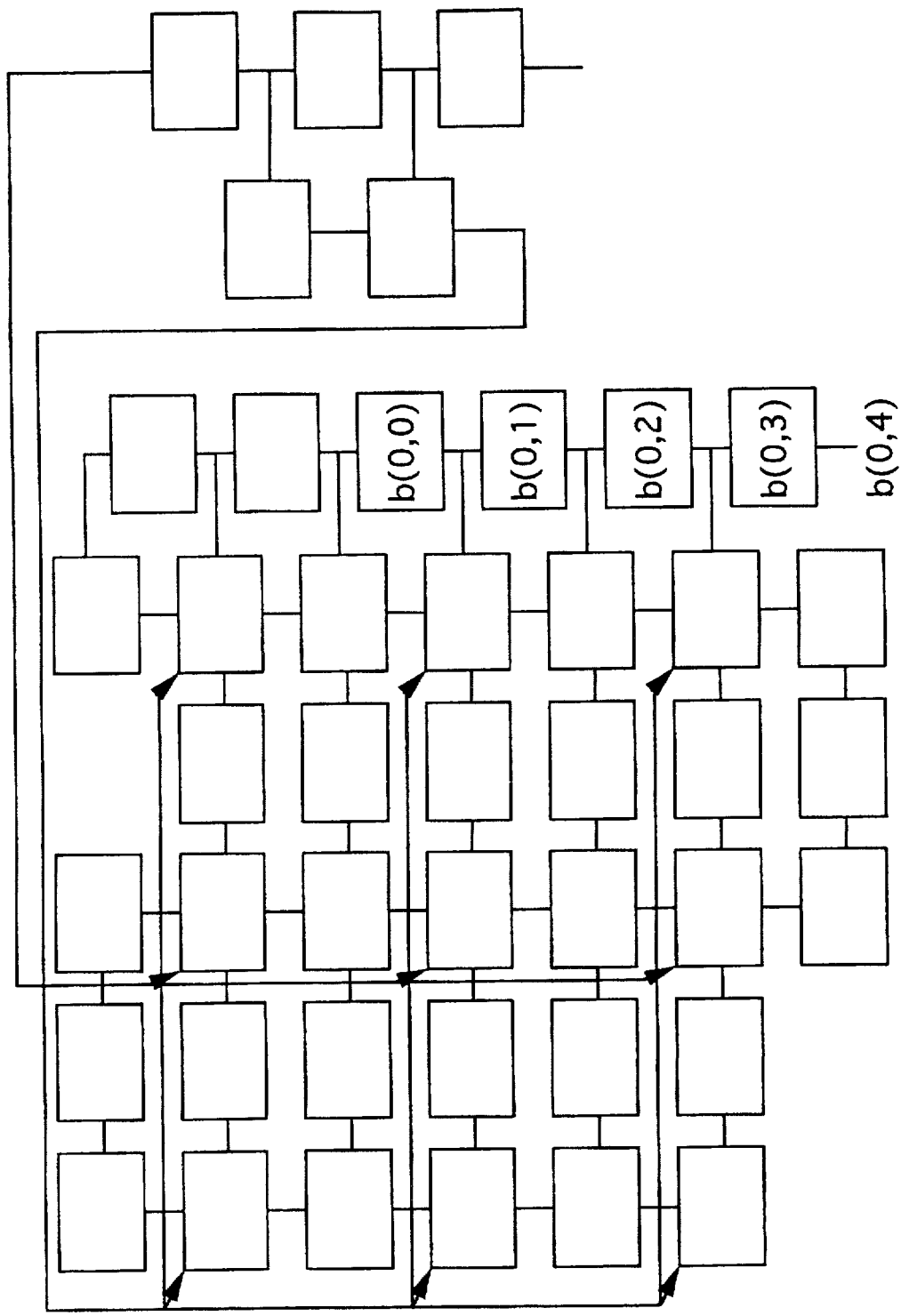

At the simultaneous timing of the fifth pulse of the pulse signal CK0 as shown in FIG. 52, the pel values b(0,0), b(0,1), b(0,2) and b(0,3) are transmitted from the input registers RE(5,1), RE(5,2), RE(5,3) and RE(5,4) to the input registers RE(5,0), RE(5,1), RE(5,2) and RE(5,3), respectively, while the pel value b(0,4) is supplied from the search window supplying unit 200 to the input register RE(5,4).

Figure 53:
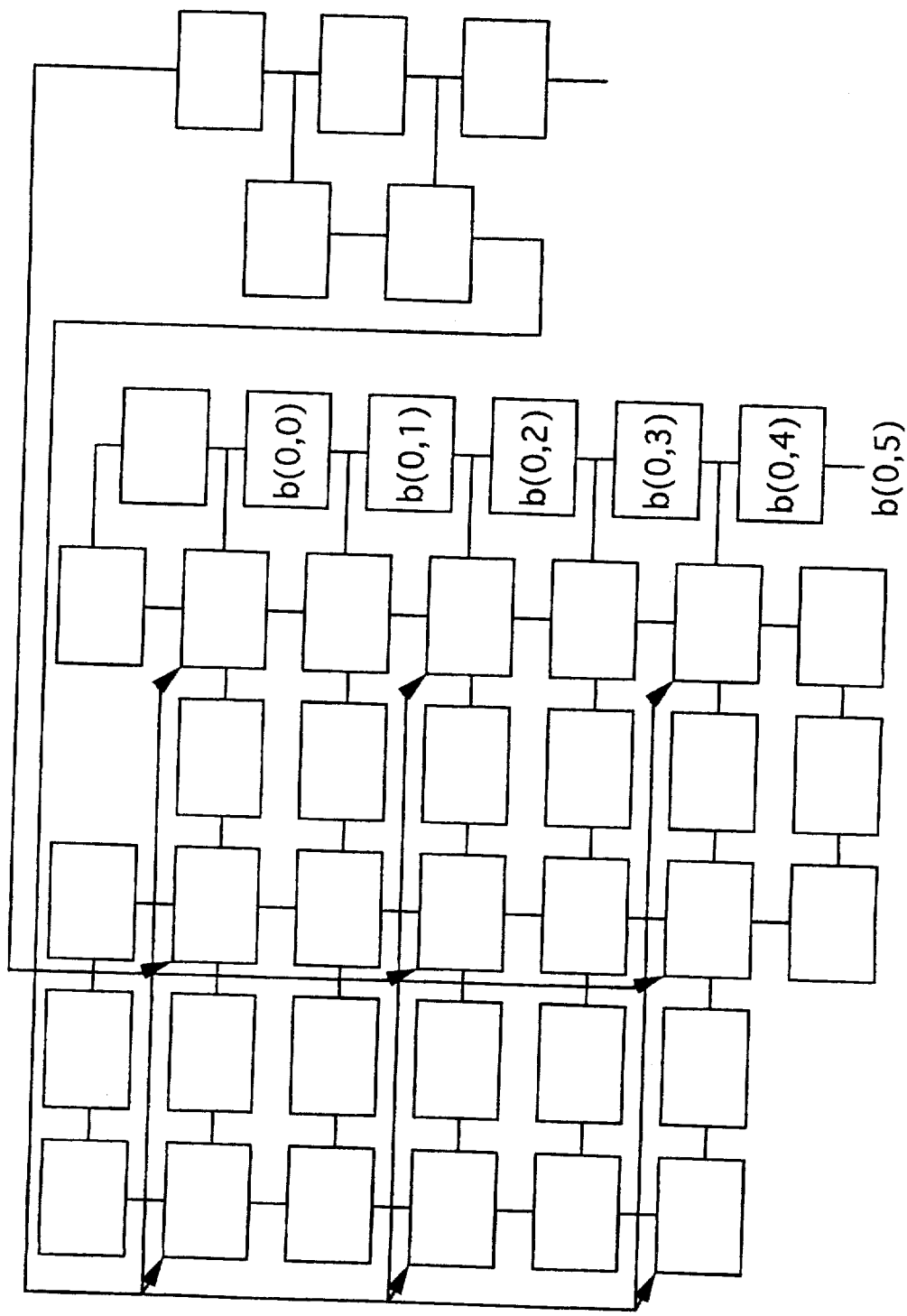

At the simultaneous timing of the sixth pulse of the pulse signal CK0 as shown in FIG. 53, the pel values b(0,0), b(0,1), b(0,2), b(0,3) and b(0,4) are transmitted from the input registers RE(5,0), RE(5,1), RE(5,2), RE(5,3) and RE(5,4) to the input registers RE(5,-1), RE(5,0), RE(5,1), RE(5,2) and RE(5,3), respectively, while the pel value b(0,5) is supplied from the search window supplying unit 200 to the input register RE(5,4).

Figure 54:
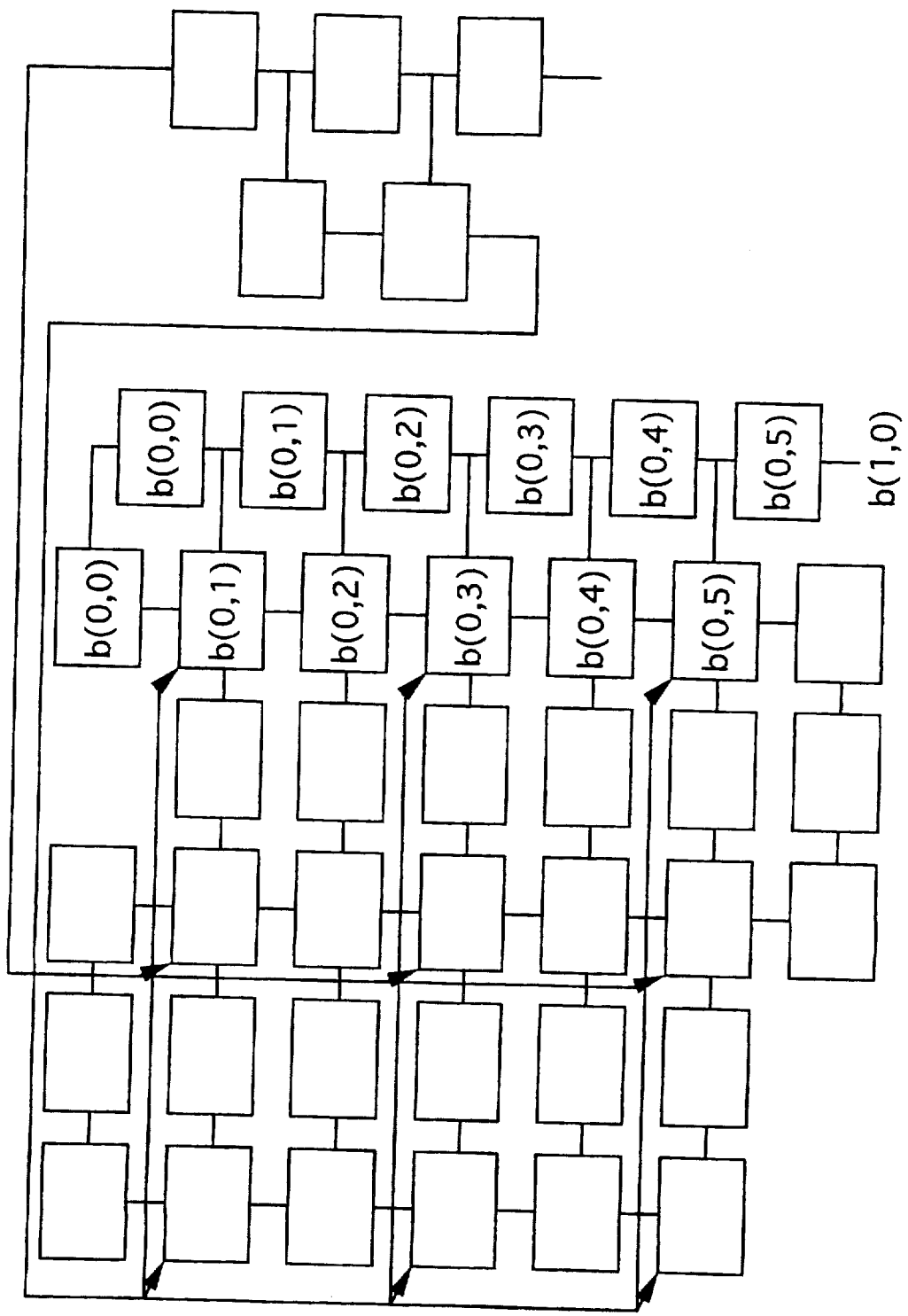

At the simultaneous timing of the third pulse of the pulse signal CK1 as shown in FIG. 54, the pel values b(0,0), b(0,1), b(0,2), b(0,3), b(0,4) and b(0,5) are transmitted from the input registers RE(5,-1), RE(5,0), RE(5,1), RE(5,2), RE(5,3) and RE(5,4) to the side register SR(4,-1), the processor element PE(4,0), the second intermediate register IR2(4,1), the processor element PE(4,2), the second intermediate register IR2(4,3), and the processor element PE(4, 4), respectively.

At the simultaneous timing of the seventh pulse of the pulse signal CK0, the pel values b(0,1), b(0,2), b(0,3), b(0,4) and b(0,5) are transmitted from the input registers RE(5,0), RE(5,1), RE(5,2), RE(5,3) and RE(5,4) to the input registers RE(5,-1), RE(5,0), RE(5,1), RE(5,2) and RE(5,3), respectively, while the pel value b(1,0) is supplied from the search window supplying unit 200 to the input register RE(5,4).

At the simultaneous timing of the eighth pulse of the pulse signal CK0, the pel values b(0,2), b(0,3), b(0,4), b(0,5) and b(1,0) are transmitted from the input registers RE(5,0), RE(5,1), RE(5,2), RE(5,3) and RE(5,4) to the input registers RE(5,-1), RE(5,0), RE(5,1), RE(5,2) and RE(5,3), respectively, while the pel value b(1,1) is supplied from the search window supplying unit 200 to the input register RE(5,4).

At the simultaneous timing of the ninth pulse of the pulse signal CK0, the pel values b(0,3), b(0,4), b(0,5), b(1,0) and b(1,1) are transmitted from the input registers RE(5,0), RE(5,1), RE(5,2), RE(5,3) and RE(5,4) to the input registers RE(5,-1), RE(5,0), RE(5,1), RE(5,2) and RE(5,3), respectively, while the pel value b(1,2) is supplied from the search window supplying unit 200 to the input register RE(5,4).

Figure 55:
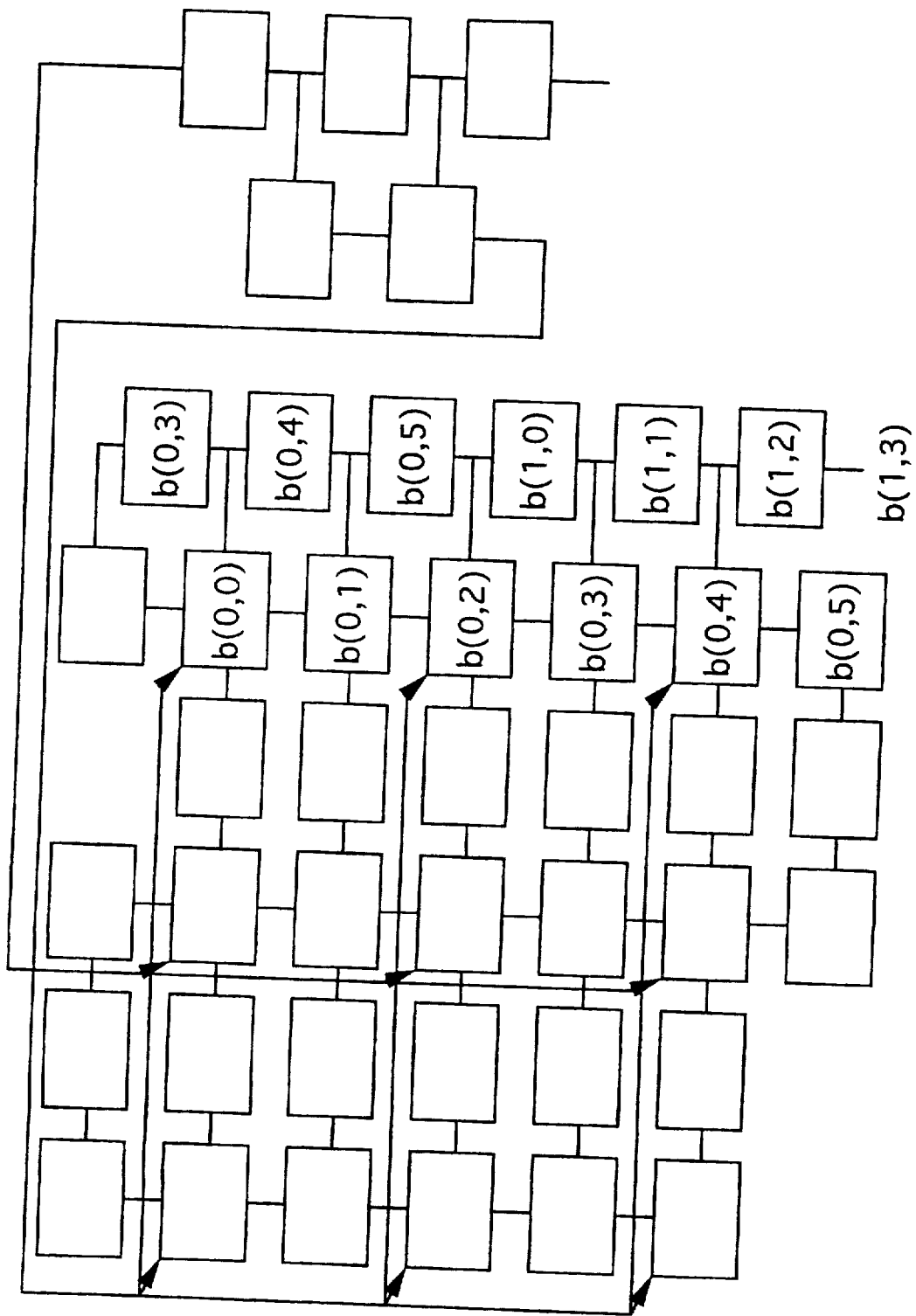

At the simultaneous timing of the fourth pulse of the pulse signal CK1 as shown in FIG. 55, the pel values b(0,0), b(0,1), b(0,2), b(0,3), b(0,4), and b(0,5) are transmitted from the side register SR(4,-1), the processor element PE(4,0), the second intermediate register IR2(4,1), the processor element PE(4,2), the second intermediate register IR2(4,3), and the processor element PE(4,4) to the processor element PE(4,0), the second intermediate register IR2(4,1), the processor element PE(4,2), the second intermediate register IR2(4,3), the processor element PE(4,4) and the side registers SR(4,5), respectively.

At the simultaneous timing of the tenth trough twelfth pulse of the pulse signals CK0, the pel values are transmitted respectively.

Before the fifth pulse of the pulse signal CK1 is outputted, the pel values b(1,0), b(1,1), b(1,2), b(1,3) and b(1,4) are transmitted from the input registers RE(5,0), RE(5,1), RE(5, 2), RE(5,3) and RE(5,4) to the input registers RE(5,-1), RE(5,0), RE(5,1), RE(5,2) and RE(5,3), respectively, while the pel value b(1,5) is supplied from the search window supplying unit 200 to the input register RE(5,4).

Figure 56:
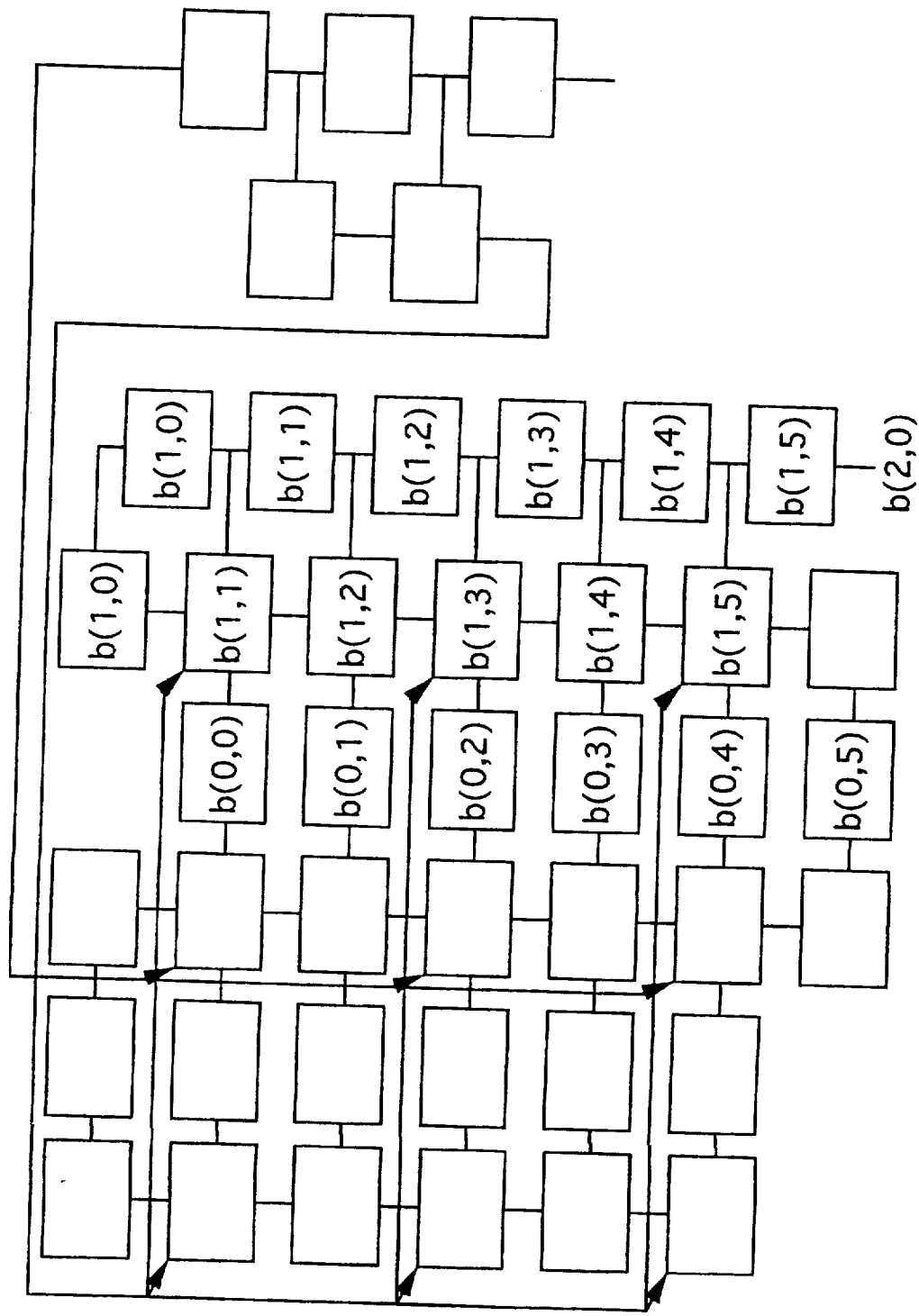

At the simultaneous timing of the fifth pulse of the pulse signal CK1 as shown in FIG. 56, the pel values b(0,0), b(0,1), b(0,2), b(0,3), b(0,4) and b(0,5) are transmitted from the processor element PE(4,0), the second intermediate register IR2(4,1), the processor element PE(4,2), the second intermediate register IR2(4,3), the processor element PE(4, 4) and the side registers SR(4,5) to the first intermediate registers IR1(3,0), IR1(3,1), IR1(3,2), IR1(3,3), IR1(3,4) and IR1(3,5) respectively, while the pel values b(1,0), b(1, 1), b(1,2), b(1,3), b(1,4) and b(1,5) are transmitted from the input registers RE(5,-1), RE(5,0), RE(5,1), RE(5,2), RE(5, 3) and RE(5,4) to the side register SR(4,-1), the processor element PE(4,0), the second intermediate register IR2(4,1), the processor element PE(4,2), the second intermediate register IR2(4,3), and the processor element PE(4,4) respectively.

Before the sixth pulse of the pulse signal CK1 is outputted, the pel values b(1,3), b(1,4), b(1,5), b(2,0) and b(2,1) are transmitted from the input registers RE(5,0), RE(5,1), RE(5,2), RE(5,3) and RE(5,4) to the input registers RE(5,-1), RE(5,0), RE(5,1), RE(5,2) and RE(5,3), respectively, while the pel value b(2,2) is supplied from the search window supplying unit 200 to the input register RE(5,4).

Figure 57:
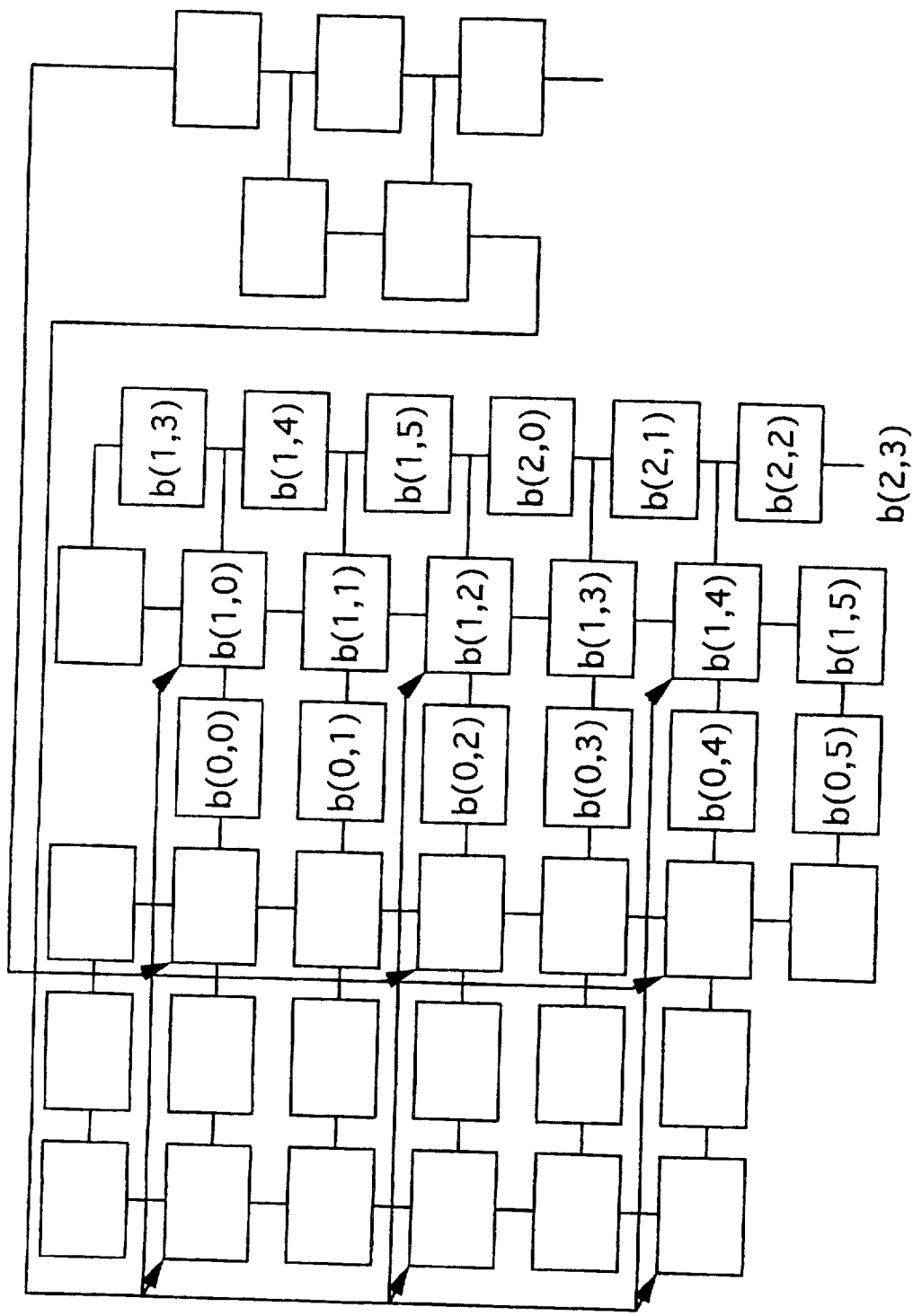

At the simultaneous timing of the sixth pulse of the pulse signal CK1 as shown in FIG. 57, the pel values b(1,0), b(1,1), b(1,2), b(1,3), b(1,4) and b(1,5) are transmitted from the side register SR(4,-1), the processor element PE(4,0), the second intermediate register IR2(4,1), the processor element PE(4,2), the second intermediate register IR2(4,3), and the processor element PE(4,4) to the processor element PE(4,0), the second intermediate register IR2(4,1), the processor element PE(4,2), the second intermediate register IR2(4,3), the processor element PE(4,4), and the side register SR(4,5), respectively.

Before the seventh pulse of the pulse signal CK1 is outputted, the pel values b(2,0), b(2,1), b(2,2), b(2,3) and b(2,4) are transmitted from the input registers RE(5,0), RE(5,1), RE(5,2), RE(5,3) and RE(5,4) to the input registers RE(5,-1), RE(5,0), RE(5,1), RE(5,2) and RE(5,3), respectively, while the pel value b(2,5) is supplied from the search window supplying unit 200 to the input register RE(5,4).

Figure 58:
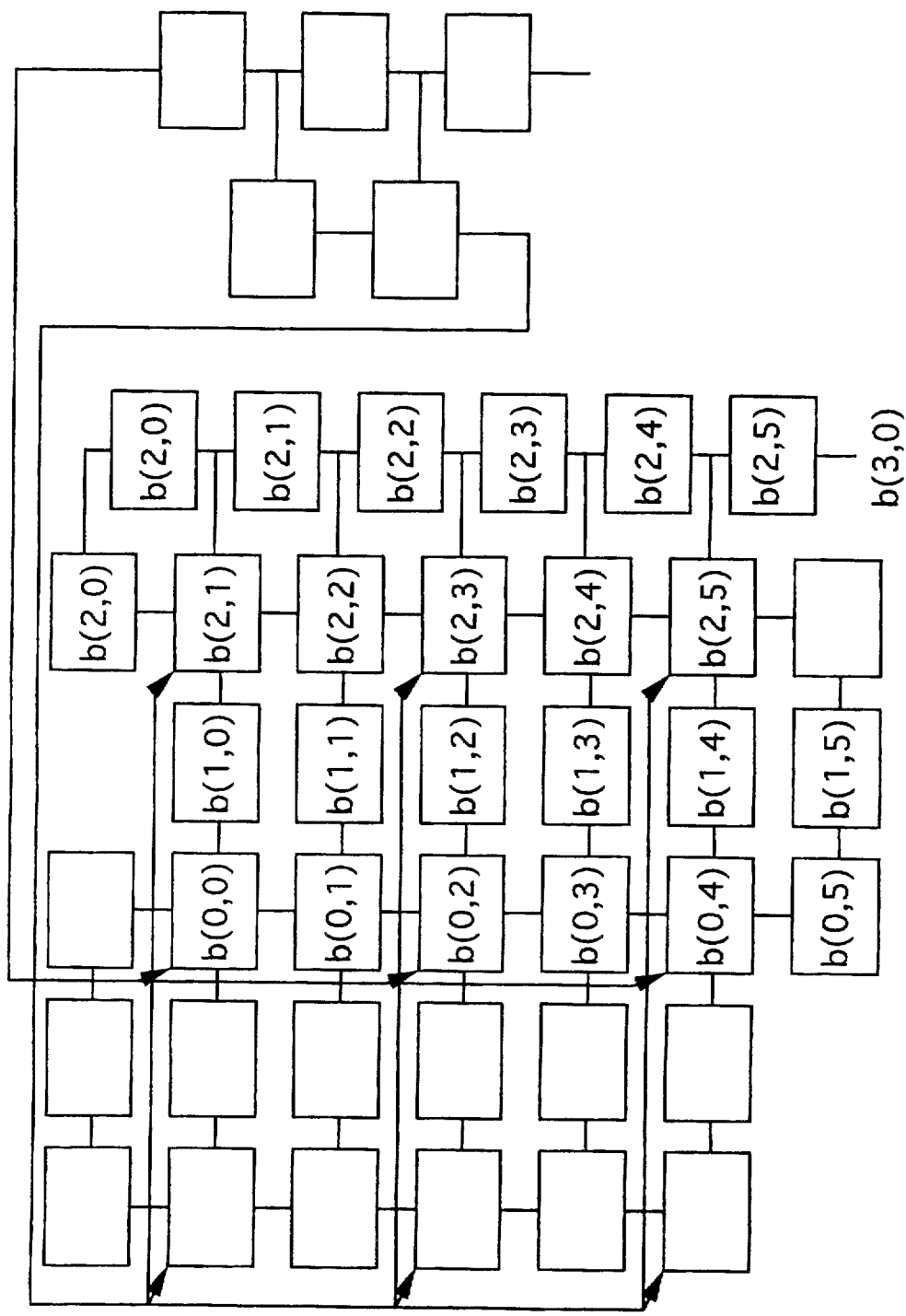

At the simultaneous timing of the seventh pulse of the pulse signal CK1 as shown in FIG. 58, the pel values b(0,0), b(0,1), b(0,2), b(0,3), b(0,4) and b(0,5) are transmitted from the first intermediate registers IR1(3,0), IR1(3,1), IR1(3,2), IR1(3,3), IR1(3,4) and IR1(3,5) to the processor element PE(2,0), the second intermediate register IR2(2,1), the processor element PE(2,2), the second intermediate register IR2(2,3), the processor element PE(2,4) and the side register SR(2,5), respectively, while the pel values b(1,0), b(1,1), b(1,2), b(1,3), b(1,4) and b(1,5) are transmitted from the processor element PE(4,0), the second intermediate register IR2(4,1), the processor element PE(4,2), the second intermediate register IR2(4,3), the processor element PE(4,4) and the side register SR(4,5) to the first intermediate registers IR1(3,0), IR1(3,1), IR1(3,2), IR1(3,3), IR1(3,4) and IR1(3, 5), respectively. Moreover, the pel values b(2,0), b(2,1), b(2,2), b(2,3), b(2,4) and b(2,5) are transmitted from the input registers RE(5,-1), RE(5,0), RE(5,1), RE(5,2), RE(5, 3) and RE(5,4) to the side register SR(4,-1), the processor element PE(4,0), the second intermediate register IR2(4,1), the processor element PE(4,2), the second intermediate register IR2(4,3), and the processor element PE(4,4) respectively.

Before the eighth pulse of the pulse signal CK1 is outputted, the pel values b(2,3), b(2,4), b(2,5), b(3,0) and b(3,1) are transmitted from the input registers RE(5,0), RE(5,1), RE(5,2), RE(5,3) and RE(5,4) to the input registers RE(5,-1), RE(5,0), RE(5,1), RE(5,2) and RE(5,3) respectively, while the pel value b(3,2) is supplied from the search window supplying unit 200 to the input register RE(5,4).

Figure 59:
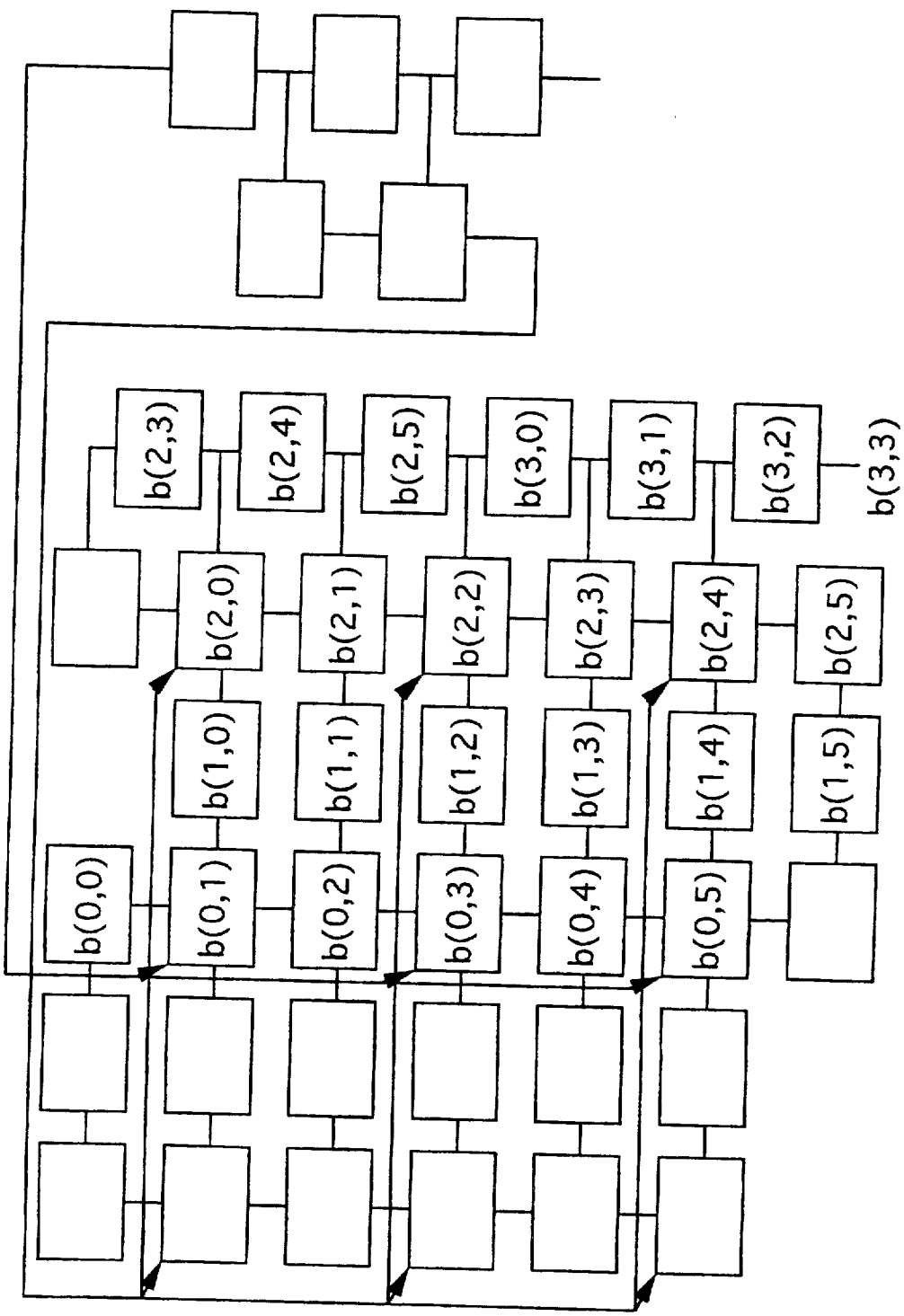

At the simultaneous timing of the eighth pulse of the pulse signal CK1 as shown in FIG. 59, the pel values b(0,0), b(0,1), b(0,2), b(0,3), b(0,4) and b(0,5) are transmitted from the processor element PE(2,0), the second intermediate register IR2(2,1), the processor element PE(2,2), the second intermediate register IR2(2,3), the processor element PE(2, 4) and the side registers SR(2,5) to the side register SR(2,-1) the processor element PE(2,0), the second intermediate register IR2(2,1), the processor element PE(2,2), the second intermediate register IR2(2,3), and the processor element PE(2,4). Moreover, the pel values b(2,0), b(2,1), b(2,2), b(2,3), b(2,4) and b(2,5) are transmitted from the side register SR(4,−1), the processor element PE(4,0), the second intermediate register IR2(4,1), the processor element PE(4, 2), the second intermediate register IR2(4,3), and the processor element PE(4,4) to the processor element PE(4,0), the second intermediate register IR2(4,1), the processor element PE(4,2), the second intermediate register IR2(4,3), the processor element PE(4,4), and the side register SR(4,5), respectively.

Before the ninth pulse of the pulse signal CK1 is outputted, the pel values b(3,0), b(3,1), b(3,2), b(3,3) and b(3,4) are transmitted from the input registers RE(5,0), RE(5,1), RE(5,2), RE(5,3) and RE(5,4) to the input registers RE(5,−1), RE(5,0), RE(5,1), RE(5,2) and RE(5,3), respectively, while the pel value b(3,5) is supplied from the search window supplying unit 200 to the input register RE(5,4).

Figure 60:
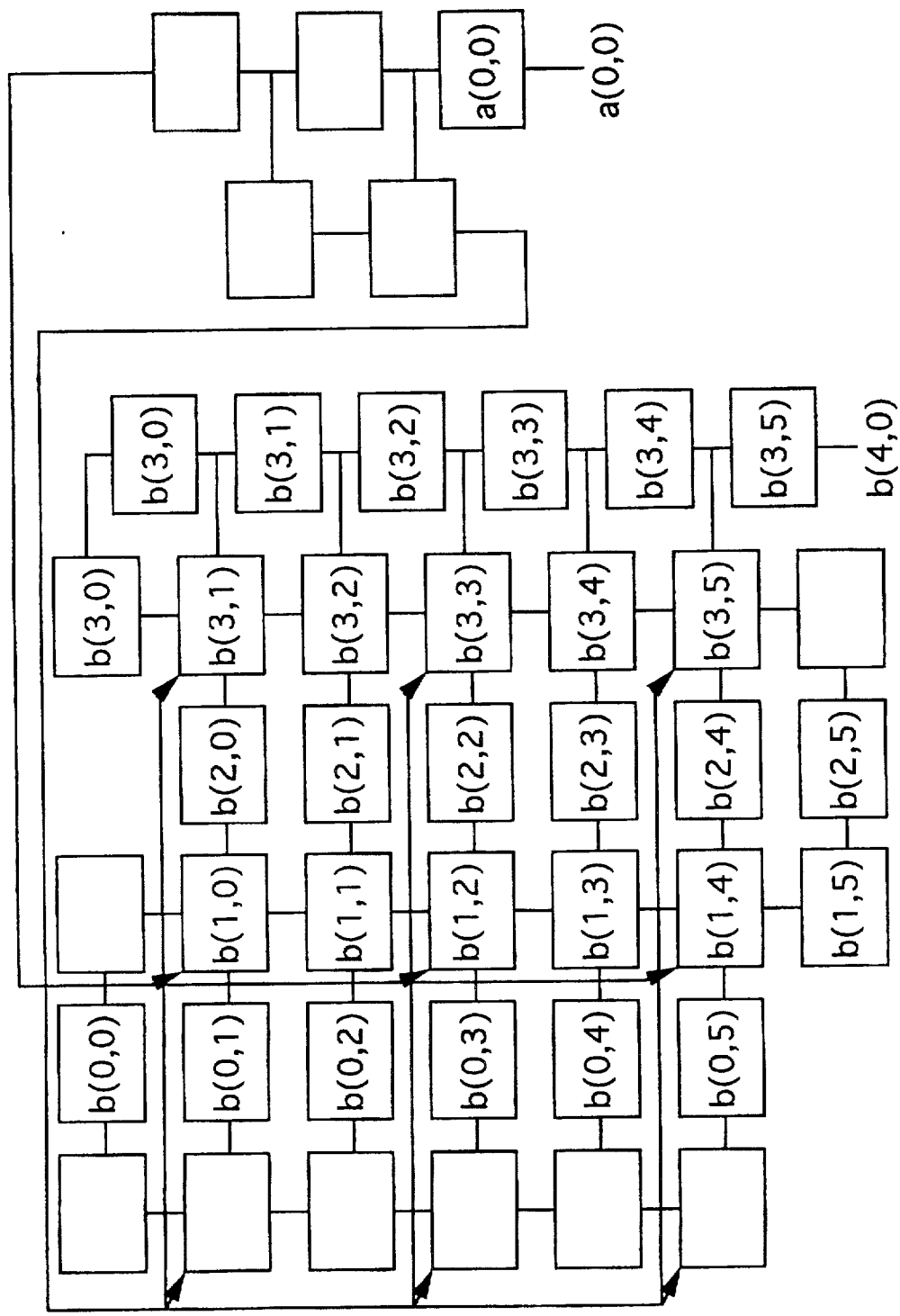

At the simultaneous timing of the ninth pulse of the pulse signal CK1 as shown in FIG. 60, the pel values b(0,0), b(0,1), b(0,2), b(0,3), b(0,4) and b(0,5) are transmitted from the side register SR(2,−1) the processor element PE(2,0), the second intermediate register IR2(2,1), the processor element PE(2,2), the second intermediate register IR2(2,3), and the processor element PE(2,4) to the first intermediate registers IR1(1,1), IR1(1,0), IR1(1,1), IR1(1,2), IR1(1,3) and IR1(1, 4), respectively. Moreover, the pel values b(1,0), b(1,1), b(1,2), b(1,3), b(1,4) and b(1,5) are transmitted from the first intermediate registers IR1(3,0), IR1(3,1), IR1(3,2), IR1(3, 3), IR1(3,4) and IR1(3,5) to the processor element PE(2,0), the second intermediate register IR2(2,1), the processor element PE(2,2), the second intermediate register IR2(2,3), the processor element PE(2,4) and the side register SR(2,5), respectively. Moreover, the pel values b(2,0), b(2,1), b(2,2), b(2,3), b(2,4) and b(2,5) are transmitted from the processor element PE(4,0), the second intermediate register IR2(4,1), the processor element PE(4,2), the second intermediate register IR2(4,3), the processor element PE(4,4), and the side register SR(4,5) to the intermediate registers IR1(3,0), IR1(3,1), IR1(3,2), IR1(3,3), IR1(3,4) and IR1(3,5), respectively. Further, the pel values b(3,0), b(3,1), b(3,2), b(3,3), b(3,4) and b(3,5) are transmitted from the input registers RE(5,−1), RE(5,0), RE(5,1), RE(5,2), RE(5,3) and RE(5,4) to the side register SR(4,−1), the processor element PE(4,0), the second intermediate register IR2(4,1), the processor element PE(4,2), the second intermediate register IR2(4,3), and the processor element PE(4,4), respectively.

At the same time, the pel value a(0,0) is supplied from the data inputting means (not shown) to the flip-flop 110 of the current block supplying unit 100.

Before the tenth pulse of the pulse signal CK1 is outputted, the pel values b(3,3), b(3,4), b(3,5), b(4,0) and b(4,1) are transmitted from the input registers RE(5,0), RE(5,1), RE(5,2), RE(5,3) and RE(5,4) to the input registers RE(5,−1), RE(5,0), RE(5,1), RE(5,2) and RE(5,3), respectively, while the pel value b(4,2) is supplied from the search window supplying unit 200 to the input register RE(5,4).

Figure 61:
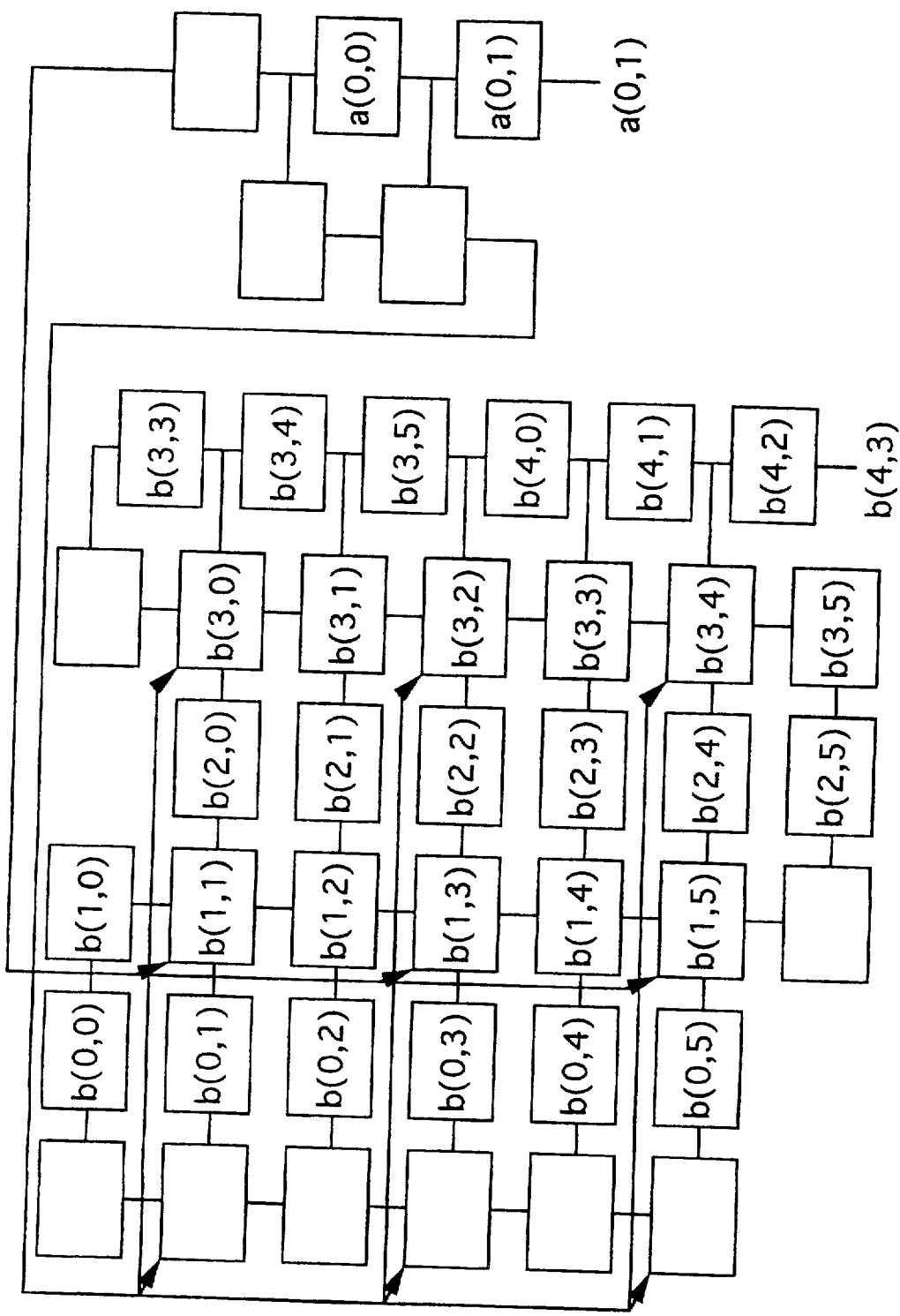

At the simultaneous timing of the tenth pulse of the pulse signal CK1 as shown in FIG. 61, the pel values b(1,0), b(1,1), b(1,2), b(1,3), b(1,4) and b(1,5) are transmitted from the processor element PE(2,0), the second intermediate register IR2(2,1), the processor element PE(2,2), the second intermediate register IR2(2,3), the processor element PE(2, 4) and the side register SR(2,5) to the side register SR(2,−1), the processor element PE(2,0), the second intermediate register IR2(2,1), the processor element PE(2,2), the second intermediate register IR2(2,3), and the processor element PE(2,4), respectively. Moreover, the pel values b(3,0), b(3, 1), b(3,2), b(3,3), b(3,4) and b(3,5) are transmitted from the side register SR(4,−1), the processor element PE(4,0), the second intermediate register IR2(4,1), the processor element PE(4,2), the second intermediate register IR2(4,3), and the processor element PE(4,4) to the processor element PE(4,0), the second intermediate register IR2(4,1), the processor element PE(4,2), the second intermediate register IR2(4,3), the processor element PE(4,4) and the side register SR(4,5), respectively.

At the same time, the pel value a(0,0) is transmitted from the flip-flop 110 of the current block supplying unit 100 to the flip-flop 120, while the pel value a(0,1) is supplied from the data inputting means (not shown) to the flip-flop 110 of the current block supplying unit 100.

Before the eleventh pulse of the pulse signal CK1 is outputted, the pel values b(4,0), b(4,1), b(4,2), b(4,3) and b(4,4) are transmitted from the input registers RE(5,0), RE(5,1), RE(5,2), RE(5,3) and RE(5,4) to the input registers RE(5,−1), RE(5,0), RE(5,1), RE(5,2) and RE(5,3), respectively, while the pel value b(4,5) is supplied from the search window supplying unit 200 to the input register RE(5,4).

Figure 62:
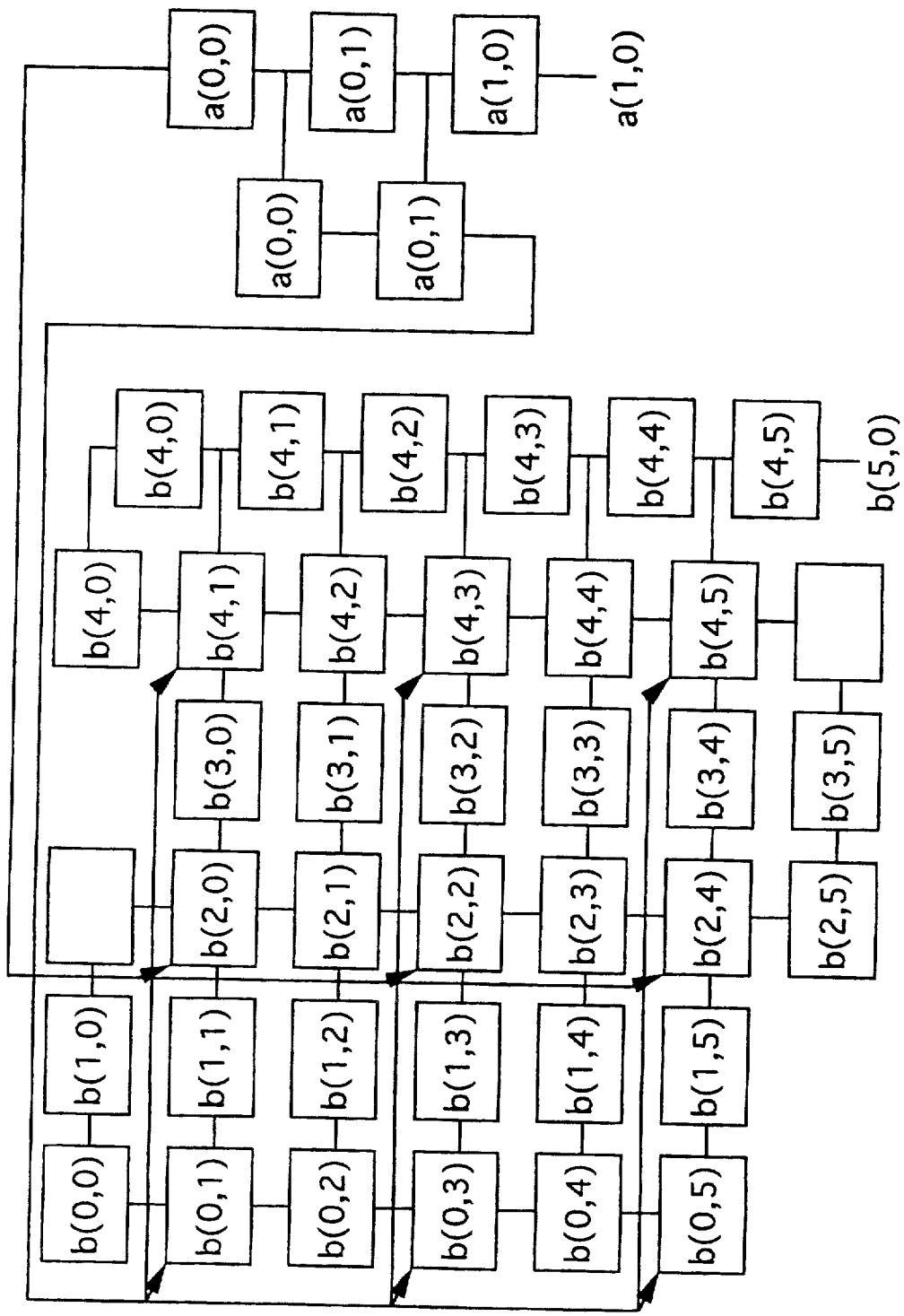
FIGS. 62 through 66 are diagrams showing flow of the pel values of search window in periods (k) to (o), respectively.

At the simultaneous timing of the eleventh pulse of the pulse signal CK1 as shown in FIG. 62, the pel values b(0,0), b(0,1), b(0,2), b(0,3), b(0,4) and b(0,5) are transmitted from the first intermediate registers IR1(1,−1), IR1(1,0), IR1(1,1), IR1(1,2), IR1(1,3) and IR1(1,4) to the side register SR(0,−1), the processor element PE(0,0), the second intermediate register IR2(0,1), the processor element PE(0,2), the second intermediate register IR2(0,3), and the processor element PE(0,4), respectively. Moreover, the pel values b(1,0), b(1, 1), b(1,2), b(1,3), b(1,4) and b(1,5) are transmitted from the side register SR(2,−1), the processor element PE(2,0), the second intermediate register IR2(2,1), the processor element PE(2,2), the second intermediate register IR2(2,3), and the processor element PE(2,4) to the first intermediate registers IR1(1,−1), IR1(1,0), IR1(1,1), IR1(1,2), IR1(1,3) and IR1 (1,4), respectively. Moreover, the pel values b(2,0), b(2,1), b(2,2), b(2,3), b(2,4) and b(2,5) are transmitted from the first intermediate registers IR1(3,0), IR1(3,1), IR1(3,2), IR1(3, 3), IR1(3,4) and IR1(3,5) to the processor element PE(2,0), the second intermediate register IR2(2,1), the processor element PE(2,2), the second intermediate register IR2(2,3), the processor element PE(2,4) and the side register SR(2,5), respectively. Further, the pel values b(3,0), b(3,1), b(3,2), b(3,3), b(3,4) and b(3,5) are transmitted from the processor element PE(4,0), the second intermediate register IR2(4,1), the processor element PE(4,2), the second intermediate register IR2(4,3), the processor element PE(4,4) and the side register SR(4,5) to the first intermediate registers IR1(3,0), IR1(3,1), IR1(3,2), IR1(3,3), IR1(3,4) and IR1(3,5), respectively. Yet further, the pel values b(4,0), b(4,1), b(4,2), b(4,3), b(4,4) and b(4,5) are transmitted from the input registers RE(5,−1), RE(5,0), RE(5,1), RE(5,2), RE(5,3) and RE(5,4) to the side register SR(4,−1), the processor element PE(4,0), the second intermediate register IR2(4,1), the processor element PE(4,2), the second intermediate register IR2(4,3), and the processor element PE(4,4), respectively.

At the same time, the pel values a(0,0) and a(0,1) are transmitted from the flip-flops 120 and 110 of the current block supplying unit 100 to both flip-flops 130 and 140, both flip-flops 120 and 150 of the current block supplying unit 100, respectively, while the pel value a(1,0) is supplied from the data inputting means (not shown) to the flip-flop 110 of the current block supplying unit 100.

Before the twelfth pulse of the pulse signal CK1 is outputted, the pel values b(4,3), b(4,4), b(4,5), b(5,0) and b(5,1) are transmitted from the input registers RE(5,0), RE(5,1), RE(5,2), RE(5,3) and RE(5,4) to the input registers RE(5,−1), RE(5,0), RE(5,1), RE(5,2) and RE(5,3), respectively, while the pel value b(5,2) is supplied from the search window supplying unit 200 to the input register RE(5,4).

Figure 63:
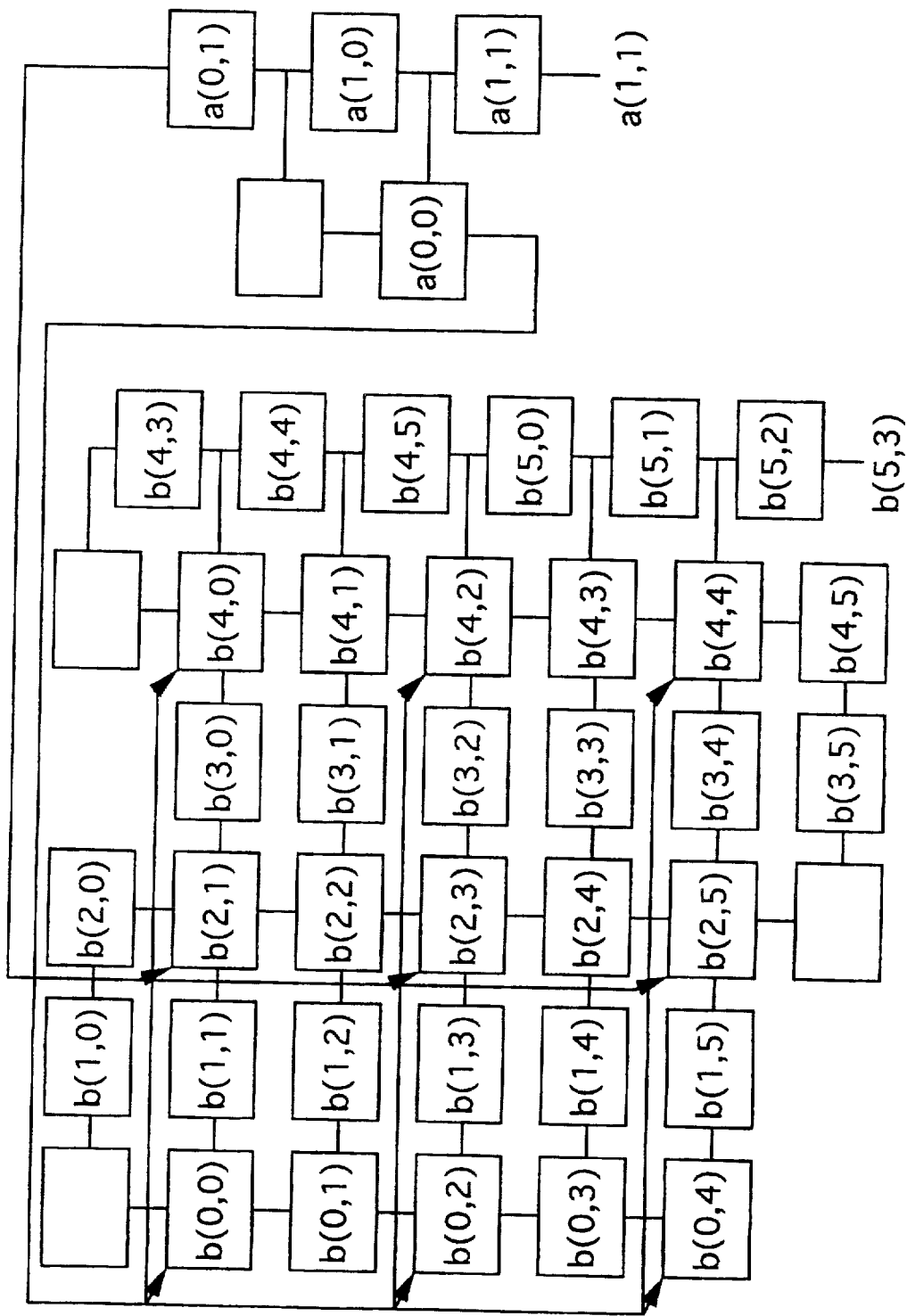

At the simultaneous timing of the twelfth pulse of the pulse signal CK1 as shown in FIG. 63, the pel values b(0,0), b(0,1), b(0,2), b(0,3) and b(0,4) are transmitted from the side register SR(0,−1), the processor element PE(0,0), the second intermediate register IR2(0,1), the processor element PE(0,2), and the second intermediate register IR2(0,3) to the processor element PE(0,0), the second intermediate register IR2(0,1), the processor element PE(0,2), the second intermediate register IR2(0,3), and the processor element PE(0,4), respectively. Moreover, the pel values b(2,0), b(2,1), b(2,2), b(2,3), b(2,4) and b(2,5) are transmitted from the processor element PE(2,0), the second intermediate register IR2(2,1), the processor element PE(2,2), the second intermediate register IR2(2,3), the processor element PE(2,4) and the side register SR(2,5) to the side register SR(2,−1), the processor element PE(2,0), the second intermediate register IR2(2,1), the processor element PE(2,2), the second intermediate register IR2(2,3), and the processor element PE(2,4), respectively. Further, the pel values b(4,0), b(4,1), b(4,2), b(4,3), b(4,4) and b(4,5) are transmitted from the side register SR(4,−1), the processor element PE(4,0), the second intermediate register IR2(4,1), the processor element PE(4,2), the second intermediate register IR2(4,3), and the processor element PE(4,4) to the processor element PE(4,0), the second intermediate register IR2(4,1), the processor element PE(4,2), the second intermediate register IR2(4,3), the processor element PE(4,4) and the side register SR(4,5), respectively.

At the same time, the pel values a(0,0), a(0,1) and a(1,0) are transmitted from the flip-flops 140, 120 and 110 of the current block supplying unit 100 to flip-flops 150, 130 and 120 of the current block supplying unit 100, respectively, while the pel value a(1,1) is supplied from the data inputting means (not shown) to the flip-flop 110 of the current block supplying unit 100.

Before the thirteenth pulse of the pulse signal CK1 is outputted, the pel values b(5,0), b(5,1), b(5,2), b(5,3) and b(5,4) are transmitted from the input registers RE(5,0), RE(5,1), RE(5,2), RE(5,3) and RE(5,4) to the input registers RE(5,−1), RE(5,0), RE(5,1), RE(5,2) and RE(5,3), respectively, while the pel value b(5,5) is supplied from the search window supplying unit 200 to the input register RE(5,4).

Figure 64:
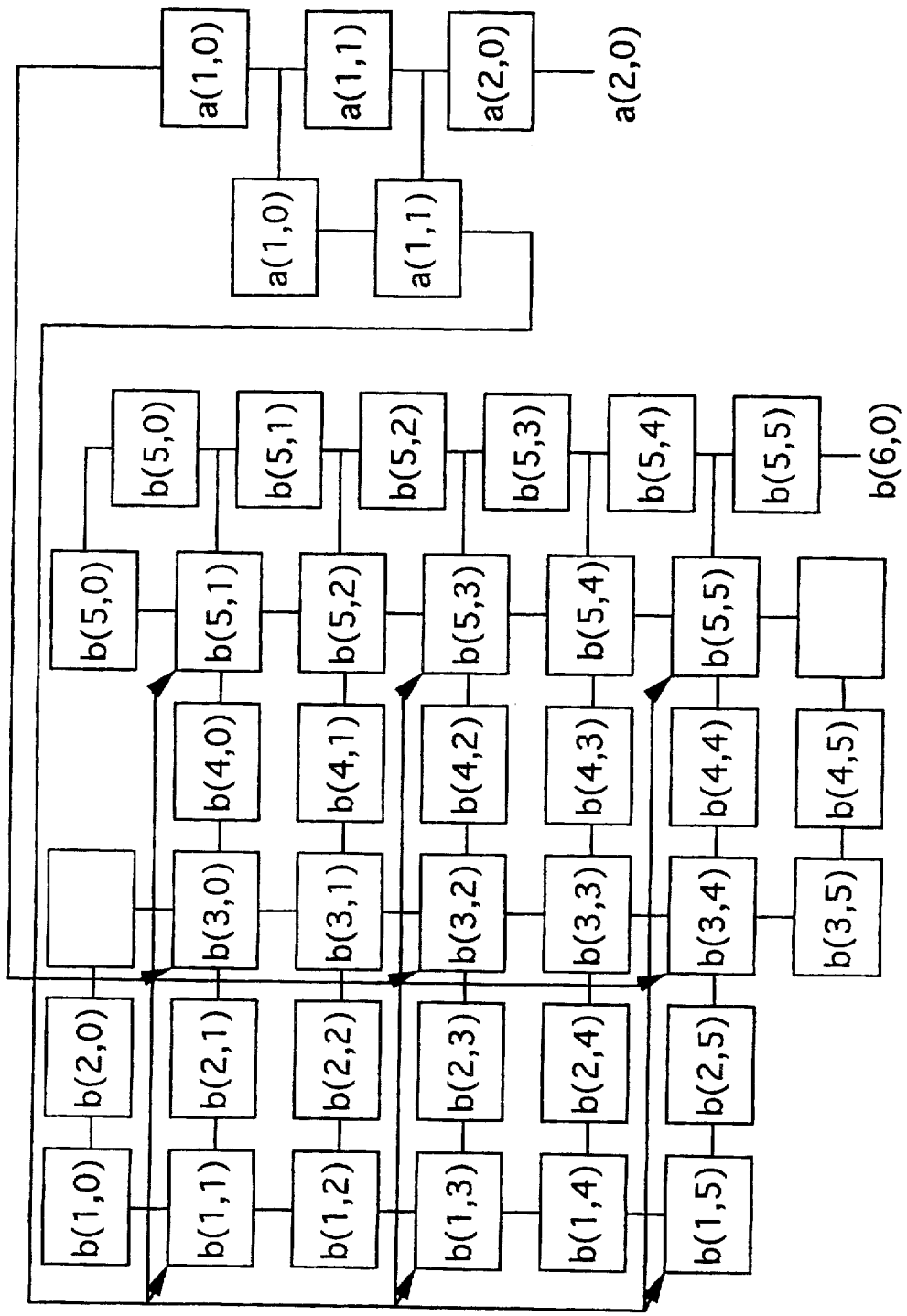

At the simultaneous timing of the thirteenth pulse of the pulse signal CK1 as shown in FIG. 64, the pel values b(1,0), b(1,1), b(1,2), b(1,3), b(1,4) and b(1,5) are transmitted from the first intermediate registers IR1(1,−1), IR1(1,0), IR1(1,1), IR1(1,2), IR1(1,3) and IR1(1,4) to the side register SR(0,−1), the processor element PE(0,0), the second register IR2(0,1), the processor element PE(0,2), the second intermediate register IR2(0,3), and the processor element PE(0,4), respectively. Moreover, the pel values b(2,0), b(2,1), b(2,2), b(2,3), b(2,4) and b(2,5) are transmitted from the side register SR(2,−1), the processor element PE(2,0), the second intermediate register IR2(2,1), the processor element PE(2,2), the second intermediate register IR2(2,3), and the processor element PE(2,4) to the first intermediate registers IR1(1,−1), IR1(1,0), IR1(1,1), IR1(1,2), IR1(1,3) and IR1(1,4), respectively. Further, the pel values b(3,0), b(3,1), b(3,2), b(3,3), b(3,4) and b(3,5) are transmitted from the first intermediate registers IR1(3,0), IR1(3,1), IR1(3,2), IR1(3, 3), IR1(3,4) and IR1(3,5) to the processor element PE(2,0), the second intermediate register IR2(2,1), the processor element PE(2,2), the second intermediate register IR2(2,3), the processor element PE(2,4) and the side register SR(2,5), respectively. Further, the pel values b(4,0), b(4,1), b(4,2), b(4,3), b(4,4) and b(4,5) are transmitted from the processor element PE(4,0), the second intermediate register IR2(4,1), the processor element PE(4,2), the second intermediate register IR2(4,3), the processor element PE(4,4) and the side register SR(4,5) to the first intermediate registers IR1(3,0), IR1(3,1), IR1(3,2), IR1(3,3), IR1(3,4) and IR1(3,5), respectively. Further moreover, the pel values b(5,0), b(5,1), b(5,2), b(5,3), b(5,4) and b(5,5) are transmitted from the input registers RE(5,−1), RE(5,0), RE(5,1), RE(5,2), RE(5,3) and RE(5,4) to the side register SR(4,1), the processor element PE(4,0), the second intermediate register IR2(4,1), the processor element PE(4,2), the second intermediate register IR2(4,3), and the processor element PE(4,4), respectively.

At the same time, the pel values a(1,0) and a(1,1) are transmitted from the flip-flops 120 and 110 of the current block supplying unit 100 to both flip-flops 130 and 140, both flip-flops 120 and 150 of the current block supplying unit 100, respectively, while the pel value a(2,0) is supplied from the data inputting means (not shown) to the flip-flop 110 of the current block supplying unit 100.

Before the fourteenth pulse of the pulse signal CK1 is outputted, the pel values b(5,3), b(5,4), b(5,5), b(6,0) and b(6,1) are transmitted from the input registers RE(5,0), RE(5,1), RE(5,2), RE(5,3) and RE(5,4) to the input registers RE(5,−1), RE(5,0), RE(5,1), RE(5,2) and RE(5,3), respectively, while the pel value b(6,2) is supplied from the search window supplying unit 200 to the input register RE(5,4).

Figure 65:
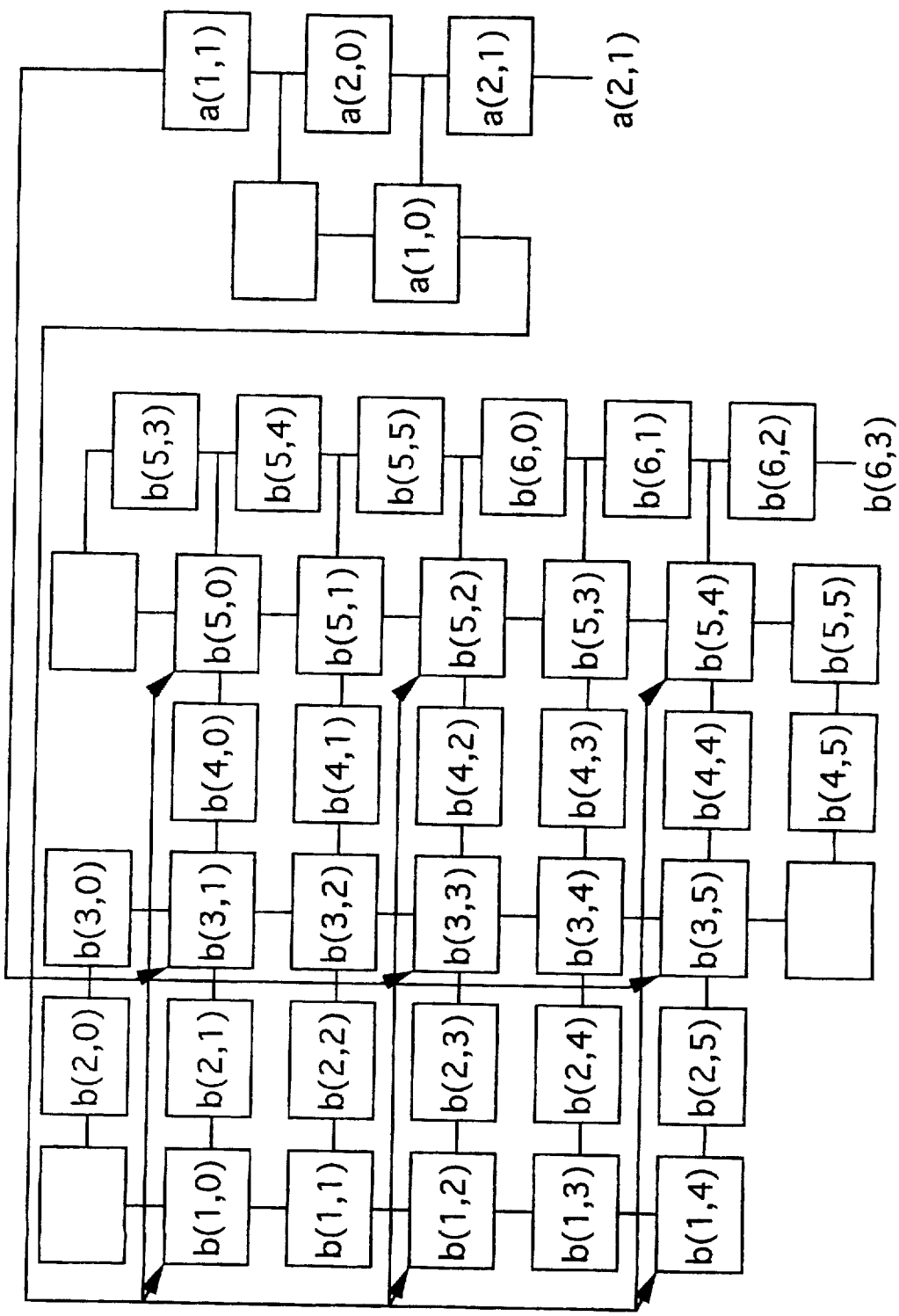

At the simultaneous timing of the twelfth pulse of the pulse signal CK1 as shown in FIG. 65, the pel values b(1,0), b(1,1), b(1,2), b(1,3) and b(1,4) are transmitted from the side register SR(0,−1), the processor element PE(0,0), the second intermediate register IR2(0,1), the processor element PE(0,2), and the second intermediate register IR2(0,3) to the processor element PE(0,0), the second intermediate register IR2(0,1), the processor element PE(0,2), the second intermediate register IR2(0,3), and the processor element PE(0,4), respectively. Moreover, the pel values b(3,0), b(3,1), b(3,2), b(3,3), b(3,4) and b(3,5) are transmitted from the processor element PE(2,0), the second intermediate register IR2(2,1), the processor element PE(2,2), the second intermediate register IR2(2,3), the processor element PE(2,4) and the side register SR(2,5) to the side register SR(2,−1), the processor element PE(2,0), the second intermediate register IR2(2,1), the processor element PE(2,2), the second intermediate register IR2(2,3), and the processor element PE(2,4), respectively. Further, the pel values b(5,0), b(5,1), b(5,2), b(5,3), b(5,4) and b(5,5) are transmitted from the side register SR(4,−1), the processor element PE(4,0), the second intermediate register IR2(4,1), the processor element PE(4,2), the second intermediate register IR2(4,3), and the processor element PE(4,4) to the processor element PE(4,0), the second intermediate register IR2(4,1), the processor element PE(4,2), the second intermediate register IR2(4,3), the processor element PE(4,4) and the side register SR(4,5), respectively.

At the same time, the pel values a(1,0), a(1,1) and a(2,0) are transmitted from the flip-flops 140, 120 and 110 of the current block supplying unit 100 to flip-flops 150, 130 and 120 of the current block supplying unit 100, respectively, while the pel value a(2,1) is supplied from the data inputting means (not shown) to the flip-flop 110 of the current block supplying unit 100.

During the periods (k), (l), (m) and (n) each of which begins with a rising edge of the eleventh, twelfth, thirteenth and fourteenth pulse of the pulse signal CK1, respectively, and ends with a rising edge of the twelfth, thirteenth, fourteenth and fifteenth pulse of the pulse signal CK1, respectively, the calculations described below are performed at each of the processor elements PE(x,y).

During the period (k) as shown in FIG. 62, each of the pel values b(0,1), b(0,3), b(0,5), b(2,0), b(2,2), b(2,4), b(4,1), b(4,3) and b(4,5) are transmitted, as in the listed order herein, to the first data input terminal A of the subtracter 1030 of the corresponding processor elements PE(0,0), PE(0,2), PE(0,4), PE(2,0), PE(2,2), PE(2,4), PE(4,0), PE(4,2) and PE(4,4), respectively through the selector 1010 and the flip-flop 1020 of each of the processor elements. In other words, each of the processor elements PE(x,y) of the odd columns is operated to receive the pel values b(x,y+1), while each of the processor elements PE(x,y) of the even column is operated to receive the pel values b(x,y).

At the same time, each of the processor elements of the odd columns and of the even column is operated to receive the pel values a(0,1) and a(0,0) of the current block respectively through the second data input terminal B of the subtracter 1030 of each of the processor elements PE(x,y).

At each of the processor elements PE(x,y) of the odd columns and of the even column, the following subtraction is performed on the pel values by the subtracter 1030 respectively.

b(x,y+1)−a(0,1) at PE(x,y) of the odd columns
b(x,y)−a(0,0) at PE(x,y) of the even column The values calculated by the subtracter 1030 are then converted into positive values by the positive value transducer 1040 as follows.

|b(x,y+1)−a(0,1)| at PE(x,y) of the odd columns
|b(x,y)−a(0,0)| at PE(x,y) of the even column The positive values thus converted by the positive value transducer 1040 are then transmitted to the first data input terminal A of the adder 1050. While at the inverter 1090 of each of the processor elements, the pulse signal LD is received through the signal input terminal. The pulse signal LD representative of "1" is outputted during the period (j) prior to the period (k), and thus the signal representative "0" is transmitted from the signal output terminal of the inverter 1090. The signal outputted from the inverter 1090 is then transmitted to the signal input terminal A of the logical product element 1100, therefore the data representative of "0" is transmitted from the data output terminal Y regardless of the value received through the data input terminal B of the logical product element 1100. The data representative of "0" is then transmitted to the data input terminal B of the adder 1050 where the data received through the first data input terminal A and the data representative of "0" received through the second input terminal B are summed up, and the resulting value is transmitted to the flip-flop 1060 as follows.

|b(x,y+1)−a(0,1)| at PE(x,y) of the odd columns
|b(x,y)−a(0,0)| at PE(x,y) of the even column During the period (l), the subtracter 1030 of each of the processor elements PE(x,y) of the odd columns is operated to receive the pel value b(x,y) through the first data input terminal A transmitted either from the data output terminal of the adjacent upper second intermediate register IR2(x,y−1) shown in FIG. 37 or from the data output terminal of the side register SR(x,y−1), while receiving the pel value a(0,0) of the current block through the second data input terminal B. The subtracter 1030 of each of the processor elements PE(x,y) of the even column is operated to receive the pel value b(x,y+1) of the current block through the first data input terminal A transmitted either from the data output terminal of the adjacent lower second intermediate register IR2(x,y+1) or from the data output terminal of the side register SR(x,y+1), while receiving the pel value a(0,1) through the second data input terminal B.

At each of the processor elements PE(x,y) of the odd columns and of the even column, the following subtraction is performed on the pel values by the subtracter 1030 respectively.

b(x,y)−a(0,0) at PE(x,y) of the odd columns
b(x,y+1)−a(0,1) at PE(x,y) of the even column The resulting values are converted into positive values by the positive value transducer 1040 as follows.

|b(x,y)−a(0,0)| at PE(x,y) of the odd columns
|b(x,y+1)−a(0,1)| at PE(x,y) of the even column The positive values thus converted by the positive value transducer 1040 are then transmitted to the first data input terminal A of the adder 1050. The second data input terminal B of the adder 1050 is operated to receive the value calculated during the period (k) transmitted from the flip-flop 1060 through the logical product element 1100. At the adder 1050 the following calculation is performed.

|b(x,y+1)−a(0,1)|
+|b(x,y)−a(0,0)| at PE(x,y) of the odd columns
|b(x,y)−a(0,0)|
+|b(x,y+1)−a(0,1)| at PE(x,y) of the even column The resulting pel values are then transmitted to the flip-flop 1060.

During the period (m), the subtracter 1030 of each of the processor elements PE(x,y) of the odd columns is operated to receive the pel value b(x+1,y+1) through the first data input terminal A transmitted either from the data output terminal of the adjacent right first intermediate registers IR1(x+1,y) shown in FIG. 36, while receiving the pel value a(1,1) of the current block through the second data input terminal B. The subtracter 1030 of each of the processor elements PE(x,y) of the even column is operated to receive the pel value b(x+1,y) of the current block through the first data input terminal A transmitted from the data output terminal of the adjacent right first intermediate registers IR1(x+1,y), while receiving the pel value a(1,0) through the second data input terminal B.

At each of the processor elements PE(x,y) of the odd columns and of the even column, the following subtraction is performed on the pel values by the subtracter 1030 respectively.

b(x+1,y+1)−a(1,1) at PE(x,y) of the odd columns
b(x+1,y)−a(1,0) at PE(x,y) of the even column The resulting values are converted into positive values by the positive value transducer 1040 as follows.

|b(x+1,y+1)−a(1,1)| at PE(x,y) of the odd columns
|b(x+1,y)−a(1,0)| at PE(x,y) of the even column The positive values thus converted by the positive value transducer 1040 are then transmitted to the first data input terminal A of the adder 1050. The second data input terminal B of the adder 1050 is operated to receive the value calculated during the period (l) transmitted from the flip-flop 1060 through the logical product element 1100. At the adder 1050 the following calculation is performed.

|b(x,y+1)−a(0,1)|
+|b(x,y)−a(0,0)|
+|b(x+1,y+1)−a(1,1)| at PE(x,y) of the odd columns
|b(x,y)−a(0,0)|

+|b(x,y+1)–a(0,1)|
+|b(x+1,y–a(1,0) | at PE(x,y) of the even column
The resulting values are then transmitted to the flip-flop 1060.

During the period (n), the subtracter 1030 of each of the processor elements PE(x,y) of the odd columns is operated to receive the pel value b(x+1,y) through the first data input terminal A transmitted either from the data output terminal of the adjacent upper second intermediate register IR2(x,y–1) shown in FIG. 36 or from the data output terminal of the side register SR(x,y–1), while receiving the pel value a(1,0) of the current block through the second data input terminal B. The subtracter 1030 of each of the processor elements PE(x,y) of the even column is operated to receive the pel value b(x+1,y+1) of the current block through the first data input terminal A transmitted either from the data output terminal of the adjacent lower second intermediate register IR2(x,y+1) or from the data output terminal of the side register SR(x,y+1), while receiving the pel value a(1,1) through the second data input terminal B.

At each of the processor elements PE(x,y) of the odd columns and of the even column, the following subtraction is performed on the pel values by the subtracter 1030 respectively.

b(x+1,y–a(1,0) at PE(x,y) of the odd columns
b(x+1,y+1)–a(1,1) at PE(x,y) of the even column The resulting values are converted into positive values by the positive value transducer 1040 as follows.

|b(x+1,y–a(1,0)| at PE(x,y) of the odd columns
|b(x+1,y+1)–a(1,1)| at PE(x,y) of the even column The positive values thus converted by the positive value transducer 1040 are then transmitted to the first data input terminal A of the adder 1050. The second data input terminal B of the adder 1050 is operated to receive the value calculated during the period (m) transmitted from the flip-flop 1060 through the logical product element 1100. At the adder 1050 the following calculation is performed.

|b(x,y+1)–a(0,1)
+|b(x,y)–a(0,0)|
+|b(x+1,y+1)–a(1,1)|
+|b(x+1,y–a(1,0)| . . . (Q5) at PE(x,y) of the odd columns
|b(x,y)–a(0,0)|
+|b(x,y+1)–a(0,1)|
+|b(x+1,y–a(1,0)|
+|b(x+1,y+1)–a(1,1)| . . . (Q6) at PE(x,y) of the even column At the simultaneous timing of the pulse signal LD which is outputted during the period (n), the data output terminal Y of the second selector is latched to the data output terminal of the flip-flop 1060, and at the simultaneous timing of the 15th pulse of the pulse signal CK1, i.e., at the timing of the pulse cycle of the pulse signal CK2, the resulting value obtained from the adder 1050 in the process described above is outputted from each of the processor elements PE(x,y) through the output terminal DLo. For instance, the following value is outputted from the processor element PE(2,2) through the output terminal DLo.

|b(2,2)–a(0,0)|
+|b(2,3)–a(0,1)|
+|b(3,2)–a(1,0)|
+|b(3,3)–a(1,1)|

As will be understood from the equations (Q5) and (Q6) listed above, the difference between the equations (Q5) and (Q6) is order of the terms, and thus both equations are equivalent to each other. Consequently, the distortion value between each of the nine candidate blocks of the search window 60 and the current block 50 shown in FIG. 36 is thus calculated at each of the processor elements PE(x,y).

At the simultaneous timing of the fifteenth pulse of the pulse signal CK2, each distortion value thus calculated at each of the processor elements PE(0,0), PE(0,2) and PE(0,4) is transmitted from each of the processor elements through the output terminal DLo to the comparator 410 of the minimum distortion detecting unit 400 through the data input terminals A0, A1 and A2 respectively. At the same time, since the first data input terminal A is selected by the selector 1070 of each of the processor elements, the distortion value calculated at each of the processor elements PE(2,0), PE(2,2), PE(2,4), PE(4,0), PE(4,2) and PE(4,4) is transmitted from each of the processor elements PE(2,0), PE(2,2), PE(2,4), PE(4,0), PE(4,2), and PE(4,4) to the processor elements PE(0,0), PE(0,2), PE(0,4), PE(2,0), PE(2,2) and PE(2,4) respectively.

At the simultaneous timing of the sixteenth pulse of the pulse signal CK2, the distortion value thus calculated at each of the processor elements PE(2,0), PE(2,2) and PE(2,4) is transmitted from each of the processor elements PE(0,0), PE(0,2) and PE(0,4) to the comparator 410 of the minimum distortion detecting unit 400 through the data input terminals A0, A1 and A2 respectively.

Moreover, at the simultaneous timing of the seventeenth pulse of the pulse signal CK2, the distortion value thus calculated at each of the processor elements PE(4,0), PE(4,2) and PE(4,4) is transmitted from each of the processor elements PE(0,0), PE(0,2) and PE(0,4) to the comparator 410 of the minimum distortion detecting unit 400 through the data input terminals A0, A1 and A2 respectively.

The minimum distortion detecting unit 400 is operated to determine a minimum distortion value MinDis among the distortion values D(0,0), D(0,2), D(0,4), D(2,0), D(2,2), D(2,4), D(4,0), D(4,2) and D(4,4), and to calculate a motion vector MVx, MVy during the periods (o), (p), (q) and (r) similarly to the first embodiment.

Figure 66:
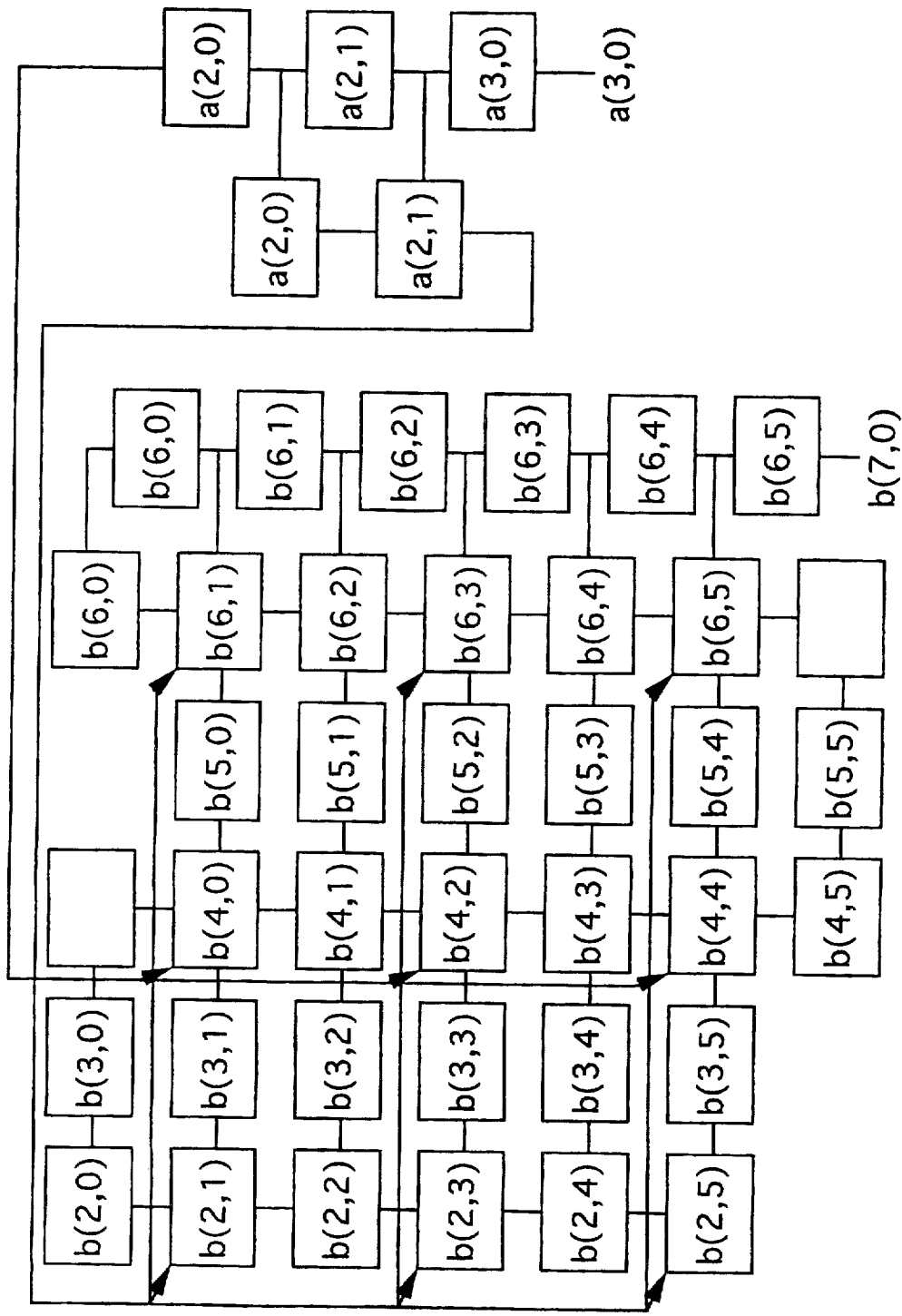

The distortion calculating unit 2000a is operated to start distortion calculation for the next current block at the simultaneous timing of the fifteenth pulse of the pulse signal CK1 as shown in FIG. 66, and the distortion calculation is repeated at the simultaneous timing of the sixteenth, seventeenth and eighteenth pulse of the pulse signal CK1. The minimum distortion detecting unit 400 is operated to determine a minimum distortion value MinDis among the received distortion values, and to calculate a motion vector MVx, MVy.

The motion vector MVx, MVy, and the minimum distortion value MinDis with respect to each of the current blocks are successively calculated in the calculation process described above without having duplicated pel values in the search window being transmitted.

Each of the distortion calculating units 2000a and 2000b may be designed to transmit the distortion values from the first row of the processor elements to the minimum distortion detecting unit 400 and to transmit the distortion values each being calculated by each of the processor elements of the third and fifth rows from each of the processor elements of the third and fifth rows to each of the processor elements of the first and third rows respectively, when each of the processor elements finish calculating the distortion values. The distortion calculating units 2000a and 2000b are further designed to repeatedly transmit the distortion vales until all of the distortion values transmit from the processor elements of the distortion calculating units 2000a and 2000b to the minimum distortion detecting unit 400. This result in the fact that the motion vector and the minimum distortion value with respect to each of the current blocks are successively calculated in the calculation process described above without having duplicated pel values being transmitted.

Figure 67:
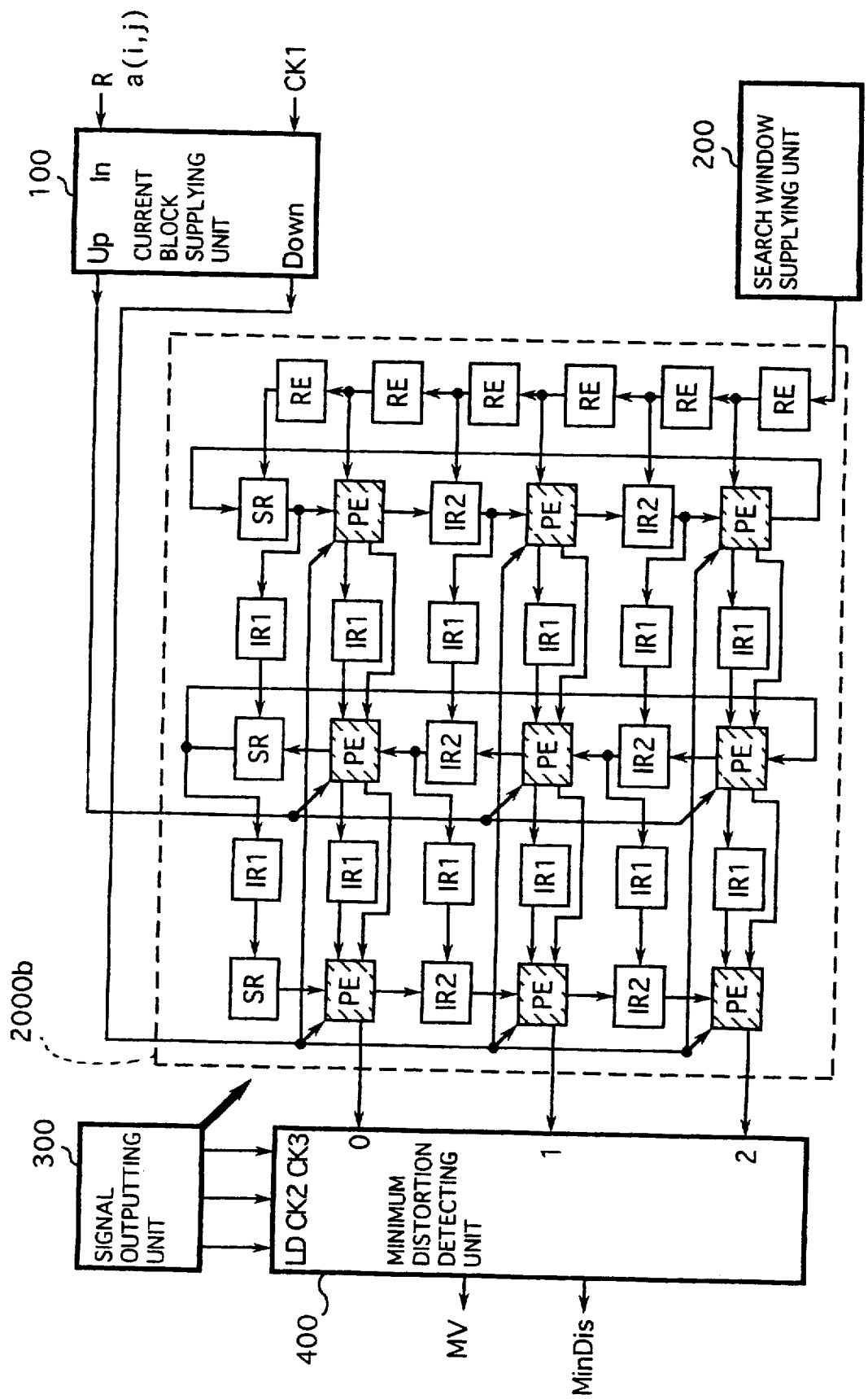
FIG. 67 is a block diagram showing the second embodiment of the motion estimation apparatus according to the present invention as comprising a distortion calculating unit 2000b.

FIG. 67 shows another embodiment of the motion estimation apparatus according to the present invention in which the side register units, which are separately disposed at the top and bottom sides of the same column in the embodiment shown in FIG. 36, are incorporated in one register unit with data transmission being controlled by a selector. More specifically, the side registers SR(2,-1) and SR(2,5) of the third column in the embodiment shown in FIG. 36 are replaced by the side register SR(2,-1) whose construction is shown in FIGS. 32(b) and 33(b), and the side registers SR(4,-1) and SR(4,5) of the fifth column in the embodiment shown in FIG. 36 are replaced by the side register SR(4,-1) whose construction is shown in FIGS. 32(b) and 33(b), and the intermediate register IR1(3,5) is replaced by the intermediate register IR1(3,-1).

Figure 68:
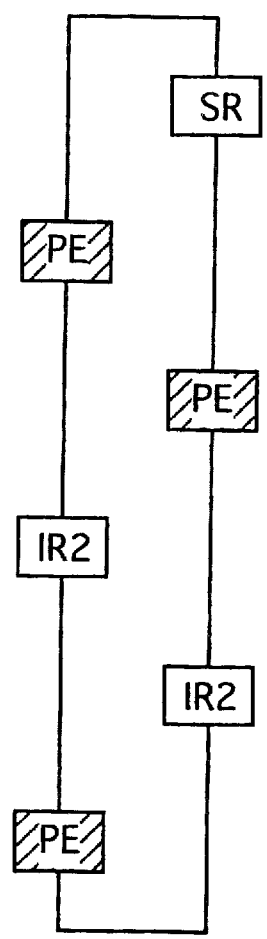
FIG. 68 is a diagram showing one of columns of a matrix elements of the distortion calculating unit electrically connected in a ring-style.

Constructing a circuit in such a manner that a column holding the side registers SR(2,-1) and SR(4,-1) is placed in a ring-style as shown in FIG. 68 makes it possible to shorten transmission busses, and to lessen the differences among the length of the transmission busses.

Figure 69:
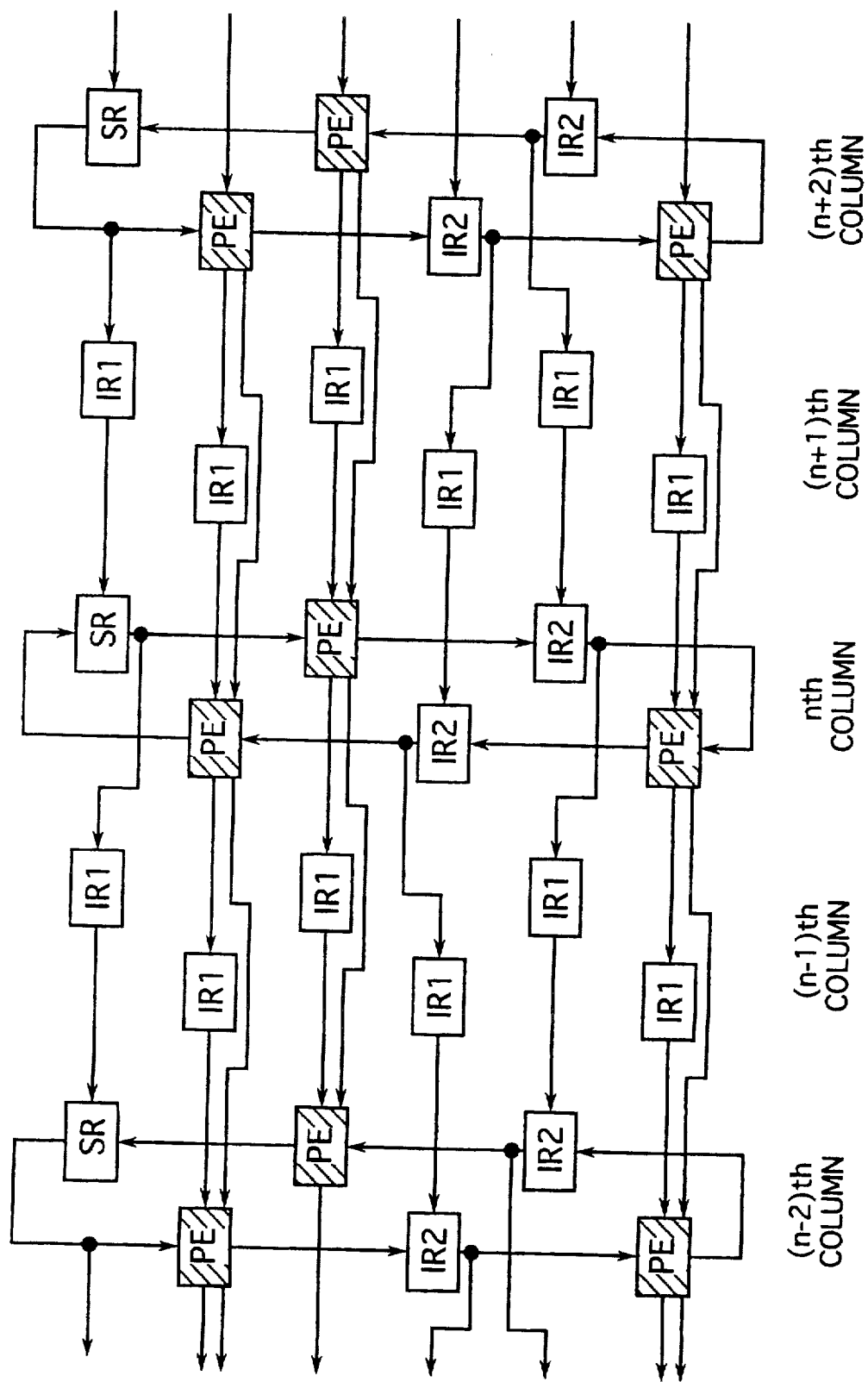
FIG. 69 is a diagram showing the matrix elements of the distortion calculating unit electrically connected in a ring-style.

FIG. 69 is a diagram showing a ring-style disposition described above in which connections among the columns are illustrated.

From the foregoing description along with FIGS. 36 through 70, it will be appreciated that the second embodiment of motion estimation method and apparatus according to the present invention brings numerous advantage described below.

The motion estimation apparatus shown in FIG. 36 comprises a distortion calculating unit 2000a or an additional motion estimation apparatus shown in FIG. 67 comprises a distortion calculating unit 2000b. Each of the distortion calculating units 2000a and 2000b comprises a plurality of processor elements PE is designed to parallel shifting the pel values of the search window 60 between each of the processor elements and another processor element vertically adjoining the processor element toward only one predetermined side. This means that each of the processor elements is electrically connected to the vertically adjoining processor element by only one bus for transferring the pel values between each of the processor elements and the vertically adjoining processor element. This result in the fact that the first embodiment has an advantage over prior-art apparatus in reducing the number of the buses for transferring the pel values of the search window 60 between each of the processor elements.

As shown in FIG. 36 and described hereinbefore, the motion estimation apparatus further comprises a minimum distortion detecting unit 400. After the distortion calculating unit 2000a or 2000b finishes calculating the distortion values, all of the distortion values calculated by the processor elements are transmitted from the processor elements to the minimum distortion detecting unit 400. This result in the fact that the distortion calculating unit 2000a or 2000b is unnecessary to store the distortion values.

As shown in FIGS. 60 through 66 and described hereinbefore, the current block supplying unit 100 carries out, in ascending order of column number, operations by each of which the pel vales of each column of the current block 50 are supplied one by one in ascending order of row number to the processor elements of the even columns, and carries out, in ascending order of column number, operations by each of which the pel values of the current block 50 are supplied one by one in descending order of row number to the processor elements of the odd columns. This result in the fact that the second embodiment has an advantage over prior-art apparatus in instructing each of the processor elements to calculate each of the distortion values on the basis of the pel values of the current block 50 and the pel values of each of the candidate blocks 60a of the search window 60.

As shown in FIG. 7 and described hereinbefore, the current block supplying unit 100 comprises flip-flops 110, 120, 130, 140 and 150 and a selector 160. The current block supplying unit 100 is designed to supply the processor elements of the even columns with the pel values of the current block 50 one by one in ascending order of row number while to supply the processor elements of the odd columns with the pel values of the current block 50 one by one in descending order of row number. This result in the fact that the second embodiment has an advantage over prior-art apparatus in easily forming the circuit of the current block supplying unit 100 from the flip-flops 110, 120, 130, 140 and 150 and the selector 160 for supplying the processor elements of the odd columns with the pel values of the current block 50 one by one in ascending order of row number and supplying the processor elements of the even columns with the pel values of the current block 50 one by one in descending order of row number.

As shown in FIGS. 36 through 70 and described hereinbefore, the distortion calculating unit 2000a or 2000b comprises an input register group including H input registers RE. And the flip-flops of the input registers are parallel connected to the processor elements of the (L-M+1)th column, the second intermediate registers IR2 of the (L-M+1)th column and the side registers of the (L-M+1)th column for transmitting the pel values of each column of the search window 60 to the processor elements of the (L-M+1)th row, the second intermediate registers IR2 of the (L-M+1)th column and the side registers of the (L-M+1)th column, respectively.

This result in the fact that the second embodiment has an advantage over prior-art apparatus in making it possible to supply the processor elements PE and the second intermediate registers IR2 of the distortion calculating unit 2000a and 2000b with the pel values of each of the candidate blocks 60a of the search window 60 for instructing each of the processor elements to calculate the distortion values, only resulting from inputting the pel values of each column of the search window 60 in ascending order of row number into the input register group of the distortion calculating unit 2000a or 2000b from the search window supplying unit 200.

As shown in FIGS. 36 through 70 and described hereinbefore, each of the input registers of the distortion calculating unit 2000a or 2000b comprises a flip-flop. The flip-flops of the input registers RE are electrically connected in series with each other. The pel values of the search window 60 received by the flip-flops of the input register group are parallel transmitted to the processor elements of the (L-M+1)th column, the second intermediate registers IR2 of the (L-M+1)th column and the side register unit of the (L-M+1)th column.

The input register group of the distortion calculating unit 2000a or 2000b comprises more input registers RE than that of the present embodiment, thereby making it possible to receive the more pel values of the search window 60 than that of the present embodiment. This means that the processor elements PE can calculate the distortion values on the basis of each of the candidate blocks 60a and the current block 50 each being the larger size than that of the present embodiment.

FIGS. 70 through 96 shows a third preferred embodiment of the motion estimation apparatus according to the present invention. The motion estimation apparatus herein shown comprises constitutional units and elements same as and different from those of the first and second preferred embodiments of the motion estimation apparatus which have been described in detail in the above. Only the constitutional units and elements of the third preferred embodiment different from those of the first and second preferred embodiments will be described hereinafter in detail while the constitutional units and elements of the third preferred embodiment same as those of the first or second preferred embodiment will not be described hereinafter but respectively bears reference numerals same as those of the constitutional units and elements of the first and second preferred embodiments. In this embodiment, a motion vector is searched using a search window which is selected from a plurality of search windows.

As shown in FIG. 70, the motion estimation apparatus consists of a current block supplying unit 100, a search window supplying unit 200, a distortion calculating unit 3000a, a minimum distortion detecting unit 400, a signal outputting unit 330, and an operation mode selecting unit 600, and is designed to estimate a motion vector for a current block 50 partially forming a current picture Pa shown in FIG. 72(a), on the basis of the reference picture Pb shown in FIG. 72(b) which is encoded prior to the current picture Pa.

The current block supplying unit 100, similar to each of those of the first and second embodiments, is designed to transmit pel values of the current block 50 of the current picture Pa to the distortion calculating unit 3000a.

The search window supplying unit 200 is designed to specify a first search window 60, an area of the reference picture Pb which may contain a plurality of the candidate blocks 60a similar to the current block 50, and to select a candidate block 60a among each of the candidate blocks of the first search window 60, and to supply each pel value of the candidate block 60a to the distortion calculating unit 3000a. In another case, the search window supplying unit 200 is operated to specify a second search window 70, an area of the reference picture Pb which is described above, and to select a candidate block 70a among each of the candidate blocks of the first search window 70, and to supply each pel value of the candidate block 70a to the distortion calculating unit 3000a.

Both of the first search window 60 and the second search window 70 may be any size of the windows but must be larger than the current block 50. The third embodiment being described hereinlater uses the first search window 60 of the size consisting of 6×6 pels, the same size of the search window as that of the second embodiment, and the second search window 70 of the size consisting of 4×4 pels, the same size of the search window as that of the first embodiment.

The distortion calculating unit 3000a is designed to calculate distortion values between the current block 50 of the current picture Pa and either of the respective candidate blocks 60a of the first search window 60 or the respective candidate blocks 70a of the second search window 70 of the reference picture Pb. The distortion calculating unit 3000a calculates distortions through the steps of calculating a difference between a pel value of the current block 50 and a pel value either of the candidate block 60a of the search window 60 or of the candidate block 70a of the search window 70 with each pair of pels corresponding in position to each other, taking an absolute value of the difference value to obtain a local distortion value at each pair of pels, and summing up the local distortion values to obtain a distortion value for either of the candidate blocks 60a or 70a. This calculation process is repeated for every candidate blocks 60a or 70a.

The minimum distortion detecting unit 400 is designed to determine a minimum distortion value among the distortion values calculated by the distortion calculating unit 3000a, and to calculate a motion vector based on the position of either of the candidate block 60a of the search window 60 or the candidate block 70a of the search window 70 which is determined to have the minimum distortion value.

The signal outputting unit 330 is designed to control operations of the current block supplying unit 100, the search window supplying unit 200, the distortion calculating unit 3000a, and the minimum distortion detecting unit 400.

The operation mode selecting unit 600 is designed to control operations of the search window supplying, unit 200, the distortion calculating unit 3000a, and the signal outputting unit 330, and to determine a search window to be used to calculate a motion vector either from the first search window 60 or from the second search window 70.

As shown in FIGS. 70(a) and 70(b), the operation mode selecting unit 600 is operated to select one of the first and second operation modes. As shown in FIG. 70(a), all of the columns and rows of the matrix array are counted as columns and rows of a matrix array for the first search window when the first operation mode is selected. As shown in FIG. 70(b), part of the columns and the rows of the matrix array includes at least one processor element are counted as columns and rows of a matrix array for the second search window when the second operation mode is selected.

Figure 73:
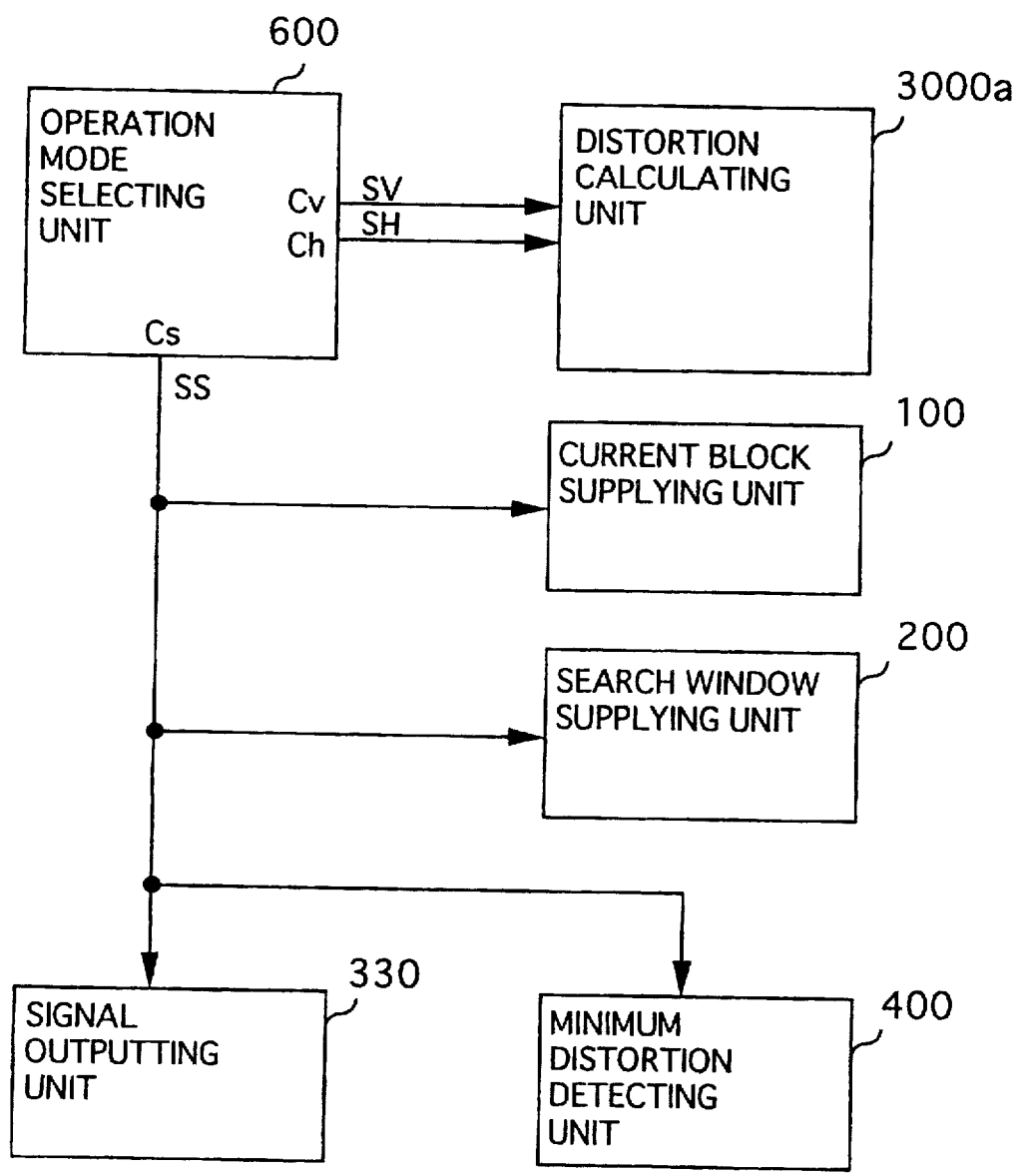
FIG. 73 is a block diagram showing a signal outputting unit and showing signals supplied from the signal outputting unit to the current block supplying unit, the search window supplying unit, the distortion calculating unit and minimum distortion detecting unit.

As shown in FIG. 73, the operation mode selecting unit 600 has signal output terminals Cv, Ch and Cs. Each signal outputted from each of the signal output terminals is used to control operations of the distortion calculating unit 3000a, the search window supplying unit 200, the signal outputting unit 330 and the minimum distortion detecting unit 400, and is outputted to each of the units listed herein.

The signal outputting unit 330 has a first through seventh signal output terminals, denoted by P1 through P7 respectively. Each signal outputted from each of the signal output terminals P1 through P7 is used to control operations of the current block supplying unit 100, the search window supplying unit 200, the distortion calculating unit 3000a, and the minimum distortion detecting unit 400, and is outputted to each of the units listed herein.

When the first operation mode is selected by the operation mode selecting unit 600, the same signals as those of the second embodiment are outputted through the signal output terminals P1 to P7 of the signal outputting unit 330, when the second operation mode is selected by the operation mode selecting unit 600, the same signals as those of the first embodiment are outputted through the signal output terminals P1– P7 of the signal out putting unit 330.

Figure 74:
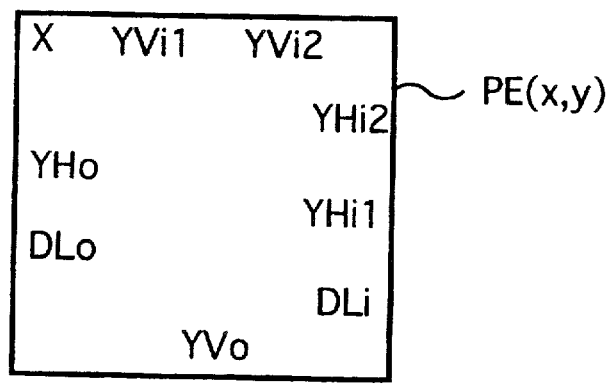
FIG. 74 is a plan view showing each of processor elements shown in FIG. 70.
Figure 74:
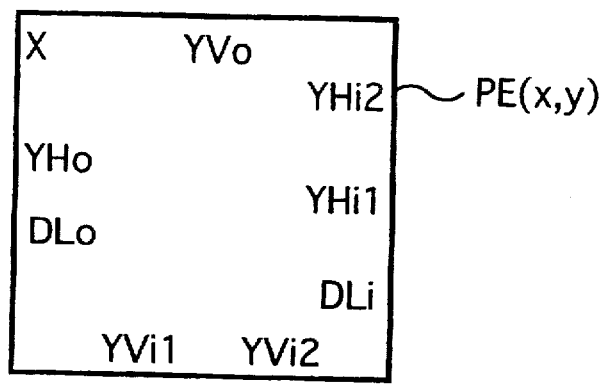

FIG. 74(a) shows input and output terminals of the processor elements of the first and fifth columns, and FIG. 74(b) shows input and output terminals of the processor elements of the third column. As shown in FIG. 74, each of the processor elements PE(x,y) has input terminals X, YHi1, YHi2, DLi, YVi1 and YVi2, the output terminal YVo, DLo and YHo, and input terminals (not shown) each of which is connected to each of the output terminals of the signal outputting unit 330. In addition, the input terminals YVi1 and YVi2 disposed at the top of the processor elements of the first and fifth columns are disposed at the bottom of the processor elements of the third columns, and the output terminals YVo disposed at the bottom of the processor elements of the first and fifth columns are disposed at the top of the processor elements of the third columns.

Figure 75:
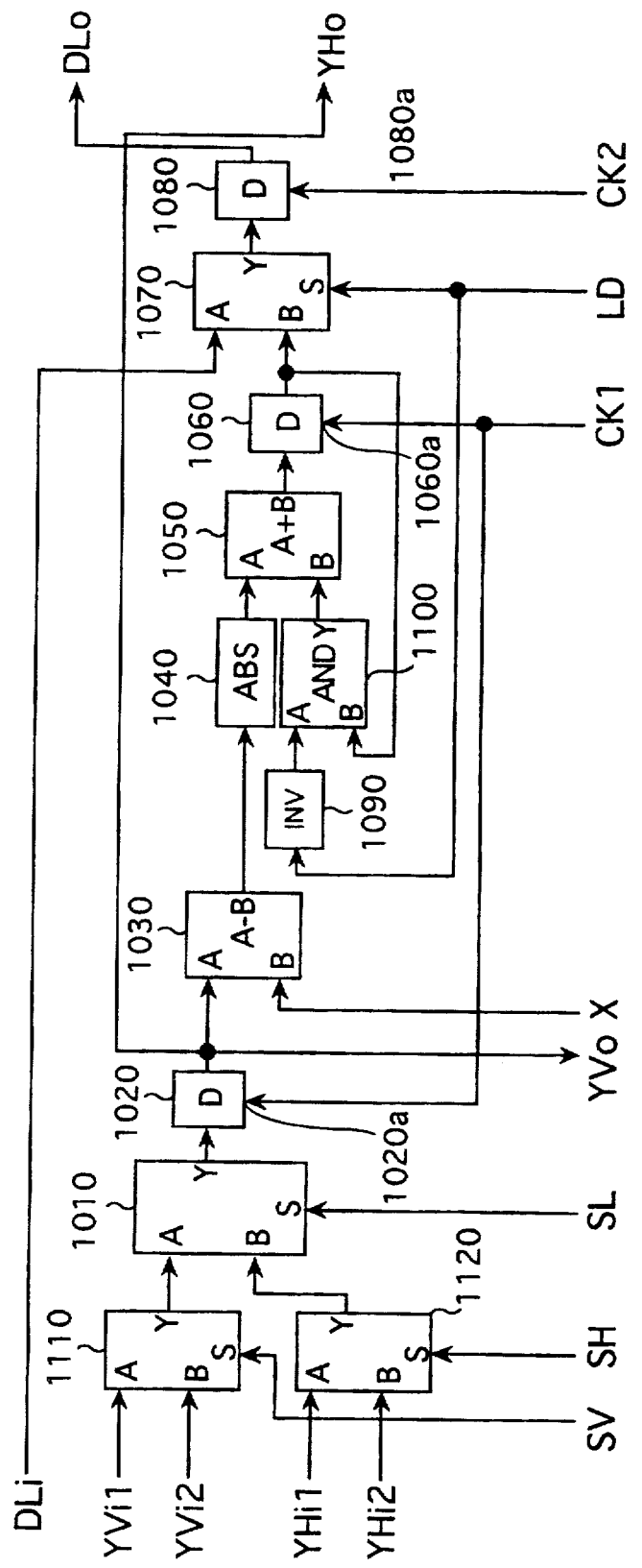
FIG. 75 is a block diagram showing a circuit of each of the processor elements shown in FIG. 74.
Figure 76:
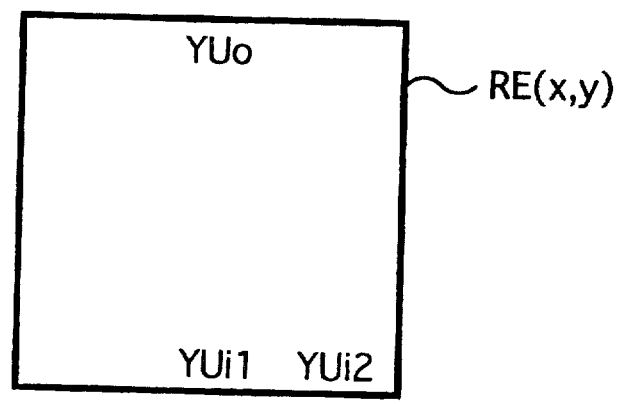
FIG. 76(a) is a plan view showing an input register shown in FIG. 70.
FIG. 76(b) is a block diagram showing the input register shown in FIG. 76(b)
Figure 76:
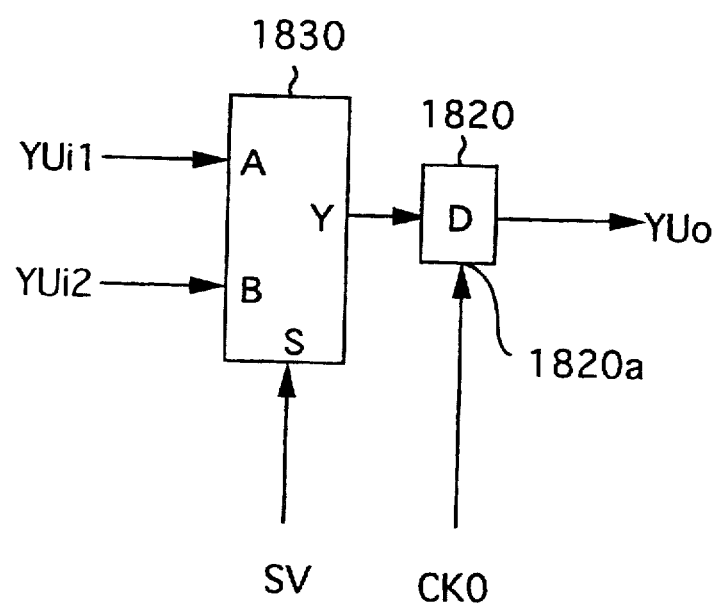

FIG. 75 shows a specific construction of each of the processor elements.

As shown in FIG. 75, the processor element PE(x,y) comprises a vertical skip selector 1110, a horizontal skip selector 1120, a selector 1010, a flip-flop 1020, a subtracter 1030, a positive value transducer 1040, an inverter 1090, a logical product element 1100, an adder 1050, a flip-flop 1060, a selector 1070, and a flip-flop 1080.

The top processor element of the first column PE(0,0), the bottom processor element of the third column PE(2,4), the top processor element of the fifth column PE(4,0) do not comprise a vertical skip selector 1110, and thus have an input terminal YVi in place of the input terminals YVi1 and YVi2. The processor elements, PE(4,0), PE(4,2), PE(4,4) do not comprise a horizontal skip selector 1120, and thus have an input terminal YHi in place of the input terminals YHi1 and YHi2.

The vertical skip selector 1110 has a first data input terminal A, a second data input terminal B, a signal input terminal S and a data output terminal Y, and is designed to output data in the first data input terminal A through the data output terminal Y when the signal representative of "0" is received through the signal input terminal S, and to output data in the second data input terminal B through the data output terminal Y when the signal representative of "1" is received through the signal input terminal S.

The horizontal skip selector 1120 has a first data input terminal A, a second data input terminal B, a signal input terminal S, and a data output terminal Y, and is designed to output data in the first data input terminal A through the data output terminal Y when the signal representative of "0" is received through the signal input terminal S, and to output data in the second data input terminal B through the data output terminal Y when the signal representative of "1" is received through the signal input terminal S.

Each of the selector 1010, the flip-flop 1020, the subtracter 1030, the positive value transducer 1040, the inverter 1090, the logical product element 1100, the adder 1050, the flip-flop 1060, the selector 1070, and the flip-flop 1080 is operated in a similar manner to the first and second embodiments.

The first data input terminal A of the vertical skip selector 1110 of each of the processor elements PE (x,y) of the first and fifth columns is electrically connected to the data output terminal of the second intermediate register IR2(x,y−1) through the input terminal YVi1, while the first data input terminal A of the vertical skip selector 1110 of each of the processor elements PE (x,y) of the third column is electrically connected to the data output terminal of the second intermediate register IR2(x,y+1) through the input terminal YVi1. The second data input terminal B of the vertical skip selector 1110 of each of the processor elements PE (x,y) of the first and fifth columns is electrically connected to the data output terminal of the flip-flop 1020 of another processor element PE(x, Y−2) through the input terminal YVi2, while the second data input terminal B of the vertical skip selector 1110 of each of the processor elements PE (x,y) of the third columns is electrically connected to the data output terminal of the flip-flop 1020 of another processor element PE(x, y+2) through the input terminal YVi2.

The signal input terminal S of the vertical skip selector 1110 of each of the processor elements PE (x,y) is electrically connected to the signal output terminal Cv of the operation mode selecting unit 600.

The first data input terminal A of the horizontal skip selector 1120 of each of the processor elements PE (x,y) is electrically connected to the data output terminal of the first intermediate register IR1(x+1,y) through the input terminal YHi1, while the second data input terminal B of the horizontal skip selector 1120 is electrically connected to the data output terminal of the flip-flop 1020 of another processor element PE(x+2,y) through the input terminal YHi2.

The signal input terminal S of the horizontal skip selector 1120 of each of the processor elements PE (x,y) is electrically connected to the signal output terminal Cv of the operation mode selecting unit 600.

The first data input terminal A of the selector 1010 of each of the processor elements PE (x,y) is electrically connected to the data output terminal Y of the vertical skip selector 1110 of the present processor element (x,y), and the top processor elements of the first and fifth columns which do not have a vertical skip selector 1110, PE(0,0) and PE(4,0), are electrically connected to the output terminal of the side register SR(x,y−1) through the input terminal YVi, while the bottom processor element of the third column which does not have a vertical skip selector 1110, PE(2,4), is electrically connected to the output terminal of the side register SR(x, y+1) through the input terminal YVi.

The second data input terminal B of the selector 1010 is electrically connected to the data output terminal Y of the horizontal skip selector 1120 of the present processor element PE(x,y), and all the processor elements of the fifth columns which do not have a horizontal skip selector 1120, PE(4,0), PE(4,2) and PE(4,4) are electrically connected to the output terminal of the input register RE(x+1,y) through the input terminal YHi.

Each of the registers is connected in a similar manner to the second embodiment, therefore only the different portion from the second embodiment is described hereinlater.

As shown in FIG. 76(a), the input registers RE(5,2) and RE(5,0) of the distortion calculating unit 3000a have data input terminals YUi1 and YUi2, a data output terminal YUo, and input terminals (not shown) each of which is connected to each of the signal output terminals of the signal outputting unit 330, and comprises a selector 1830 and a flip-flop 1820 as shown in FIG. 76(b).

The selector 1830 has a first data input terminal A, a second data input terminal B, a signal input terminal S, and a data output terminal Y, and is designed to output data in the first data input terminal A through the data output terminal Y when the signal representative of "0" is received through the signal input terminal S, and to output data in the second data input terminal B through the data output terminal Y when the signal representative of "1" is received through the signal input terminal S.

The flip-flop 1820 comprises a D flip-flop having a data input terminal, a signal input terminal 1820a, and a data output terminal, and is designed to latch data in the data input terminal up to the data output terminal at the simultaneous timing of the pulse cycle of the signal received through the signal input terminal 1820a.

The first data input terminal A of the selector 1830 of the input registers RE(5,2) and RE(5,0) of the distortion calculating unit 3000a is electrically connected to the data output terminal of another input register RE(x,y+1) through the input terminal YUi1, while the second data input terminal B of the selector 1830 is electrically connected to the data output terminal of another input register RE(x,y+2) through the input terminal YUi2, and the signal input terminal S of the selector 1830 is electrically connected to the signal output terminal Cv of the operation mode selecting unit 600.

The data input terminal of the flip-flop 1820 of the input registers RE(5,2) and RE(5,0) is electrically connected to the data output terminal Y of the selector 1830 of the present input register RE(x,y), while the signal input terminal 1820a of the flip-flop 1820 is electrically connected to the first signal output terminal P1 of the signal outputting unit 330.

The side register SR(0,−1) of the distortion calculating unit 3000a has a data input terminals YLi1 and YLi2, and a data output terminal YDo as shown in FIG. 77(a). The side register SR(2,5) has data input terminals YLi1 and YLi2, and a data output terminal YUo as shown in FIG. 77(b). Both of the side registers SR(x,y) have input terminals (not shown) each of which is electrically connected to each of the signal output terminals of the signal outputting unit 330. Each of the side registers SR(x,y) comprises a selector 1630 and a flip-flop 1620 as shown in FIGS. 78(a) and 78(b).

The selector 1630 has a first data input terminal A, a second data input terminal B, a signal input terminal S, and a data output terminal Y, and is designed to output data in the first data input terminal A through the data output terminal Y when the signal representative of "0" is received through the signal input terminal S, and to output data in the second data input terminal B through the data output terminal Y when the signal representative of "1" is received through the signal input terminal S.

The flip-flop 1620 comprises a D flip-flop having a data input terminal, a signal input terminal 1620a, and a data output terminal, and is designed to latch current data in the data input terminal up to the data output terminal at the simultaneous timing of the pulse cycle of the signal received through the signal input terminal 1620a.

The first data input terminal A of the selector 1630 of the side registers SR(2,5) and SR(0,−1) of the distortion calculating unit 3000a is electrically connected to the data output terminal of intermediate registers IR1(3,5) and IR1(1,−1) respectively, and the second data input terminal B of the selector 1630 of the side registers SR(2,5) and SR(0,−1) of the distortion calculating unit 3000a is electrically connected to the data output terminal of the side registers SR(4,5) and SR(2,−1) respectively, and the signal input terminal S of the selector 1630 is electrically connected to the signal output terminal Ch of the operation mode selecting unit 600. The data input terminal of the flip-flop 1620 of the side registers SR(2,5) and SR(0,−1) is electrically connected to the data output terminal Y of the selector 1630 of the present side register SR(x,y), and the signal input terminal is electrically connected to the second signal output terminal P2 of the signal outputting unit 330.

The operation is described hereinlater.

In the present embodiment, when the first operation mode is selected by the operation mode selecting unit 600, the vertical skip selector of each of the processor elements and registers of the distortion calculating unit 3000a is operated to select a first input terminal A, and the horizontal skip selector of each of the processor elements and registers is also operated to select a first input terminal A. The mode thus selected by the operation mode selecting unit 600 is not changed during the calculation process of a distortion value.

Similarly, when the second operation mode is selected by the operation mode selecting unit 600, the vertical skip selector of each of the processor elements and registers of the distortion calculating unit 3000a is operated to select a second input terminal B, and the horizontal skip selector of each of the processor elements and registers is also operated to select a second input terminal B. The mode thus selected by the operation mode selecting unit 600 is not changed during the calculation process of a distortion value. In the description below, the operation of the vertical skip selector 1110 and the horizontal skip selector 1120 is not mentioned as far as the operation mode is not changed.

In addition, the motion estimation apparatus of the present embodiment is operated similarly to the second embodiment when the first operation mode is selected by the operation mode selecting unit 600.

FIG. 79 is a diagram showing another construction of side registers of a distortion calculating unit 3000b of the motion estimation apparatus according to the present invention.

In the embodiments shown in FIG. 79, the side register units, which are separately disposed at the top and bottom of the same column in the embodiment shown in FIG. 70, are incorporated into one register unit with data transmission being controlled by a selector. More specifically, the side registers SR(2,−1) and SR(2,5) of the third column are replaced by the side register SR(2,−1) whose construction is shown in FIGS. 80(a) and 80(a), and the side registers SR(4,−1) and SR(4,5) of the fifth column are replaced by the side register SR(4,−1) whose construction is shown in FIGS. 32(b) and 33(b), and the intermediate register IR1(3,5) is replaced by the intermediate register IR1(3,−1). This result in the fact that the third embodiment has an advantage over prior-art apparatus in reducing the number of the side registers for transferring the pel values of the search window 60 or 70 to partly form the distortion calculation unit 3000b easily from the first side register group. Also, if the processor elements and the side registers are electrically connected in series with each other forming the ring, the buses between each of the elements of the distortion calculation unit 3000b for transferring the pel values of the search window 60 or 70 can be short and the distance between each of the elements of the distortion calculation unit 3000b can be constant. This means that the operation time for transferring the pel values between each of the elements can be constant.

FIG. 80(a) shows an input and output terminal disposition of the side register SR(x,y), and FIG. 80(b) is a diagram showing specific circuit construction of the side register SR(x,y).

FIGS. 80(a) and 80(b) show construction of the side register SR(x,y) of the third column which has input terminals YUi, YLi1 and YLi2, and an output terminal YUo, and comprises a horizontal skip selector 3623, a selector 3621, and a flip-flop 3622.

The construction of the side register SR(x,y) of the fifth column is same as that of the side register shown in FIGS. 32(b) and 33(b).

The horizontal skip selector 3623 of the side register SR(x,y) has a first data input terminal A, a second data input terminal B, a signal input terminal S, and a data output terminal Y, and is designed to output data in the first data input terminal A through the data output terminal Y when the signal representative of "0" is received through the signal input terminal S, and to output data in the second data input terminal B through the data output terminal Y when the signal representative of "1" is received through the signal input terminal S.

The selector 3621 of the side register SR(x,y) has a first data input terminal A, a second data input terminal B, a signal input terminal S, and a data output terminal Y, and is designed to output data in the first data input terminal A through the data output terminal Y when the signal representative of "0" is received through the signal input terminal S, and to output data in the second data input terminal B through the data output terminal Y when the signal representative of "1" is received through the signal input terminal S.

The flip-flop 3622 of the side register SR(x,y) comprises a D flip-flop having a data input terminal, a signal input terminal 3622a, and a data output terminal, and is designed to latch current data in the data input terminal up to the data output terminal at the simultaneous timing of the pulse cycle of the signal received through the signal input terminal 3622a.

The first data input terminal A of the horizontal skip selector 3623 of the side register SR(2,-1) is electrically connected to the data output terminal of the intermediate register IR1(3,-1) through the input terminal YLi1, while the second data input terminal B of the horizontal skip selector 3623 is electrically connected to the data output terminal of the flip-flop 3622 of another side register SR(4,-1) through the input terminal YLi2.

The signal input terminal S of the horizontal skip selector 3623 of the side register SR(2,-1) is electrically connected to the signal output terminal Ch of the operation mode selecting unit 600.

The first data input terminal A of the selector 3621 of the side register SR(2,-1) is electrically connected to the output terminal of the flip-flop 1020 of the processor element PE(2,0) through the input terminal YUi, while the second data input terminal B of the selector 3621 is electrically connected to the data output terminal Y of the horizontal skip selector 3623 of the present the side register SR(2,-1).

The first data input terminal A of the selector 3621 of the side register SR(4,-1) is electrically connected to the output terminal of the flip-flop 1020 of the processor element PE(4,5) through the input terminal YDi, while the second data input terminal B of the selector 3621 is electrically connected to the data output terminal of the input register RE(5,-1).

The signal input terminal S of the selector 3621 of the side register SR(x,y) is electrically connected to the fourth signal output terminal P4 of the signal outputting unit 330.

The data input terminal of the flip-flop 3622 of the side register SR(x,y) is electrically connected to the data output terminal Y of the selector 3621 of the present side register SR(x,y), while the signal input terminal 3622a of the flip-flop 3622 is electrically connected to the second signal output terminal P2 of the signal outputting unit 330.

The intermediate register IR1(3,-1) is same as the intermediate register IR1 of the embodiment shown in FIG. 70, and the input terminal of the intermediate register IR1(3,-1) is electrically connected to the data output terminal of the flip-flop 3622 of the side register SR(4,-1).

At the simultaneous timing of the third pulse of the pulse signal CK1, the pel values c(0,0), c(0,1), c(0,2), c(0,3), c(0,4) and c(0,5) are transmitted from the input registers RE(5,-1), RE(5,0), RE(5,1), RE(5,2), RE;(5,3) and RE(5,4) to the side register SR(4,-1), the processor element PE(4,0), the second intermediate register IR2(4,1), the processor element PE(4,2), the second intermediate register IR2(4,3), and the processor element PE(4,4), respectively.

At the simultaneous timing of the fourth pulse of the pulse signal CK1, the pel values c(0,0), c(0,1), c(0,2), c(0,3) and c(0,4) are transmitted from the side register SR(4,-1), the processor element PE(4,0), the second intermediate register IR2(4,1), the processor element PE(4,2), and the second intermediate register IR2(4,3) to the processor element PE(4,0), the second intermediate register IR2(4,1), the processor element PE(4,2), the second intermediate register IR2(4,3) and the processor element PE(4,4), respectively, while the pel value c(0,5) is supplied from the processor element PE(4,4) to the side register SR(4,-1).

At the simultaneous timing of the fifth pulse of the pulse signal CK1, the pel values c(0,5), c(0,0), c(0,1), c(0,2), c(0,3) and c(0,4) are transmitted from the side registers SR(4,-1), the processor element PE(4,0), the second intermediate register IR2(4,1), the processor element PE(4,2), the second intermediate register IR2(4,3), and the processor element PE(4,4) to the first intermediate registers IR1(3,-1), IR1(3,0), IR1(3,1), IR1(3,2), IR1(3,3) and IR1(3,4), respectively, while the pel values c(1,0), c(1,1), c(1,2), c(1,3), c(1,4) and c(1,5) are transmitted from the input registers RE(5,-1), RE(5,0), RE(5,1), RE(5,2), RE(5,3) and RE(5,4) to the side register SR(4,-1), the processor element PE(4,0), the second intermediate register IR2(4,1), the processor element PE(4,2), the second intermediate register IR2(4,3), and the processor element PE(4,4), respectively.

At the simultaneous timing of the sixth pulse of the pulse signal CK1, the pel values c(1,0), c(1,1), c(1,2), c(1,3) and c(1,4) are transmitted from the side register SR(4,-1), the processor element PE(4,0), the second intermediate register IR2(4,1), the processor element PE(4,2), and the second intermediate register IR2(4,3) to the processor element PE(4,0), the second intermediate register IR2(4,1), the processor element PE(4,2), the second intermediate register IR2(4,3), and the processor element PE(4,4), respectively, while the pel value c(1,5) is supplied from the processor element PE(4,4) to the side register SR(4,-1).

At the simultaneous timing of the seventh pulse of the pulse signal CK1, the pel values c(0,5), c(0,0), c(0,1), c(0,2), c(0,3) and c(0,4) are transmitted from the first intermediate registers IR1(3,-1), IR1(3,0), IR1(3,1), IR1(3,2), IR1(3,3) and IR1(3,4) to the side registers SR(2,-1), the processor element PE(2,0), the second intermediate register IR2(2,1), the processor element PE(2,2), the second intermediate register IR2(2,3), and the processor element PE(2,4), respectively, while the pel values c(1,5), c(1,0), c(1,1), c(1,2), c(1,3) and c(1,4) are transmitted from the side register SR(4,-1), the processor element PE(4,0), the second intermediate register IR2(4,1), the processor element PE(4, 2), the second intermediate register IR2(4,3), and the processor element PE(4,4) to the first intermediate registers IR1(3,-1), IR1(3,0), IR1(3,1), IR1(3,2), IR1(3,3) and IR1(3,4), respectively. Moreover, th, pel values c(2,0), c(2,1), c(2,2), c(2,3), c(2,4) and c(2,5) are transmitted from the input registers RE(5,-1), RE(5,0), RE(5,1), RE(5,2), RE(5,3) and RE(5,4) to the side register SR(4,-1), the processor element PE(4,0), the second intermediate register IR2(4,1), the processor element PE(4,2), the second intermediate register IR2(4,3), and the processor element PE(4,4), respectively.

At the simultaneous timing of the eighth pulse of the pulse signal CK1, the pel values c(0,0), c(0,1), c(0,2), c(0,3) and c(0,4) are transmitted from the processor element PE(2,0), the second intermediate register IR2(2,1), the processor element PE(2,2), the second intermediate register IR2(2,3), and the processor element PE(2,4) to the second intermediate register IR2(2,1), the processor element PE(2,2), the second intermediate register IR2(2,3), the processor element PE(2,4) and the side register SR(2,-1) respectively, while the pel value c(0,5) is transmitted from the side register SR(2,-1) to the processor element PE(2,0). Moreover, the pel values c(2,0), c(2,1), c(2,2), c(2,3) and c(2,4) are transmitted from the side register SR(4,-1), the processor element PE(4,0), the second intermediate register IR2(4,1), the processor element PE(4,2), and the second intermediate register IR2(4,3) to the processor element PE(4,0), the second intermediate register IR2(4,1), the processor element PE(4,2), the second intermediate register IR2(4,3), and the processor element PE(4,4), respectively, while the pel value c(2,5) is supplied from the processor element PE(4,4) to the side register SR(4,-1).

At the simultaneous timing of the ninth pulse of the pulse signal CK1, the pel values c(0,0), c(0,1), c(0,2), c(0,3), c(0,4) and c(0,5) are transmitted from the side register SR(2,−1) the processor element PE(2,0), the second intermediate register IR2(2,1), the processor element PE(2,2), the second intermediate register IR2(2,3), and the processor element PE(2,4) to the first intermediate registers IR1(1,−1), IR1(1,0), IR1(1,1), IR1(1,2), IR1(1,3) and IR1(1,4), respectively. Moreover, the pel values c(1,5), c(1,0), c(1,1), c(1,2), c(1,3) and c(1,4) are transmitted from the first intermediate registers IR1(3,−1), IR1(3,0), IR1(3,1), IR1(3,2), IR1(3,3) and IR1(3,4) to the side register SR(2,−1), the processor element PE(2,0), the second intermediate register IR2(2,1), the processor element PE(2,2), the second intermediate register IR2(2,3), and the processor element PE(2,4), respectively. Moreover, the pel values c(2,5), c(2,0), c(2,1), c(2,2), c(2,3) and c(2,4) are transmitted from the side register SR(4,−1), the processor element PE(4,0), the second intermediate register IR2(4,1), the processor element PE(4,2), the second intermediate register IR2(4,3), and the processor element PE(4,4) to the intermediate registers IR1(3,−1), IR1(3,0), IR1(3,1), IR1(3,2), IR1(3,3) and IR1(3,4), respectively. Further, the pel values c(3,0), c(3,1), c(3,2), c(3,3), c(3,4) and c(3,5) are transmitted from the input registers RE(5,−1), RE(5,0), RE(5,1), RE(5,2), RE(5,3) and RE(5,4) to the side register SR(4,−1), the processor element PE(4,0), the second intermediate register IR2(4,1), the processor element PE(4,2), the second intermediate register IR2(4,3), and the processor element PE(4,4), respectively.

While at the current block supplying unit 100, the pel value a(0,0) is supplied from the data inputting means(not shown) to the flip-flop 110 at the simultaneous timing of the ninth pulse of the pulse signal CK1.

Each distortion value is calculated by repeating the process described above at each of the processor elements.

Constructing a circuit in such a manner that a column holding side registers SR(2,−1) and SR(4,−1) is placed in a ring-style similarly to the second embodiment makes it possible to shorten transmission busses, and to lessen the differences among the length of transmission busses.

FIG. 81 is a diagram showing a ring-style disposition described above in which connections among the columns are illustrated.

FIGS. 82 through 93 show the operation when the second operation mode is selected by the operation mode selecting unit 600 of the motion estimation apparatus according to the present invention.

The flow of the pel values transmitted from the current block supplying unit 100 and the candidate block data calculation unit 200 to the distortion calculating unit 3000a will be described hereinlater. The same timing chart as that of the first embodiment is also applied to the present embodiment when the second operation mode is selected by the operation mode selecting unit 600.

In addition, when the second operation mode is selected, the horizontal and vertical skip selectors of each of the processor elements PE (x,y), the side register SR(x,y), and the input register RE(x,y) are operated to select a second data input terminal B depending upon the signal condition of SV and SH received from the signal outputting unit 330. Therefore, in the present embodiment, all the intermediate registers IR1(x,y) and IR2(x,y), and a part of the input registers RE(x,y) are skipped during the data transmission.

At the simultaneous timing of the pulse cycle of the pulse signal CK0, the input register RE(x, y) is operated to receive data either from the adjacent lower input registers RE(x, y+1), RE(x, y+2) or from the search window supplying unit 200 shown in FIG. 70, and this data transmission process is repeated for every pulse cycle of the pulse signal CK0. At the simultaneous timing of the first pulse of the pulse signal CK1, function elements of each of the processor elements PE (x,y) and the side registers SR(x,y) are operated to receive data from the adjacent right function elements shown in FIG. 70, and at the second pulse of the pulse signal CK0, each of the processor elements PE (x,y) and the side registers SR(x,y) of the odd columns is operated to receive data either from the adjacent upper processor element PE(x, y) or side register SR(x,y) shown in FIG. 70, while each of the processor elements PE (x,y) and the side registers SR(x,y) of the even column is operated to receive data either from the adjacent lower processor element PE(x,y) or side register SR(x,y) shown in FIG. 70. This data transmission process is repeated for every pulse cycle of the pulse signal CK1 after CK1 is initiated.

Figure 82:
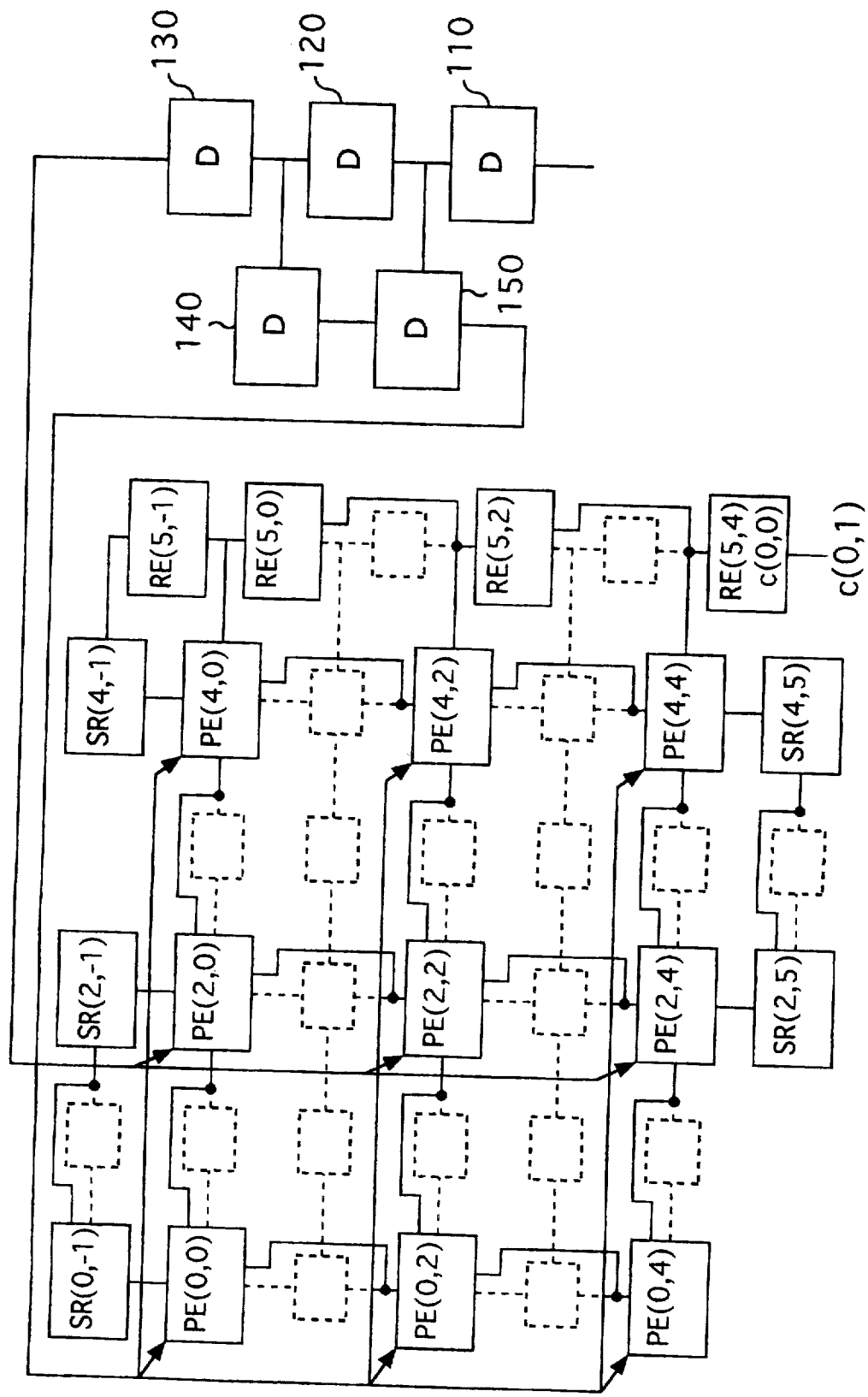

The flow of pel values will be described more specifically hereinlater. At the simultaneous timing of the first pulse of the pulse signal CK0 as shown in FIG. 82, the pel value c(0,0) is supplied from the search window supplying unit 200 to the input register RE(5,4).

Figure 83:
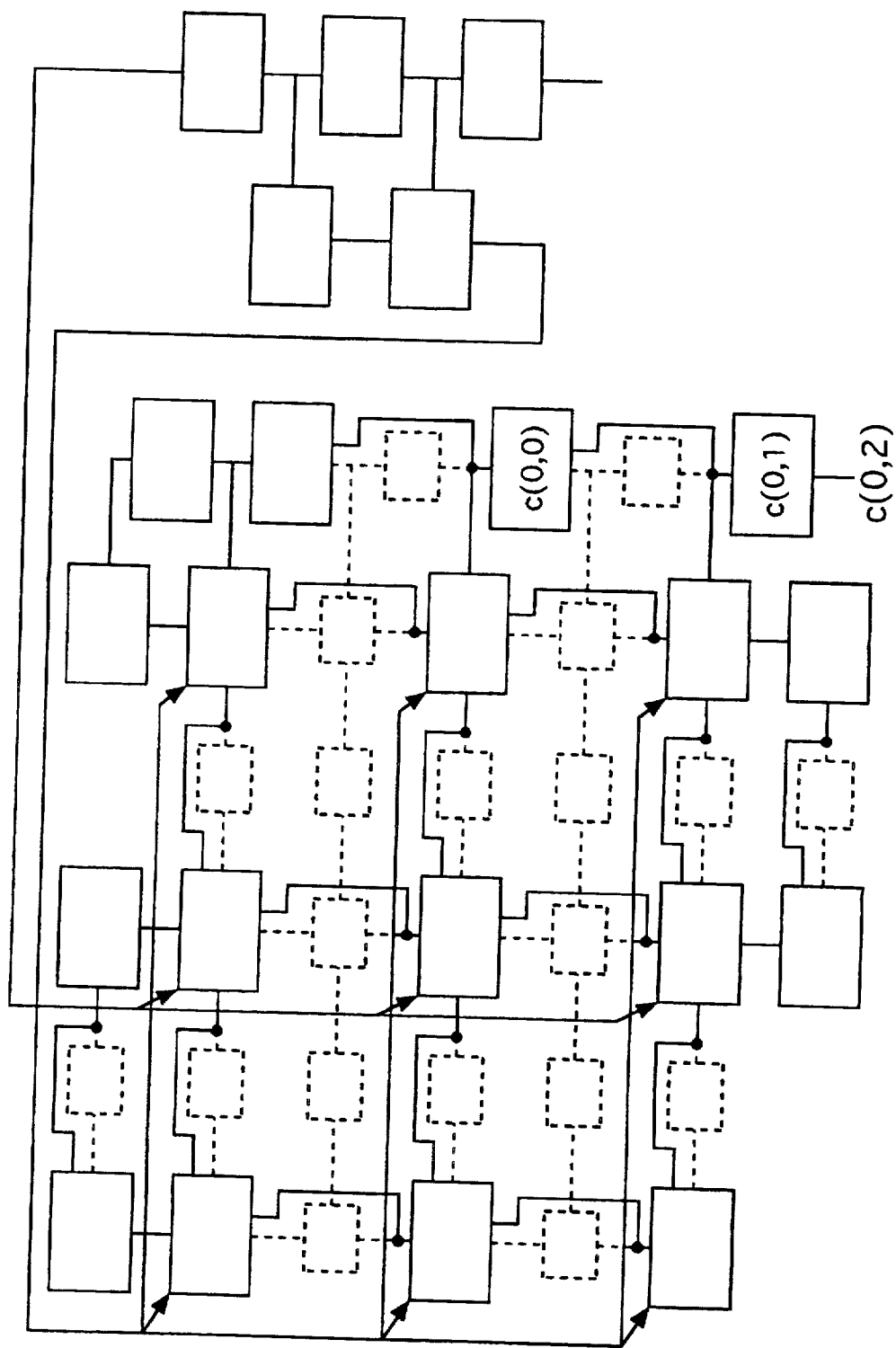

At the simultaneous timing of the second pulse of the pulse signal CK0 as shown in FIG. 83, the pel value c(0,0) is transmitted from the input register RE(5,4) to the input register RE(5,2), while the pel value c(0,1) is supplied from the search window supplying unit 200 to the input register RE(5,4).

Figure 84:
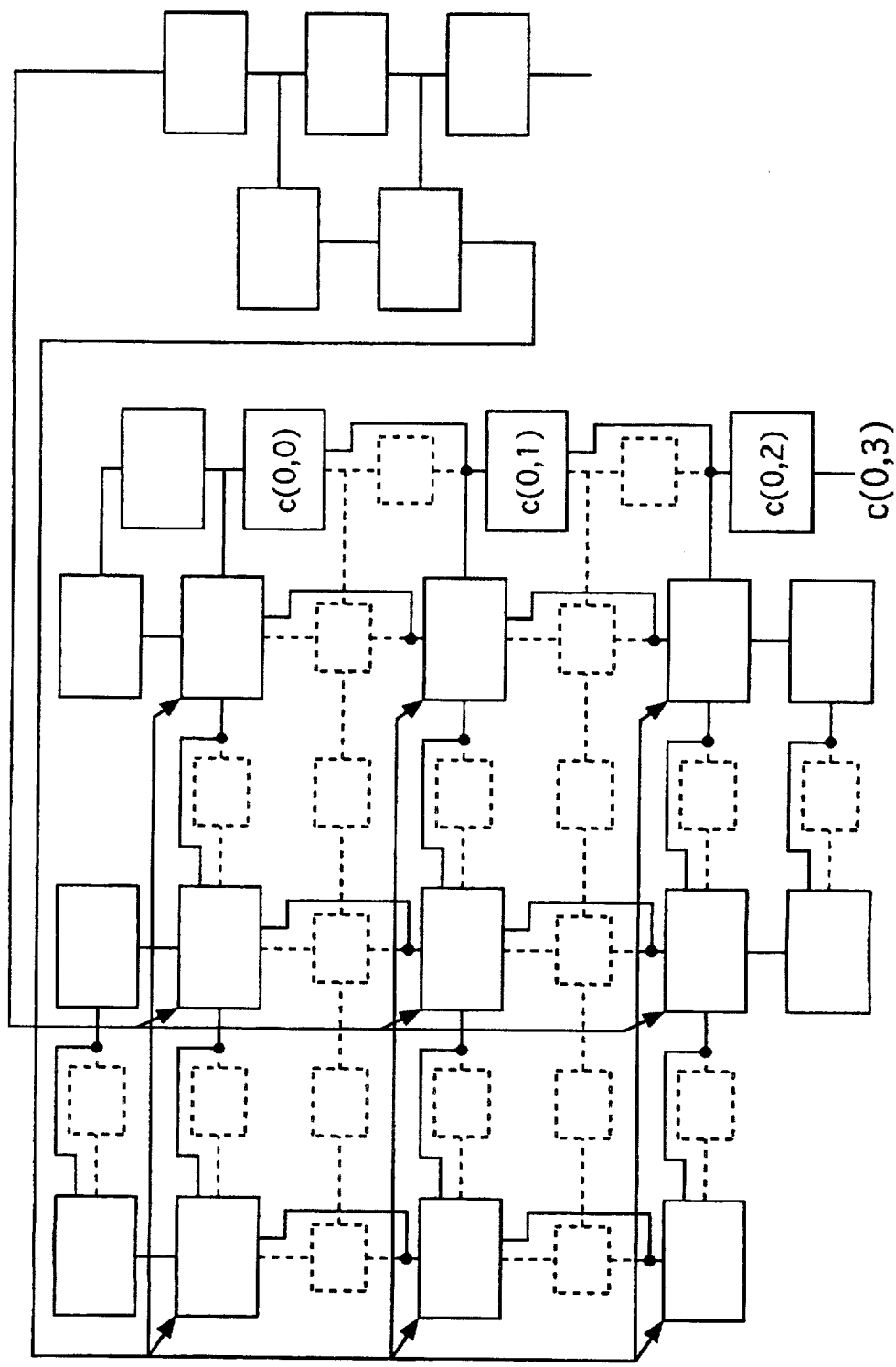

At the simultaneous timing of the third pulse of the pulse signal CK0 as shown in FIG. 84, the pel values c(0,0) and c(0,1) are transmitted from the input registers RE(5,2) and RE(5,4) to the input registers RE(5,0) and RE(5,2), respectively, while the pel value c(0,2) is supplied from the search window supplying unit 200 to the input register RE(5,4).

At the simultaneous timing of the fourth pulse of the pulse signal CK0, the pel values c(0,0), c(0,1) and c(0,2) are transmitted from the input registers RE(5,0), RE(5,2) and RE(5,4) to the input registers RE(5,−1), RE(5,0) and RE(5, 2), respectively, while the pel value c(0,3) is supplied from the search window supplying unit 200 to the input register RE(5,4).

Figure 85:
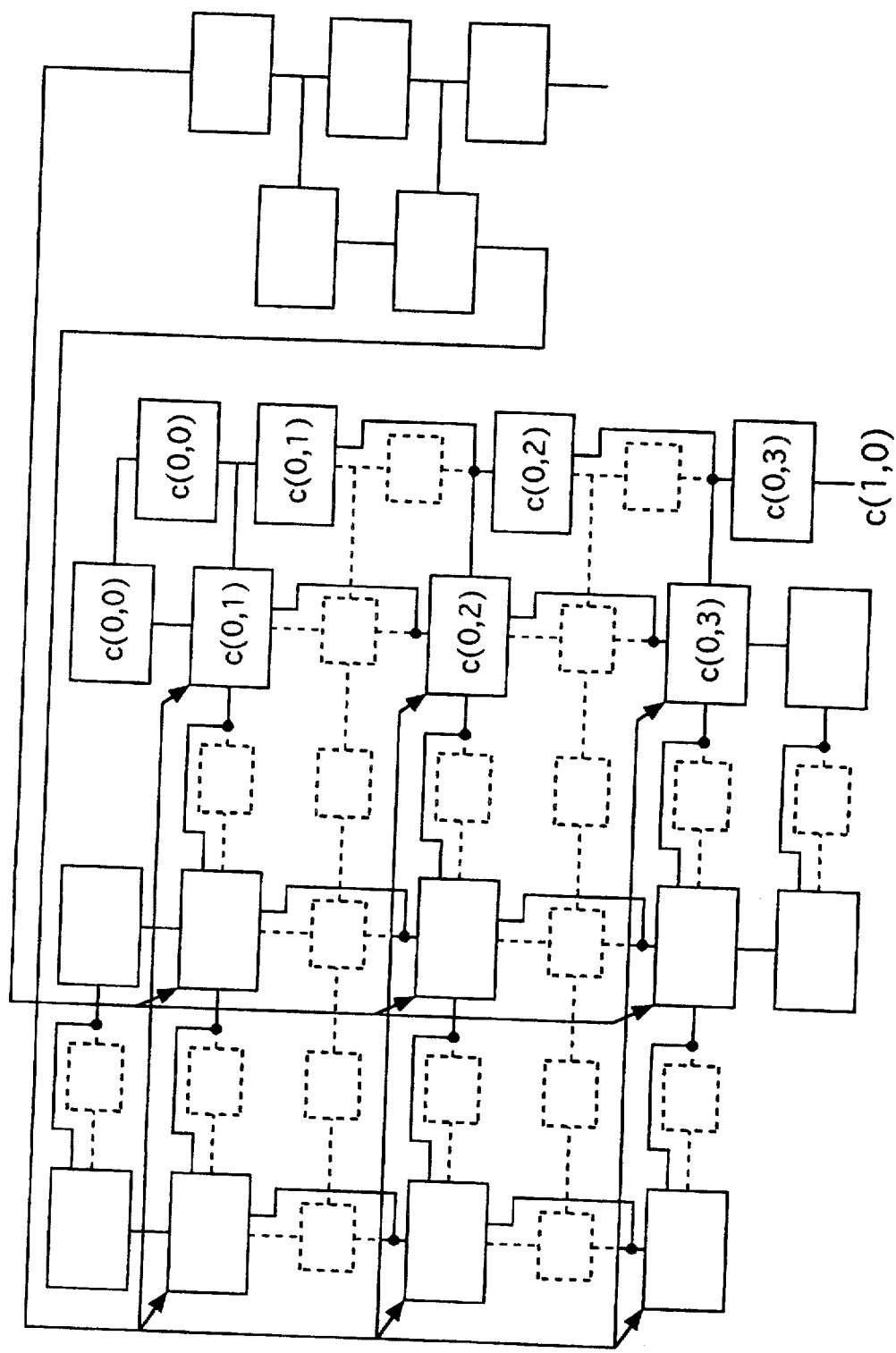

At the simultaneous timing of the third pulse of the pulse signal CK1 as shown in FIG. 85, the pel values c(0,0), c(0,1), c(0,2) and c(0,3) are transmitted from the input registers RE(5,−1), RE(5,0), RE(5,2), and RE(5,4) to the side register SR(4,−1), the processor elements PE(4,0), PE(4,2) and PE(4,4), respectively.

Figure 86:
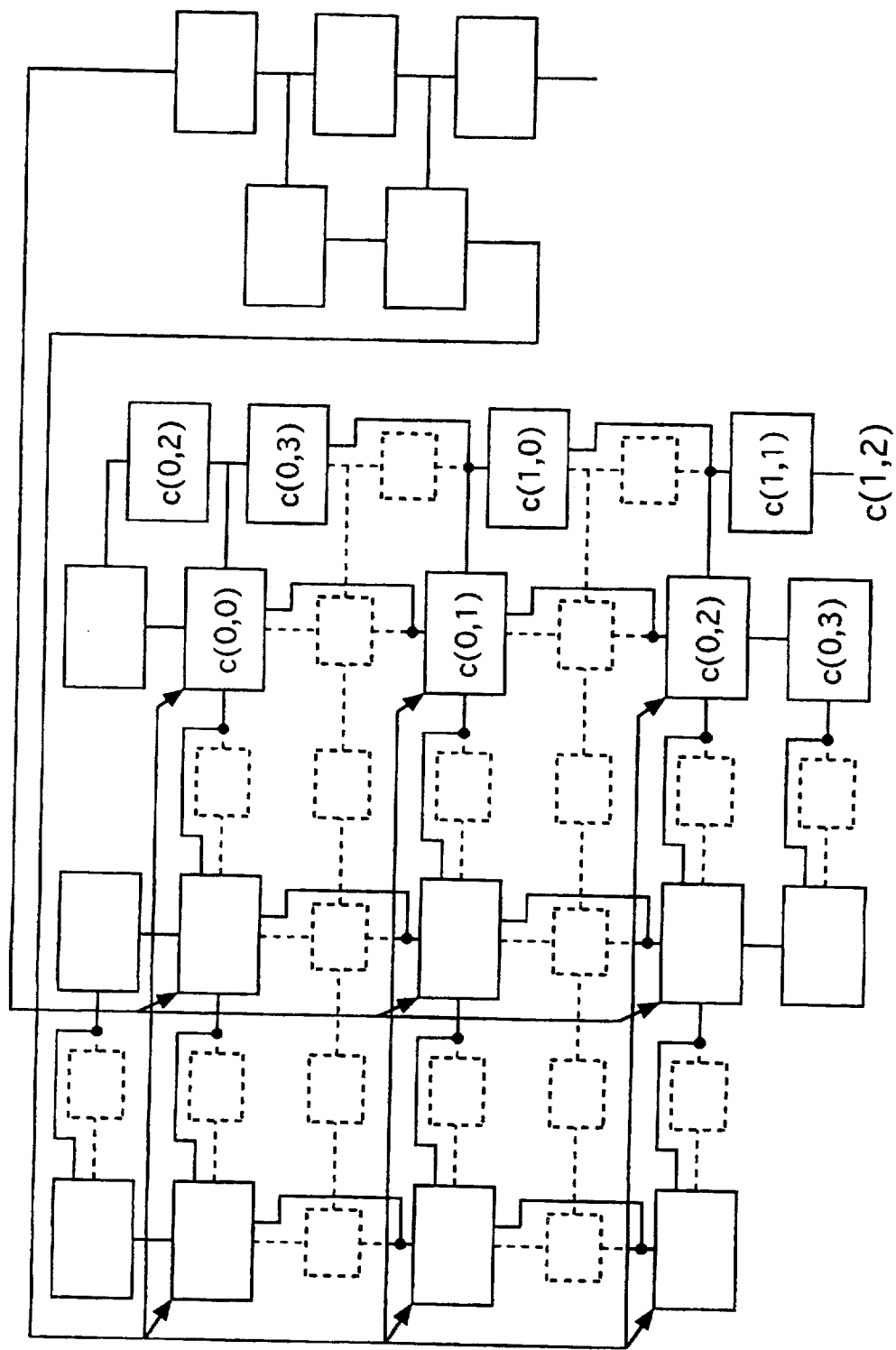

At the simultaneous timing of the fourth pulse of the pulse signal CK1 as shown in FIG. 86, the pel values c(0,0), c(0,1), c(0,2) and c(0,3) are transmitted from the side register SR(4,−1), the processor elements PE(4,0), PE(4,2) and PE(4,4) to the processor elements PE(4,0), PE(4,2), PE(4,4) and the side registers SR(4,5), respectively.

Before the fifth pulse of the pulse signal CK1 is outputted, the pel values c(1,0), c(1,1) and c(1,2) are transmitted from the input registers RE(5,0), RE(5,2) and RE(5,4) to the input registers RE(5,−1), RE(5,0) and RE(5,2), respectively, while the pel value c(1,3) is supplied from the search window supplying unit 200 to the input register RE(5,4).

Figure 87:
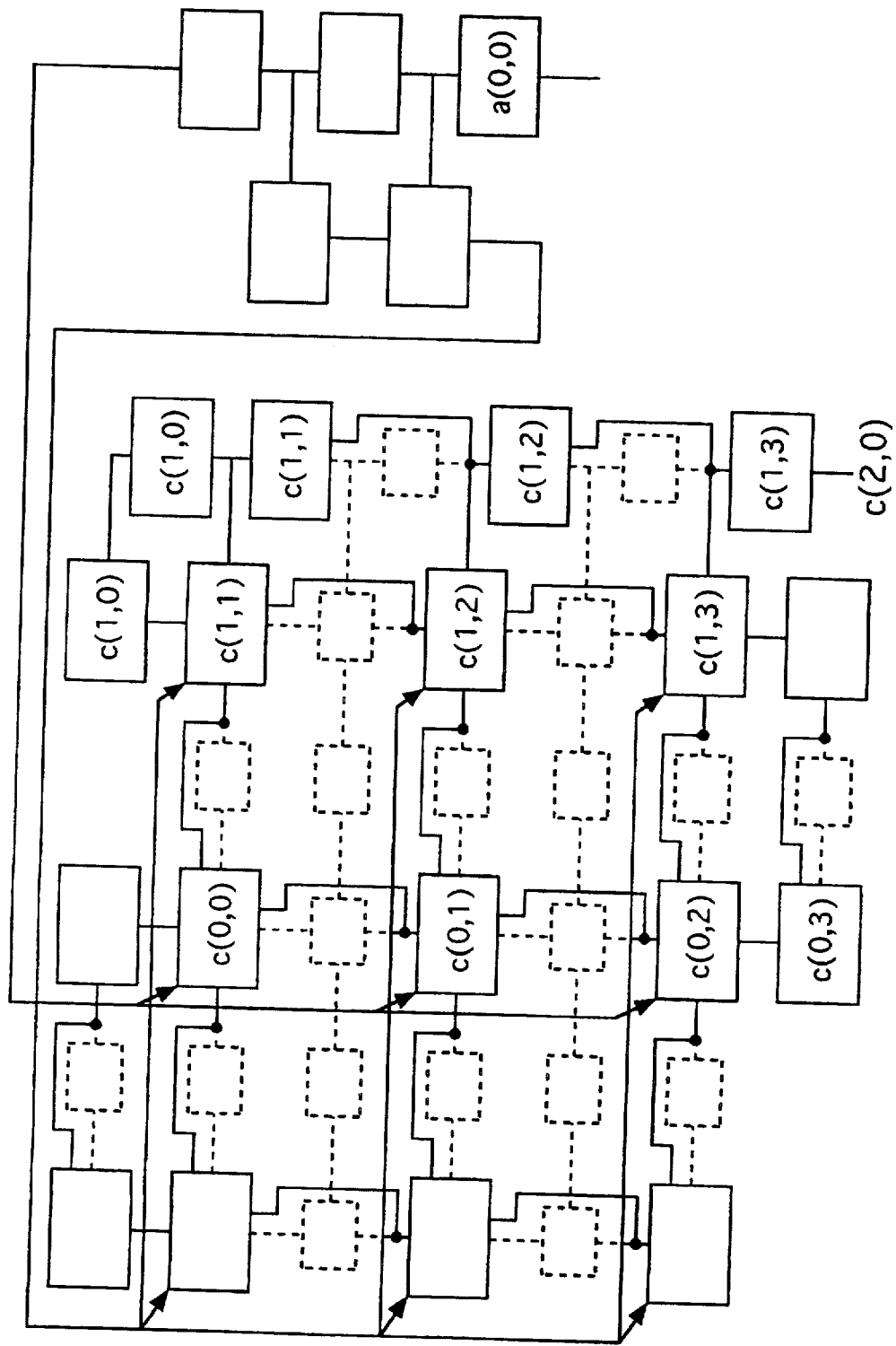

At the simultaneous timing of the fifth pulse of the pulse signal CK1 as shown in FIG. 87, the pel values c(0,0), c(0,1), c(0,2) and c(0,3) are transmitted from the processor elements PE(4,0), PE(4,2), PE(4,4) and the side registers SR(4,5) to the processor elements PE(2,0), PE(2,2), PE(2,4) and the side registers SR(2,5), while the pel values c(1,0), c(1,1), c(1,2) and c(1,3) are transmitted from the input registers RE(5,-1), RE(5,0), RE(5,2) and RE(5,4) to the side register SR(4,-1), the processor elements PE(4,0), PE(4,2) and PE(4,4) respectively.

At the same time, the pel value a(0,0) is supplied from the data inputting means (not shown) to the flip-flop 110 of the current block supplying unit 100.

Figure 88:
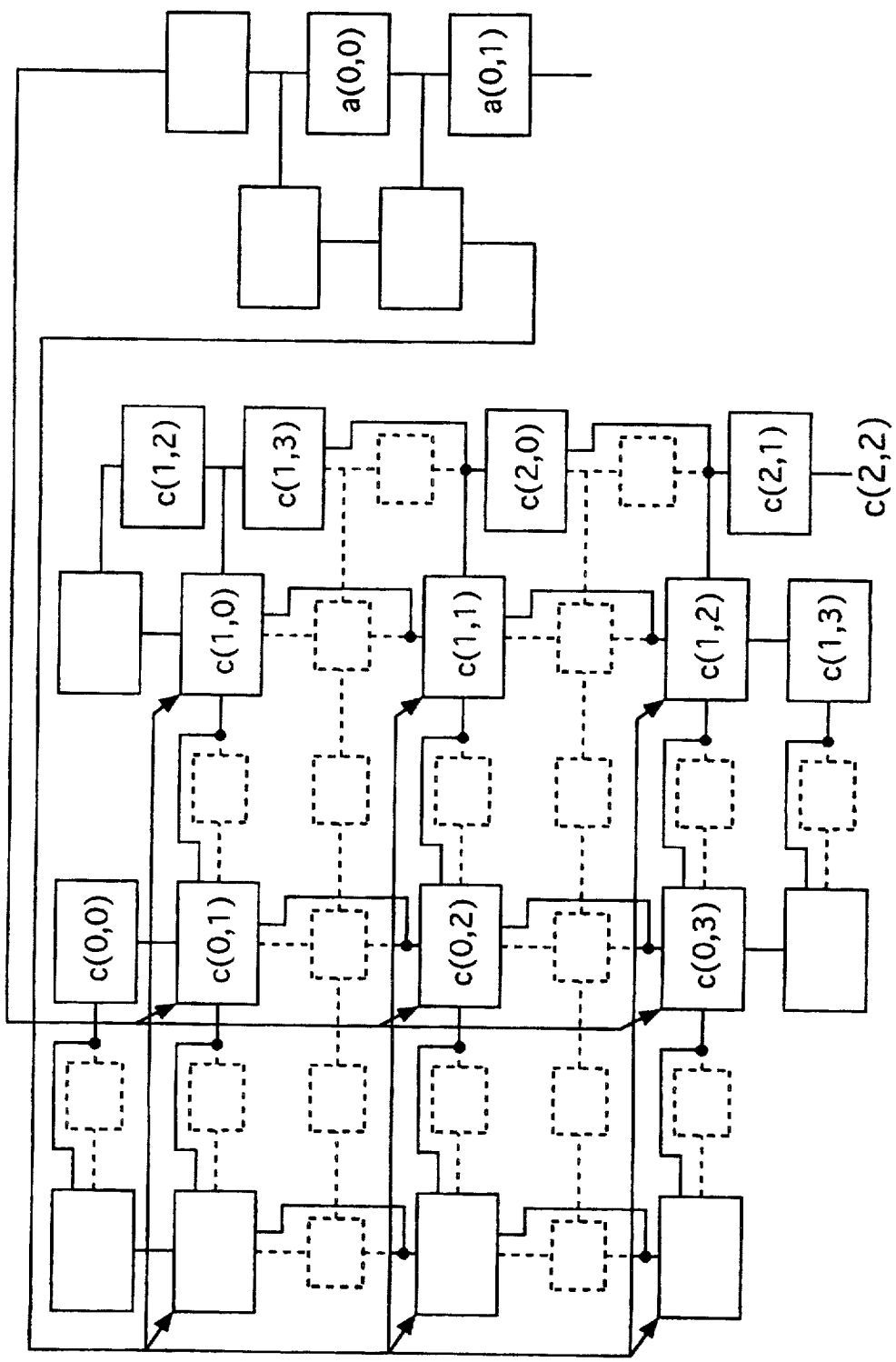

At the simultaneous timing of the sixth pulse of the pulse signal CK1 as shown in FIG. 88, the pel values c(0,0), c(0,1), c(0,2) and c(0,3) are transmitted from the processor elements PE(2,0), PE(2,2), PE(2,4) and the side registers SR(2,5) to the side registers SR(2,-1), the processor elements PE(2,0), PE(2,2) and PE(2,4), respectively, while the pel values c(1,0), c(1,1), c(1,2) and c(1,3) are transmitted from the side register SR(4,-1), the processor elements PE(4,0), PE(4,2) and PE(4,4) to the processor elements PE(4,0), PE(4,2), PE(4,4) and the side register SR(4,5), respectively.

At the same time, the pel value a(0,0) is transmitted from the flip-flop 110 of the current block supplying unit 100 to the flip-flop 120, while the pel value a(0,1) is supplied from the data inputting means (not shown) to the flip-flop 110 of the current block supplying unit 100.

Before the seventh pulse of the pulse signal CK1 is outputted, the pel values c(2,0), c(2,1) and c(2,2) are transmitted from the input registers RE(5,0), RE(5,2) and RE(5, 4) to the input registers RE(5,-1), RE(5,0) and RE(5,2), respectively, while the pel value c(2,3) is supplied from the search window supplying unit 200 to the input register RE(5,4).

Figure 89:
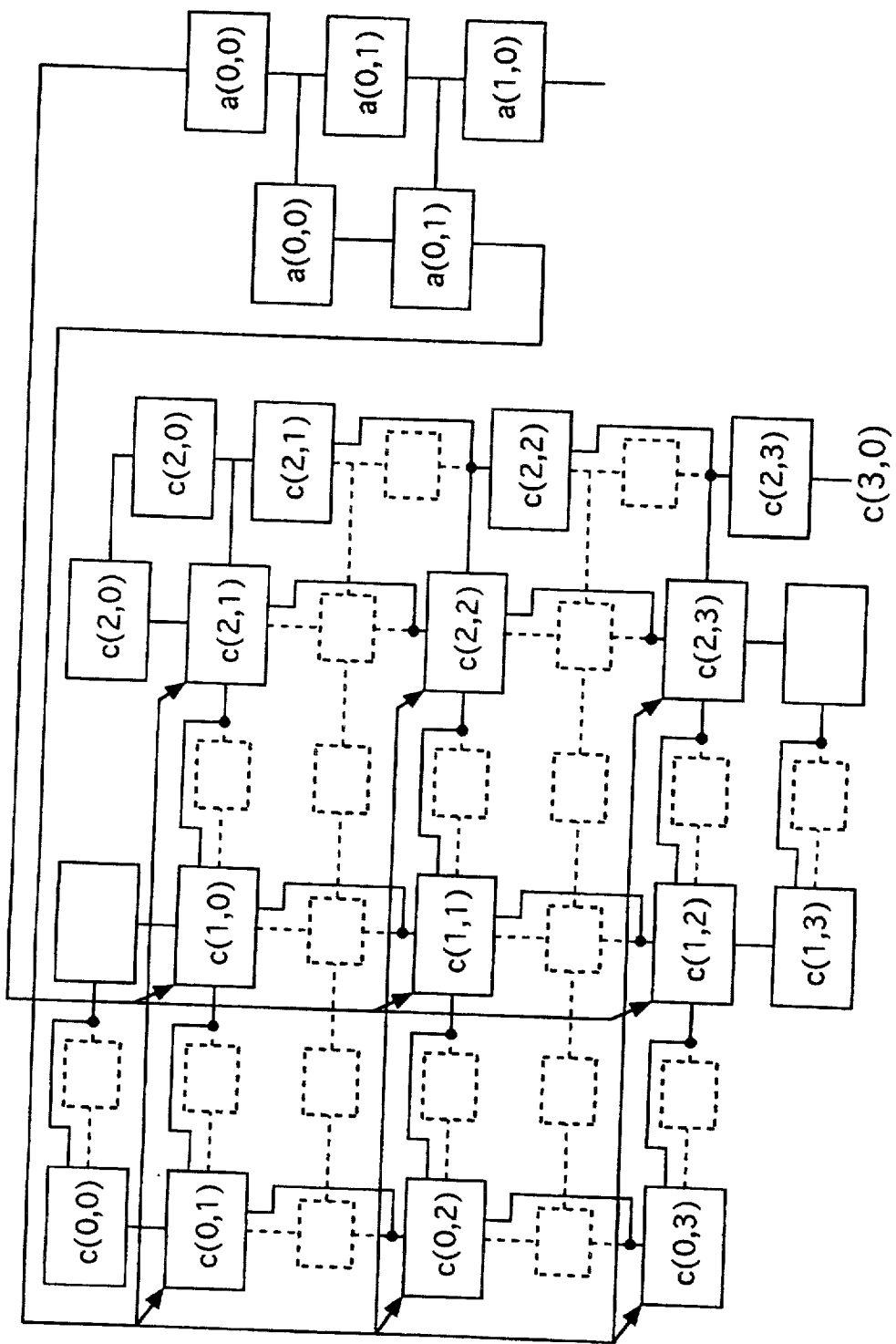

At the simultaneous timing of the seventh pulse of the pulse signal CK1 as shown in FIG. 89, the pel values c(0,0), c(0,1), c(0,2) and c(0,3) are transmitted from the side registers SR(2,-1), the processor elements PE(2,0), PE(2,2) and PE(2,4) to the side registers SR(0,-1), the processor elements PE(0,0), PE(0,2) and PE(0,4), respectively, while the pel values c(1,0), c(1,1), c(1,2) and c(1,3) are transmitted from the processor elements PE(4,0), PE(4,2), PE(4,4) and the side register SR(4,5) to the processor elements PE(2,0), PE(2,2), PE(2,4) and the side registers SR(2,5), respectively. Moreover, the pel values c(2,0), c(2,1), c(2,2) and c(2,3) are transmitted from the input registers RE(5,-1), RE(5,0), RE(5,2) and RE(5,4) to the side register SR(4,-1), the processor elements PE(4,0), PE(4,2) and PE(4,4), respectively.

At the same time, the pel values a(0,0) and a(0,1) are transmitted from the flip-flops 120 and 110 of the current block supplying unit 100 to both flip-flops 130 and 140, both flip-flops 120 and 150 of the current block supplying unit 100, respectively, while the pel value a(1,0) is supplied from the data inputting means (not shown) to the flip-flop 110 of the current block supplying unit 100.

Figure 90:
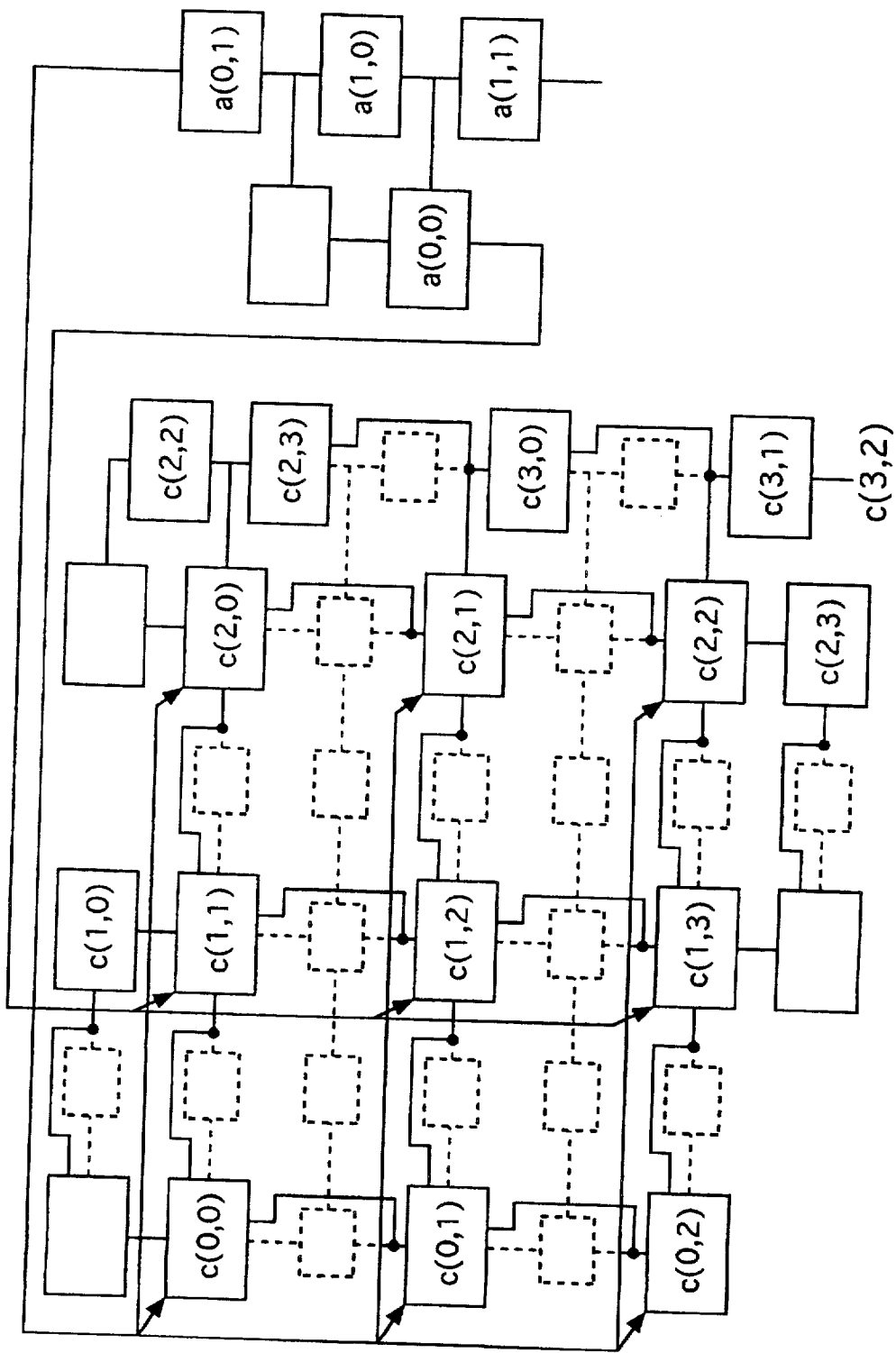

At the simultaneous timing of the eighth pulse of the pulse signal CK1 as shown in FIG. 90, the pel values c(0,0), c(0,1) and c(0,2) are transmitted from the side registers SR(0,-1), the processor elements PE(0,0) and PE(0,2) to the processor elements PE(0,0), PE(0,2) and PE(0,4), respectively, while the pel values c(1,0), c(1,1), c(1,2) and c(1,3) are transmitted from the processor elements PE(2,0), PE(2,2), PE(2,4) and the side registers SR(2,5) to the side registers SR(2,-1), the processor elements PE(2,0), PE(2,2) and PE(2,4), respectively. Moreover, the pel values c(2,0), c(2,1), c(2,2) and c(2,3) are transmitted from the side register SR(4,-1), the processor elements PE(4,0), PE(4,2) and PE(4,4) to the processor elements PE(4,0), PE(4,2), PE(4,4), and the side register SR(4,5), respectively.

At the same time, the pel values a(0,0), a(0,1) and a(1,0) are transmitted from the flip-flops 140, 120 and 110 of the current block supplying unit 100 to flip-flops 150, 130 and 120 of the current block supplying unit 100, respectively, while the pel value a(1,1) is supplied from the data inputting means (not shown) to the flip-flop 110 of the current block supplying unit 100.

Before the ninth pulse of the pulse signal CK1 is outputted, the pel values c(3,0), c(3,1) and c(3,2) are transmitted from the input registers RE(5,0), RE(5,2) and RE(5, 4) to the input registers RE(5,-1), RE(5,0) and RE(5,2), respectively, while the pel value c(3,3) is supplied from the search window supplying unit 200 to the input register RE(5,4).

Figure 91:
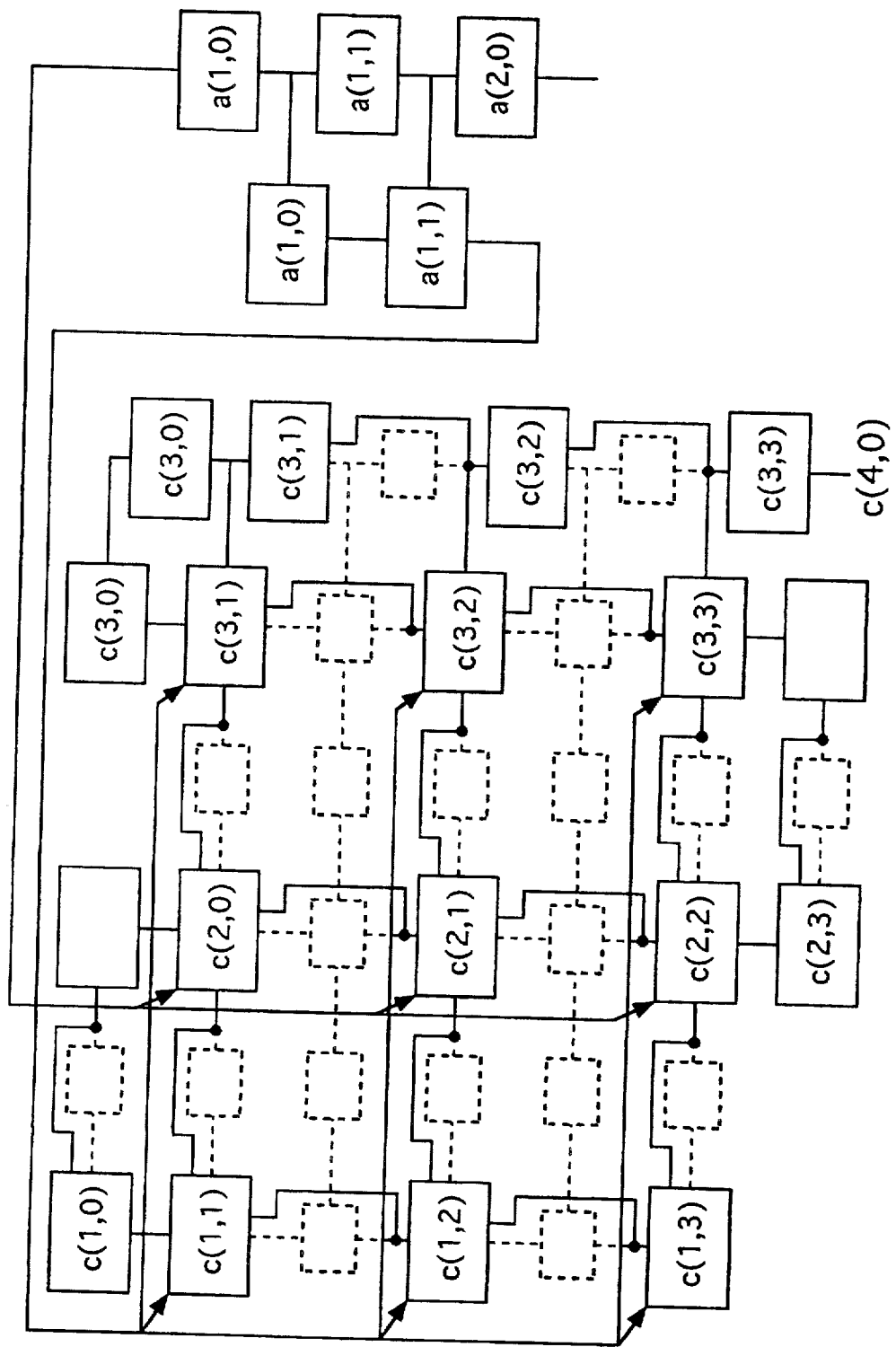

At the simultaneous timing of the ninth pulse of the pulse signal CK1 as shown in FIG. 91, the pel values c(1,0), c(1,1), c(1,2) and c(1,3) are transmitted from the side register SR(2,-1) the processor elements PE(2,0), PE(2,2) and PE(2,4) to the side registers SR(0,-1), the processor elements PE(0,0), PE(0,2) and PE(0,4), respectively. Moreover, the pel values c(2,0), c(2,1), c(2,2) and c(2,3) are transmitted from the processor elements PE(4,0), PE(4,2), PE(4,4) and the side register SR(4,5) to the processor elements PE(2,0), PE(2,2), PE(2,4) and the side register SR(2,5), respectively. Further, the pel values c(3,0), c(3,1), c(3,2) and c(3,3) are transmitted from the input registers RE(5,-1), RE(5,0), RE(5,2) and RE(5,4) to the side register SR(4,-1), the processor elements PE(4,0), PE(4,2) and PE(4,4), respectively.

At the same time, the pel values a(1,0) and a(1,1) are transmitted from the flip-flops 120 and 110 of the current block supplying unit 100 to both flip-flops 130 and 140, both flip-flops 120 and 150 of the current block supplying unit 100, respectively, while the pel value a(2,0) is supplied from the data inputting means (not shown) to the flip-flop 110 of the current block supplying unit 100.

Figure 92:
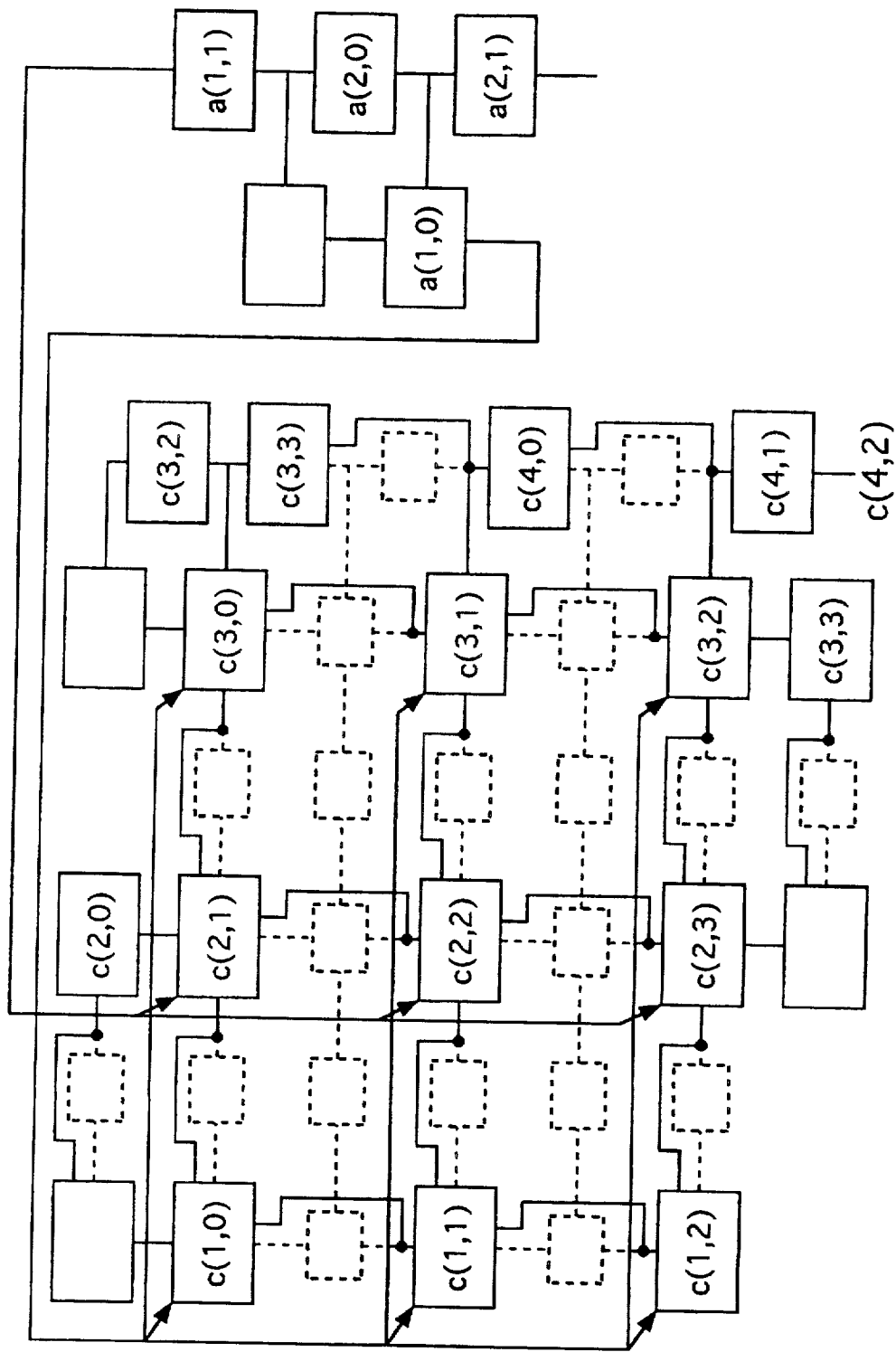

At the simultaneous timing of the tenth pulse of the pulse signal CK1 as shown in FIG. 92, the pel values c(1,0), c(1,1) and c(1,2) are transmitted from the side registers SR(0,-1), the processor elements PE(0,0) and PE(0,2) to the processor elements PE(0,0), PE(0,2) and PE(0,4), respectively. Moreover, the pel values c(2,0), c(2,1), c(2,2) and c(2,3) are transmitted from the processor elements PE(2,0), PE(2,2), PE(2,4) and the side register SR(2,5) to the side register SR(2,-1), the processor elements PE(2,0), PE(2,2) and PE(2,4), respectively. Further, the pel values c(3,0), c(3,1), c(3,2) and c(3,3) are transmitted from the side register SR(4,-1), the processor elements PE(4,0), PE(4,2) and PE(4,4) to the processor elements PE(4,0), PE(4,2), PE(4,4) and the side register SR(4,5), respectively.

At the same time, the pel values a(1,0), a(1,1) and a(2,0) are transmitted from the flip-flops 140, 120 and 110 of the current block supplying unit 100 to flip-flops 150, 130 and 120 of the current block supplying unit 100, respectively, while the pel value a(2,1) is supplied from the data inputting means (not shown) to the flip-flop 110 of the current block supplying unit 100.

During the periods (g), (h), (i) and (j) each of which begins with a rising edge of the seventh, eighth, ninth and tenth pulse of the pulse signal CK1 respectively, and ends with a rising edge of the eighth, ninth, tenth and eleventh pulse of the pulse signal CK1 respectively, the calculations described below are performed at each of the processor elements PE(x,y).

During the period (g) as shown in FIG. 89, each of the pel values c(0,1), c(0,2), c(0,3), c(1,0), c(1,1), c(1,2), c(2,1), c(2,2) and c(2,3) is transmitted, as in the listed order herein, to the first data input terminal A of the subtracter 1030 of the corresponding processor elements PE(0,0), PE(0,1), PE(0, 2), PE(2,0), PE(2,2), PE(2,4), PE(4,0), PE(4,2) and PE(4,4) respectively through the selector 1010 and the flip-flop 1020 of each of the processor elements.

At the same time, each of the processor elements PE(x,y) of the odd columns is operated to receive a pel value a(0,1) of the current block, while each of the processor elements PE(x,y) of the even column is operated to receive a pel value a(0,0) of the current block through the second data input terminal B of the subtracter of each of the processor elements PE(x,y).

At the subtracter 1030 of each of the processor elements PE(x,y), the subtraction is performed and the resulting value is transmitted to the flip-flop 1060 similarly to the embodiment in FIG. 70.

During the succeeding periods (h), (i) and (j), the similar calculation process described above is repeated to obtain a distortion value at each of the processor elements PE(x,y).

At the simultaneous timing of the eleventh pulse of the pulse signal CK2, the distortion value thus calculated at each of the processor elements PE(0,0), PE(0,2) and PE(0,4) is transmitted from each of the processor elements through the output terminal DLo to the comparator 410 of the minimum distortion detecting unit 400 through each of the data input terminals A0, A1 and A2 respectively. Since the second data input terminal B is selected by the selector 1070 of each of the processor elements PE(x,y), the distortion value calculated at each of the processor elements PE(2,0), PE(2,2), PE(2,4), PE(4,0), PE(4,2) and PE(4,4) is transmitted to each of the processor element PE(0,0), PE(0,2), PE(0,4), PE(2,0), PE(2,2) and PE(2,4) respectively at the simultaneous timing of the eleventh pulse of the pulse signal CK2.

At the simultaneous timing of the twelfth pulse of the pulse signal CK2, the distortion value calculated at each of the processor elements PE(2,0), PE(2,2) and PE(2,4) is transmitted from each of the processor elements PE(0,0), PE(0,2) and PE(0,4) to the comparator 410 of the minimum distortion detecting unit 400 through each of the data input terminals A0, A1 and A2 respectively. Moreover, the distortion value calculated at each of the processor elements PE(4,0), PE(4,2) and PE(4,4) is transmitted from each of the processor elements PE(2,0), PE(2,2) and PE(2,4) to each of the processor elements PE(0,0), PE(0,2) and PE(0,4) respectively.

At the simultaneous timing of the thirteen pulse of the pulse signal CK2, the distortion value calculated at each of the processor elements PE(4,0), PE(4,2) and PE(4,4) is transmitted from each of the processor elements PE(0,0), PE(0,2) and PE(0,4) to the comparator 410 of the minimum distortion detecting unit 400 through each of the data input terminals A0, A1 and A2 respectively.

The minimum distortion detecting unit 400 is operated to determine a minimum distortion value MinDis among the distortion values D(0;0), D(0,2), D(0,4), D(2,0), D(2,2), D(2,4), D(4,0), D(4,2) and D(4,4), and to calculate a motion vector MVx, MVy during the periods (k), (l), (m) and (n) similarly to the embodiment in FIG. 70.

Figure 93:
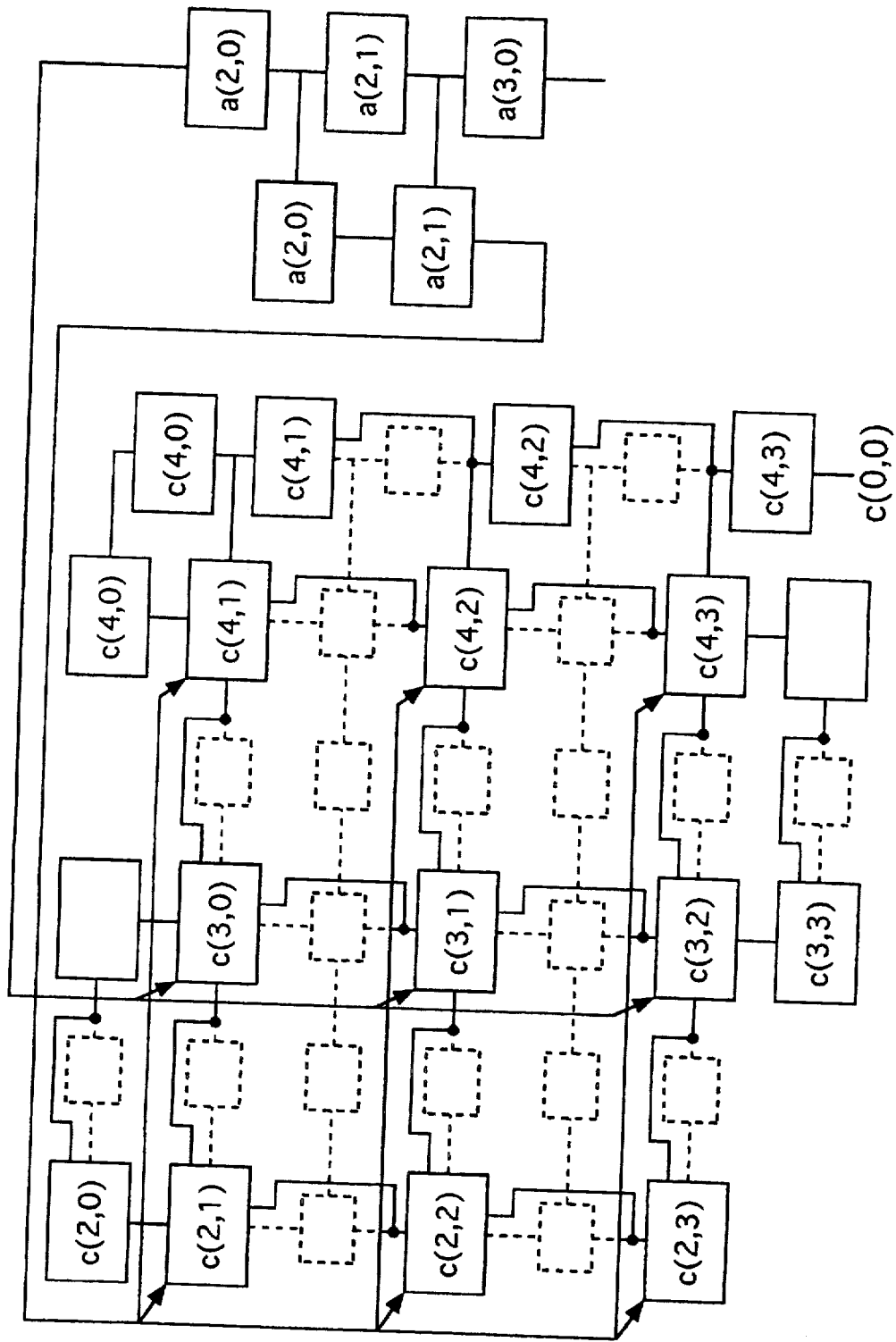

The distortion calculating unit 3000a is operated to initiate distortion calculation for the next current block at the simultaneous timing of the eleventh pulse of the pulse signal CK1 as shown in FIG. 93, and the similar calculation process is repeated at the simultaneous timing of the twelfth, thirteenth, and fourteenth pulse of the pulse signal CK1. The minimum distortion detecting unit 400 is operated to determine a minimum distortion value MinDis among the received distortion values, and to calculate a motion vector MVx, MVy.

The motion vector MVx, MVy, and the minimum distortion value MinDis with respect to each of the current blocks are successively calculated in the calculation process described above without having duplicated pel values in the search window being transmitted.

The distortion calculating unit 3000a may be designed to transmit the distortion values from the first row of the processor elements to the minimum distortion detecting unit 400 and to transmit the distortion values each being calculated by each of the processor elements of the second and third rows from each of the processor elements of the second and third rows to each of the processor elements of the first and second rows respectively, when each of the processor elements finish calculating the distortion values. The distortion calculating unit 3000a is further designed to repeatedly transmit the distortion vales until all of the distortion values transmit from the processor elements of the distortion calculating unit 3000a to the minimum distortion detecting unit 400. This result in the fact that the motion vector and the minimum distortion value with respect to each of the current blocks are successively calculated in the calculation process described above without having duplicated pel values being transmitted.

Although the present embodiment shows a structure of the processor elements and the intermediate registers being spaced apart from each other at an equal distance, it is possible to construct processor elements densely disposed around the center and being dispersed away from the center as shown in FIGS. 94 and 95. Moreover, the processor elements can be arranged in various manners according to the condition of the search window of the target and the candidate block. It is possible to arrange the processor elements in a ring-style, for instance.

Figure 96:
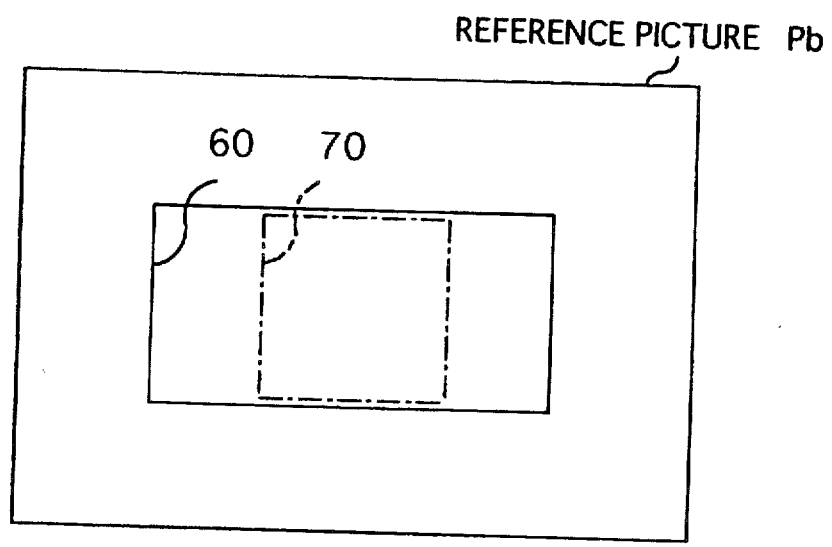
Figure 96:
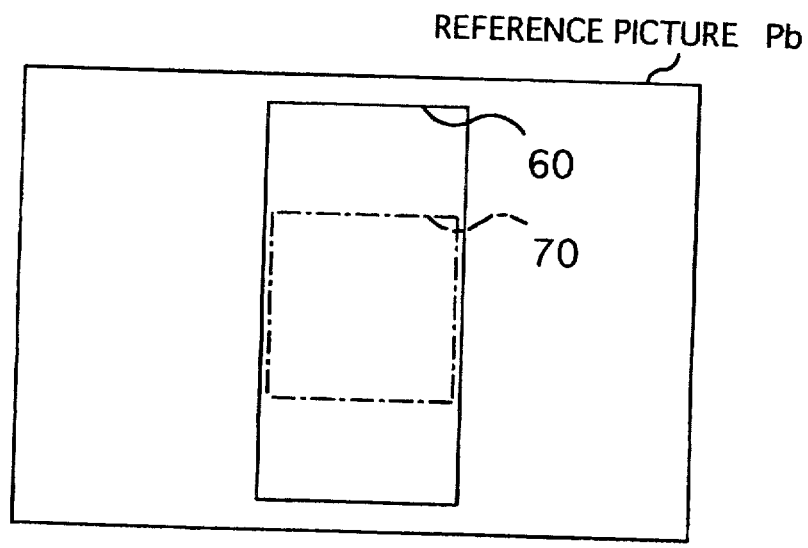

FIG. 96 shows a search window which may be used in the motion estimation apparatus constructed in such a manner as shown in FIGS. 94 and 95. The motion estimation apparatus constructed as shown in FIG. 94 is operated more effectively because the moving distance in horizontal direction of motion pictures is generally larger than the moving distance in vertical direction.

Although the embodiments in FIGS. 94 and 95 show the constructions with exactly one intermediate register intervening between a pair of processor elements, the number of intermediate registers is not required to correspond to the number of pels. There may exist the same number of the intermediate registers as that of the pels, however, it is possible to manipulate various sizes of the search window by changing the signal transmitted to the selector 1310 shown in FIG. 46, or by increasing the number of the flip-flops 1321 and 1322 shown in FIG. 47.

From the foregoing description along with FIGS. 70 through 96, it will be appreciated that the third embodiment of motion estimation method and apparatus according to the present invention brings numerous advantage described below.

The motion estimation apparatus shown in FIGS. 70 comprises a distortion calculation unit 3000a or an additional motion estimation apparatus comprises a distortion calculation unit 3000b. Each of the distortion calculation units 3000a and 3000b comprises a plurality of processor elements PE and a plurality of side registers SR. The processor elements PE and the side registers SR arranged in the form of a matrix array. Each of the distortion calculation units 3000a and 3000b is designed to parallel shifting the pel values of the selected search window 60 or 70 between each of the elements of the matrix array and the other element of the matrix array vertically adjoining the element of the matrix array toward only one predetermined side. This means that each of the elements of the matrix array is electrically connected to the vertically adjoining element of the matrix array by only one bus for transferring the pel values between each of the elements of the matrix array and the vertically adjoining element of the matrix array. This result in the fact that the third embodiment has an advantage over prior-art apparatus in reducing the number of the buses for transferring the pel values of the selected search window 60 or 70 between each of the elements.

The motion estimation apparatus may be further designed to select the size of the search window on the basis of an interval between the current picture Pa and the reference picture Pb in the moving picture. This means that when the interval between the current picture Pa and the reference picture Pb is small, the small size of the search window is selected to calculate the motion vector, and when the interval is large, the wide size of the search window is selected to calculate the motion vector. This result in the fact that when the interval between the current picture Pa and the reference picture Pb is small, the search window having the small size and having great number of the candidate blocks is selected, thereby making it possible to calculate the motion vector with fine precision of the motion estimation. When the interval is large, the search window having the wide size is selected, thereby preventing the candidate blocks of the search window of the reference picture Pb from deviating from a search area and making it possible to calculate the best motion vector.

The motion estimation apparatus may be designed to repeatedly select the search window including the candidate block corresponding to the minimum distortion value detected in the last detecting step, and being smaller than the previously selected search window. This means that the search window having the large size can be selected to coarsely estimate the current picture based on the reference picture, subsequently, the search window having the smaller size can be selected to estimate the current picture based on the reference picture with great precision of the motion estimation.

The motion estimation apparatus may be designed to select the search window including the adjoining candidate blocks being deviated by one pel pitch from one another in horizontal, vertical and diagonal directions. This result in the fact that the motion estimation apparatus can be applied to full search block matching method on the basis of the finally selected search window.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly, all suitable modifications and equivalents may be resorted to, falling with the scope of the invention.

What is claimed is:

1. A motion estimation method of calculating a motion vector to estimate a current picture partially forming a moving picture on the basis of a reference picture partially forming said moving picture, said current picture being partially formed by a current block containing N×M pel values which are arranged in the form of a matrix with N rows by M columns, said reference picture being partially formed by a search window containing H×L pel values which are arranged in the form of a matrix with H rows by L columns, said search window having a plurality of candidate blocks each equal in size to said current block, and said motion vector being indicative of a displacement between said current block and one of said candidate blocks most similar to said current block, said N and M being integers, respectively, and said H and L being integers greater than said N and M, respectively, comprising the steps of:

(i) preparing a plurality of processor elements for receiving and holding the pel values of said search window and for receiving the pel values of said current block to calculate distortion values each indicative of a difference between said current block and each of said candidate blocks a plurality of intermediate registers for receiving and holding the pel values of said search window, and (L−M+1) side register units for receiving and holding the pel values of said search window and an input register unit for receiving and holding the pel values of said search window, the sum of the number of said processor elements and the number of said intermediate registers being (H−N+1)×(L−M+1), said processor elements and said intermediate registers respectively forming (H−N+1)×(L−M+1) matrix elements arranged in the form of a matrix array with (H−N+1) rows by (L−M+1) columns, said (L−M+1) side register units being related to at least one of each of the (L−M+1) matrix elements of the 1st row and rows of said matrix array are counted as columns and rows of said matrix array;

(viii) inputting the pel values of said current block into the processor elements of the odd columns of the matrix array in first predetermined order simultaneously when the pel values of each of said candidate blocks are received by each of said processor elements;

(ix) inputting the pel values of said current block into the processor elements of the even columns of the matrix array in second predetermined order different from said first predetermined order simultaneously when the pel values of said candidate blocks are received by each of said processor elements; and (x) instructing each of said processor elements to calculate each of said distortion values on the basis of the received pel values of each of said candidate blocks and the received pel values of said current block.

2. A motion estimation method as set forth in claim 1, further comprising the steps of:

(xi) preparing a minimum distortion detecting unit for detecting the minimum distortion value from among said distortion values to specify the candidate block most similar to said current block; and (xii) transmitting said distortion values from said processor elements to said minimum distortion detecting unit after the instructing step (x).

3. A motion estimation method as set forth in claim 2, further comprising the steps of:

(xiii) replacing said search window with another search window overlapping with said search window and deviated by M pels from said search window in a horizontal direction, and replacing said current block with another current block deviated by M pels from said current block in a horizontal direction, said another current block containing N×M pel values which are arranged in the form of a matrix with N rows by M columns, said another search window containing H×L pel values which are arranged in the form of a matrix with H rows by L columns, and said another search window having a plurality of candidate blocks each equal in size to said another current block;

(xiv) inputting the pel values of the (L−M+1)th-Lth columns of said another search window into said input register unit continuously after all of the pel values of said search window are inputted into said input register unit so that said input register unit finishes inputting all of the pel values of said another search window; and (xv) repeating the steps (iii) to (x) until each of distortion values indicative of a difference between said another current block and each of said candidate blocks of said another search window is calculated by each of said processor element.

4. A motion estimation method as set forth in claim 1, further comprising the steps of:

(xi) preparing a minimum distortion detecting unit for detecting the minimum distortion value from among said distortion values to specify the candidate block most similar to said current block;

(xii) transmitting the distortion values from the processor elements of the 1st column to said minimum distortion detecting unit, and from the processor elements of the ∥th column to the processor elements of the (∥−1)th column; and (xiii) repeating the transmitting step (xii) until all of said distortion values are transmitted to said minimum distortion detecting unit.

5. A motion estimation method as set forth in claim 1, further comprising the steps of:

(xi) preparing a minimum distortion detecting unit for detecting the minimum distortion value from among said distortion values to specify the candidate block most similar to said current block;

(xii) transmitting the distortion values from the processor elements of the 1st row to said minimum distortion detecting unit, and from the processor elements of the hth row to the processor elements of the (h−1)th row; and (xiii) repeating the transmitting step (xii) until all of said distortion values are transmitted to said minimum distortion detecting unit.

6. A motion estimation apparatus for calculating a motion vector to estimate a current picture partially forming a moving picture on the basis of a reference picture partially forming said moving picture, said current picture being partially formed by a current block containing N×M pel values which are arranged in the form of a matrix with N rows by M columns, said reference picture being partially formed by a search window containing H×L pel values which are arranged in the form of a matrix with H rows by L columns, said search window having a plurality of candidate blocks each equal in size to said current block, and said motion vector being indicative of a displacement between said current block and one of said candidate blocks most similar to said current block, said N and M being integers, respectively, and said H and L being integers greater than said N and M, respectively, comprising:

a plurality of processor elements for receiving and holding the pel values of said search window and for receiving the pel values of said current block to calculate distortion values each indicative of a difference between said current block and each of said candidate blocks;

a plurality of intermediate registers for receiving and holding the pel values of said search window, the sum of the number of said processor elements and the number of said intermediate registers being (H−N+1)×(L−M+1), said processor elements and said intermediate registers respectively forming (H−N+1)×(L−M+1) matrix elements arranged in the form of a matrix array with (H−N+1) rows by (L−M+1) columns;

(L−M+1) side register units for receiving and holding the pel values of said search window, said (L−M+1) side register units being related to at least one of each of the (L−M+1) matrix elements of the 1st row and each of the (L−M+1) matrix elements of the (H−N+1)th row, the side register unit related to the matrix element of the ∥th column of said matrix array being assumed to be a side register unit of the ∥th column, said ∥ being an integer defined by 1≦∥≦(L−M+1);

an input register unit for receiving and holding the pel values of said search window, said input register unit being electrically connected to the side register unit of the (L−M+1)th column and the matrix elements of the (L−M+1)th column;

search window supplying means for supplying the pel values of said search window into said input register unit;

current block supplying means for supplying the pel values of said current block into said processor elements;

transmission control means for repeatedly transmitting H pel values of said search window from said input register unit to the processor elements and side register unit of the (L−M+1)th column until all of the pel values of said search window are received by the matrix elements and the side register unit of the (L−M+1)th column;

first shift control means for parallel shifting the pel values from the matrix elements of the ∥th column to the matrix elements of the (∥−1)th column of said matrix array and from the side register unit of the ∥th column to the side register unit of the (∥−1)th column in simultaneous relationship to each of the repetitions by said transmission control means;

second shift control means for parallel shifting, (N−1) times in each of said intervals, the pel values from the side register units of the odd columns to the matrix elements occupying intersections of the odd columns and the 1st row of said matrix array, from the matrix elements occupying intersections of the odd columns and the hth row of said matrix array to the matrix elements occupying intersections of the odd columns and the (h+1)th row of said matrix array, and from the matrix elements occupying intersections of the odd columns and the (H−N+1)th row of said matrix array to the side register units of the odd columns, said h being an integer defined by 1≦h<(H−N+1), said second shift control means being operated on assumption that the columns of said matrix array including at least one processor element and au of the rows of said matrix array are counted as columns and rows of said matrix array;

third shift control means for parallel shifting, (N−1) times in each of said intervals, the pel values from the side register units of the even columns to the matrix elements occupying intersections of the even columns and the (H−N+1)th row of said matrix array, from the matrix elements occupying intersections of the even columns and the (h+1)th row of said matrix array to the matrix elements occupying intersections of the even columns and the hth row of said matrix array, and from the matrix elements occupying intersections of the even columns and the 1st row of said matrix array to the side register units of the even columns, said third shift control means being operated on assumption that the columns of said matrix array including at least one processor element and all of the rows of said matrix array are counted as columns and rows of said matrix array;

odd column input control means for instructing said current block supplying means to input the pel values of said current block into the processor elements of the odd columns of said matrix array in first predetermined order simultaneously when the pel values of each of said candidate blocks are received by each of said processor elements;

even column input control means for instructing said current block supplying means to input the pel values of said current block into the processor elements of the even columns of said matrix array in second predetermined order different from said first predetermined order simultaneously when the pel values of said candidate blocks are received by each of said processor elements; and calculation control means for instructing said processor elements to calculate each of said distortion values on the basis of the received pel values of each of said candidate blocks and the received pel values of said current block.

7. A motion estimation apparatus as set forth in claim 6, in which each of said side register units comprises a first register unit electrically connected to each of the matrix elements of the 1st row and a second register unit electrically connected to each of the matrix elements of the (H−N+1)th row, said first register unit including (N−1) registers electrically connected in series for receiving and holding (N−1) pel values of said search window, respectively, and said second register unit including (N−1) registers electrically connected in series for receiving and holding (N−1) pel values of said search window, respectively.

8. A motion estimation apparatus as set forth in claim 6, in which each of said side register units comprises (N−1) registers for receiving and holding (N−1) pel values of said search window, respectively.

9. A motion estimation apparatus as set forth in claim 6, in which said input register unit comprises a first register unit including (H−N+1) flip-flops electrically connected in series and a second register unit, the series of said first register units being electrically connected at one end flip-flop to said search window supplying means for receiving the pel values of said search window and at the other end flip-flop to said second register unit for transmitting the pel value of said search window to said second register unit, said flip-flops being parallel connected to the processor elements of the (L−M+1)th row for transmitting the pel values of said search window to the matrix elements of the (L−M+1)th row, and said second register unit being electrically connected to the side register unit of the (L−M+1)th row for transmitting the pel values of said search window to the side register unit of the (L−M+i)th row, said search window supplying means being operated to carry out, in ascending order of column number, operations by each of which the pel vales of each column of said search window are supplied one by one in step with a first clock signal in ascending order of row number to said one end flip flop of said series of said first register units, the pel values received by said series of said flip-flops being shifted from said one end flip-flop toward said the other end flip-flop in turn in step with said first clock signal, said transmission control means and said second shift control means being operated to transmit and shift the pel values in step with a second clock signal having a pulse repetition period which is H/N times as long as that of said first clock signal, the pel values received by said flip-flops of said first register unit being parallel transmitted to the processor elements of the (L−M+1)th column in step with said second clock signal, and the pel values received by said second register unit being transmitted to the side register unit of the (L−M+1)th column in step with said second clock signal.

10. A motion estimation apparatus as set forth in claim 9, in which said second register unit comprises (N−1) flip-flops electrically connected in series.

11. A motion estimation apparatus as set forth in claim 6, in which said current block supplying means is operated to carry out, in ascending order of column number, operations by each of which the pel vales of each column of said current block are supplied one by one in ascending order of row number to the matrix elements of the even columns, and carry out in ascending order of column number, operations by each of which the pel values of each column of said current block are supplied one by one in descending order of row number to the matrix elements of the odd columns.

12. A motion estimation apparatus as set forth in claim 11, in which said current block supplying means comprises a first supplying unit for supplying the pel values of said current block to the processor elements of the even columns and a second supplying unit for supplying the pel values of said current block to the processor elements of the odd columns, said first supplying unit including (N+1) flip-flops electrically connected in series to carry out, in ascending order of column number, operations through each of which the pel vales of each column of said search window are inputted one by one in ascending order of row number into the 1st flip-flop of said first supplying unit, and the pel values of said current block received by the 1st flip-flop of said first supplying unit being shifted in turn toward the (N+1)th flip-flop of said first supplying unit and supplied one by one from the (N+1)th flip-flop of said first supplying unit to the processor elements of the even columns, and said second supplying unit including N flip-flops and (N−1) selectors arranged by turns and connected in series, the 1st flip-flop of said second supplying unit receiving the pel values of said current block from the Nth flip-flop of said first supplying unit, the nth selector receiving the pel values of said current block selectively from the nth flip-flop of said second supplying unit and from the (n−1)th flip-flop of said first supplying unit to output the received pel values to the (n+1)th flip-flop of said second supplying unit, said n being an integer defined by $1 \leq n \leq N$, and the pel values of said current block being supplied from the Nth flip-flop of said second supplying unit to the processor elements of the odd columns.

13. A motion estimation apparatus as set forth in claim 6, in which each of the intermediate registers of the odd columns of the matrix array comprises a selector and a flip-flop, the pel values of said search window being received by the selector of the intermediate register occupying an intersection of the ‖th column and the hth row selectively from the matrix element occupying an intersection of the ‖th column and the (h−1)th row and from the matrix element occupying an intersection of the (‖+1)th column and the hth row to output the received pel values to the flip-flop, and each of the intermediate registers of the even columns of said matrix array comprises a selector and a flip-flop, the pel values of said search window being received by the selector of the intermediate register occupying an intersection of the ‖th column and the hth row selectively from the matrix element occupying an intersection of the ‖th column and the (h+1)th row and from the matrix element occupying an intersection of the (‖+1)th column and the hth row to output the received pel values to the flip-flop.

14. A motion estimation apparatus as set forth in claim 6, in which each of the intermediate registers of the columns formed only by the intermediate registers comprises N flip-flops electrically connected in series and receives the pel values of said search window one by one from the 1st flip-flop, and the pel values of said search window received by the 1st flip-flop being shifted in turn toward and outputted from the Nth flip-flop.

15. A motion estimation apparatus as set forth in claim 6, in which the each of the intermediate registers of the columns formed only by the intermediate registers comprises a selector and a flip-flop, the pel values of said search window being received by the selector of the intermediate register occupying an intersection of the ‖th column and the hth row selectively from the matrix element occupying an intersection of the (‖+1)th column and the hth row and from intersection of the flip-flop of the intermediate register occupying the same intersection and outputted to the matrix element occupying an intersection of the (‖−1)th column and the hth row through the flip-flop of the intermediate register occupying the intersection of the ‖th column and the hth row.

16. A motion estimation apparatus as set forth in claim 6, further comprising:

a minimum distortion detecting unit for detecting the minimum distortion value from among said distortion values to specify the candidate block most similar to said current block; and distortion transmitting means for transmitting said distortion values from said processor elements to said minimum distortion detecting unit.

17. A motion estimation apparatus as set forth in claim 16, in which said current picture further includes another current block containing N×M pel values and deviated by M pels from said current block in a horizontal direction, said search window further including another search window overlapping with said search window and deviated by M pels from said search window in a horizontal direction, said another search window containing H×L pel values and having a plurality of candidate blocks each equal in size to said another current block, said search window supplying means being operated to supply said input register unit with the pel values of the (L−M+1)th-Lth columns of said another search window into said input register unit continuously after all of the pel values of said search window are inputted into said input register unit, thereby completing supplying said another search window to said input register unit, said current block supplying means being operated to supply said processor elements with the pel values of said another current block continuously after all of the pel values of said current block are inputted into said matrix elements, said transmission control means, said first to third shift control means, and said odd and even column input control means being repeatedly operated until all of the pel values of each candidate blocks of said another search window and all of the pel values of said another current block are received by each of the matrix elements, and said calculation control means being operated to further instruct said processor elements to calculate said distortion values each indicative of a difference between said another current block and each of said candidate blocks of said another search window on the basis of the pel received values of each of said candidate blocks and the pel received values of said current block.

18. A motion estimation apparatus as set forth in claim 6, further comprising:

a minimum distortion detecting unit for detecting the minimum distortion value from among said distortion values to specify the candidate block most similar to said current block; and distortion transmitting means for repeatedly transmitting the distortion values from the processor elements of the 1st column to said minimum distortion detecting unit, and from the processor elements of the ‖th column to the processor elements of the (‖−1)th column until all of said distortion values are transmitted to said minimum distortion detecting unit.

19. A motion estimation apparatus as set forth in claim 6, further comprising:

a minimum distortion detecting unit for detecting the minimum distortion value from among said distortion values to specify the candidate block most similar to said current block; and distortion transmitting means for repeatedly transmitting the distortion values from the processor elements of the 1st row to said minimum distortion detecting unit, and from the processor elements of the hth row to the processor elements of the (h−1)th row until all of said distortion values are transmitted to said minimum distortion detecting unit.

* * * * *